(12) United States Patent
Martin et al.

(10) Patent No.: US 12,377,397 B2
(45) Date of Patent: Aug. 5, 2025

(54) SYSTEMS, APPARATUS AND KITS FOR ENZYMATIC POLYNUCLEOTIDE SYNTHESIS

(71) Applicant: DNA Script, Le Kremlin-Bicêtre (FR)

(72) Inventors: Carl Martin, Le Kremlin-Bicêtre (FR); Marc Artigue, Le Kremlin-Bicêtre (FR); Sandrine Creton, Le Kremlin-Bicêtre (FR); Gabriel de Crozals, Le Kremlin-Bicêtre (FR); Xavier Godron, Le Kremlin-Bicêtre (FR); Adrian Horgan, Le Kremlin-Bicêtre (FR); Henri Lachaize, Le Kremlin-Bicêtre (FR); John Luckey, Le Kremlin-Bicêtre (FR); Christine Peponnet, Le Kremlin-Bicêtre (FR); Thomas Ybert, Le Kremlin-Bicêtre (FR)

(73) Assignee: DNA Script, Le Kremlin-Bicêtre (FR)

( * ) Notice: Subject to any disclaimer, the term of this patent is extended or adjusted under 35 U.S.C. 154(b) by 481 days.

(21) Appl. No.: 18/010,424

(22) PCT Filed: Jun. 14, 2021

(86) PCT No.: PCT/EP2021/065904
§ 371 (c)(1),
(2) Date: Dec. 14, 2022

(87) PCT Pub. No.: WO2021/254934
PCT Pub. Date: Dec. 23, 2021

(65) Prior Publication Data
US 2023/0241571 A1 Aug. 3, 2023

(30) Foreign Application Priority Data
Jun. 16, 2020 (EP) .................................. 20180224

(51) Int. Cl.
*B01J 19/00* (2006.01)
(52) U.S. Cl.
CPC .. *B01J 19/0046* (2013.01); *B01J 2219/00286* (2013.01); *B01J 2219/00317* (2013.01);
(Continued)
(58) Field of Classification Search
None
See application file for complete search history.

(56) References Cited

U.S. PATENT DOCUMENTS

| 5,234,809 A | 8/1993 | Boom et al. |
| 5,273,718 A | 12/1993 | Skold et al. |

(Continued)

FOREIGN PATENT DOCUMENTS

| WO | WO1991/06678 | 5/1991 |
| WO | WO2004/005667 | 1/2004 |

(Continued)

OTHER PUBLICATIONS

Arndt-Jovin et al. (1975) "Covalent Attachment DNA to Agarose—Improved Synthesis and Use in Affinity Chromatography", European Journal of Biochemistry, 54: 411-418.

(Continued)

*Primary Examiner* — Brian R Gordon
(74) *Attorney, Agent, or Firm* — MORRISON & FOERSTER LLP

(57) ABSTRACT

The invention is directed to systems, apparatus and kits for automated synthesis of a plurality of polynucleotides in an array of reaction chambers using a template-free polymerase. In some embodiments, adaptive elements and processes are provided to monitor and control disruption of the synthesis process and fluid movement by enzyme aggregation.

12 Claims, 25 Drawing Sheets

Specification includes a Sequence Listing.

(52) U.S. Cl.
CPC .............. *B01J 2219/00414* (2013.01); *B01J 2219/00423* (2013.01); *B01J 2219/00452* (2013.01); *B01J 2219/00689* (2013.01); *B01J 2219/00695* (2013.01); *B01J 2219/00722* (2013.01)

(56) References Cited

U.S. PATENT DOCUMENTS

| | | | |
|---|---|---|---|
| 5,367,066 | A | 11/1994 | Urdea et al. |
| 5,436,143 | A | 7/1995 | Hyman |
| 5,443,791 | A | 8/1995 | Cathcart et al. |
| 5,700,642 | A | 12/1997 | Monforte et al. |
| 5,739,386 | A | 4/1998 | Holmes |
| 5,763,594 | A | 6/1998 | Hiatt et al. |
| 5,808,045 | A | 9/1998 | Hiatt et al. |
| 5,830,655 | A | 11/1998 | Monforte et al. |
| 6,063,339 | A | 5/2000 | Tisone et al. |
| 6,818,394 | B1* | 11/2004 | O'Donnell-Maloney ............ C12Q 1/6827 435/177 |
| 7,056,666 | B2* | 6/2006 | Dower ............ B82Y 30/00 435/6.12 |
| 7,057,026 | B2 | 6/2006 | Barnes et al. |
| 7,529,598 | B2 | 5/2009 | Ingenhoven et al. |
| 7,544,794 | B1 | 6/2009 | Benner |
| 8,212,020 | B2 | 7/2012 | Benner et al. |
| 8,580,197 | B2 | 11/2013 | Glauser et al. |
| 8,808,988 | B2 | 8/2014 | Zhao et al. |
| 9,045,573 | B2 | 6/2015 | Maeta et al. |
| 9,103,809 | B2 | 8/2015 | West et al. |
| 10,435,676 | B2 | 10/2019 | Champion et al. |
| 11,112,418 | B1* | 9/2021 | Holmes ............ G01N 15/1434 |
| 2003/0138782 | A1* | 7/2003 | Evans ............ G16B 30/20 435/6.16 |
| 2003/0157700 | A1* | 8/2003 | Spence ............ B29C 65/568 506/13 |
| 2003/0186226 | A1 | 10/2003 | Brennan et al. |
| 2004/0106728 | A1 | 6/2004 | Mcgall et al. |
| 2005/0037991 | A1 | 2/2005 | Bodepudi et al. |
| 2010/0111768 | A1* | 5/2010 | Banerjee ............ B01L 9/527 422/82.08 |
| 2014/0308661 | A1* | 10/2014 | Holmes ............ G01N 35/0092 435/6.1 |
| 2015/0038373 | A1* | 2/2015 | Banyai ............ B01J 19/0046 506/23 |
| 2018/0187252 | A1* | 7/2018 | Hunter ............ B01J 19/0046 |
| 2019/0078065 | A1 | 3/2019 | Baiga et al. |
| 2019/0078126 | A1 | 3/2019 | Baiga et al. |
| 2020/0388351 | A1* | 12/2020 | Yekhanin ............ B01J 19/0046 |
| 2021/0047669 | A1* | 2/2021 | Nguyen ............ C12Q 1/6844 |
| 2021/0332351 | A1* | 10/2021 | Horgan ............ C12N 15/1068 |
| 2021/0371891 | A1* | 12/2021 | Nguyen ............ C12P 19/34 |
| 2022/0126298 | A1* | 4/2022 | Hill ............ B01J 19/0046 |
| 2022/0401957 | A1* | 12/2022 | Jebrail ............ B01L 3/502792 |
| 2023/0089448 | A1* | 3/2023 | Horgan ............ C12Y 207/07031 536/25.3 |
| 2025/0050301 | A1* | 2/2025 | Macevicz ............ B01J 19/0046 |

FOREIGN PATENT DOCUMENTS

| | | |
|---|---|---|
| WO | WO2015/159023 | 10/2015 |
| WO | WO2017/216472 | 12/2017 |
| WO | WO2019/135007 | 7/2019 |
| WO | WO2020/099451 | 5/2020 |

OTHER PUBLICATIONS

Batule et al. (2019) "Polymerization-sensitive switch-on monomer for terminal transferase activity assay", Artificial Cells, Nanomedicine, and Biotechnology, 47(1): 256-259.

Beaucage et al. (1992) "Advances in the Synthesis of Oligonucleotides by the Phosphoramidite Approach" Tetrahedron Report No. 309, 48(12): 2223-2311.

Becker et al. (1967) "The Enzymatic Cleavage of Phosphate Termini from Polynucleotides", The Journal of Biological Chemistry, 242(5): 936-950.

Bonora et al. (1993) "Large Scale, Liquid Phase Synthesis of Oligonucleotides by the Phosphoramidite Approach", Nucleic Acids Research, 21(5): 1213-1217.

Brown et al. (1998) "Solid Phase Synthesis", Synlett, (8): 817-827.

Butendeich et al. (2013) "Evaluation of a Liquid Dispenser for Assay Development and Enzymology in 1536-Well Format", Journal of Laboratory Automation, 18(3): 245-250.

Cameron et al. (1977) "3'-Phosphatase Activity in T4 Polynucleotide Kinase", Biochemistry, 16(23): 5120-5126.

Canard et al. (1994) "DNA Polymerase Fluorescent Substrates with Reversible 3'-Tags", Gene., 148(1): 1-6.

Canard et al. (1995) "Catalytic Editing Properties of DNA Polymerases", Proc Natl. Acad. Sci, 92(24): 10859-10863.

Cheng et al. (2002) "High Throughout Parallel Synthesis of Oligonucleotides with 1536 Channel Synthesizer", Nucleic Acids Research, 30(18), e93: 1-7.

Chong et al. (2009) "Stabilization of polymer-hydrogel capsules via thiol-disulfide exchange.", Small, 5(22): 2601-2610.

Delarue et al. (2002) "Crystal Structures of a Template-Independent DNA Polymerase: Murine Terminal Deoxynucleotidyltransferase", EMBO Journal, 21(3): 427-439.

Dickerson et al. (2002) "Soluble Polymers as Scaffolds for Recoverable Catalysts and Reagents", Chem Rev., 102(10): 3325-3344.

Ferrero et al. (2000) "Chemoenzymatic Transformations in Nucleoside Chemistry", Monatshefte fur Chemie 131: 585-616.

Fishman et al. (2003) "Synthesis and Investigation of Novel Branched PEG-Based Soluble Polymer Supports", J. Org. Chem., 68: 9843-9846.

Gavert et al. (1997) "Organic Synthesis on Soluble Polymer Supports: Liquid-Phase Methodologies", Chem. Rev. 97: 489-509.

Ghosh et al. (1987) "Covalent Attachment of Oligonucleotides to Solid Supports", Nucleic Acids Research, 15(13): 5353-5372.

Gokmen et al. (2012), "Porous Polymer Particles—A Comprehensive Guide to Synthesis, Characterization, Functionalization and Applications", Progress in Polymer Science, 37: 365-405.

Grantham, R. (1974) "Amino Acid Difference Formula to Help Explain Protein Evolution", Science, 185: 862-864.

Guo et al. (2008) "Four-color DNA Sequencing with 3'-O-Modified Nucleotide Reversible Terminators and Chemically Cleavable Fluorescent Dideoxynucleotides", Proc. Natl. Acad. Sci., 105(27): 9145-9150.

Hargreaves et al. (2015) "The Degradation of dG Phosphoramidites in Solution", Nucleosides, Nucleotides & Nucleic Acids, 34(10): 691-707.

Jensen et al. (2018) "Template-Independent Enzymatic Oligonucleotide Synthesis (THEOS): Its History, Prospects, and Challenges", Biochemistry, 57(12): 1821-1832.

Konieczynska et al. (2017) "On-Demand Dissolution of Chemically Cross-Linked Hydrogels", Acc. Chem. Res., 50(2): 151-160.

Lashkari et al. (1995) "An automated multiplex oligonucleotide synthesizer: Development of high-throughput, low-cost DNA synthesis", PNAS, 92(17): 7912-7915.

Lin et al. (2016) "Photoinduced Electron Transfer Between Fe(III) and Adenosine Triphosphate-BODIPY Conjugates: Application to Alkaline-Phosphatase-Linked Immunoassay", Biosensors & Bioelectronics, 77, 242-248.

Lu et al. (2018) "Recent advances of on-demand dissolution of hydrogel dressings", Burns & Trauma, 6(35): 1-13.

Mathews et al. (2016) "Photo-Cleavable Nucleotides for Primer Free Enzyme Mediated DNA Synthesis", Organic & Biomolecular Chemistry, 14(35): 8278-8288.

Meng et al. (2006) "Design and Synthesis of a Photocleavable Fluorescent Nucleotide 3'-O-Allyl-dGTP-PC-Bodipy-FL-510 as a Reversible Terminator for DNA Sequencing by Synthesis", J. Org. Chem., 71(8): 3248-3252.

Metzker et al. (1994), "Termination of DNA Synthesis by Novel 3'-Modifieddeoxyribonucleoside 5'-Triphosphates", Nucleic Acids Research, 22(20): 4259-4267.

(56) References Cited

OTHER PUBLICATIONS

Motea et al. (2010) "Terminal Deoxynucleotidyl Transferase: The Story of a Misguided DNA Polymerase", Biochimica et Biophysica Acta, 1804(5): 1151-1166.

Rasolonjatovo et al. (1999) "Development of a New DNA Sequencing Method: 3'-Ester Cleavage Catalyzed by Taq DNA Polymerase", Nucleosides & Nucleotides, 18(4&5): 1021-1022.

Schmitz et al. (1999) "Solid-Phase Enzymatic Synthesis of Oligonucleotides", Organic Letters, 1(11): 1729-1731.

Shchepinov et al. (1997) "Oligonucleotide Dendrimers: Synthesis and Use as Polylabelled DNA Probes", Nucleic Acids Research, 25(22): 4447-4454.

Sindelar et al. (1995) "High-throughput DNA Synthesis in a Multichannel Format", Nucleic Acids Research, 23(6): 982-987.

Taunton-Rigby, Alison (1973) "Oligonucleotide Synthesis. III. Enzymatically Removable Acyl Protecting Groups", J. Org. Chem., 38(5): 977-985.

Thurow et al. (2011) "A Fast Optical Method for the Determination of Liquid Levels in Microplates" Journal of Automated Methods and Management in Chemistry, 2011: 6 pages.

Uemura et al. (1989) "Regioselective Deprotection of 3',5'-O-Acylated Pyrimidine Nucleosides by Lipase and Esterase", Tetrahedron Letters, 30(29): 3819-3820.

Yang et al. (1994) "Mutational Analysis of Residues in the Nucleotide Binding Domain of Human Terminal Deoxynucleotidyl Transferase", The Journal of Biological Chemistry, 269(16): 11859-11868.

Zavgorodny et al. (1991) "1-Alkylthioalkylation of Nucleoside Hydroxyl Functions and Its Synthetic Applications: A New Versatile Method in Nucleoside Chemistry", Tetrahedron Letters, 32(51): 7593-7596.

* cited by examiner

| Reagent Code | Reagent |
|---|---|
| dAT | dATP |
| dCT | dCTP |
| dGT | dGTP |
| dTT | dTTP |
| EB | Elongation Buffer w/Elongation Enzyme |
| DB | Deblock Buffer |
| W2 | Wash 2 Buffer |
| W3 | Wash 3 / Tris Tween Triton |
| W4 | Wash 4 / Liberation Wash Buffer |
| LB | Liberation Buffer w/ Liberation Enzyme |
| W6 | Wash 6 / IPA |
| W1 | Wash 1 / 80% Ethanol |
| W7 | Wash 7 / Detergent Wash |
| W8 | Wash 8 / Machine Wash |
| EL | Elution Buffer |
| W5 | Wash 5 ** not used |

SYSTEMS, APPARATUS AND KITS FOR ENZYMATIC POLYNUCLEOTIDE SYNTHESIS

CROSS REFERENCE TO RELATED APPLICATIONS

This application is a U.S. national stage application under 35 U.S.C. § 371 of International Application No. PCT/EP2021/065904, filed internationally on Jun. 14, 2020, which claims priority benefit to EP Application Serial No. 20180224.6, filed Jun. 16, 2020.

Interest in enzymatic approaches to polynucleotide synthesis has recently increased not only because of increased demand for synthetic polynucleotides in many areas, such as synthetic biology, CRISPR-Cas9 applications, high-throughput sequencing, and the like, but also because of the limitations of chemical approaches to polynucleotide synthesis, such as the difficulty of performing multi-step synthesis reactions under inert atmospheres and moisture-free environments, the upper limits on product length, the use of, and needed disposal of, organic solvents, and so on, e.g. Jensen et al, Biochemistry, 57: 1821-1832 (2018); Sindalar et al, Nucleic Acids Research, 23(6):982-987 (1995); Lashkari et al, Proc. Natl. Acad. Sci., 92: 7912-7915 (1995); Hargreaves et al, Nucleosides, Nucleotides and Nucleic Acids, 34: 691-707 (2015). Enzymatic synthesis is attractive not only because of the specificity and efficiency of enzymes, but also because of its use of mild aqueous reaction conditions which simplify handling and eliminate the need for hazardous reagents.

On the other hand, the use of enzymes presents another set of problems for automating multi-step synthesis reactions in an apparatus including, but not limited to, enzyme adhering to surfaces, the need for stringent temperature and pH control to maintain enzyme activity, enzyme aggregation resulting in inactivity and/or clogging pores or nozzles, variations in enzyme activity in or near synthesis supports, batch to batch differences in enzyme specific activity, the formation of foams or bubbles that inhibit reagent transfer and separation, and the like.

In view of the above, parallel synthesis of polynucleotides using template-free polymerases would be advanced if methods and apparatus were available which addressed the problems posed in using enzymes and aqueous reaction mixtures and reagents in automated synthesis apparatus.

SUMMARY OF THE INVENTION

The invention is directed to systems, apparatus and kits for enzymatically synthesizing in parallel a plurality of polynucleotides in separate reaction chambers or sites. In some embodiments, systems, apparatus and kits of the invention implement automated synthesis of polynucleotides that are poly-2'-deoxyribonucleotides (or DNAs); in other embodiments, systems, apparatus and kits of the invention implement automated synthesis of polynucleotides that are polyribonucleotides (or RNAs).

In one aspect, the invention comprises systems and apparatus for synthesizing with a template-free polymerase a plurality of polynucleotides each with a predetermined sequence comprising the following elements: (a) a plurality of reaction chambers, each reaction chamber having a synthesis support with initiators attached, wherein each initiator has a free 3'-hydroxyl, and wherein each reaction chamber has an inlet and an outlet and a filter that retains the synthesis support and that is operationally associated with the outlet so that reaction solutions exiting the reaction chamber pass through the filter; (b) a waste manifold operationally associated with the outlets of the reaction chambers such that reaction solutions are removed from the reaction chambers and enter the waste manifold whenever a positive pressure differential is establish between the reaction chambers and the waste manifold; (c) a fluid delivery system for delivering reaction solutions to the reaction chambers, the reaction solutions comprising 3'-O-protected nucleoside triphosphates, a deprotection solution; and a template-free polymerase; (d) a user interface for accepting nucleotide sequences of polynucleotides to be synthesized; and (e) a control system operationally associated with the user interface, the reaction chambers, the fluid delivery system and the waste manifold, wherein the control system assigns the predetermined sequence of each polynucleotide to a reaction chamber for synthesis, and wherein for each reaction chamber, the control system directs repeated steps of: (i) delivering under coupling conditions to the initiators or deprotected elongated fragments a 3'-O-protected nucleoside triphosphate and a template-free polymerase, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments, (ii) delivering the deprotection solution to the reaction chambers so that the 3'-O-protected elongated fragments are deprotected, and (iii) producing a pressure differential between the reaction chambers and the waste manifold to remove deprotection solution from the reaction chambers at a predetermined rate.

In some embodiments, the above systems and apparatus further comprises one or more liquid level sensors for measuring a liquid level in each of the reaction chambers, and wherein said control system directs repeated steps of: (i) delivering under coupling conditions to the initiators or deprotected elongated fragments a 3'-O-protected nucleoside triphosphate and a template-free polymerase, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments, (ii) delivering the deprotection solution to the reaction chambers so that the 3'-O-protected elongated fragments are deprotected, (iii) producing a pressure differential between the reaction chambers and the waste manifold to remove deprotection solution from the reaction chambers at a predetermined rate, and (iv) measuring with the one or more liquid level sensors a liquid level in each of said reaction chambers and whenever a reaction chamber is identified whose liquid level is outside of predetermined bounds, bypassing the identified reaction chamber in subsequent reagent delivery steps.

In some embodiments, systems and apparatus for enzymatically synthesizing a plurality of polynucleotides each with a predetermined sequence comprises the following elements: (a) a plurality of reaction chambers, each reaction chamber having a synthesis support with initiators attached, wherein each initiator has a free 3'-hydroxyl, and wherein each reaction chamber has an inlet and an outlet and a filter that retains the synthesis support and that is operationally associated with the outlet so that reaction solutions exiting the reaction chamber pass through the filter; (b) a waste manifold operationally associated with the outlets of the reaction chambers such that reaction solutions are removed from the reaction chambers and enter the waste manifold whenever a positive pressure differential is establish between the reaction chambers and the waste manifold; (c) a fluid delivery system for delivering reaction solutions to the reaction chambers, the reaction solutions comprising 3'-O-protected nucleoside triphosphates, a deprotection solution, a template-free polymerase and a protease solution; (d) one or more liquid level sensors for measuring rates of change of liquid levels in individual reaction chambers; (e) a user interface for accepting nucleotide sequences of polynucleotides to be synthesized; and (f) a control system operationally associated with the user interface, the array of reaction chambers, the fluid delivery system and the waste manifold, wherein the control system assigns the predetermined sequence of each polynucleotide to a reaction chamber for synthesis, and wherein for each reaction chamber, the control system directs repeated steps of: (i) delivering under coupling conditions to the initiators or deprotected elongated fragments a 3'-O-protected nucleoside triphosphate and a template-free polymerase, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments, (ii) delivering the deprotection solution to the reaction chambers so that the 3'-O-protected elongated fragments are deprotected, (iii) producing a predetermined pressure differential between the reaction chambers and the waste manifold to remove deprotection solution from the reaction chambers, (iv) delivering a wash solution to the reaction chambers, (v) producing a predetermined pressure differential between the reaction chambers and the waste manifold to remove wash solution from the reaction chambers, and (vi) measuring with the one or more liquid level sensors a rate of change of liquid level in each of a portion of the reaction chambers and whenever a reaction chamber is detected whose rate of liquid removal is below the predetermined rate a corrective action is actuated; wherein the kind of 3'-protected nucleoside triphosphate contacted in step (i) in a reaction chamber is determined by the predetermined sequence assigned to the reaction chamber. In some embodiments, the control system further directs (iv) measurement of said rates of change of liquid levels during removal of said deprotection solution or during removal of said wash solution. In some embodiments, a corrective action comprises a further step of delivering the protease solution to the reaction chamber whose rate of liquid removal is below said predetermined rate. In some embodiments, the corrective action comprises a further step of bypassing in subsequence reagent delivery steps to the reaction chamber whose rate of liquid removal is below the predetermined rate. In some embodiments, the corrective action comprises increasing the intensity of the vacuum used to evacuate the reaction chambers.

These above-characterized aspects, as well as other aspects, of the present invention are exemplified in a number of illustrated implementations and applications, some of which are shown in the figures and characterized in the claims section that follows. However, the above summary is not intended to describe each illustrated embodiment or every implementation of the present invention.

DETAILED DESCRIPTION OF THE INVENTION

Figure 1:
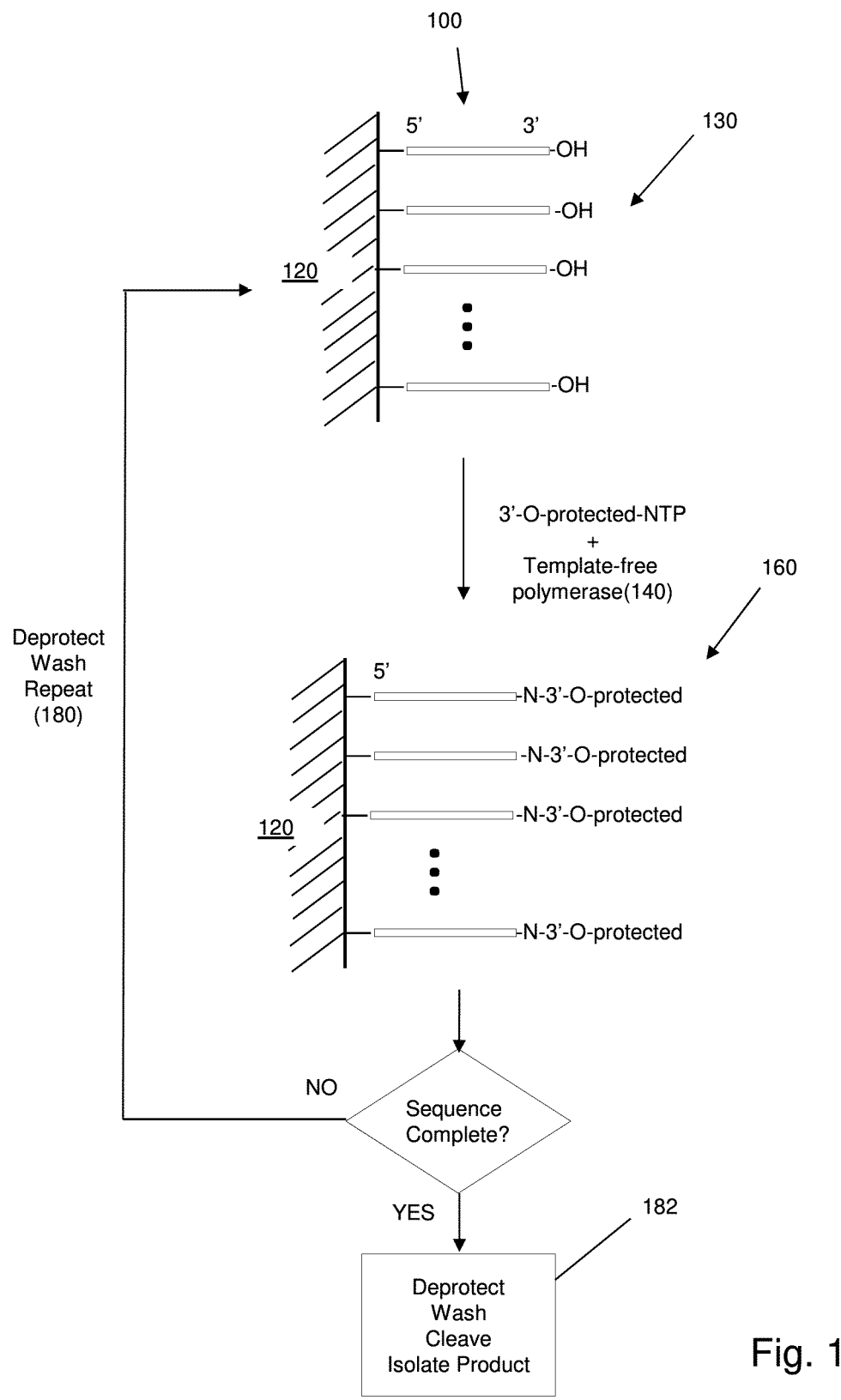
FIG. 1 illustrates diagrammatically the basic steps of enzymatic synthesis of a polynucleotide.

The general principles of the invention are disclosed in more detail herein particularly by way of examples, such as those shown in the drawings and described in detail. It should be understood, however, that the intention is not to limit the invention to the particular embodiments described. The invention is amenable to various modifications and alternative forms, specifics of which are shown for several embodiments. The intention is to cover all modifications, equivalents, and alternatives falling within the principles and scope of the invention. Guidance for selecting materials and components to carry out particular functions may be found in available treatises and references on scientific instrumentation including, but not limited to, Moore et al, Building Scientific Apparatus, Third Edition (Perseus Books, Cambridge, MA); Hermanson, Bioconjugate Techniques, $3^{rd}$ Edition (Academic Press, 2013); and like references.

In one aspect, the invention is directed to systems and apparatus for parallel enzymatic synthesis of a plurality of polynucleotides of predetermined sequences in an array of addressable reaction chambers using a template-free polymerase. That is, systems and apparatus of the invention carry out automatically synthesis of a plurality of polynucleotides of predetermined sequences using for each polynucleotide the synthesis scheme shown in FIG. 1. It is understood that the term "predetermined" in reference to polynucleotide sequences includes the placement of random sequences at predetermined locations, e.g. in the synthesis of random sequence tags or barcodes. In some embodiments, systems of the invention comprise apparatus of the invention whose practice comprises the implementation of specific method steps. In some embodiments, systems and apparatus of the invention may further carry out cleavage or release of synthesized polynucleotides from their synthesis supports and isolation of the cleaved or released polynucleotide products. In some embodiments, systems and apparatus of the invention comprise (i) a plurality of reaction wells, each reaction well being capable of accepting reactants, wash solutions, synthesis supports through an inlet or opening, holding such reactants, wash solutions and synthesis supports for predetermined incubation times, and having such reactants and wash solutions removed through an outlet operationally associated with a filter that retains the synthesis supports, wherein the plurality of reaction chambers are usually provided in a regular, e.g. rectilinear, planar array, (ii) a waste manifold operationally associated with the outlets of the reaction chambers for accepting reactants and wash solutions removed from the reaction chambers whenever a positive pressure differential is established between the reaction chambers and the waste manifold causing fluid in the reaction chambers to flow through the reaction chamber outlet to the waste manifold, (iii) a fluid delivery system for storing and delivering reagents to reaction chambers under the control of a control system, (iv) a user interface for accepting polynucleotide sequences, for example, via direct entry by a user or transmission from another device, e.g. a personal computer, cell phone, or the like, and for displaying process options, recommendations and warnings to a user, (v) a control system for controlling the operation of the fluid delivery system, waste manifold, and reaction chambers to effect polynucleotide synthesis in the reaction chambers, and additionally to collect and store process data, error management, and to implement adaptive processes, i.e., corrective actions, based on process data analysis, and (vi) liquid level sensors also under control of the control system for monitoring fluid removal from reaction wells during a synthesis cycle and detecting failure to remove fluid or inadequate fluid removal. In some embodiments, apparatus of the invention may further include components for performing a preliminary (i.e. pre-synthesis) polymerase activity assay. Based on the results of the assay, the control system can adjust incubation times and temperature of coupling reactions to optimize yields, or in extreme cases can recommend to a user via the user interface that reagents should be changed. In some embodiments, apparatus and systems of the invention may include elements for cleaving polynucleotide products from their synthesis supports and isolating the cleaved product. These embodiments may vary widely depending on the cleavage mechanism used and the isolation method used. In some embodiments, after cleavage, isolation is accomplished by conventional purification techniques, including gel filtration or adsorption onto silica-based materials, such as glass. Thus, in such embodiments, commercially available DNA isolation plates compatible with synthesis plates (comprising a plurality of reaction chambers) may be employed and positioned by a conventional plate mover or other robotic component of the apparatus. Exemplary commercially available isolation plates are available from Invitek Molecular (Berlin), Enzymax (Lexington, KY), Qiagen (San Diego), or like vendors. Such commercially available isolation plates are typically used in accordance with the manufacturer's recommended protocols. Exemplary plate movers for use in the invention may comprise simple custom made plate-gripping components coupled with movement on a track for transport between stations, or plate movers may comprise commercially available robots, such as Spinnaker Microplate Robot (ThermoFisher), or the like. Such plate mover moves the synthesis plate and/or the DNA isolation plate so that they are in proper relation to one another for cleavage and isolation to take place. In some embodiments, cleaved polynucleotide product can be isolated by chromatography, for example, in embodiments using 96-well synthesis plates, by use of Repligen's OPUS® RoboColumn® plate, or the like, with suitable packing material.

The magnitude of the plurality of polynucleotides synthesized by an apparatus of the invention may vary widely. In some embodiments, the plurality may be in the range of from 2 to 10000, or from 2 to 5000, or from 2 to 2000, or from 2 to 500, or from 2 to 100. In other embodiments, the plurality may be in the range of from 100 to 2000, or from 100 to 500. In some embodiments, the plurality of polynucleotides is equal or less than the number of wells in a standard, commercially available multi-well plate, such as a 24-well, 48-well, 96-well, 384-well or 1536-well plate. In some embodiments, the plurality of polynucleotides is the same as or less than the number of reaction chambers, or reaction wells, in a planar array. The lengths of the plurality of polynucleotides may be the same or different and, in some embodiments, may vary between 10 and 1000 nucleotides. In other embodiments, the lengths of polynucleotides synthesized by systems and apparatus of the invention may vary between 10 and 500 nucleotides, or between 10 and 200 nucleotides, or between 10 and 100 nucleotides.

Figure 2A:
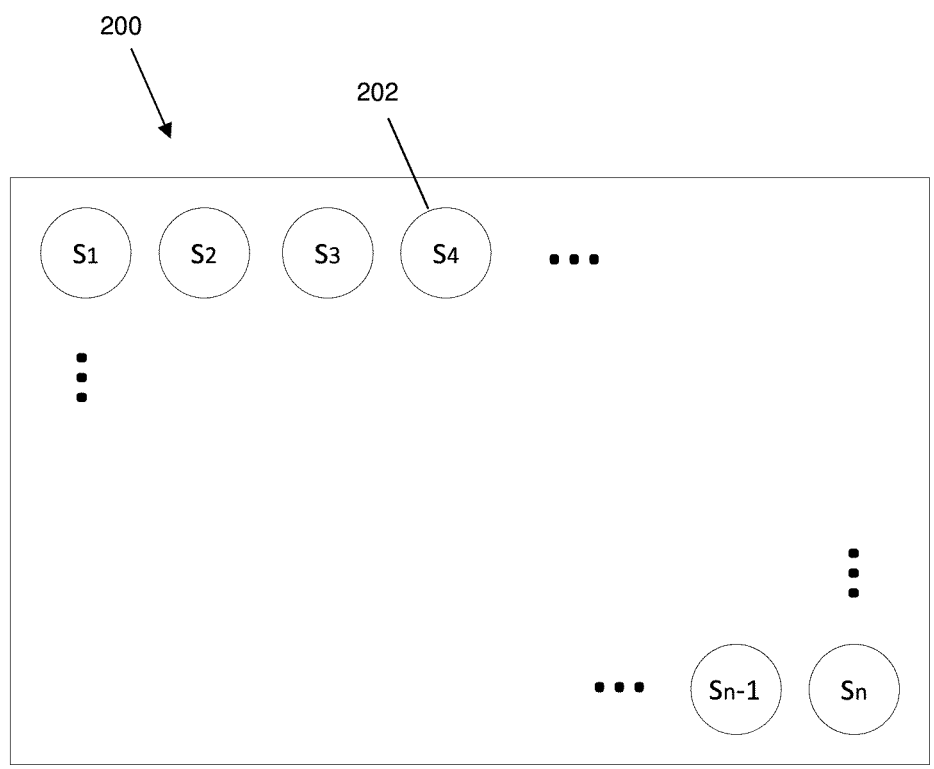
FIG. 2A illustrates a planar array of reaction chambers in the form of a rectilinear arrangement of 96 reaction wells in a planar substrate, wherein, for example, each reaction well is addressable for the purpose of delivering reagents.

Each reaction chamber of a plurality has an inlet and an outlet and a filter operationally associated with the outlet which is capable of retaining a synthesis support material in the reaction chamber whenever liquid reagents are removed from the reaction chamber through the outlet. In some embodiments, an array of reaction chambers for use with the invention may be a commercially available 24-well, 48-well, 96-well, 384-well or 1536-well filter plate, e.g. available from Pall, Agilent, ThermoFisher, or like companies. In some embodiments, the volume of the reaction chambers may be in the range of from 0.5 µL to 10 mL, or in the range of from 1.0 µL to 5 mL, or in the range of from 2.0 µL to 5 mL, or in the range of from 5 µL to 5 mL, or in the range of from 1.0 µL to 400 µL. Typical working reaction volumes of a reaction chamber are in the range of from 50% to 75% of the reaction chamber volume. In some embodiments, reaction chambers are formed in a planar substrate that comprises a material that is inert to and stable under exposure to the reagents and conditions of the enzymatic synthesis process. Exemplary materials include, but are not limited to, nylon, polypropylene, polystyrene, polytetrafluorethylene (PTFE), polyvinylidene fluoride (PVDF), or the like. FIG. 2A shows an array or plate (200) of reaction chambers (in this case, wells (202)) arranged in a rectilinear array, wherein each well in the array or plate is addressable, particularly in the sense that the control system can be programmed to precisely deliver a predetermined reagent to any predetermined well ($S_1$, $S_2$ . . . $S_n$) in the array. In other embodiments, an array of reaction chambers may have different arrangements, such as, hexagonal, concentric, or the like. In some embodiments, each different polynucleotide of a plurality is synthesized in a different reaction chamber.

Each reaction chamber contains a synthesis support material that has attached initiators onto which monomers are coupled during synthesis. As described more fully below, the type of synthesis support employed with the system and apparatus may vary widely in both size and composition. In some embodiments, synthesis supports may comprise the filter of a reaction chamber. In some embodiments, synthesis supports may be separate from and dispose in the reaction chambers. For example, in some embodiments, synthesis supports are solid particles or beads. Such solid particles or beads may include either nonporous solid particles or beads wherein synthesis occurs on the surface of the synthesis support material, or porous solid particles or beads, such as gel particles or resins, wherein synthesis occurs on both the surface and interior of the synthesis support material. In some embodiments, the plurality of reaction chambers may be in the form of a synthesis plate comprising an array of wells, e.g. in a conventional 96-well or 384-well format, each containing a predetermined quantity of synthesis support with initiators attached. As described more fully below, in some embodiments, such synthesis plates may include synthesis supports disposed in a predetermined volume of viscous humectant solution deposited in the well. The viscous humectant protects synthesis supports in a well from drying out and immobilizes or localizes the supports so that movement within the well is minimized or eliminated. In some embodiments, such synthesis supports are provided to users in vacuum packaged form, for example, vacuum packed in a plastic, mylar, metal foil or other protective material. Appliances for producing such vacuum packaged synthesis plates include such simple device as a Kitchenboss, or like appliances. In some embodiments, humectants are selected from glycerol, alcohol sugars, ethylhexylglycerin, panthenol, sorbitol, xylitol, maltitol, propylene glycol, hexylene glycol, butylene glycol, sodium lactate, hyaluronic acid, polydextrose, or the like. In some embodiments, such humectant have a viscosity equivalent to a glycerol/water solution in the range of 40-60 percent (v/v) glycerol:water. In some embodiments, the humectant is a 50 percent (v/v) glycerol:water solution. As used herein, a "humectant" is any hygroscopic substance that attracts and retains moisture. In some embodiments, synthesis plates may comprise mixtures of two or more humectants or with different humectants in different wells. In some embodiments, either separate from viscous humectants or together with viscous humectants, synthesis supports also may be immobilized or localized in a dissolvable gel, such as, a dissolvable hydrogel, such as, a disulfide-stabilized hydrogel, e.g. Chong et al, Small, 5(22): 2601-2610 (2009); Lu et al, Burns & Trama, 6:35 (2018); Konieczynska et al, Acc Chem Res, 50(2): 151-160); and the like.

The filter associated with a reaction chamber or an array of reaction chambers may be a planar sheet of filter material bonded to, or sealingly attached to, the outlet or outlets of reaction chambers. Typically the filter is made of a material inert to, and stable under, the reagents and conditions of the enzymatic synthesis process. For example, such filtration membranes may comprise polyethersulfone, polysulfone, cellulose, nylon, polypropylene, cellulose acetate, cellulose nitrate, polytetrafluorethylene (PTFE), glass fiber, polyvinylidene fluoride (PVDF), polyvinyl chloride, acrylic copolymer, aluminum oxide, polyester, and the like. In some embodiments, filter material is, or has been treated to be, hydrophobic, for example, to prevent seepage of aqueous reagents through the filter during incubations. In some embodiments, filters comprise PTFE, PVDF or polypropylene.

Pore size, pore size distribution, pore density, and like characteristics of the filter material of a reaction chamber are selected so that it retains the synthesis support material but permits passage of proteins and other reagents upon application of a pressure differential between the reaction chamber and waste manifold. Thus, in some embodiments, the pore size selected depends in part on the nature of the synthesis support material. In some embodiments, when synthesis supports are conventional solid or gel particles or beads (e.g. >40 μm diameter), filters having pores with average diameters in the range of 0.1 μm to 10.0 μm may be employed; or in other embodiments, filters having pores with average diameters in the range of 0.1 μm to 1.0 μm may be employed. In some embodiments, commercially available 96-well and 384-well filter plates having 0.45 μm pores or 1.2 μm pores may be used. In some embodiments, filters employed have pore densities ranging from 1 to $10^6$ pores per $cm^2$. In some embodiments, for example, in which soluble synthesis supports, such as polymer supports, are employed, nanofiltration may be used. Nanofiltration may be accomplished, for example, using filters having average pore size (or diameters) in the range of from 1 nm to 50 nm, or in the range of from 1 nm to 10 nm.

In some embodiments, a number of the plurality of reaction chambers may be dedicated to measuring the activity of the template-free polymerase, for example, prior to the initiation of a synthesis. The number of reaction chambers used for this purpose depends on several factors, including (i) whether a single template-free polymerase is employed or whether two or more template-free polymerases are employed, (ii) whether duplicate measurements are desired, (iii) whether the template-free polymerase is delivered as a separate reagent to reaction chambers or whether template-free polymerase is stored and delivered as a mixture that also includes a 3'-O-protected dNTP. In some embodiments, the number of reaction chambers used to measure template-free polymerase activity is in the range of from 1 to 12, or from 1 to 8, or from 1 to 4; in other embodiments, a portion of the plurality of reaction chambers are used to test template-free polymerase activity; in still other embodiments such portion may be up to 10 percent of the plurality of reaction chambers; or up to 5 percent of the plurality of reaction chambers; or up to 2 percent of the plurality of reaction chambers. In some embodiments, reaction chambers used for measuring template-free polymerase activity are identical to other reaction chambers of the same plurality, or synthesis plate. The difference is that the control system designates the number and locations or addresses of reaction chambers to be used for conducting the activity assays.

In one embodiment, template-free polymerase activity assays used with systems and apparatus of the invention provide an optical readout, for example, a fluorescent intensity that has a monotone relationship with activity, such as a linear relationship between fluorescent intensity and activity. A particular optical readout assay for activity that may be used with the invention is that disclosed by Batule et al, Artificial Cells, Nanomedicine, and Biotechnology, 47(1): 256-259 (2019). Briefly, Batule et al disclose a BODIPY-labeled dATP monomer that is quenched by Fe(III) until it is incorporated into an initiator by a terminal deoxynucleotidyltransferase (TdT). Synthesis of the dATP analog is described by Lin et al, Biosensors and Bioelectronics, 77: 242-248 (2016). Upon incorporation, the Fe(III)-based quenching ceases and the BODIPY moiety fluoresces with an intensity proportional to the amount of incorporation. Thus, to carry out the assay, one need only deliver the template-free polymerase to be tested and the BODIPY-labeled dATP to a designated reaction chamber containing an initiator. In embodiments of the invention in which template-free polymerase is delivered in a mixture with 3'-O-protected monomers, at least four reaction chambers would need to be used if the activities of all four template-free polymerase mixtures were tested.

Apparatus and systems of the invention comprise at least one waste manifold operationally associated with the plurality of reaction chambers and the control systems for simultaneously generating a positive pressure differential between all of the reaction chambers and the waste manifold which causes fluids in the reaction chambers to flow through the filter of the reaction chamber to the waste manifold (and subsequently to a waste container). The positive pressure differential may be generated by the application of a pressure head to the reaction chambers (for example, as described by Skold et al, U.S. Pat. No. 5,273,718) or by the application of a vacuum to the waste manifold chamber (for example, as described by Sindelar et al, Nucleic Acids Research, 23(6): 982-987 (1995)). Exemplary vacuum manifolds for use in the invention include the MilliporeHTS™ vacuum manifold, BioTek ELx405™ vacuum filtration module, or the like. Exemplary synthesis plates include filter plates for these manifolds in either 96-well or 384-well formats. In embodiments employing vacuum, a waste manifold includes vacuum sensors and regulators that permit the intensity of vacuum applied to the reaction chambers to be controlled by the control system. In some embodiments, the waste manifold also includes components for regulating the temperature of the plurality of reaction chambers and a shaker for agitating the reaction mixtures in the reaction chambers. Operational association between the waste manifold and the plurality of reaction chambers includes the establishment of a seal between the substrate comprising the reaction chambers and the waste manifold so that the pressure differential between the waste manifold chamber and reaction chambers may be controlled. Such operational association also includes the timing of instructions generated and sent by the control system to the fluid delivery system and waste manifold for delivery of reagents, determination of incubation times and timing of reagent removal in order to effect the synthesis steps of the enzyme-based process. In some embodiments, such operational association may also include changing temperature, incubation times of reactions depending on measured activities of template-free polymerases. In some embodiments, a waste manifold may include vacuum sensors, vacuum regulators, temperature sensors, and temperature regulating devices to control the temperature of a plate mounted on the manifold. Such sensors and regulators are operationally associated with the control system and may be used by the control system to implement a corrective action whenever liquid level sensors indicated inadequate fluid removal from reaction chambers. Such corrective actions may include increasing the intensity of vacuum applied to the synthesis plate, increasing the duration that vacuum is applied, or both. For conventional 96-well and 384-well filter plates vacuum may be in the range of 100-600 mmHg and vacuum may be applied for a time in the range of from 5-40 sec. Guidance for operating a vacuum manifold for conventional 96-well and 384-well filter plates is found in Goodrich, Tech Note, "Tips for optimizing microplate vacuum filtration results," Rev. Oct. 26, 2011.

A fluid delivery system comprises (i) reservoirs for storing reagents required for carrying out synthesis reactions and, in some embodiments, cleavage reactions and product isolation and (ii) components for delivering at the proper time reagents from the reservoirs to the reaction chambers, which may comprise pipette-based delivery or a system of conduits, tubing, connectors, valves, pumps, nozzles, and the like. Fluidic delivery systems may also include temperature sensors at a variety of locations, e.g. reservoirs, valves, nozzles, etc), temperature control elements (e.g. heaters and/or refrigeration units) to maintain reagents at temperatures to maximize their stability and effectiveness, volume level sensor for reservoirs, and the like. Such sensors are operationally associated with the control system and may be used for monitoring for errors or anomalous conditions in the apparatus. A wide variety of fluid delivery apparatus and components may be constructed or adapted for use to carry out the fluid delivery requirements of the invention. Extensive guidance for this purpose is available in the literature of automated chemical synthesis and analysis, e.g. Miertus et al, editors, Combinatorial Chemistry and Technologies: Methods and Applications, Second Edition (CRC Press, 2005); West et al, U.S. Pat. No. 9,103,809; Butendeich et al, J. Laboratory Automation, 18(3): 245-250 (2013); Fluent Automated Workstations (Tecan Group); Tisone et al, U.S. Pat. No. 6,063,339; Cathcart et al, U.S. Pat. No. 5,443,791; Ingenhoven et al, U.S. Pat. No. 7,529,598; Glauser et al, U.S. Pat. No. 8,580,197; Sindalar et al, Nucleic Acids Research, 23(6): 982-987 (1995); Cheng et al, Nucleic Acids Research, 30(18): e93 (2002); Skold et al, U.S. Pat. No. 5,273,718; and the like. In some embodiments, the fluid delivery system of the invention may comprise in part a conventional fluid delivery robot. In other embodiments, apparatus of the invention may comprise in part inkjet fluid delivery systems. In some embodiments, the fluid delivery system may comprise a reagent cartridge, which may be disposable, and which may be conveniently attached or installed in a compatible receiving station of the apparatus. Such cartridges may contain a necessary quantity of reagents to synthesize a predetermined quantity of each of a predetermined number of polynucleotides each having a length below a predetermined maximum. In some embodiments, such predetermined quantity is in the range of from 1 to 1000 pmoles, or from 1 to 200 pmoles. In some embodiments, such predetermined number of polynucleotides is in the range of from 1 to 96, or in the range of from 1 to 384. In some embodiments, such predetermined length is in the range of from 25 to 600 nucleotides, or in the range of from 50 to 200 nucleotides.

A user interface provides a means for a user to communicate information to the apparatus and to receive information from the apparatus concerning the status of apparatus (e.g. reagent temperatures, reaction chamber temperatures, valve/pump temperatures, etc.), reagent levels, synthesis status, cleavage and isolation status, quantitative and qualitative yield information, or the like. A user interface may also provide a means for a user to communicate with websites on the internet for the purpose of ordering products and services, for example, such as oligonucleotide design services, apparatus diagnostic services, or the like. The primary information provided by the user to the apparatus comprises the sequences of the plurality of polynucleotides to be synthesized. Other information may include synthesis scale, user-determined assignment of reaction chambers to particular sequences, user-determined reaction conditions (such as, reaction times and temperatures), and the like. The user interface may comprise a variety different communication devices, such as, a computer with a graphical user interface, a mobile telephone, dedicated hardware and software, or a combination of the foregoing. A computer providing all or part of the user interface may be integrated with the apparatus of the invention or it may be physically separate from the apparatus of the invention connected to the apparatus only by a communications link, e.g. cable, blue tooth, or the like. User interface software may comprise or be part of conventional laboratory software, such as, for example, LabView, that makes up part or all of the control system.

In some embodiments, instruments and systems of the invention may comprise a graphical user interface (GUI) as disclosed in FIGS. 6A-6E. The software generating features of the GUI may reside on the instrument or at a remote website. Generally such GUI provides a glyph, or graphic object, capable of representing multiple data values in a single object. In the present instrument and system, each reaction chamber of an array is associated with at least one glyph, and in some embodiments, a single glyph. Usually, the GUI generates at least one screen that displays an array view of the glyphs in which they are arranged in an array where their relative positions with respect to one another corresponds to the physical array of reaction chambers. In some embodiments, another feature of the GUI is that each glyph in the array may be clicked to open a window that provides an enlarged view of the glyph with additional data and user choices.

Figure 6A:
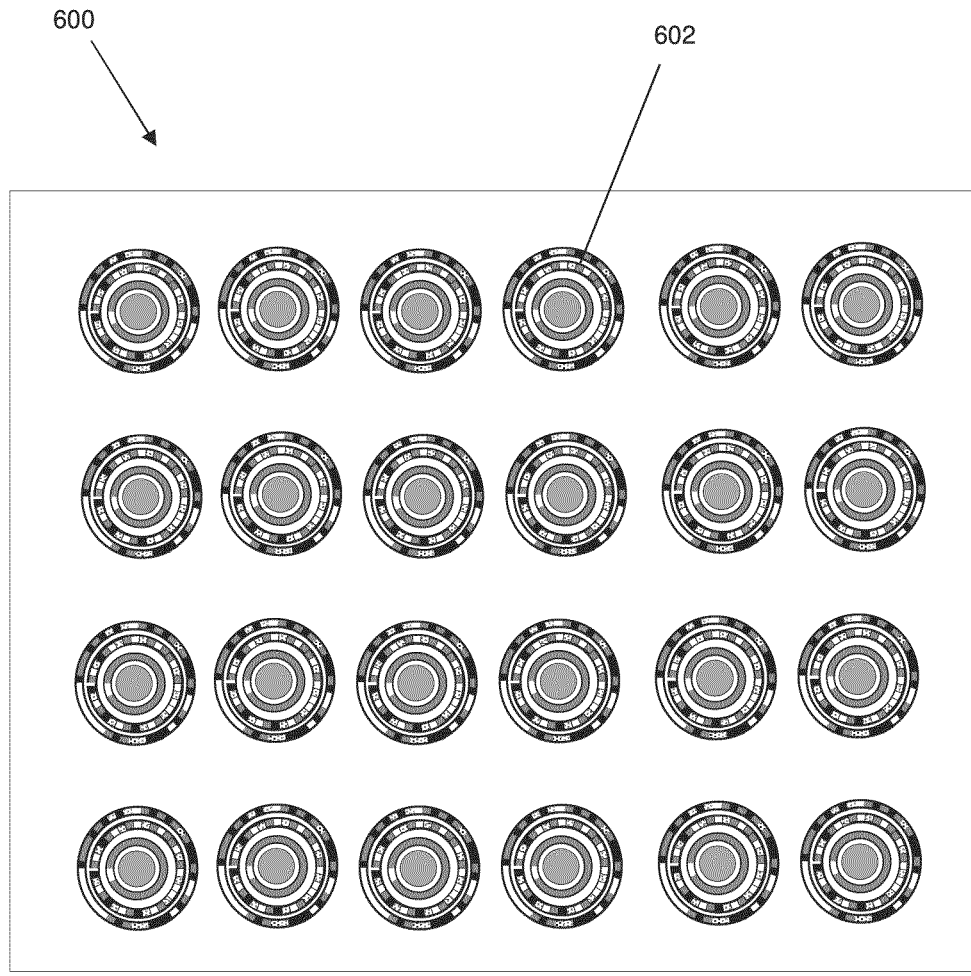
FIGS. 6A-6E illustrate features of a user interface for use with the invention.
Figure 6B:
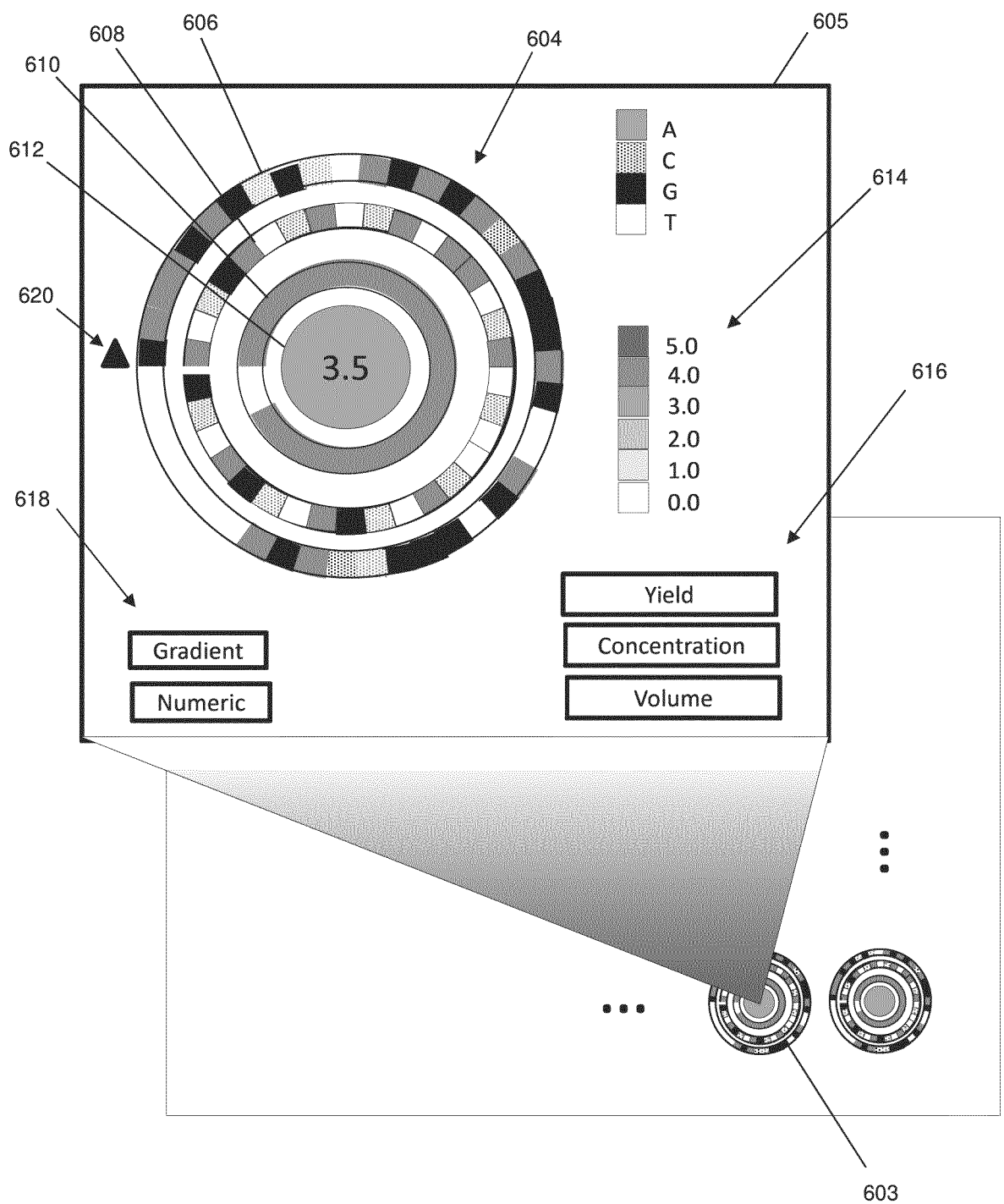
Figure 6C:
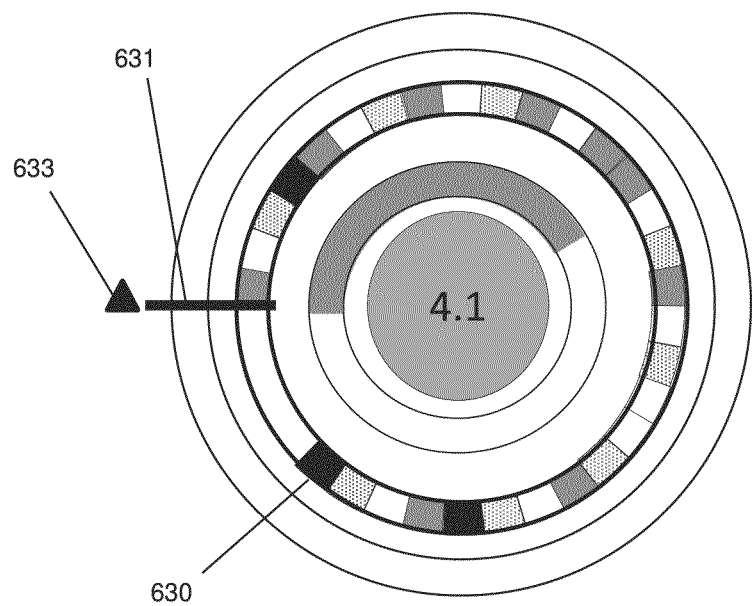
Figure 6D:
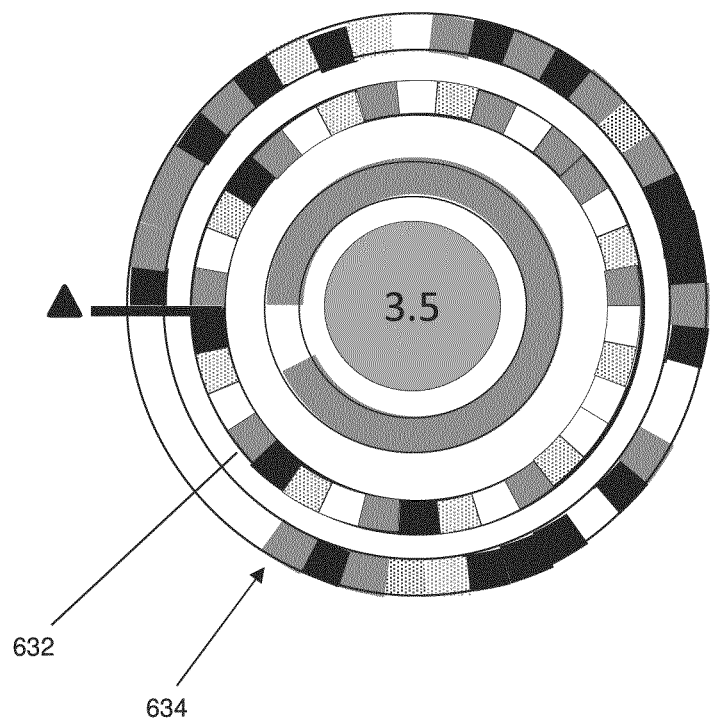
Figure 6E:
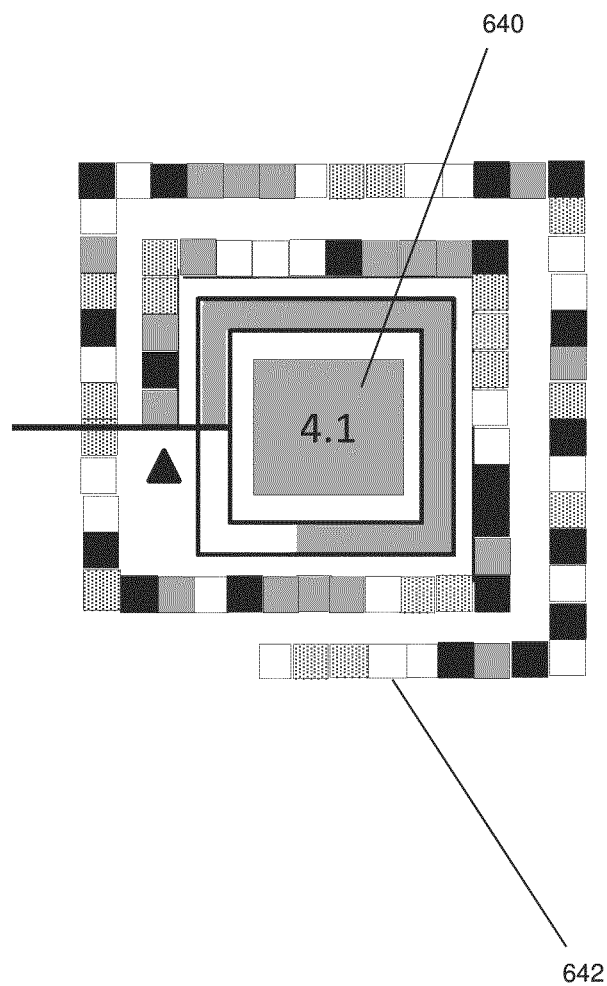

In some embodiments, glyphs provide polynucleotide sequence information coded as a sequence of colored or patterned shapes (representing different nucleotides) along a line or curve that is part of a geometric shape, such as a circle or a plurality of nested circles. In some embodiments, sequence representations may be arranged either in a nested set of circles or regular polygons (such as a nested set of squares) or in a continuous curve, such as a spiral. Such geometric figures are compact in the sense that whatever sequence information that is displayed it is displayed within a bounded area which is the same for each glyph. In some embodiments, such bounded area is independent of sequence length so that a plurality of glyphs may be displayed in an array format having a constant total area, as exemplified in the 6-by-4 array (600) of glyphs (602) in FIG. 6A. The glyphs themselves are not identical and may be distinguished visually, even in the array format, by virtue of different patterns created by different polynucleotide sequences; however, more readily discernible sequence information and additional data for a particular reaction chamber may be accessed in the GUI by providing a click-accessible window, such as illustrated in FIG. 6B, which contains an enlargement of a glyph of FIG. 6A. As used herein, "click-accessible" means a feature in which a user controlled cursor may be placed at a location on the GUI screen, e.g. on a glyph, followed by actuation of a separate control, e.g. on a mouse or keyboard, to cause the GUI to carry out some predetermined function, e.g. create a window, related to the location. In FIG. 6B, after clicking on glyph (603), window (605) is generated that includes an enlarged glyph (604) and additional information. In the enlarged glyph, sequence information is contained in two concentric circles (outer circle, 606, and second inner circle, 608) each containing a sequence of gray, spotted, black and white filled spaces to represent the sequence of A, C, G and T nucleotides, respectively. The beginning of the sequences for both circles may be indicated by symbol (620) or by like means. First inner circle (610) displays information related to the polynucleotide being synthesized (represented as a proportion of the circle (or annulus) that is filled. Such length information may include, but is not limited to, the relative length of the polynucleotide in relation to a maximum length, the fraction of the polynucleotide synthesized (proportional to synthesis cycle number), time since initiation (e.g. cycle number×cycle time), time to completion, or like quantities. Central disc (612) may display key information and/or warnings related to the reaction chamber, e.g. yield, concentration of product, volume or product, or the like (which may be provided as a number or in gradient or gray-scale format). Buttons (616 and 618) may be provided in the GUI to permit switching between the display of the different quantities and formats. That is, quantitative data, such as concentration, may be displayed in either a gray-scale (or gradient) format or a numerical format. FIGS. 6C and 6D provide illustrations of this type of glyph for a short sequence (6C, in which sequence code occupies only portion (630) of the second circle) and a long sequence (6D, in which sequence code occupies the entire inner circle (632) and a portion (634) of the outer circle). FIG. 6E illustrates a glyph comprising a square format and a continuous curve (i.e. a spiral) of symbols (gray, spotted, black and white squares) representing a polynucleotide sequence. Additionally glyphs may include symbols to indicate starting points (for example bar (631) and triangle (633) in FIG. 6C).

In some embodiments, one or more portions of a polynucleotide sequence are represented in a glyph. For example, a glyph may comprise two concentric circles (for example, as in FIG. 6B) each containing coded sequence information wherein, for example, the inner concentric circle represents up to 24 nucleotides of the 5' end of a polynucleotide and the outer concentric circle represents up to 36 nucleotides of the 3' end of a polynucleotide.

In still further embodiments, a glyph may include sequence information in a spiral, as exemplified in FIG. 6E. The spiral may comprise a curve of continuously changing curvature such that a distance from an origin point continuously increases as a path is taken along the spiral, such as an Archimedean spiral. Or, in some embodiments, such as illustrated in FIG. 6E, the spiral may comprise a sequence of segments (642) defining a continuous path that winds, or wraps, around a regular polygon, such as square (640), as shown in FIG. 6E.

In accordance with the above, an apparatus for synthesizing a plurality of polynucleotides each with a predetermined sequence may comprise the following elements: (a) an array of a plurality of reaction chambers, each reaction chamber having a synthesis support wherein each reaction chamber has an inlet and an outlet and a filter that retains the synthesis support and that is operationally associated with the outlet so that reaction solutions exiting the reaction chamber pass through the filter; (b) a waste manifold operationally associated with the outlets of the reaction chambers such that reaction solutions are removed from the reaction chambers and enter the waste manifold whenever a positive pressure differential is establish between the reaction chambers and the waste manifold; (c) a fluid delivery system for delivering reaction solutions to the reaction chambers of the array; (d) a user interface for accepting nucleotide sequences of polynucleotides to be synthesized and providing a graphical display of spatially compact glyphs each representing all or one or more portions of a sequence of a polynucleotide wherein such glyphs are arranged in an array in which a relative position of a reaction chamber for a polynucleotide in the array of reaction chambers is the same as a relative position of a glyph of the polynucleotide in the array of glyphs; and (e) a control system operationally associated with the user interface, the array of reaction chambers, the fluid delivery system and the waste manifold, wherein the control system assigns the predetermined sequence of each polynucleotide to a reaction chamber for synthesis, and wherein for each reaction chamber, the control system directs repeated steps of: (i) delivering under coupling conditions to the synthesis supports or elongated fragments in each of the reaction chambers a nucleotide monomer to allow each of the synthesis supports or elongated fragments to be elongated by the nucleotide monomer to form an elongated fragment in accordance with the predetermined sequence thereof, and (ii) producing a pressure differential between the reaction chambers and the waste manifold to remove uncoupled nucleotide monomers from the reaction chambers. In some embodiments, such glyphs represent all or one or more portions of the sequence as curves or stings of symbols comprising within a defined or bounded area a nested set of closed circles or polygons or a continuous curve, such as a spiral.

In some embodiments, an apparatus of the invention for synthesizing a plurality of polynucleotides each with a predetermined sequence may comprise the following elements: (a) an array of a plurality of reaction chambers, each reaction chamber having a synthesis support with initiators attached, wherein each initiator has a free 3'-hydroxyl, and wherein each reaction chamber has an inlet and an outlet and a filter that retains the synthesis support and that is operationally associated with the outlet so that reaction solutions exiting the reaction chamber pass through the filter; (b) a waste manifold operationally associated with the outlets of the reaction chambers such that reaction solutions are removed from the reaction chambers and enter the waste manifold whenever a positive pressure differential is establish between the reaction chambers and the waste manifold; (c) a fluid delivery system for delivering reaction solutions to the reaction chambers of the array, the reaction solutions comprising 3'-O-protected nucleoside triphosphates, a deprotection solution; and a template-free polymerase; (d) a user interface for accepting nucleotide sequences of polynucleotides to be synthesized and providing a graphical display of spatially compact glyphs each representing all or one or more portions of a sequence of a polynucleotide wherein such glyphs are arranged in an array in which a relative position of a reaction chamber for a polynucleotide in the array of reaction chambers is the same as a relative position of a glyph of the polynucleotide in the array of glyphs; and (e) a control system operationally associated with the user interface, the array of reaction chambers, the fluid delivery system and the waste manifold, wherein the control system assigns the predetermined sequence of each polynucleotide to a reaction chamber for synthesis, and wherein for each reaction chamber, the control system directs repeated steps of: (i) delivering under coupling conditions to the initiators or deprotected elongated fragments a 3'-O-protected nucleoside triphosphate and a template-free polymerase, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments, (ii) delivering the deprotection solution to the reaction chambers so that the 3'-O-protected elongated fragments are deprotected, and (iii) producing a pressure differential between the reaction chambers and the waste manifold to remove deprotection solution from the reaction chambers at a predetermined rate. As above, in some embodiments, such glyphs represent all or one or more portions of the sequence as curves or stings of symbols comprising within a defined or bounded area a nested set of closed circles or polygons or a continuous curve, such as a spiral.

In some embodiments, a spatially compact glyph means a representation of sequence information in a spatially limited, or defined, area, a plurality of which may be arranged as an array. In some embodiments, the defined areas comprise either circles, squares or hexagons. A sequence is a defined ordering of different objects, such as, an ordering of different kinds of nucleotides in a polynucleotide to be synthesized. In some embodiments, different objects, such as, different kinds of nucleotides (A, C, G or T) may be represented by different shapes (e.g. circles, segments of curves, squares, letters, stars, and the like), different colors, or both. A nucleotide sequence in a glyph may be represented by an ordering of such symbols in a limited area.

The control system comprises a computer and software for accepting sequences of polynucleotides to be synthesized, information about the status of the apparatus and status of the synthesis (e.g., from the user interface, liquid level sensors, temperature sensors, reagent level sensors, and the like) then generating and sending signals to controllers that actuate the various devices (e.g. valves, pumps, user interface, waste manifold, motors to position nozzles for fluid dispensation, and the like) for performing specific functions related to a synthesis. The control system may also (i) monitor process and apparatus data from sensor to determine if anomalous data patterns or errors occur (e.g. inadequate fluid removal from wells, inadequate volumes of reaction mixtures in well, and the like), and (ii) implement corrective actions based on the analysis of data and error signals (e.g. send warnings and recommendations to a user through the user interface). One of ordinary skill would recognize that the hardware and software for a control system depends in large part on a particular embodiment of the apparatus.

| Sensor | Measurement | Corrective Actions |
|---|---|---|
| Liquid level sensor | Slow reagent evacuation | Purge wells with protease<br>Increase vacuum intensity<br>Increase vacuum duration<br>Bypass selected wells<br>Begin new synthesis in unused well<br>Transfer solid supports to new plate |
| TdT activity assay | Below normal coupling activity | Increase incubation time<br>Increase incubation temperature |

Figures 2B, 2C:
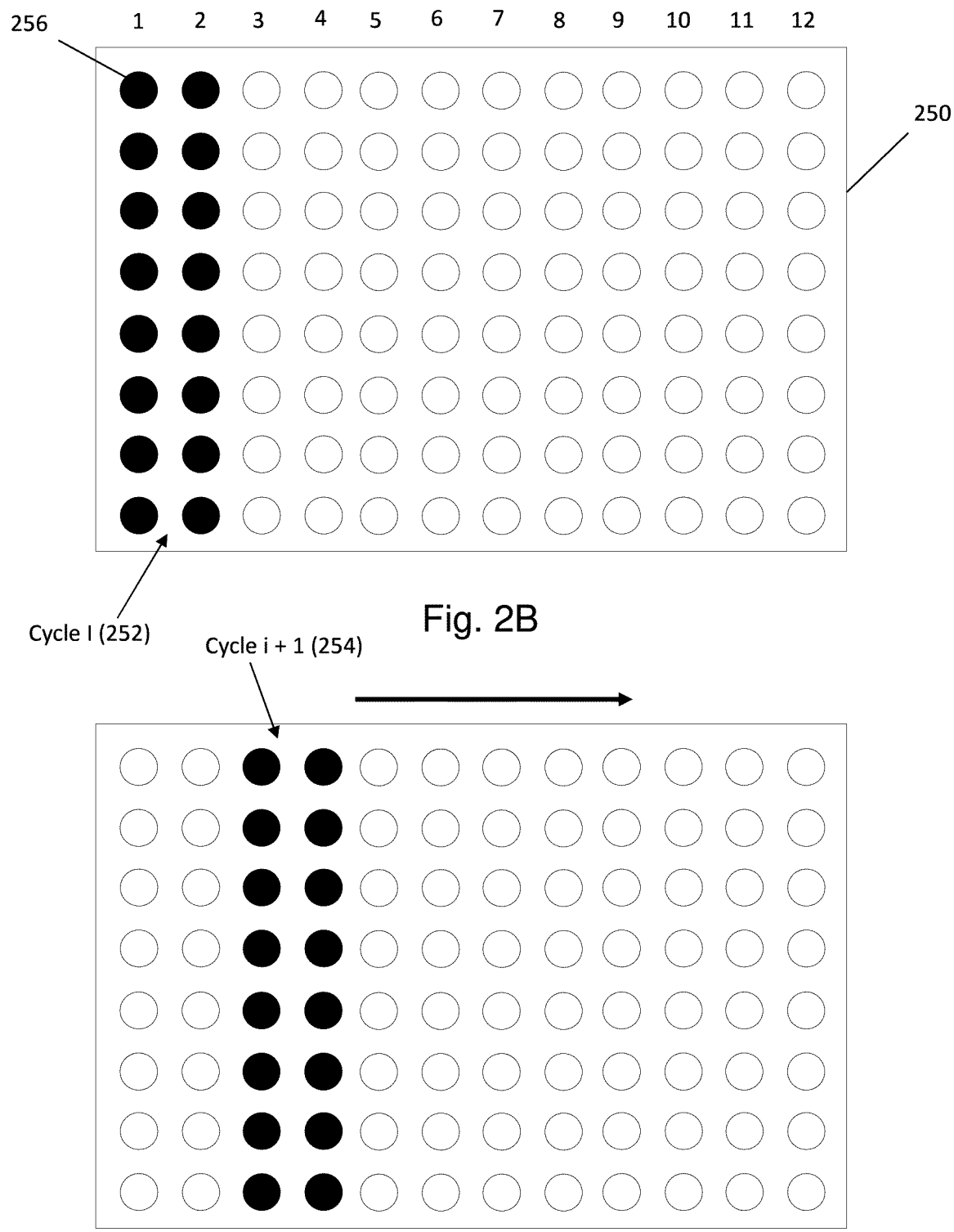
FIGS. 2B and 2C illustrate liquid level measurements on portions of the total number of reaction wells of a 96-well array.

Liquid level sensors that measure and/or monitor liquid levels in the reaction chambers provide an indirect measure of obstructions in the filter or outlet of a reaction chamber, a primary cause of which is protein sticking and accumulation in filter pores or outlet passages. Data collected by the liquid level sensors are transmitted to, stored by and analyzed by the control system. Given that all synthesis reagents enter a reaction chamber by an inlet and exit it by its outlet, any obstruction by protein sticking or accumulation could lead to reagents overflowing from the obstructed chamber and cross-contamination among reaction chambers from the overflow. Even if no overflow occurs, an alteration in the fluid removal rate may leave some evacuated reaction chambers with residual reactants or wash solutions that may detrimentally change reaction conditions. For example, reaction volumes may be increased in subsequent reactions due to inadequate fluid removal. Also, the probability of misincorporation may increase if traces of reaction mixture from a previous coupling cycle are retained because of inadequate fluid removal. In some embodiments, the liquid levels of each reaction chamber is measure during or after each coupling cycle. In some embodiments, a liquid level sensor measures the liquid level immediately after a reaction chamber has been evacuated; in other embodiments, a liquid level sensor measure the liquid level immediately after a reagent or wash solution has been dispensed to a reaction chamber; in still other embodiments, a liquid level sensor makes a plurality of liquid level measurements in a reaction chamber during the evacuation of fluid from the reaction chamber so that a rate of fluid removal can be calculated for the reaction chamber. In the latter embodiment, a bank of liquid level sensors may be positioned over all or a portion or subset of reaction chambers during a reagent removal step. For example, whenever the plurality of reaction chambers comprises a 96-well synthesis plate, a bank of liquid level sensors may comprise 4 sensors, or 8 sensors, or 16 sensors. That is, in some embodiments, such rate measurements may be made on a portion of the reaction chambers (but not all) during each coupling cycle so that every reaction chamber has its evacuation rate measured every sixth cycle. This concept is illustrated in FIGS. 2B and 2C for a bank of 16 sensors that makes sequential measurements on groups of 16 reaction chambers (shaded wells (252) for cycle i and shaded wells (254) for cycle i+1) of a 96-well synthesis plate (250) every sixth coupling cycle. In other embodiments, liquid level sensors may measure liquid levels or rates of fluid removal in a predetermined percentage of reaction chambers at each coupling cycle. For example, such predetermined percentage may be in the range of from 2-50 percent, or in the range of from 2-25 percent, or in the range of from 2-10 percent. In some embodiments, liquid level sensors may be housed in the same gantry head as reagent delivery nozzles and/or pipettes (in embodiments where reagents are transferred between plates or between wells of the same plate). In some embodiments, a bank of liquid level sensors may be housed in a separate gantry head, e.g. similarly to the dual-gantry device described in U.S. Pat. No. 9,103,809.

The selection of liquid level sensors is constrained in part by the physical constraints of the apparatus (for example, the spacing and size of the wells) and the response rate of the sensor. In some embodiment, a plurality of sensors are used to make measurement simultaneously on a plurality of reaction chambers. Such plurality of sensors may be arranged in a bank which moves as a single unit over a planar array of reaction chambers, wherein sensors are spaced in the bank so that they may be aligned with reaction chambers beneath them, for example, as shown in FIG. 5H with a 1×4 bank of ultrasonic level sensors. In some embodiments, level sensors for use with the invention are noncontact sensors. In some embodiments, such noncontact sensors are either optically based or acoustically based. Of the latter, ultrasonic liquid level sensors are of particular interest, in part because they may be miniaturized to service small reaction chamber sizes and they have rapid measurement times, for example, as low as 10 msec. An exemplary optically based liquid level measurement technique using image analysis is disclosed in Thurow et al, J. Automated Methods and Management in Chemistry, 2011 (article ID 805153). Exemplary ultrasonic liquid level sensor for 96-well plates is Baumer (Southington, CT) model 09T9114/D1.

In some embodiments, the invention comprises a system for enzymatically synthesizing a plurality of polynucleotides each with a predetermined sequence using porous particulate resins and TdT variants engineered to have a minimal radius of gyration and reduced adhesion to surfaces, such as reaction chamber walls and filters. In some embodiments, such system comprises (a) a plurality of reaction chambers, each reaction chamber having porous resin particles with initiators attached, wherein each initiator has a free 3'-hydroxyl, and wherein each reaction chamber has an inlet and an outlet and a filter that retains the porous resin particles and that is operationally associated with the outlet so that reaction solutions exiting the reaction chamber pass through the filter; (b) a waste manifold operationally associated with the outlets of the reaction chambers such that reaction solutions are removed from the reaction chambers and enter the waste manifold whenever a positive pressure differential is establish between the reaction chambers and the waste manifold; (c) a fluid delivery system for delivering reaction solutions to the reaction chambers of the array, the reaction solutions comprising 3'-O-protected nucleoside triphosphates, a deprotection solution; and a TdT variant engineered to have a minimal radius of gyration; (d) a user interface for accepting nucleotide sequences of polynucleotides to be synthesized; and (e) a control system operationally associated with the user interface, the array of reaction chambers, the fluid delivery system and the waste manifold, wherein the control system assigns the predetermined sequence of each polynucleotide to a reaction chamber for synthesis, and wherein for each reaction chamber, the control system directs repeated steps of: (i) delivering under coupling conditions to the initiators or deprotected elongated fragments a 3'-O-protected nucleoside triphosphate and the TdT variant, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments, (ii) delivering the deprotection solution to the reaction chambers so that the 3'-O-protected elongated fragments are deprotected, and (iii) producing a pressure differential between the reaction chambers and the waste manifold to remove deprotection solution from the reaction chambers at a predetermined rate. In some embodiments, a system of the invention further comprises: one or more liquid level sensors for measuring a liquid level in each of the reaction chambers, and wherein said control system directs repeated steps of: (i) delivering under coupling conditions to the initiators or deprotected elongated fragments a 3'-O-protected nucleoside triphosphate and the TdT variant, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments, (ii) delivering the deprotection solution to the reaction chambers so that the 3'-O-protected elongated fragments are deprotected, (iii) producing a pressure differential between the reaction chambers and the waste manifold to remove deprotection solution from the reaction chambers at a predetermined rate, and (iv) measuring with the one or more liquid level sensors a liquid level in each of said reaction chambers and whenever a reaction chamber is identified whose liquid level is outside of predetermined bounds, bypassing the identified reaction chamber in subsequent reagent delivery steps. In some embodiments, a TdT variant is selected that has a minimal radius of gyration for more efficient transport through the porous resin particles. In some embodiments, such TdT variant is selected from the group of TdT variants having an amino acid sequence at least ninety percent identical to SEQ ID NO: 16 through 50 subject to mutations Q4E/S/D/N and those of Table 2 or having an amino acid sequence at least ninety percent identical to SEQ ID NO 51 through 71.

Figure 3A:
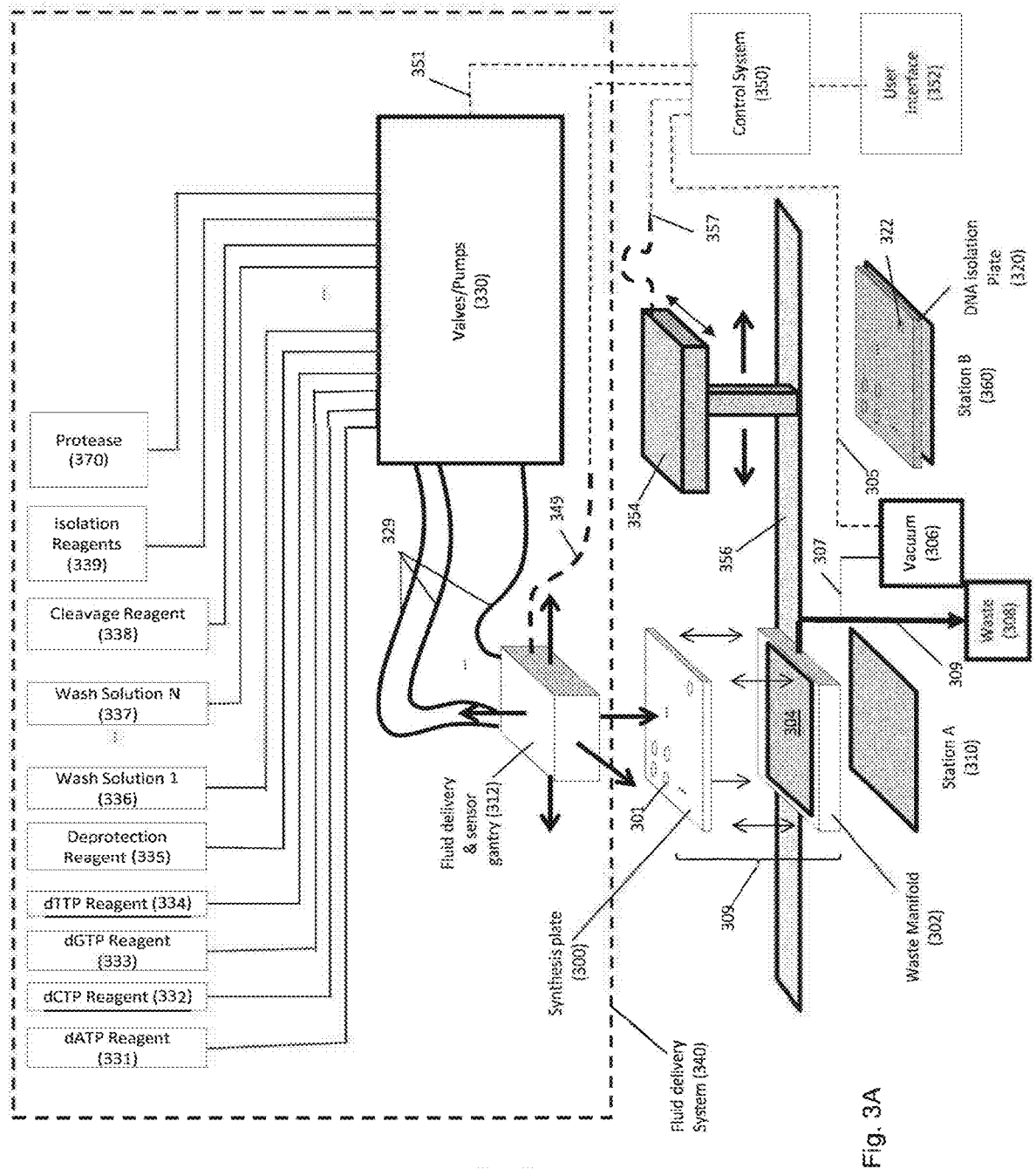
FIGS. 3A-3H illustrate various embodiments of apparatus of the invention.

The operation of the basic elements of one embodiment of the invention is exemplified in FIG. 3A, which embodiment performs enzymatic synthesis of polynucleotides on solid supports within filter plate wells, cleavage of the polynucleotide products from the solid supports and isolation of polynucleotide products from the cleavage reaction components. Synthesis plate (300) with plurality of reaction chambers or wells (301) is shown in exploded view (309) with waste manifold (302). Inlets of reaction chambers (301) are well openings on top of synthesis plate (300). Outlets (hidden from view) and filters (also hidden from view) are on the bottom of synthesis plate (300). Synthesis plate (300) in operation is sealingly attached to waste manifold (302) (for example by clamping) so that whenever a vacuum (306) is applied through line (307) to chamber (304) of waste manifold (302) fluids (reagents, wash solutions and the like) are drawn from reaction chambers (301) through the filter material and outlet into waste manifold chamber (304) and then into waste repository (308). Synthesis plate (300) containing the plurality reaction chambers (301) may be a convention filter plate in 24-well, 48-well 96-well, 384-well, 1536-well, or similar formats, for example, available from commercial manufacturers, such as, Pall Corp., Port Washington, NY. Reaction volumes typical for such filter plates may be employed with the invention, e.g. 10-50 μL for 96-well plates, 3-10 µL for 384-well plates, 0.5-3.0 µL for 1536-well plates. Fluid delivery system (340) (encompassed by the dashed rectangle) delivers reagents (331-339) to reaction chambers (301) of synthesis plate (300) through a system of pumps and valves (330) under control (351) of control system (350) and delivery nozzles (not shown) located in fluid delivery and sensor gantry (312) also under control (349) of control system (350). Liquid delivery nozzles in gantry (312) receive reagents from valve and pump system (330) through flexible lines (329) which allow gantry (312) to move over synthesis plate (300). In other embodiments, gantry (312) may have a capability to move to different stations at different locations in the apparatus, for example, for carrying out reactions in additional reaction plates associated with additional waste manifolds. In addition, in some embodiments, manifold (302) and synthesis plate (301) may be moveable with respect to gantry (312). Gantry (312) may be moveable in x, y, and z directions relative to the surface of synthesis plate (300) (as indicated in FIG. 3A by the bold arrows), or synthesis plate (300) may be moveable in the x and y directions also, or both elements may be moveable with respect to one another in the x and y directions.

In some embodiments, liquid level sensors (not shown) are located in the fluid delivery and sensor gantry (312). In some embodiments, liquid level sensors simply confirm liquid levels in reaction chambers (301) immediately after nozzles in gantry (312) deliver predetermined amounts of fluid to the reaction chambers (301) (which may be coupling reagent (331-334), deprotection reagent (335), wash solutions (337-338), cleavage reagent (338) or isolation reagent (339)). As described more fully below, isolation of cleaved polynucleotide product can be accomplished by a variety of techniques. Each of such techniques may require different reagents for implementation, which are referred to herein as "isolation reagents." For example, some techniques require precipitation of the polynucleotide products which may be accomplished with the isolation reagent, isopropanol. Another isolation reagent may be water or a Tris EDTA (TE) buffer, which may be used to elute an adsorbed DNA precipitate from a silica adsorbent. In some embodiments, liquid level measurement may occur after the completion of reagent delivery to all of the reaction chambers (301), or detection may occur at the same time as when fluid delivery is occurring but at different reaction chambers. For example, in some embodiments, the number and positions of liquid level sensors and the number and positions of fluid delivery nozzles in gantry (312) permit them to be positioned simultaneously over different groups of reaction chambers of the same synthesis plate. In some embodiments of systems and apparatus of the invention, a separate step in the synthesis process may be implemented wherein the liquid level sensors measure the rate of fluid removal in a portion of the reaction chambers while vacuum is applied to remove fluid. In such embodiments, within a cycle multiple measurements of fluid levels are made in each reaction chamber undergoing evacuation so that a rate of fluid removal can be computed. If the rate falls below a predetermined level, control system (350) can actuate a corrective action, such as, flagging the reaction chambers with evacuation rates below the predetermined level and discontinuing fluid delivery to them, or actuate other remedial actions described below.

Under control of control system (350), the above elements carry out a predetermined number of cycles of synthesis steps for each of the plurality of polynucleotides. Control system (350) implements repeated steps of: (i) actuating fluid delivery system (340) to deliver under coupling conditions to the initiators or deprotected elongated fragments in reaction chambers (301) a 3'-O-protected nucleoside triphosphate and a template-free polymerase (either 331, 332, 333 or 334 depending on the sequence of the polynucleotide), wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments; (ii) actuating fluid delivery system (340) to deliver deprotection solution (335) to the reaction chambers (301) so that the 3'-O-protected elongated fragments are deprotected; and (iii) actuating waste manifold (302) to generate a pressure differential between reaction chambers (301) and waste manifold (302) to remove deprotection solution (335) from reaction chambers (301) at a predetermined rate (for example, as determined by the magnitude of the pressure differential). In some embodiments, a differential pressure may be obtained by applying a vacuum through waste manifold (302) to "pull" fluid from the reaction chambers or by applying a positive pressure at the inlets of the reaction chambers to "push" fluid from the reaction chambers, or both. For embodiments employing conventional 96-well synthesis plates, typically vacuum is applied for 10-30 seconds to evacuate fluids from the wells. In some embodiments, such as those employing 96-well plates, a predetermined rate of fluid removal may be in the range of from 1 to 100 µL/sec, or in the range of from 1 to 50 µL/sec, or in the range of from 0.5 to 30 µL/sec.

Figure 3B:
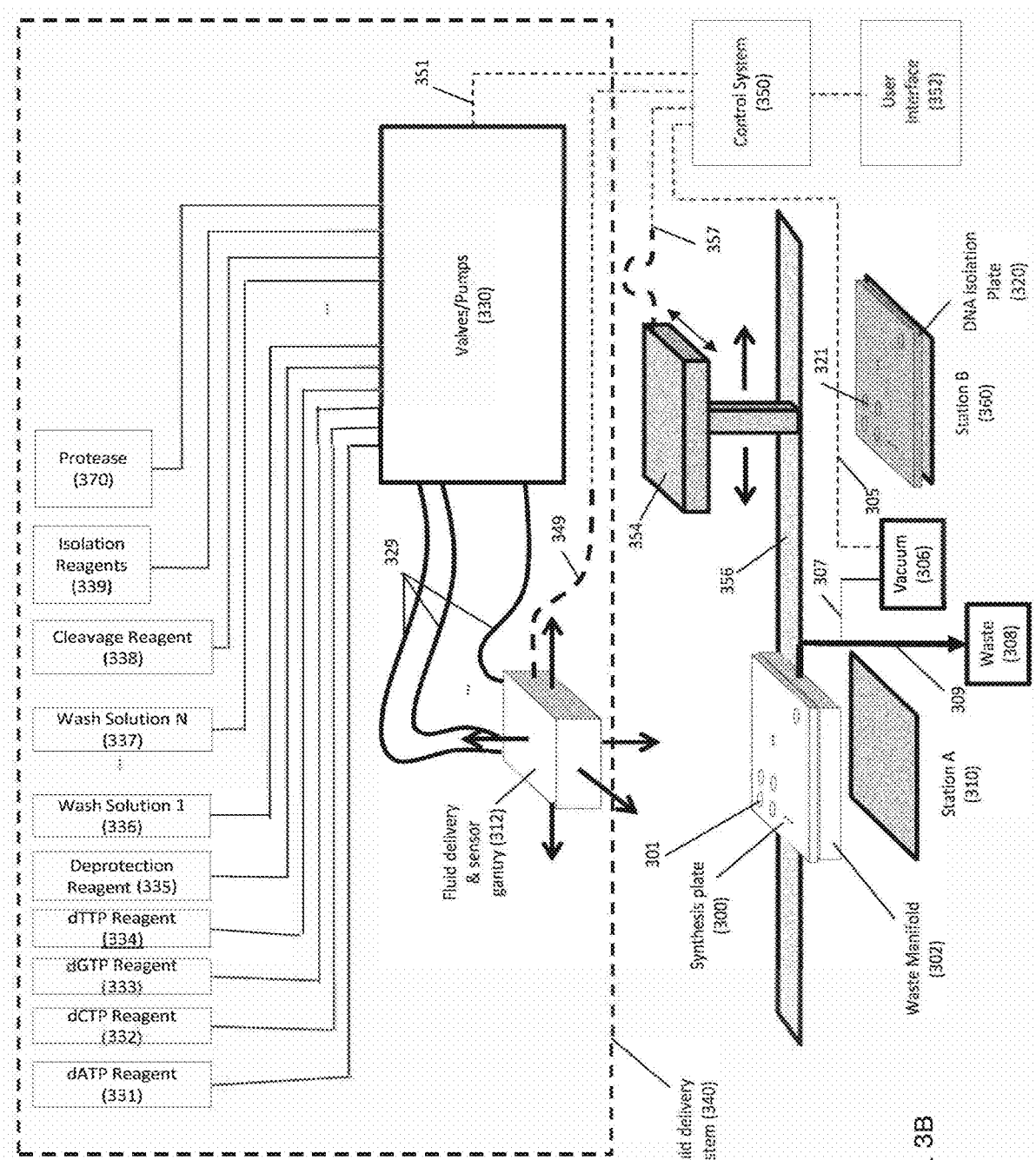
Figure 3C:
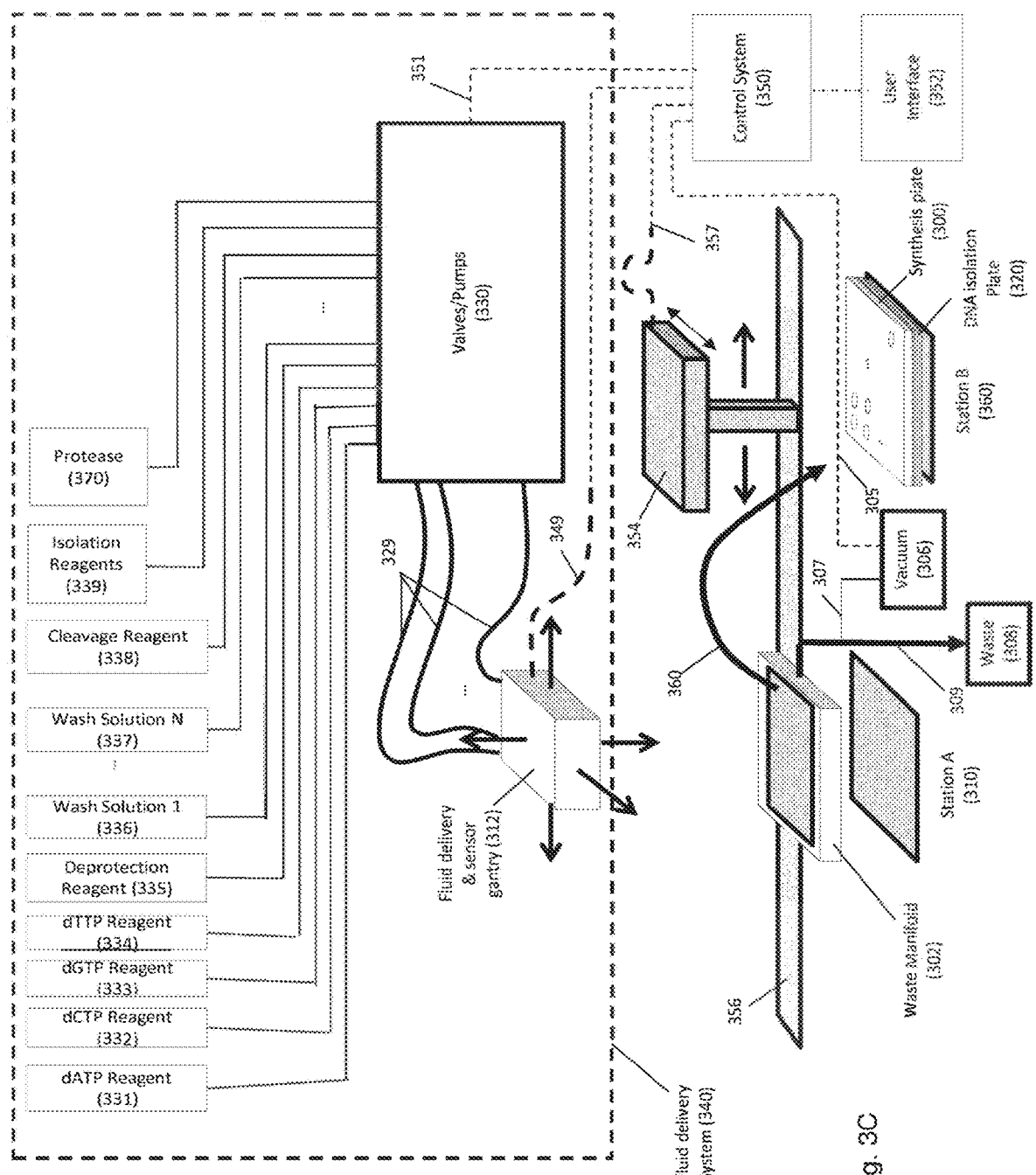
Figure 3D:
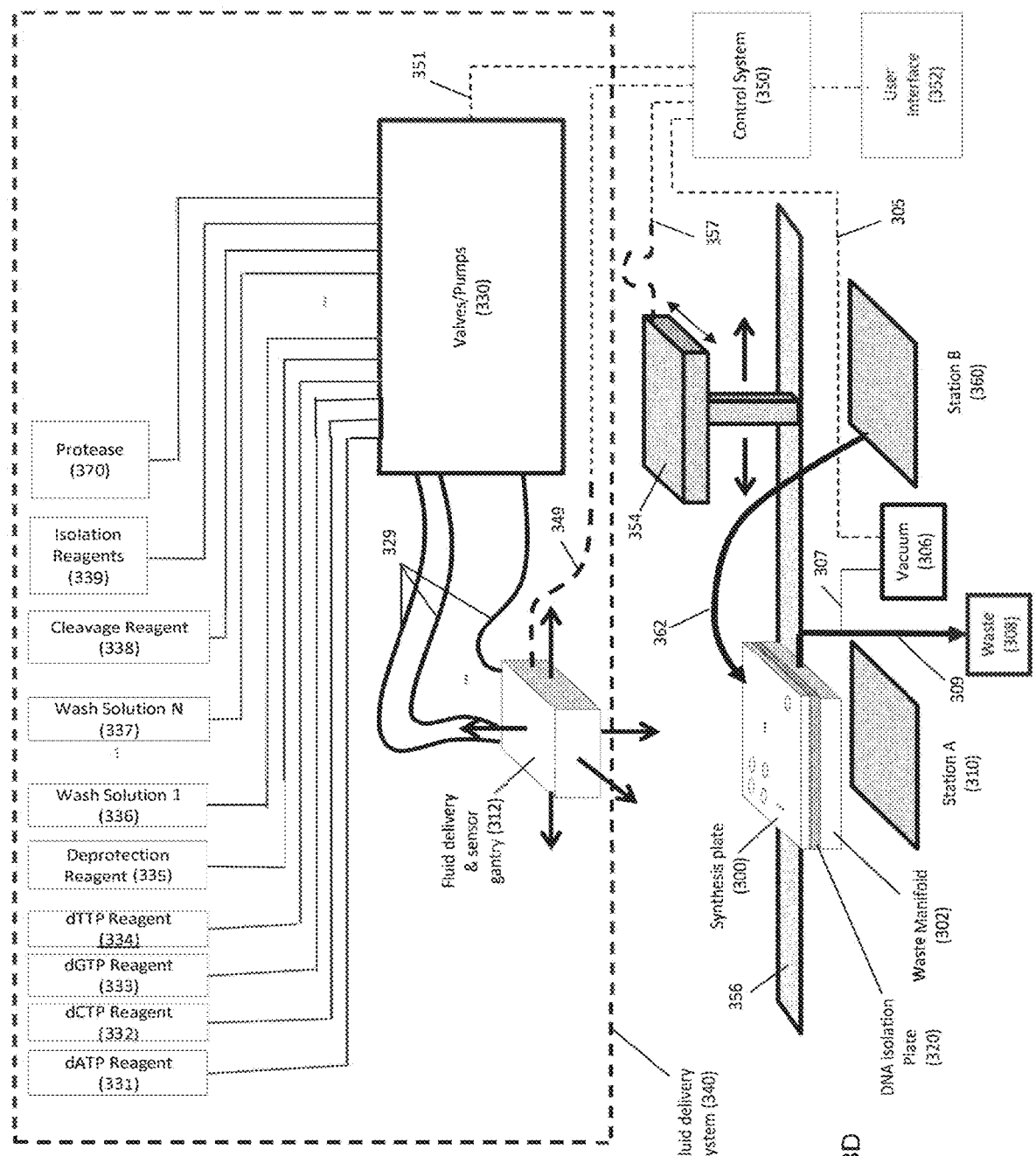

After polynucleotides are synthesized in synthesis plate (300), system and apparatus of FIG. 3A carries out steps of cleaving the polynucleotide products from their synthesis supports and isolating the cleaved polynucleotide product from the cleavage reaction mixture. FIGS. 3B-3D illustrate how these steps are accomplished for this embodiment. FIG. 3B illustrates the position of synthesis plate (300) during synthesis but before the steps of cleaving and isolating. That is, synthesis plate (300) is sealingly mounted on waste manifold (302) so that whenever vacuum is applied fluid in reaction chambers (301) is removed via waste manifold (302). In this embodiment, cleavage takes place in reaction chambers (301) and isolation takes place in DNA isolation plate (320). DNA isolation plate is selected or designed so that isolation chambers (or wells) (321) spatially align with reaction chambers (301) of synthesis plate (300). After synthesis, the apparatus employs a robotic device to place the DNA isolation plate (320) beneath synthesis plate (300) such that both synthesis plate (300) and DNA isolation plate (320) are sealingly mounted on waste manifold (302). As noted below, the cleavage and isolation steps may be implemented in a wide variety of ways, each of which may call for slightly different apparatus components which are readily provided by those with skill in the art. In some embodiments, cleavage may be implemented in synthesis plate (300), reaction mixtures of each chamber of plate (300) may then be pipetted to an isolation plate at a different location and DNA isolation may be implemented at the different location or station. Such isolation in different plates at different stations within the apparatus may (for example) provide better yields or other advantages depending on the particular DNA isolation protocol employed. In some embodiments, DNA isolation plate (320) may be based on the isolation technique developed by Boom et al, U.S. Pat. No. 5,234,809, wherein cleaved polynucleotides are precipitated with isopropanol and adsorbed onto a silica compound, such as glass. In such embodiments, after cleavage, isopropanol is delivered to reaction chambers (101), incubated, then mild vacuum is applied to transfer the reaction mixture of each reaction chamber to an isolation chamber immediate below it in DNA isolation plate (320). The silica of the isolation chamber captures the precipitated DNA and after washing, the captured DNA can be eluted from the silica, for example, separately from the apparatus.

Returning to FIG. 3C, plate mover (354) on track (356) under control (357) of control system (350) grabs synthesis plate (300) on waste manifold at station A (310) and places (360) it on top of DNA isolation plate (320) at station B (360), after which it grabs both synthesis plate (300) and isolation plate (320) from station B (360) and places (362) both plates back on waste manifold (302) at station A (310), as shown in FIG. 3D, where cleavage and isolation steps are performed. Plate mover (354) may be a conventional laboratory robot comprising a plate grabber function and a plate transport function, e.g. available from several different manufacturers, such as, Hudson Robotics (NJ), Hamilton Microlab, TPA Motion, Beckman Coulter, or the like. Plate mover (354) can be a general purpose robotic arm or a special purpose plate mover with restrict movement, such as illustrated in the figures. Gantry (312) then delivers cleavage reagents to reaction chambers (301) of synthesis plate (300) and, after incubation, delivers isopropanol to reaction chambers (301) to precipitate cleaved polynucleotide products. After incubation, a mild vacuum is applied through waste manifold (302) to draw the isopropanol-containing product from reaction chambers (301) into the aligned isolation chambers of isolation plate (320). As above for the synthesis reagents, cleavage reagents and/or isolation reagents may be moved through an isolation plate by applying a vacuum or by applying a positive pressure.

In some embodiments, systems and apparatus implement further steps, including (i) measuring reaction yields, (ii) normalizing product concentrations after measuring yield, for example, by adjusting product concentrations, e.g. by selective dilutions, (iii) measuring obstruction or clogging of reaction chamber filters and taking remedial actions based on such measurements, and (iv) measuring template-free polymerase activity and taking remedial actions based on such measurements, including adjusting incubation times and temperature of coupling reactions.

In some embodiments related to (iii) (monitoring filter obstruction), a number of different corrective actions may be implement by control system (350) including (a) specific reaction chambers may be bypassed for any future reagent deliveries after the anomalous liquid level measurement is made, (b) vacuum intensity or the pressure differential between reaction chambers and waste manifold may be increased, either permanently or temporarily for a predetermined number of cycles (c) reaction chambers and/or other fluid passages may be treated with a proteolytic enzyme solution, such as proteinase K, to remove obstructing protein aggregates, or (d) a combination of corrective actions may be taken. In regard to (c), control system (350) monitors liquid level sensor data during the performance of synthesis cycles and may (as a corrective action) insert one or more protease treatment steps if the liquid level sensor data indicates inadequate fluid removal (for example, as measured by a rate of removal, a final level after evacuation or fluid addition, or the like). An inserted protease treatment step includes dispensing protease solution (370) to reaction chambers (301), incubating the reaction chambers for a predetermined duration, e.g. 30 minutes, or 1 hour, or 2 hours (depending on the protease, concentration, and other conditions), removing the protease solution, washing the reaction chambers. After the protease treatment step, the synthesis cycles are resumed. Control system (350) may be programmed to insert protease treatment steps whenever anomalous liquid level measurements are made in any reaction chambers, or it may implement a combination of corrective actions. For example, a first corrective action may be to insert a one or more protease treatment steps, a second corrective action may be to bypass the reaction chambers with anomalous liquid level measures if the anomalous condition persists. An exemplary protease treatment step may comprise delivering a solution of proteinase K at a concentration in the range of between 0.01 to 1.0 mg/mL.

Figure 3E:
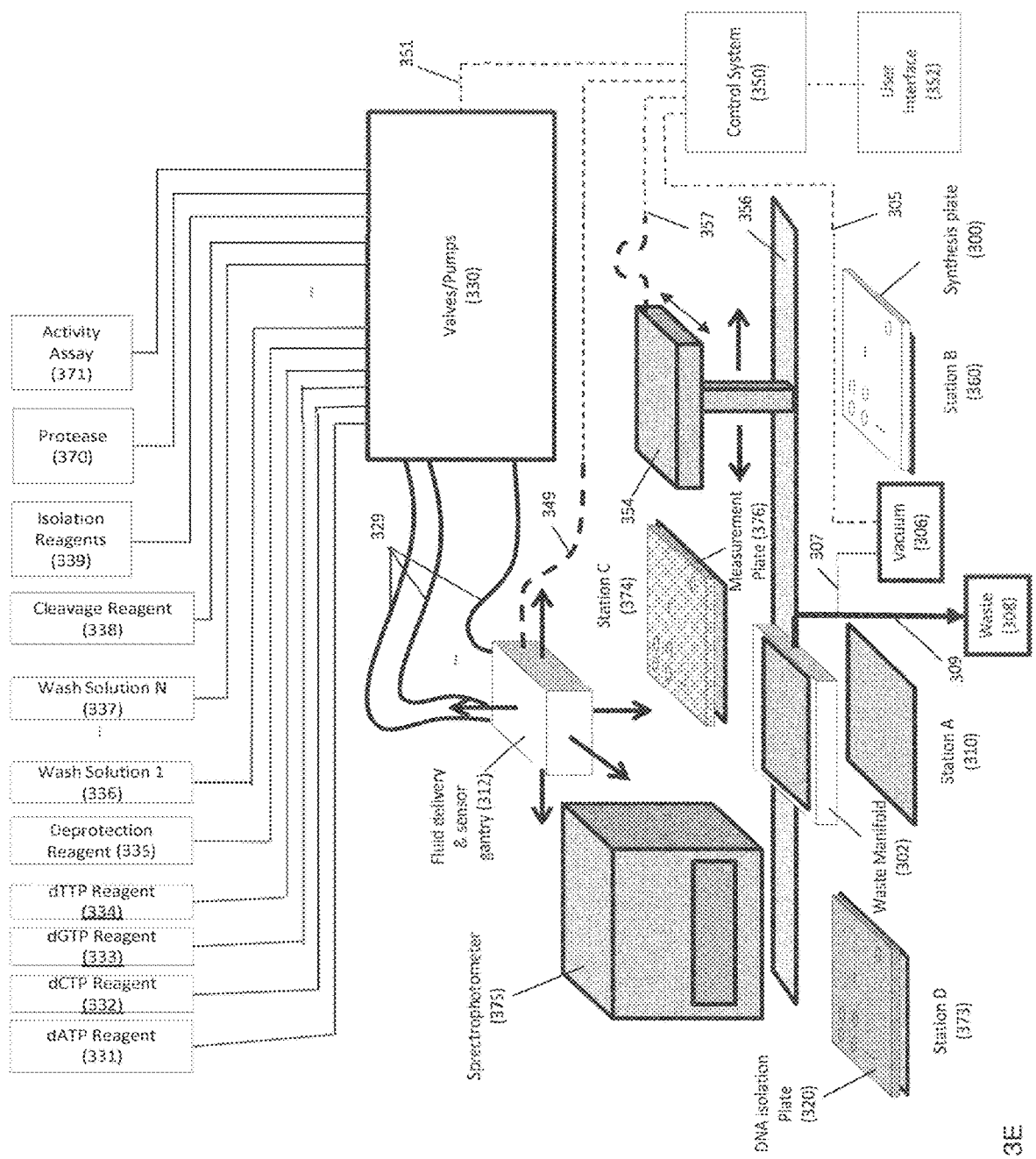
Figure 3F:
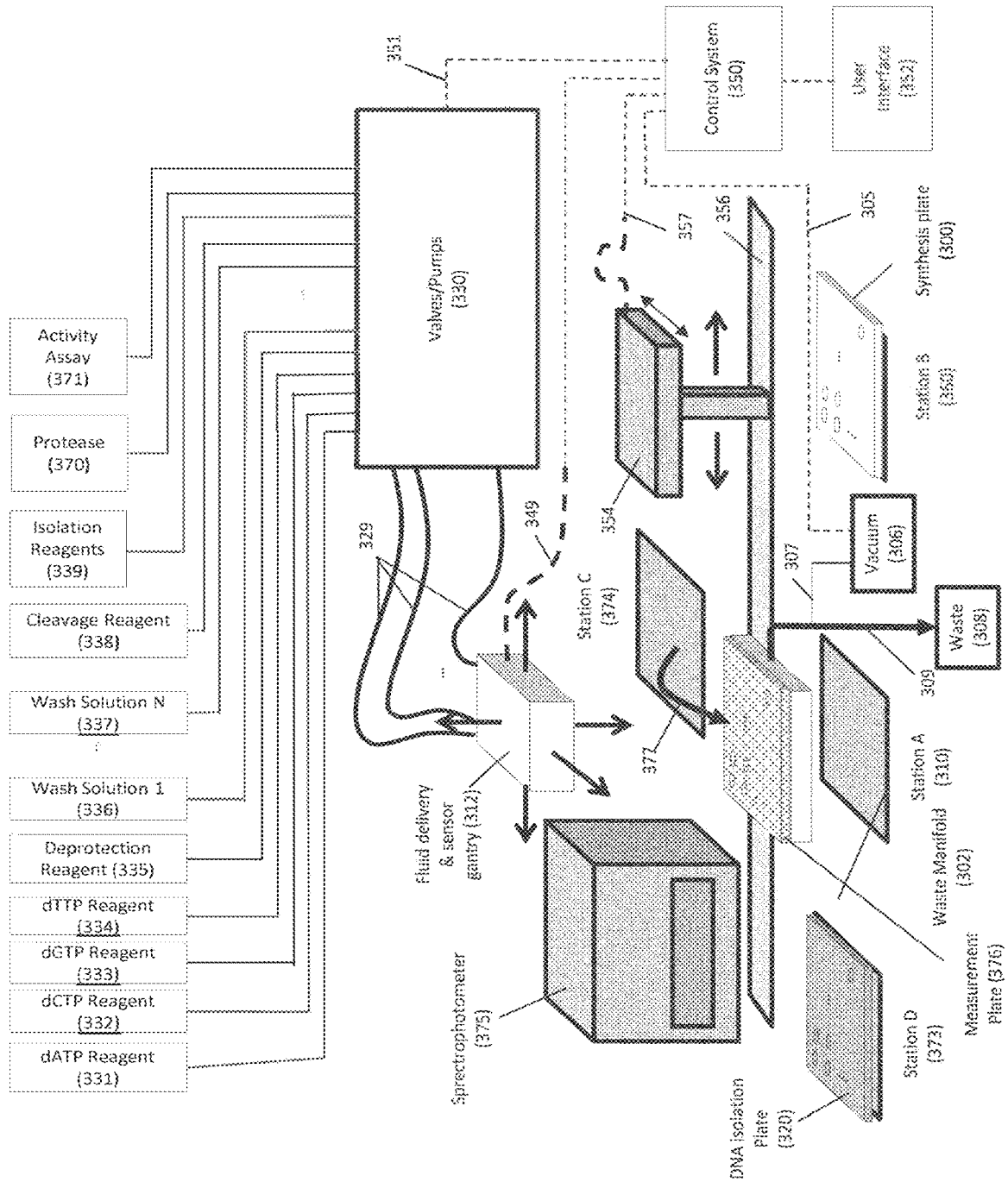
Figure 3G:
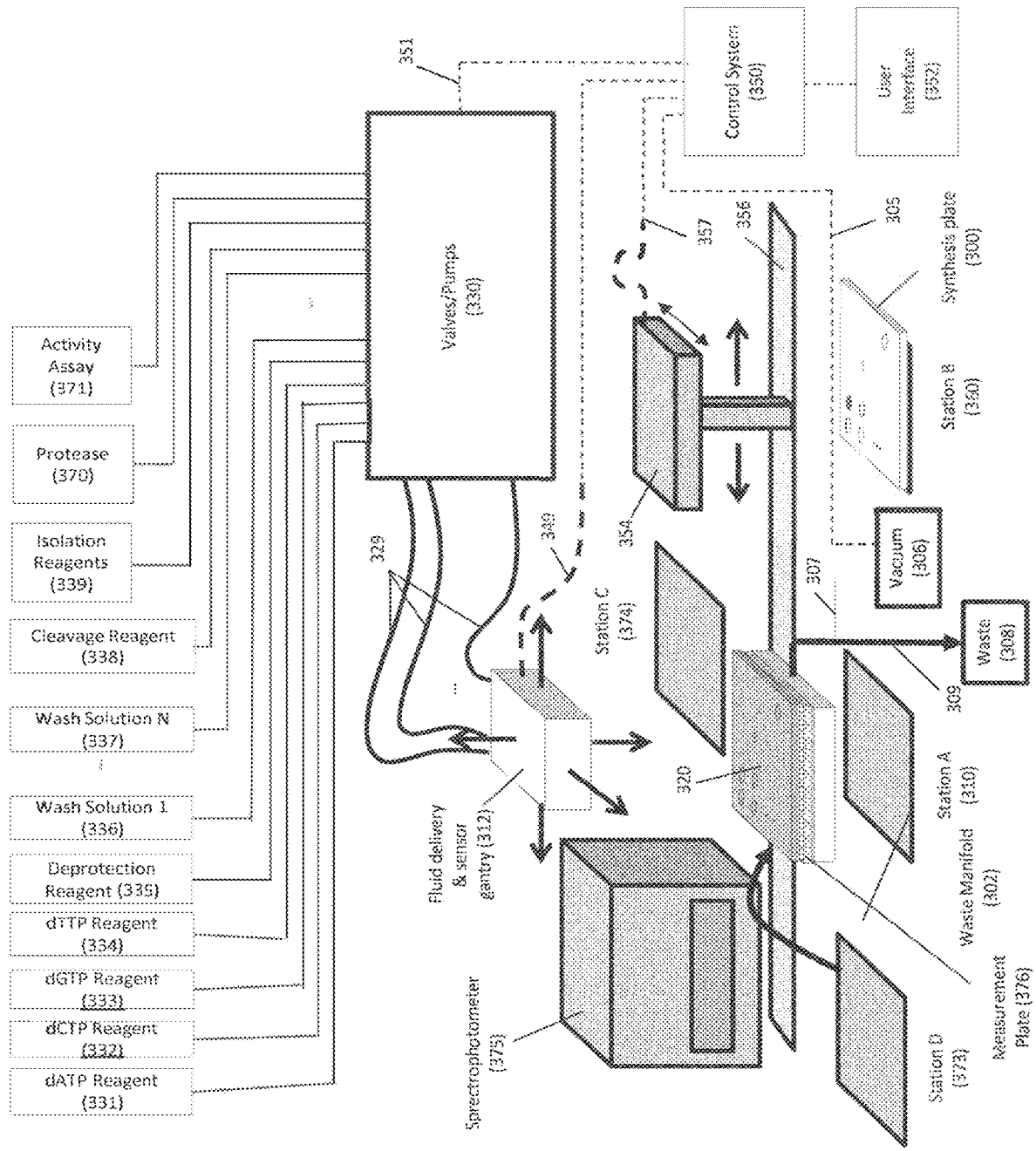
Figure 3H:
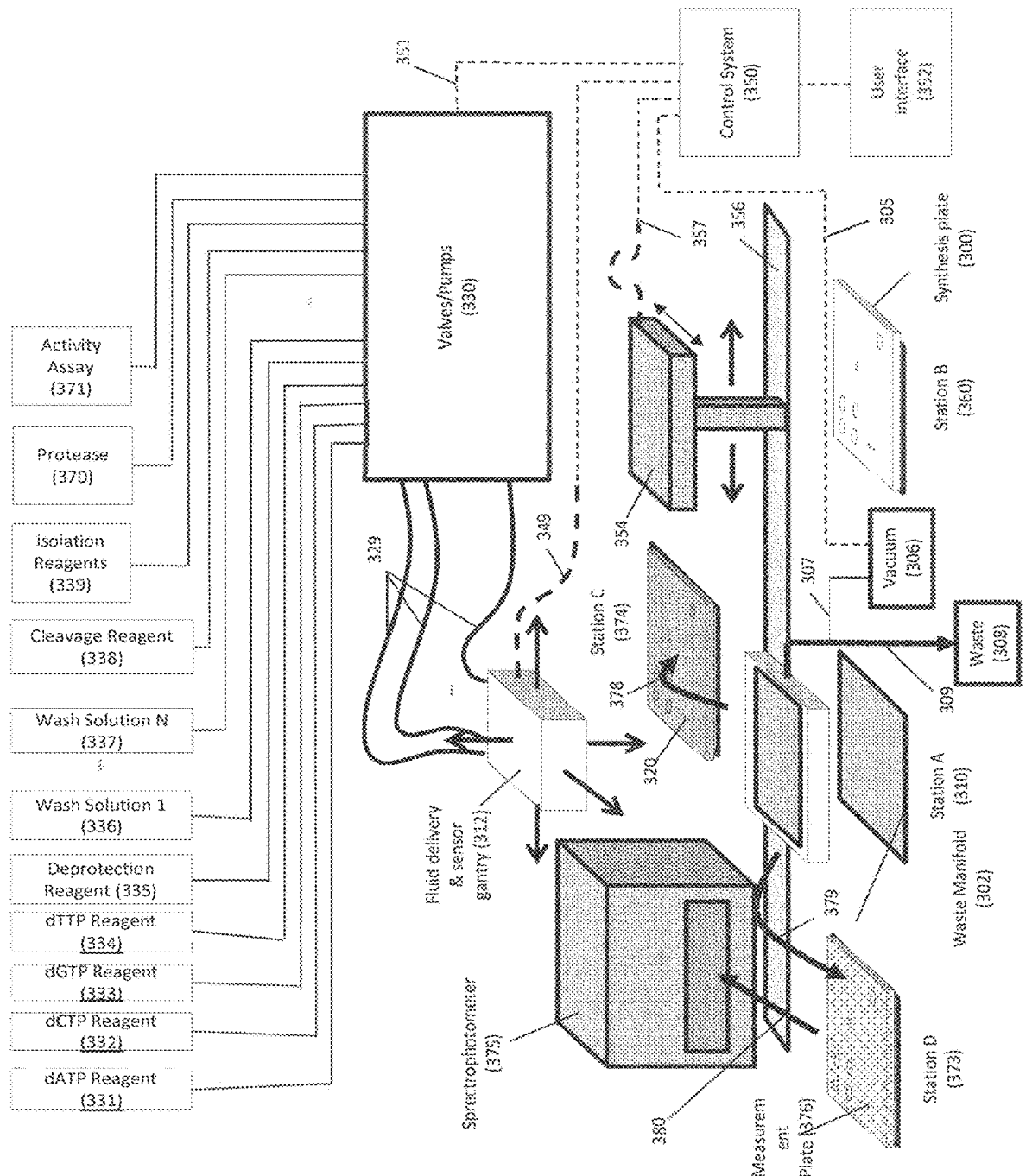

In some embodiments related to (i) and (iv) (concentration measurement and activity assays), coupling reaction incubation times may be automatically increased up to a predetermined maximum whenever measured polymerase activity is below a predetermined level. FIGS. 3E-3H illustrate an embodiment in which further reagents are provided for measuring polymerase activity and in which polynucleotide yields are measured after synthesis and isolation. FIG. 3E shows additional components, including reagent reservoir (371) which contains activity assay reagents, stations C (374) and D (373) which provide locations to for holding and manipulating multi-well plates, and spectrophotometer (375) for optically measuring DNA concentration by absorption at 260 nm. After synthesis is complete, synthesis plate (300) is moved from station A to station B (where it is shown in FIG. 3E). DNA isolation plate (320) and measurement plate (376) may have starting locations at station D (373) and station C (374), respectively. Measurement plate (376) may be a conventional plate whose wells align with those of isolation plate (320) and which is designed to accept fluid, in particular, eluted DNA, from isolation plate (320) and to permit optically based measurement of the concentration of such received DNA. Exemplary measurement plates are available commercially, e.g. from Greiner Bio-One (Frickenhausen, DE). After polynucleotide products have been cleaved and isolated in isolation plate (320) at station A, synthesis plate (300) is moved from station A (310) to station B (360) and isolation plate (320) is moved from station A (310) to station D (373), after which measurement plate (376) is moved (377) from station C (374) to station A (as shown in FIG. 3F), after which isolation plate (320) is place on top of measurement plate (376) (as shown in FIG. 3G). After isolated DNA is eluted from the isolation wells of isolation plate (320), it is moved (378) to station C (374) and measurement plate (376) is moved to station D (373) where it is subsequently inserted (380) into spectrophotometer (375) where the concentration of each well is measured. Exemplary sprectrophotometer or fluorometer (375) for measuring DNA concentration or fluorescent emissions is an Epoch microplate spectrophotometer (BioTek Instruments, Inc., Winooski, VT); Tecan infinite 200 (Mannedorf, CH); or like instrument. Such instruments are typically designed for 96-well and 384-well plates. In some embodiments, measurement plate (376) may be returned to station A (310) where liquid levels may be measured so that DNA amounts may be determined from measured concentrations.

As mentioned above, in some embodiments, systems and apparatus of the invention measure nucleotide coupling activity of template-free polymerase prior to synthesizing a plurality of polynucleotides. In some embodiments, such assays may be conducted in a subset of reaction chambers of a standard synthesis plate (that is, containing a synthesis support and initiator in each reaction chamber) under the control of an optional routine of control system (350) using an embodiment of FIGS. 3E-3H. Prior to polynucleotide synthesis, synthesis plate (300) is placed on waste manifold (302) at station A (310) so that gantry (312) is capable of delivering activity assay reagents (371) to one or more predetermined reaction chambers ("assay wells"). In embodiments where polymerase is delivered mixed with monomers, then at least one reaction chamber per mixture is used so that at least four reaction chambers are devoted to activity measurements. After activity is measured, the reaction chambers used for measurements are not used for polynucleotide synthesis. For embodiments employing the BODIPY-ATP/Fe(III)-based assay, a single reagent comprising the BODIPY compound and buffer is deliver to each of the assay wells, after which the polymerase-containing dATP reagent (331), dCTP reagent (332), dGTP reagent (333) and dTTP reagent (334) are delivered. After a predetermined incubation, the synthesis plate is moved to the spectrophometer/fluorimeter for fluorescence measurement which is reported to control system (350). Provided that the measured activity levels are within predetermined ranges, control system (350) returns the synthesis plate to station A (310) for synthesis to commence in the non-assay well reaction chambers. If one or more polymerase activities are below a predetermined level, control system (350) may lengthen the duration of coupling reaction times up to a predetermined maximum duration to maximize coupling yields during synthesis. Alternatively, if one or more activities is below a predetermined level, control system (350) may issue a warning to the user through user interface (352).

Figure 4A:
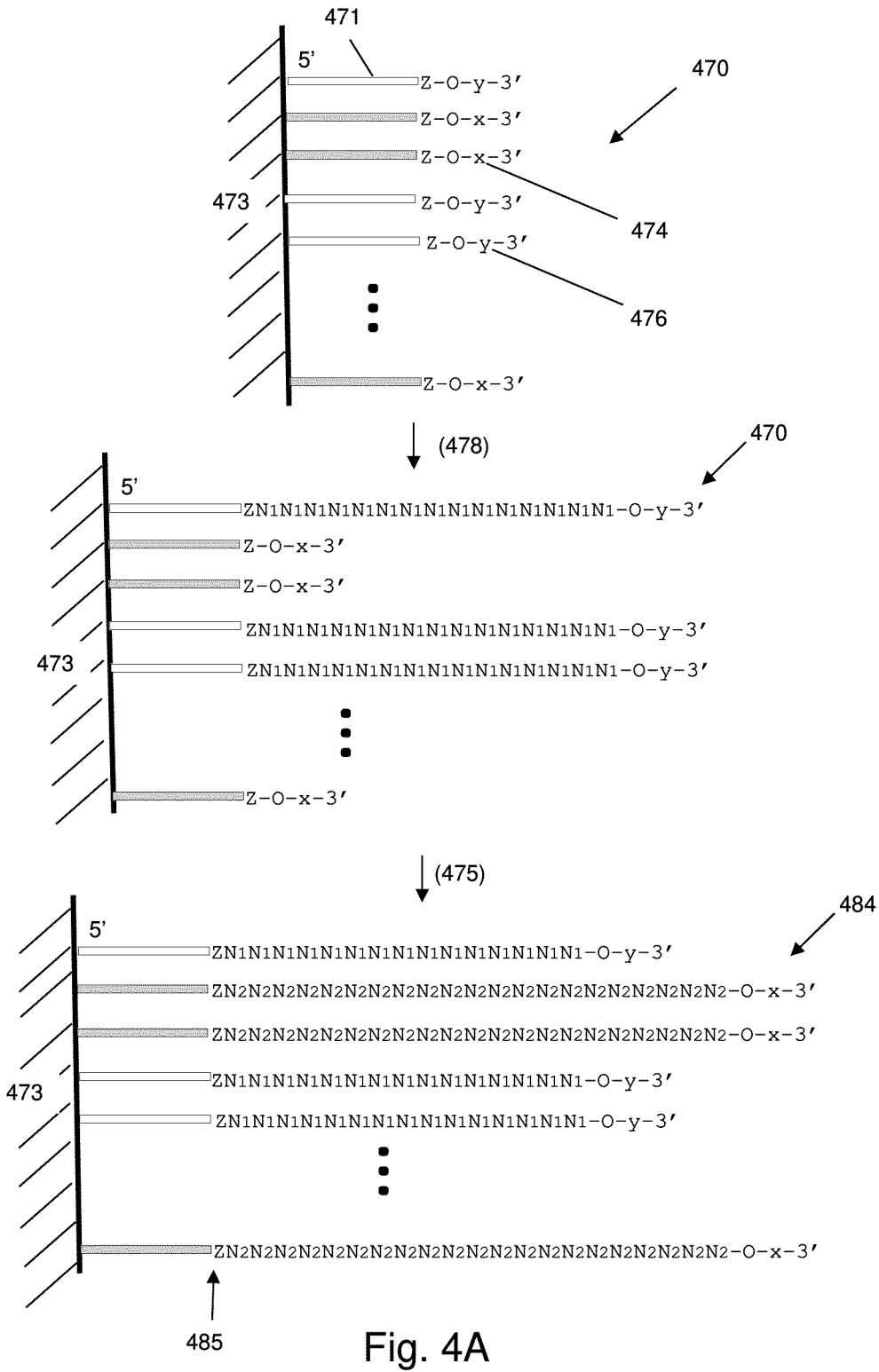
FIG. 4A-4B illustrate an embodiment of the apparatus of the invention for synthesizing multiple oligonucleotides, polynucleotide comprising a combination of RNA and DNA or branched oligonucleotides in the same reaction chamber using orthogonal protection-deprotection chemistries.

In other embodiments of the invention, initiators and monomers may be provided with orthogonal 3'-O-protecting groups so that two or more different polynucleotides may be synthesized in the same reaction chamber, branched polynucleotides may be synthesized, or RNA-DNA chimeric polynucleotide may be synthesized. One embodiment of such parallel synthesis is illustrated in FIG. 4A. Two different initiators (471 and 472) corresponding to the different oligonucleotides are attached to solid support (473) in a predetermined ratio that will result in the desired ratio of oligonucleotides being synthesized. In some embodiments, 3'-most nucleotide of the initiator may be a cleavable nucleotide. The different 3'-O-blocking groups are indicated as "x" (474) and "y" (476). The two oligonucleotides may be synthesized one at a time (as illustrated in FIG. 4A) or they may be synthesized at the same time by alternating which oligonucleotide is elongated in every other elongation step. As shown in FIG. 4A, oligonucleotides employing the "y" blocking group is elongated (478) in its entirety to produce first elongation product (470) still having its 3'-hydroxyl blocked, after which (475) the oligonucleotide employing the "x" blocking group is elongated to produce second elongation product (484). After both syntheses are complete, the two blocking groups may be removed and the oligonucleotides released from solid support (473) by cleaving cleavable nucleotide "Z" (485). Some embodiments, a method for synthesizing two or more oligonucleotides in the same reaction vessel may be implemented by the following steps: (a) providing one or more supports with two or more populations of initiators wherein the initiators of each population are terminated by a cleavable linkage or a cleavable nucleotide having a population-specific 3'-O-blocking group removable by deblocking conditions orthogonal to the deblocking conditions of the 3'-O-blocking groups of every other population of initiators; (b) deblocking population-specific blocking groups of a population of initiators or elongated fragments to form initiators or elongated fragments having free 3'-hydroxyls; (c) contacting under elongation conditions the population of initiators or its elongated fragments having free 3'-hydroxyls with a 3'-O-blocked nucleoside triphosphate and a template-independent DNA polymerase so that the initiators or elongated fragments are elongated by incorporation of the 3'-O-blocked nucleoside triphosphate to form 3'-O-blocked elongated fragments; and (d) repeating steps (b) and (c) for each population of initiators until elongated fragments are formed having nucleotide sequences of the plurality of oligonucleotides. Polynucleotide products may be cleaved from the initiators as described below. In some embodiments, the above methods further include steps of (d) deblocking the elongated fragments; and (e) cleaving the cleavable nucleotides or cleavable linkages to free the elongated fragments and/or the two or more oligonucleotides.

Figure 4B:
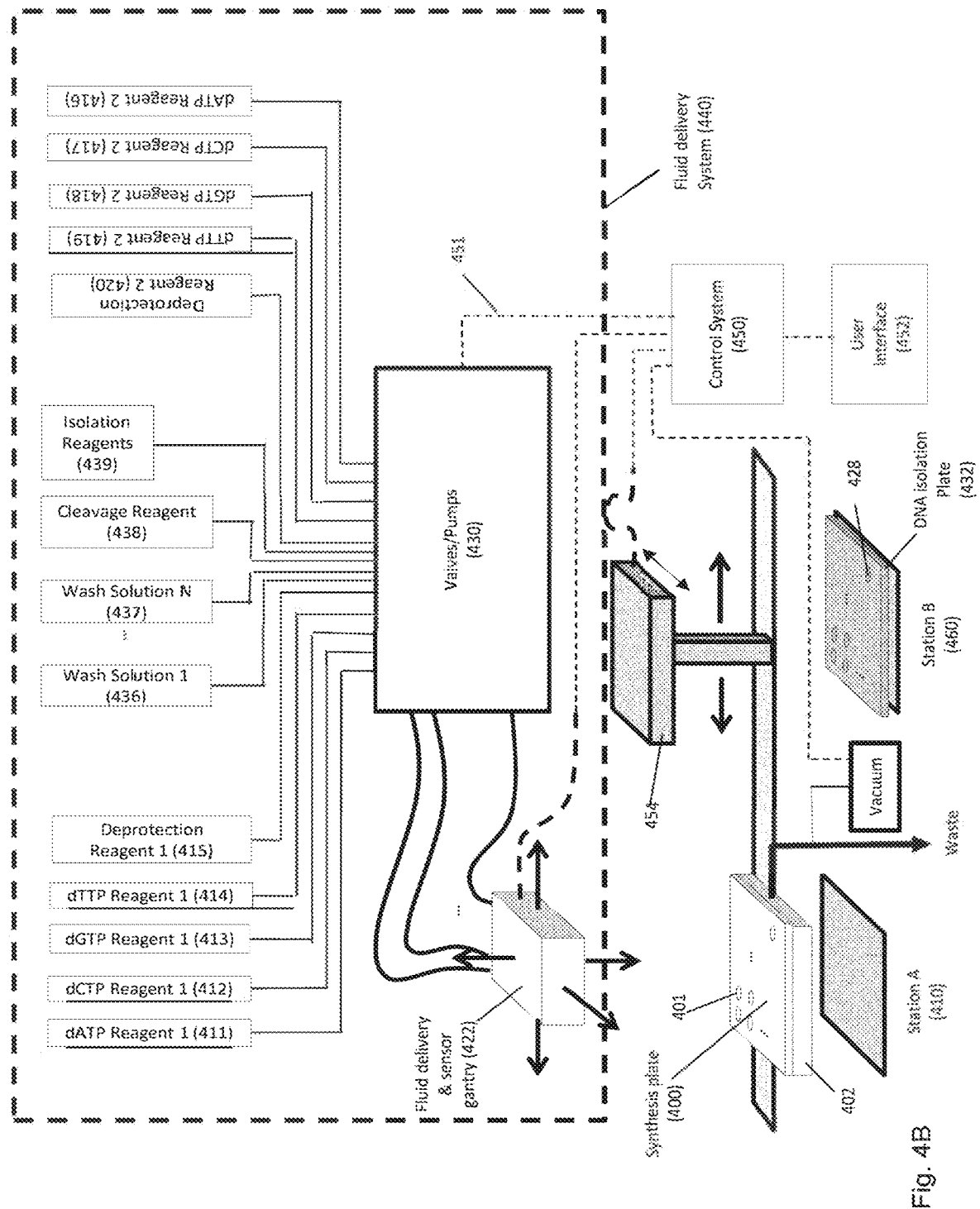

An embodiment of the system and apparatus of the invention for synthesizing one or two polynucleotides in the same reaction chamber is illustrated in FIG. 4B. As is readily noted the key difference between this embodiment and that of FIGS. 3A-3D is the presence of two sets of synthesis reagents for each of the orthogonal protection chemistries. Several pairs of such orthogonal protection chemistries are described below. The components of the embodiment of FIG. 4B function in the same manner as those of the embodiment of FIGS. 3A-3D. Namely, synthesis plate (400) with reaction chambers (401) containing synthesis supports with two different initiators (instead of one) is mounted on waste manifold (402). Fluid delivery system (440) under command of control system (450) delivers synthesis reagents (411-415 and 416-420) via valve and pump block (430) and fluid delivery and sensor gantry (422) in accordance with the above cycles until the two different polynucleotides are completed. For synthesizing RNA-DNA chimeric polynucleotides, synthesis reagents (416-420) may be RNA monomers and may be combined with a template-free polymerase that is specific for RNA-to-DNA or RNA-to-RNA couplings. Some reagents, e.g. wash solutions, cleavage reagents and isolation reagents (436-439) may be shared. At the completion of synthesis, DNA isolation plate (432) and plate mover (454) function as described for the embodiment of FIGS. 3A-3D.

Figure 5A:
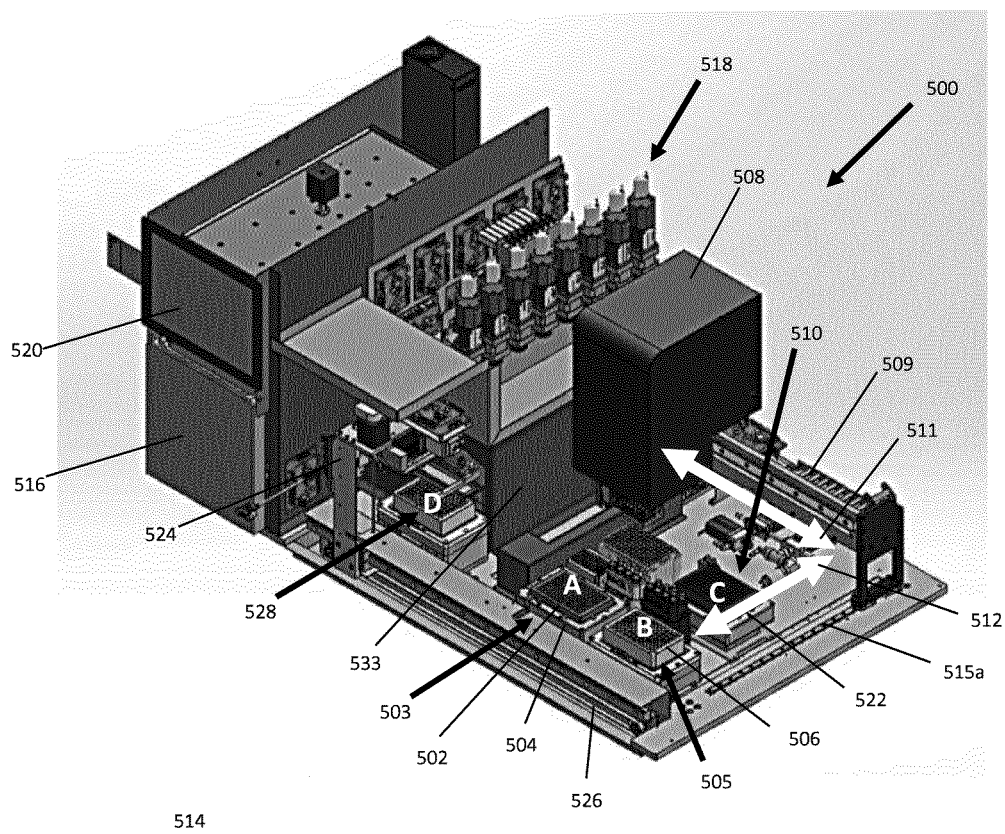
FIGS. 5A-5G illustrate an embodiment of the invention employing separate stations within the apparatus for synthesis, product cleavage, isolation and product quantitation.

A further embodiment of the system and apparatus of the invention and its components are described in FIGS. 5A-5G. FIG. 5A illustrates the arrangement of components in an embodiment (500) of the apparatus of the invention. In this embodiment, the processing proceeds as follows: after synthesis at station A, synthesis supports with polynucleotide product attached are transferred by pipettes (e.g. a 96-pipette bank for a 96-well synthesis plate) to separate station C where a cleavage reaction takes place, after which the cleavage reaction mixture is transferred back to station A using the same pipette bank and deposited into a DNA isolation plate which has replaced the synthesis plate at station A. In the meantime, a measurement plate has been mounted on the vacuum manifold at station B. After capture of the cleaved polynucleotide product, the DNA isolation plate is move to and mounted on top of the measurement plate at station B where the captured polynucleotide product is eluted into the measurement plate. The measurement plate is then move to and inserted into the spectrophotomer where concentration is measured and after which the measurement plate is moved back to station A where concentrations are normalized if necessary.

In other embodiments, station C may be used for pooling synthesis supports from predetermined reaction wells from a synthesis plate at station A, for example, for increasing final product concentrations of selected polynucleotides. Station C may also be used for pooling polynucleotide products from a synthesis plate for synthesizing random oligonucleotide tags on polynucleotide products using a split-and-mix synthesis strategy.

In FIG. 5A, synthesis plate (502) containing a plurality of reaction chambers each containing a synthesis support with initiators is located at station A (503) mounted on top of waste manifold (504). Adjacent to station A is station B (505) comprising vacuum manifold (506) which in this embodiment is used for releasing isolated or captured polynucleotide product from wells of an isolation plate and transfer to a measurement plate mounted below it on vacuum manifold (506). After entry of the polynucleotide sequences, for example, through user interface touch screen (520), all synthesis cycles are performed in synthesis plate (502) at station A (503) wherein fluid delivery nozzles (not shown) housed in gantry head (508) deliver the coupling reagents, deprotection reagents and wash solutions to the reaction chambers after which liquid level sensors, also housed in gantry head (508), measure liquid levels in each well. Besides reagent delivery nozzles and liquid level sensors, gantry head (508) also houses a 96-pipette bank for transferring synthesis supports with polynucleotide product to station C (510) and then a cleavage mixture from station C (510) back to station A (503). Gantry head (508) is mounted on gantry (509) and is capable of moving back and forth on gantry (509) as indicated by white arrow (511). Gantry (509) in turn is capable of moving back and forth as indicated by white arrow (512) on tracks (515a) and (515b, shown in FIG. 5B), so that gantry head (508) can access stations A (503), B (505) and C (510).

Fluid movement and delivery is made through a system of reservoirs, valves and pumps connected to gantry head (508) by flexible lines (made of PTFE (Teflon), or like material), under the control of the control system. Reagent storage cabinet (516) houses coupling reagents, wash reagents, cleavage reagents, elution reagents, and other reagents used in whatever embodiment of the synthesis method is implemented on the apparatus. As illustrated in other figures, fluid from the reagent reservoirs is routed through banks of valves (not shown) and pumps (518) controlled by the control system and delivered to fluid delivery nozzles (not shown) for dispensing into reaction chambers. Such valve banks may include temperature control elements to ensure that reagents are at a predetermined temperature for desired reaction conditions in the reaction chambers. As described above, in one embodiment, pipette bank in gantry head (508) transfers washed synthesis supports with attached polynucleotide product to cleavage plate (522) at station C (510) after which cleavage reagents are dispensed to the reaction chambers of cleavage plate (522) by nozzles of gantry head (508). After incubation, whenever the isolation technique is based on the precipitation/adsorption method of Boom (cited above), isopropanol is then added which precipitates the cleaved polynucleotide product in the reaction mixture. While the cleavage reaction is implemented, plate mover (524) travels along track (526) and rearranges plates at stations A (503) and D (528) so that the DNA isolation plate is placed at station A (503) and the measurement plate is placed on top of vacuum manifold (506) at station B (505). The cleavage reaction mixtures from the wells of cleavage plate (522) are transferred by the pipette bank of gantry head (508) to the wells of the DNA isolation plate now mounted on waste manifold (504) at station A (503). There the cleavage reaction mixture is drawn through the silica adsorbent material of the DNA isolation plate and the polynucleotide product precipitates are adsorbed onto the silica material. Plate mover (524) then moves the DNA isolation plate to station B (505) and places it on top of the measurement plate. Gantry (508) then delivers elution solution (e.g. water or TE) to the wells of the DNA isolation plate and the adsorbed polynucleotide product is eluted into the wells of the measurement plate. After elution, plate mover (524) rearranges plates at stations A (503), B (505) and D (528) so that the measurement plate is transferred to station D (528) where it is inserted into spectrophotometer (533) to measure concentrations of each polynucleotide product. After such measurement, the measurement plate is transferred from spectrophotometer (533) to station A (503) where additional fluid (e.g. elution buffer) is added to wells as necessary to normalize concentrations across all the wells or to adjust concentrations to meet user specified concentration values for different polynucleotide product.

Figure 5B:
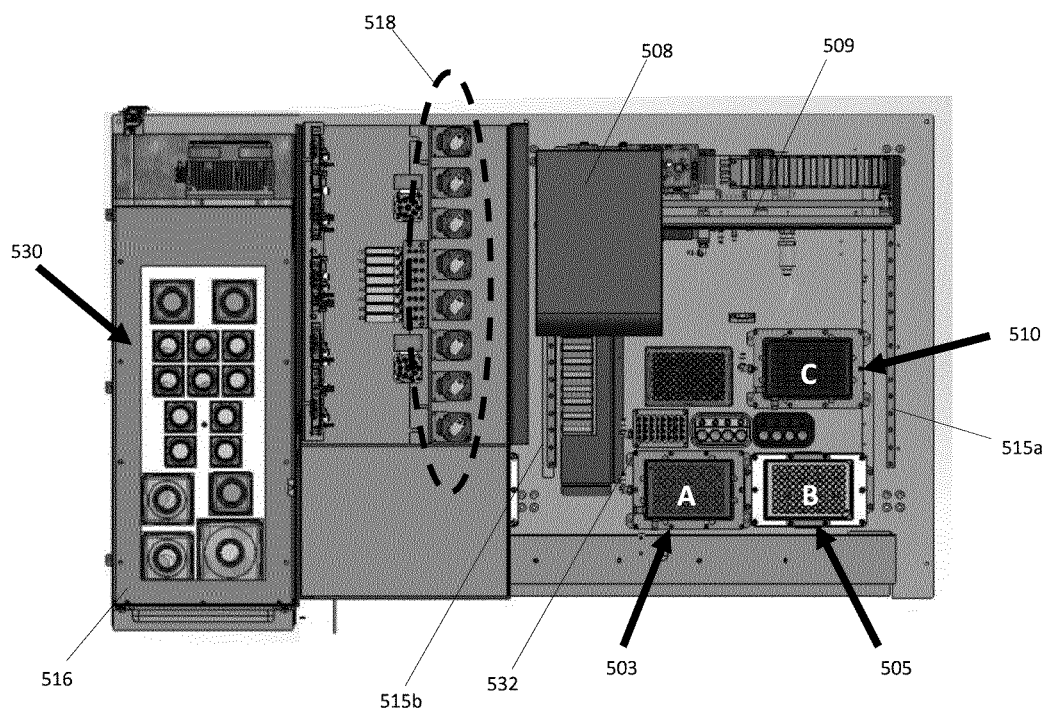
Figure 5C:
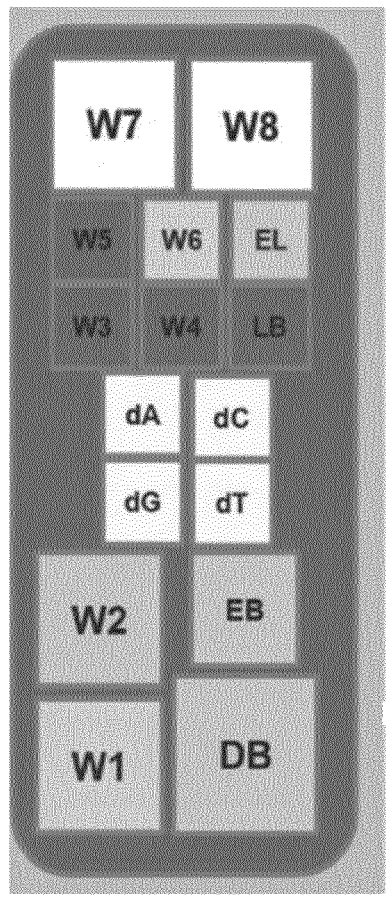

A top view of apparatus (500) is shown in FIG. 5B. Stations A (503), B (505) and C (510) are shown in relation to gantry head (508) and rails (515a) and (515b). Component (532) is a rinse station to which fluid dispense nozzles may be positioned for flushing lines of the fluid delivery system. Reagent bottles or reservoirs (530) are shown in reagent cabinet (516). Bank of eight pumps (518) are shown mounted between reagent reservoirs (530) and gantry (508). Reagent reservoir assignments for this embodiment are shown in FIG. 5C.

Figure 5D:
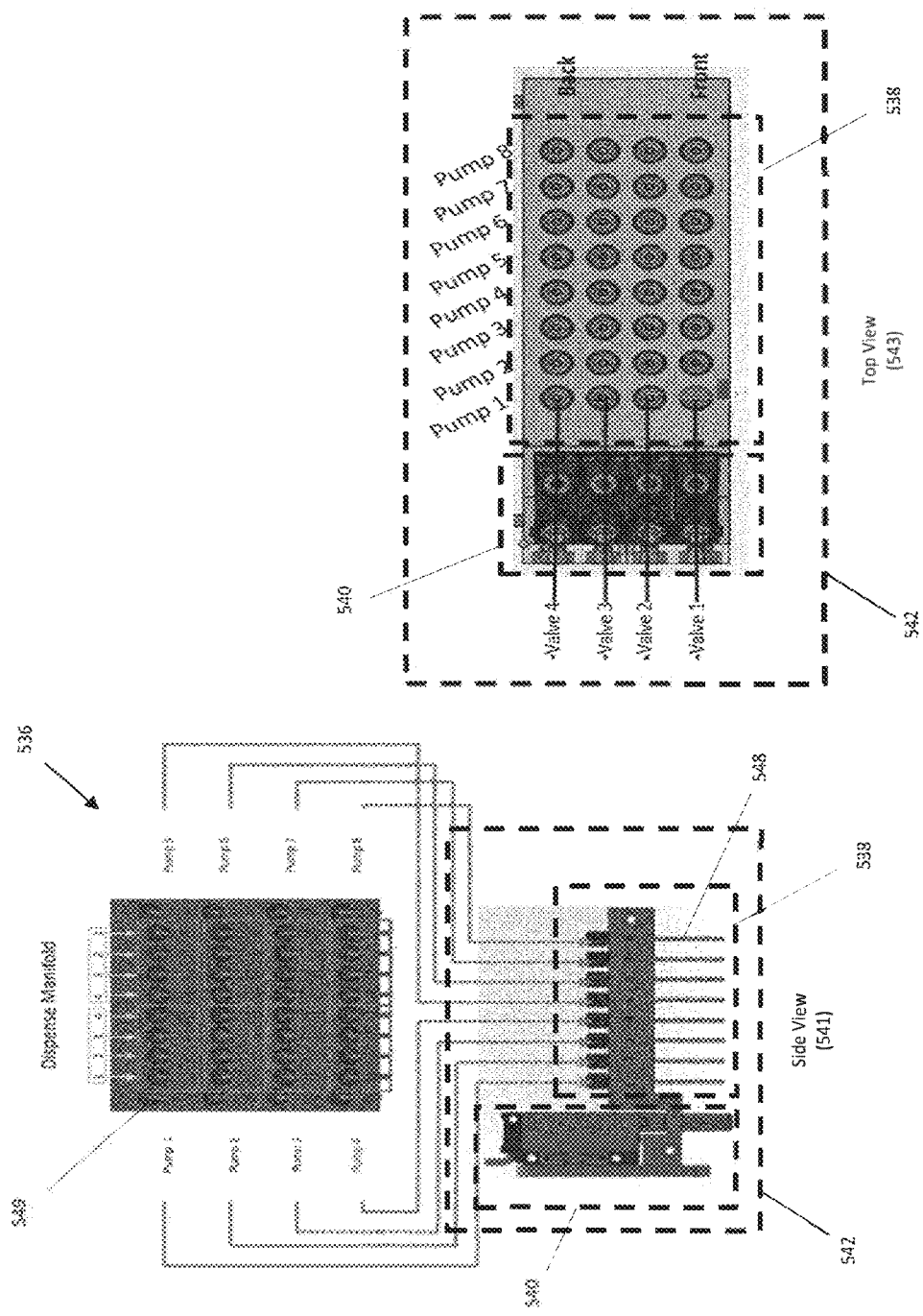
Figure 5E:
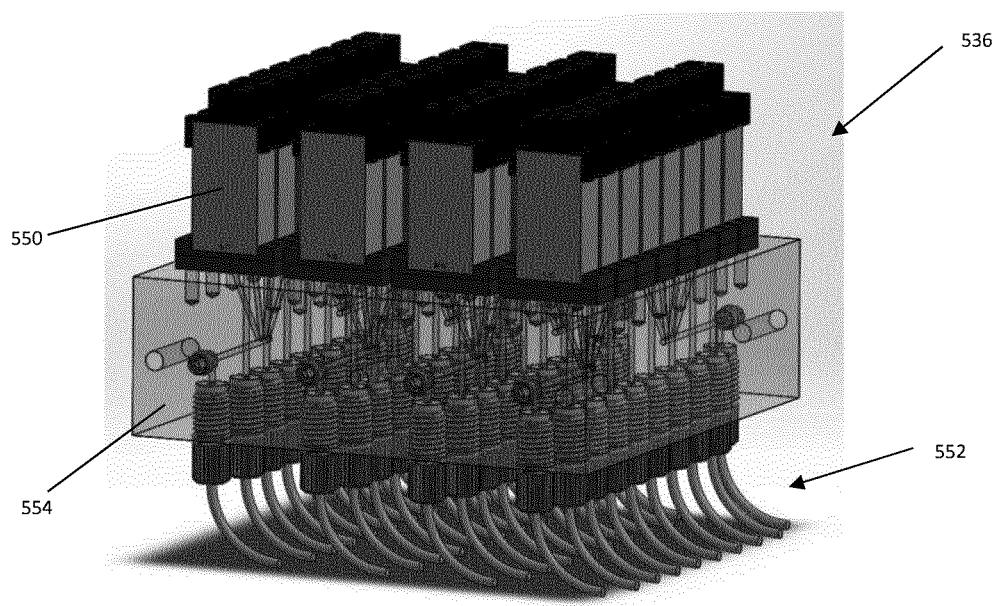
Figure 5F:
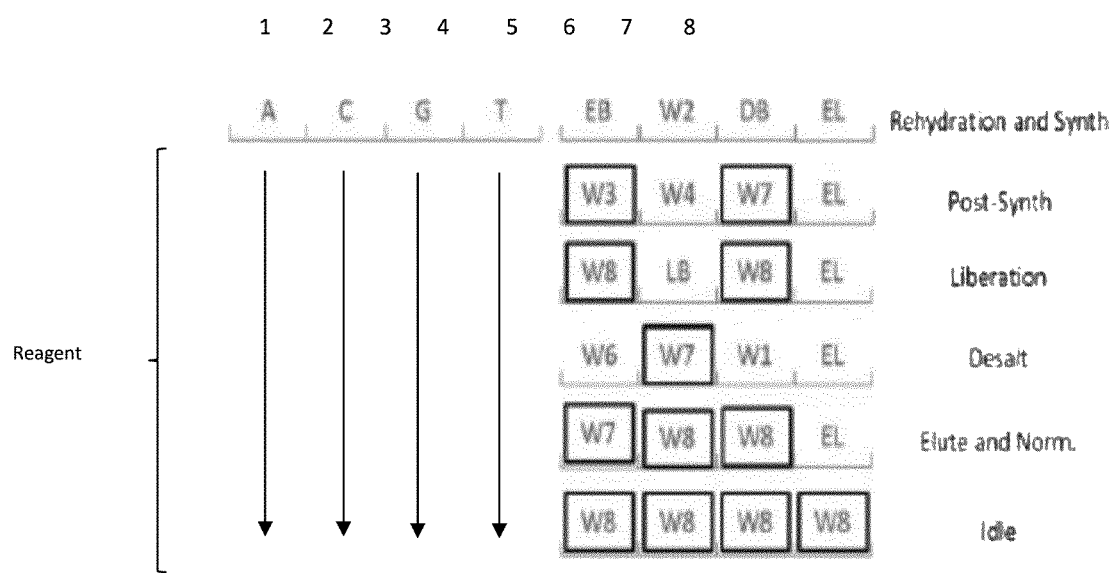
Figure 5G:
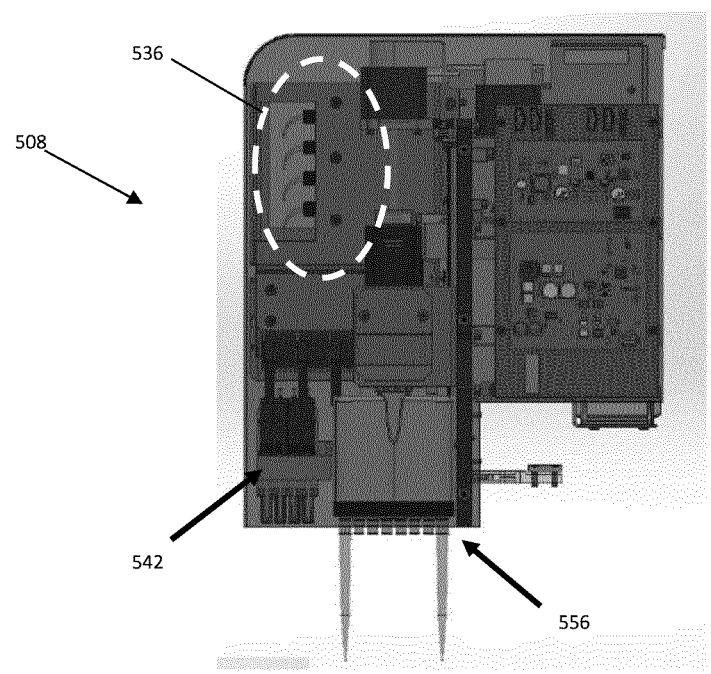

FIGS. 5D-5G show details of components of the fluid delivery system associated with gantry head (508). FIG. 5D shows dispense manifold (536) and the association of the eight pumps with dispense nozzle bank (538) comprising 32 nozzles (548), both in a side view (541) and top view (543). In this embodiment, liquid level sensor bank (540) is rigidly mounted with dispense nozzle bank (538) as a single unit (542) housed in gantry head (508). Output lines (549) of dispense manifold (536) are grouped into eight groups corresponding to the eight pumps (518) of FIGS. 5A and 5B. FIG. 5E is a perspective view of dispense manifold (536) showing bank of 32 valves (550) that are in one-to-one correspondence with outlets (552). Dispense manifold (536) and nozzles (548) are fabricated from a rigid, mechanically stable and chemically inert material such as polyetheretherketone (PEEK), or like material. FIG. 5F shows how pumps 1-8 are assigned to the various reagent throughout a synthesis and subsequent cleaving, isolating and normalizing steps. FIG. 5G is a cross-section of gantry head (508) showing the positions of dispense manifold (536), liquid level sensor bank and nozzle bank (542) and pipette bank (556)

Methods of Template-Free Enzymatic Synthesis

Systems, apparatus and kits of the invention permit implementation of a variety of methods of template-free enzymatic synthesis of a plurality of polynucleotides having predetermined sequences. It is within the skill of ordinary practitioners to adapt components of the apparatus in obvious ways to accommodate the different embodiments of the methods of template-free enzymatic synthesis of polynucleotides. Generally, methods of template-free (or equivalently, "template-independent") enzymatic polynucleotide synthesis comprise repeated cycles of steps, such as are illustrated in FIG. 1, in which a predetermined nucleotide is coupled to an initiator or growing chain in each cycle. The general elements of template-free enzymatic synthesis are described in the following references: Ybert et al, International patent publication WO/2015/159023; Ybert et al, International patent publication WO/2017/216472; Hyman, U.S. Pat. No. 5,436,143; Hiatt et al, U.S. Pat. No. 5,763,594; Jensen et al, Biochemistry, 57: 1821-1832 (2018); Mathews et al, Organic & Biomolecular Chemistry, DOI: 0.1039/c6ob01371f (2016); Schmitz et al, Organic Lett., 1(11): 1729-1731 (1999).

Initiator polynucleotides (100) with free 3'-hydroxyl groups (130) are provided, for example, attached to synthesis support (120). As described more fully below, synthesis supports may be soluble supports or solid support, such as, planar solid surfaces or beads, such as magnetic beads, agarose beads, or the like. To the initiator polynucleotides (100) (or elongated initiator polynucleotides in subsequent cycles) are added a 3'-O-protected-dNTP and a template-free polymerase, such as a terminal deoxynucleotidyltransferase (TdT) or variant thereof (e.g. Ybert et al, WO/2017/216472; Champion et al, WO2019/135007) under conditions (140) effective for the enzymatic incorporation of the 3'-O-protected-dNTP onto the 3' end of the initiator polynucleotides (100) (or elongated initiator polynucleotides). This reaction produces elongated initiator polynucleotides whose 3'-hydroxyls are protected (160). If the elongated sequence is not complete, then another cycle of addition is implemented (180). If the elongated initiator polynucleotide contains a competed sequence, then the 3'-O-protection group may be removed, or deprotected, and the desired sequence may be cleaved from the original initiator polynucleotide (182). Such cleavage may be carried out using any of a variety of single strand cleavage techniques, for example, by inserting a cleavable nucleotide at a predetermined location within the original initiator polynucleotide. An exemplary cleavable nucleotide may be a uracil nucleotide which is cleaved by uracil DNA glycosylase. If the elongated initiator polynucleotide does not contain a completed sequence, then the 3'-O-protection groups are removed to expose free 3'-hydroxyls (130) and the elongated initiator polynucleotides are subjected to another cycle of nucleotide addition and deprotection.

As used herein, an "initiator" (or equivalent terms, such as, "initiating fragment," "initiator nucleic acid," "initiator oligonucleotide," or the like) usually refers to a short oligonucleotide sequence with a free 3'-hydroxyl at its end, which can be further elongated by a template-free polymerase, such as TdT. In one embodiment, the initiating fragment is a DNA initiating fragment. In an alternative embodiment, the initiating fragment is an RNA initiating fragment. In some embodiments, an initiating fragment possesses between 3 and 100 nucleotides, in particular between 3 and 20 nucleotides. In some embodiments, the initiating fragment is single-stranded. In alternative embodiments, the initiating fragment may be double-stranded. In some embodiments, an initiator oligonucleotide may be attached to a synthesis support by its 5'end; and in other embodiments, an initiator oligonucleotide may be attached indirectly to a synthesis support by forming a duplex with a complementary oligonucleotide that is directly attached to the synthesis support, e.g. through a covalent bond. In some embodiments a synthesis support is a solid support which may be a discrete region of a solid planar solid, or may be a bead.

In some embodiments, an initiator may comprise a non-nucleic acid compound having a free hydroxyl to which a TdT may couple a 3'-O-protected dNTP, e.g. Baiga, U.S. patent publications US2019/0078065 and US2019/0078126.

After synthesis is completed polynucleotides with the desired nucleotide sequence may be released from initiators and the synthesis supports by cleavage.

A wide variety of cleavable linkages or cleavable nucleotides may be used for this purpose. In some embodiments, cleaving the desired polynucleotide leaves a natural free 5'-hydroxyl on a cleaved strand; however, in alternative embodiments, a cleaving step may leave a moiety, e.g. a 5'-phosphate, that may be removed in a subsequent step, e.g. by phosphatase treatment. Cleaving steps may be carried out chemically, thermally, enzymatically or by photochemical methods. In some embodiments, cleavable nucleotides may be nucleotide analogs such as deoxyuridine or 8-oxo-deoxyguanosine that are recognized by specific glycosylases (e.g. uracil deoxyglycosylase followed by endonuclease VIII, and 8-oxoguanine DNA glycosylase, respectively). In some embodiments, cleavage may be accomplished by providing initiators with a deoxyinosine as the penultimate 3' nucleotide, which may be cleaved by endonuclease V at the 3' end of the initiator leaving a 5'-phosphate on the released polynucleotide. In some embodiments, an initiator may contain a terminal uridine so that after synthesis the desired polynucleotide may be cleaved from the initiator by treatment with KOH, or like base. Further methods for cleaving single stranded polynucleotides are disclosed in the following references, which are incorporated by reference: U.S. Pat. Nos. 5,739,386, 5,700,642 and 5,830,655; and U.S. Patent Publication Nos. 2003/0186226 and 2004/0106728; and in Urdea and Horn, U.S. Pat. No. 5,367,066.

Returning to FIG. 1, in some embodiments, an ordered sequence of nucleotides are coupled to an initiator nucleic acid using a template-free polymerase, such as TdT, in the presence of 3'-O-protected dNTPs in each synthesis step. In some embodiments, the method of synthesizing an oligonucleotide comprises the steps of (a) providing an initiator having a free 3'-hydroxyl; (b) reacting under extension conditions the initiator or an extension intermediate having a free 3'-hydroxyl with a template-free polymerase in the presence of a 3'-O-protected nucleoside triphosphate to produce a 3'-O-protected extension intermediate; (c) deprotecting the extension intermediate to produce an extension intermediate with a free 3'-hydroxyl; and (d) repeating steps (b) and (c) until the polynucleotide is synthesized. (Sometimes the terms "extension intermediate" or "elongation fragment" or "growing chain" are used interchangeably). In some embodiments, an initiator is provided as an oligonucleotide attached to a solid support, e.g. by its 5' end. The above method may also include washing steps after the reaction, or extension, step, as well as after the de-protecting step. For example, the step of reacting may include a sub-step of removing unincorporated nucleoside triphosphates, e.g. by washing, after a predetermined incubation period, or reaction time. In some embodiments, such predetermined incubation periods or reaction times may be in the range of from 30 seconds to 30 minutes, or from 1 min to 30 min, or from 1 min to 15 min, or from 1 min to 10 min.

In some embodiments, after the synthesis cycles of FIG. 1 are completed further steps may be performed to cleave the completed polynucleotides from the solid supports and to purify them for applications. Such further steps may be performed either in the reaction chambers of the array or the polynucleotides still attached to the solid supports may be transferred to other reaction vessels for the performance of such further steps. Additionally, some cleavage methods may result in a released product that still requires modification to convert it into a useable product. For example, in the "endonuclease V-inosine" cleavage (described below) leaves a 5'-phosphate that must be removed for some applications. Thus, a further step of phosphatase treatment may be required.

In some embodiments, a synthesis cycle may be represented as follows:

| Steps of Synthesis Cycle | | |
|---|---|---|
| Step | Action | Duration* |
| (i) | Couple-Remove reaction solution | $t_1$ |
| (ii) | Deprotect-Remove reaction solution | $t_2$ |
| (iii) | Wash-Remove wash solution | $t_3$ |

*These are reaction or wash times only. Fluid evacuation or removal may require an additional 10-30 sec.

As shown above, in some embodiments, the coupling reaction solution remains in the reaction chamber and the deblocking solution is simply added to it in step (ii). In some embodiments, a wash step may be performed after the coupling step and before the deprotection step.

In particular embodiments, further steps may be performed either in each cycle or periodically during the synthesis process. For example, as mentioned above, from time to time, if enzyme accumulation arises, for example, by template-free polymerase sticking to surfaces, such as reaction chamber walls, the filter surfaces or pores so as to cause blockage that inhibits fluid transfer, steps of protease treatment may be employed. The reaction times or durations, $t_1$, $t_2$ and $t_3$ may vary widely depending on particular embodiments in which, for example, different template-free polymerases, reaction temperatures, reaction buffers, monomers, deprotection solutions, and the like, are employed.

When the predetermined sequences of polynucleotides on a synthesis support includes reverse complementary subsequences, secondary intra-molecular or cross-molecular structures may be created by the formation of hydrogen bonds between the reverse complementary regions. In some embodiments, base protecting moieties for exocyclic amines are selected so that hydrogens of the protected nitrogen cannot participate in hydrogen bonding, thereby preventing the formation of such secondary structures. That is, base protecting moieties may be employed to prevent the formation of hydrogen bonds, such as are formed in normal base pairing, for example, between nucleosides A and T and between G and C. At the end of a synthesis, the base protecting moieties may be removed and the polynucleotide product may be cleaved from the solid support, for example, by cleaving it from its initiator.

In addition to providing 3'-O-blocked dNTP monomers with base protection groups, elongation reactions may be performed at higher temperatures using thermal stable template-free polymerases. For example, a thermal stable template-free polymerase having activity above 40° C. may be employed; or, in some embodiments, a thermal stable template-free polymerase having activity in the range of from 40-85° C. may be employed; or, in some embodiments, a thermal stable template-free polymerase having activity in the range of from 40-65° C. may be employed.

In some embodiments, elongation conditions may include adding solvents to an elongation reaction mixture that inhibit hydrogen bonding or base stacking. Such solvents include water miscible solvents with low dielectric constants, such as dimethyl sulfoxide (DMSO), methanol, and the like. Likewise, in some embodiments, elongation conditions may include the provision of chaotropic agents that include, but are not limited to, n-butanol, ethanol, guanidinium chloride, lithium perchlorate, lithium acetate, magnesium chloride, phenol, 2-propanol, sodium dodecyl sulfate, thiourea, urea, and the like. In some embodiments, elongation conditions include the presence of a secondary-structure-suppressing amount of DMSO. In some embodiments, elongation conditions may include the provision of DNA binding proteins that inhibit the formation of secondary structures, wherein such proteins include, but are not limited to, single-stranded binding proteins, helicases, DNA glycolases, and the like.

When base-protected dNTPs are employed, the above method of FIG. 1 may further include a step (e) removing base protecting moieties, which in the case of acyl or amidine protection groups may (for example) include treating with concentrated ammonia.

The above method may also include capping step(s) as well as washing steps after the reacting, or extending, step, as well as after the deprotecting step. As mentioned above, in some embodiments, capping steps may be included in which non-extended free 3'-hydroxyls are reacted with compounds that prevents any further extensions of the capped strand. In some embodiments, such compound may be a dideoxynucleoside triphosphate. In other embodiments, non-extended strands with free 3'-hydroxyls may be degraded by treating them with a 3'-exonuclease activity, e.g. Exo I. For example, see Hyman, U.S. Pat. No. 5,436,143. Likewise, in some embodiments, strands that fail to be deblocked may be treated to either remove the strand or render it inert to further extensions.

In some embodiments, reaction conditions for an elongation step (also sometimes referred to as an extension step or a coupling step) may comprising the following: 2.0 μM purified TdT; 125-600 μM 3'-O-blocked dNTP (e.g. 3'-O—NH$_2$-blocked dNTP); about 10 to about 500 mM potassium cacodylate buffer (pH between 6.5 and 7.5) and from about 0.01 to about 10 mM of a divalent cation (e.g. $CoCl_2$ or $MnCl_2$), where the elongation reaction may be carried out in a 50 μL reaction volume, at a temperature within the range RT to 45° C., for 3 minutes. In embodiments, in which the 3'-O-blocked dNTPs are 3'-O—NH$_2$-blocked dNTPs, reaction conditions for a deblocking step may comprise the following: 700 mM $NaNO_2$; 1 M sodium acetate (adjusted with acetic acid to pH in the range of 4.8-6.5), where the deblocking reaction may be carried out in a 50 μL volume, at a temperature within the range of RT to 45° C. for 30 seconds to several minutes. Washes may be performed with the cacodylate buffer without the components of the coupling reaction (e.g. enzyme, monomer, divalent cations).

In some embodiments, RNA synthesis may be accomplished by similar steps as described above but with template-free polymerases and monomers specifically selected for RNA synthesis, e.g. such as described in Heinisch et al, International patent publication WO2021/018919. For example, systems, apparatus and kits of the invention may implement methods of synthesizing a polyribonucleotide having a predetermined sequence comprising the steps of: a) providing an initiator having a 3'-terminal nucleotide having a free 3'-hydroxyl; and b) repeating, until the polyribonucleotide is formed, cycles of (i) contacting under elongation conditions the initiator or elongated fragments having free 3'-hydroxyls with a 3'-O-blocked-nucleoside triphosphate and a template-free polymerase so that the initiator or elongated fragments are elongated by incorporation of a 3'-O-blocked-nucleoside triphosphate to form 3'-O-blocked-elongated fragments, and (ii) deblocking the elongated fragments to form elongated fragments having free 3'-hydroxyls; wherein the template-free polymerase is a poly(A) polymerase (PAP) or a poly(U) polymerase. In further embodiments, the initiator may be attached to a support by a 5' end, the support may be a solid support, and the above method may include a step of cleaving the polynucleotide from the initiator. In some embodiments, reaction conditions for an extension or elongation step using PAP or PUP may comprising the following: Reaction conditions 1 (for primer+

AM-rATP): 250 uM AM-rATP, 0.1 uM ATTO488-(rA)5, 1 uM PAP, 1×ATP buffer (20 mM Tris-HCl, 0.6 mM MnCl2, 0.02 mM EDTA, 0.1% BSA, 10% glycerol, 100 mM imidazole, pH 7-8), 37 C, 30 min. Reaction condition 2 (for primer+AM-rGTP): 250 uM rGTP, 0.1 uM ATTO488-(rA)5, 1 uM PAP, 1×GTP buffer (0.6 mM MnCl2, 0.1% BSA, 10 mM imidazole, pH 6), 37 C, 30 min. In the foregoing, "AM-rNTP" refers to 3'-azidomethyl-O-ribonucleoside triphosphate. Many of the 3'-O-blocked rNTPs employed in the invention may be purchased from commercial vendors (e.g. Jena Bioscience, MyChemLabs, or the like) or synthesized using published techniques, e.g. U.S. Pat. No. 7,057, 026; International patent publications WO2004/005667, WO91/06678; Canard et al, Gene (cited above); Metzker et al, Nucleic Acids Research, 22: 4259-4267 (1994); Meng et al, J. Org. Chem., 14: 3248-3252 (3006); U.S. patent publication 2005/037991; Zavgorodny et al, Tetrahedron Letters, 32(51): 7593-7596 (1991). In a further particular embodiments, the 3'-blocked nucleotide triphosphate is blocked by either 3'-O-propargyl, a 3'-O-azidomethyl, 3'-O—NH$_2$ or 3'-O-allyl group. In still other embodiments, 3'-O-blocking groups of the invention include 3'-O-methyl, 3'-O-(2-nitrobenzyl), 3'-O-allyl, 3'-O-amine, 3'-O-azidomethyl, 3'-O-tert-butoxy ethoxy, 3'-O-(2-cyanoethyl), and 3'-O-propargyl.

Synthesis Supports

A wide variety of synthesis supports may be used in methods implemented by systems and apparatus of the invention. Synthesis supports permit multiple reactions, particularly cycles coupling reactions, to be performed on intermediates or precursors of a desired polynucleotide product by providing a means of retaining the attached precursors, when undesired reactants are removed, such as, in washing steps. An important feature of a synthesis support is that the support and attached precursor or product is retained by the filter of a reaction chamber during fluid removal steps. Other useful features of synthesis support include accessibility of template-free polymerase to attached product precursors, a composition that does not interact (either physically, for example, by adsorption, or chemically) with reactants or precursors, a composition that allows initiators to be readily attached, good solubility in the reagents employed, and the like. Synthesis supports include, but are not limited to, soluble supports, such as, polymer supports, including polyethylene glycol (PEG) supports, dendrimer supports and the like; non-swellable solid supports, such as, polystyrene particles, Dynabeads, and the like; swellable solid supports, such as resins or gels, including agarose. Synthesis supports may also form part of the reaction chambers, such as, the filter membrane. Guidance for selecting soluble supports is found in references Bonora et al, Nucleic Acids Research, 212(5): 1213-1217 (1993); Dickerson et al, Chem. Rev. 102: 3325-3344 (2002); Fishman et al, J. Org. Chem., 68: 9843-9846 (2003); Gavert et al, Chem. Rev. 97: 489-509 (1997); Shchepinov et al, Nucleic Acids Research, 25(22): 4447-4454 (1997): and like references. Guidance for selecting solid supports is found in Brown et al, Synlett 1998(8): 817-827; Maeta et al, U.S. Pat. No. 9,045,573; Beaucage and Iyer, Tetrahedron, 48(12): 2223-2311 (1992); and the like. Guidance for attaching oligonucleotides to solid supports is found in Arndt-Jovin et al, Eur. J. Biochem., 54: 411-418 (1975); Ghosh et al, Nucleic Acids Research, 15(13): 5353-5372 (1987); Integrated DNA Technologies, "Strategies for attaching oligonucleotides to solid supports," 2014(v6); Gokmen et al, Progress in Polymer Science 37: 365-405 (2012); and like references.

In some embodiments, the solid-phase support will typically be comprised of small porous beads or particles in the form of a resin or gel. Numerous materials are suitable as solid-phase supports for the synthesis of polynucleotides. As mentioned above, such supports should provide good mass transfer in and out of their pores, be chemically inert, be minimally affected by reagents and solvents, and allow derivatization, attachment and removal of polynucleotides, both initiators and polynucleotide product. As used herein, the term "particle" includes, without limitation, a "microparticle" or "nanoparticle" or "bead" or "microbead" or "microsphere." Particles or beads useful in the invention include, for example, beads measuring 10 to 300 microns in diameter, or 20 to 300 microns in diameter, or 30 to 300 microns in diameter, or beads measuring larger than 300 microns in diameter. A particle can be made of glass, plastic, polystyrene, resin, gel, agarose, sepharose, and/or other suitable materials. Of particular interest are porous resin particles or beads, such as, agarose beads. Exemplary agarose particles include Sepharose™ beads. In some embodiments, cyanogen bromide-activated 4% crosslinked agarose beads having diameters in the range of 40-165 μm may be used with methods implemented by the invention. In other embodiments, cyanogen bromide-activated 6% crosslinked agarose beads having diameters in the range of 200-300 μm may be used with methods implemented by the invention. In the latter two embodiments, oligonucleotide initiators having a 5'-aminolinker may be coupled to the Sepharose™ beads for use with the invention. Other desirable linkers for agarose beads include thiol and epoxy linkers.

A particle can be functionalized in order to covalently attach molecules, cells, other particles or other materials. Exemplary molecules that can be attached include intermediate compounds (or final compounds) of a synthetic reaction. As will be appreciated by those in the art, functionalization of a particle will depend on the synthetic reactions to be performed, The functionalization of solid support surfaces such as certain polymers with chemically reactive groups such as thiols, amines, carboxyls, etc. is generally known in the art. Some examples of these surface chemistries for subsequent addition of building blocks during synthetic reactions include, but are not limited to, amino groups including aliphatic and aromatic amines, carboxylic acids, aldehydes, amides, chloromethyl groups, hydrazide, hydroxyl groups, sulfonates and phosphates. These functional groups can be used to add any number of different building block moieties to the particles, generally using known chemistries, including, but not limited to the use of amino-functionalized supports, sulfhydryl linkers, etc. There are a number of sulfhydryl reactive linkers known in the art such as SPDP, maleimides, o-haloacetyls, and pyridyl disulfides, or the like. Similarly, amino groups on the building blocks and on the surface can be attached using linkers; for example, a large number of stable bifunctional groups are well known in the art, including homobifunctional and heterobifunctional linkers (e.g. see Hemanson (cited above)). In an additional embodiment, carboxyl groups (either from the surface or from the building block) can be derivatized using well-known linkers. For example, carbodiimides activate carboxyl groups for attack by good nucleophiles such as amines (see Torchilin et al., Critical Rev. Therapeutic Drug Carrier Systems, 7(4):275-308 (1991).

In some embodiments, a porous resin support has average pore diameters of at least 10 nm, or at least 20 nm, or at least 50 nm. In other embodiments, a porous resin support has an average pore diameter in the range of from 10 nm to 500 nm, or in the range of from 50 nm to 500 nm.

In some embodiments, such as those described in FIGS. 3A-3H and 5A-5G, using 96-well synthesis plates and agarose beads as synthesis supports, per well yields of cleaved 20-60-mer polynucleotide product may be in the range of 50-70 percent of initiator loadings. Thus, if synthesis supports comprise 100 pmole initiators, then cleaved product is in the range of 50-70 pmole.

3'-O-Protected Nucleoside Triphosphates

Depending on particular applications, the steps of deblocking and/or cleaving may include a variety of chemical or physical conditions, e.g. light, heat, pH, presence of specific reagents, such as enzymes, which are able to cleave a specified chemical bond. Guidance in selecting 3'-O-blocking groups and corresponding de-blocking conditions may be found in the following references, which are incorporated by reference: Benner, U.S. Pat. Nos. 7,544,794 and 8,212,020; 5,808,045; 8,808,988; International patent publication WO91/06678; and references cited below. In some embodiments, the cleaving agent (also sometimes referred to as a de-blocking reagent or agent) is a chemical cleaving agent, such as, for example, dithiothreitol (DTT). In alternative embodiments, a cleaving agent may be an enzymatic cleaving agent, such as, for example, a phosphatase, which may cleave a 3'-phosphate blocking group. It will be understood by the person skilled in the art that the selection of deblocking agent depends on the type of 3'-nucleotide blocking group used, whether one or multiple blocking groups are being used, whether initiators are attached to living cells or organisms or to solid supports, and the like, that necessitate mild treatment. For example, a phosphine, such as tris(2-carboxyethyl)phosphine (TCEP) can be used to cleave a 3'O-azidomethyl groups, palladium complexes can be used to cleave a 3'O-allyl groups, or sodium nitrite can be used to cleave a 3'O-amino group. In particular embodiments, the cleaving reaction involves TCEP, a palladium complex or sodium nitrite.

As noted above, in some embodiments it is desirable to employ two or more blocking groups that may be removed using orthogonal de-blocking conditions. The following exemplary pairs of blocking groups may be used in parallel synthesis embodiments. It is understood that other blocking group pairs, or groups containing more than two, may be available for use in these embodiments of the invention.

| | |
|---|---|
| 3'-O—NH2 | 3'-O-azidomethyl |
| 3'-O—NH2 | 3'-O-allyl, 3'-O-propargyl |
| 3'-O—NH2 | 3'-O-phosphate |
| 3'-O-azidomethyl | 3'-O-allyl, 3'-O-propargyl |
| 3'-O-azidomethyl | 3'-O-phosphate |
| 3'-O-allyl, 3'-O-propargyl | 3'-O-phosphate |

In some embodiments, specific enzymatically removable blocking groups are require specific enzymes for their removal. For example, ester- or acyl-based blocking groups may be removed with an esterase, such as acetylesterase, or like enzyme, and a phosphate blocking group may be removed with a 3' phosphatase, such as T4 polynucleotide kinase. By way of example, 3'-O-phosphates may be removed by treatment with as solution of 100 mM Tris-HCl (pH 6.5) 10 mM MgCl$_2$, 5 mM 2-mercaptoethanol, and one Unit T4 polynucleotide kinase. The reaction proceeds for one minute at a temperature of 37° C.

Further examples of synthesis and enzymatic deprotection of 3'-O-ester-protected dNTPs or 3'-O-phosphate-protected dNTPs are described in the following references: Canard et al, Proc. Natl. Acad. Sci., 92:10859-10863 (1995); Canard et al, Gene, 148: 1-6 (1994); Cameron et al, Biochemistry, 16(23): 5120-5126 (1977); Rasolonjatovo et al, Nucleosides & Nucleotides, 18(4&5): 1021-1022 (1999); Ferrero et al, Monatshefte fur Chemie, 131: 585-616 (2000); Taunton-Rigby et al, J. Org. Chem., 38(5): 977-985 (1973); Uemura et al, Tetrahedron Lett., 30(29): 3819-3820 (1989); Becker et al, J. Biol. Chem., 242(5): 936-950 (1967); Tsien, International patent publication WO1991/006678.

In some embodiments, the modified nucleotides comprise a modified nucleotide or nucleoside molecule comprising a purine or pyrimidine base and a ribose or deoxyribose sugar moiety having a removable 3'-OH blocking group covalently attached thereto, such that the 3' carbon atom has attached a group of the structure:

wherein —Z is any of —C(R')$_2$—O—R", —C(R')$_2$—N(R")$_2$, —C(R')$_2$—N(H)R", —C(R')$_2$—S—R" and —C(R')$_2$—F, wherein each R" is or is part of a removable protecting group; each R' is independently a hydrogen atom, an alkyl, substituted alkyl, arylalkyl, alkenyl, alkynyl, aryl, heteroaryl, heterocyclic, acyl, cyano, alkoxy, aryloxy, heteroaryloxy or amido group, or a detectable label attached through a linking group; with the proviso that in some embodiments such substituents have up to 10 carbon atoms and/or up to 5 oxygen or nitrogen heteroatoms; or (R')$_2$ represents a group of formula =C(R''')$_2$ wherein each R''' may be the same or different and is selected from the group comprising hydrogen and halogen atoms and alkyl groups, with the proviso that in some embodiments the alkyl of each R''' has from 1 to 3 carbon atoms; and wherein the molecule may be reacted to yield an intermediate in which each R" is exchanged for H or, where Z is —(R')$_2$—F, the F is exchanged for OH, SH or NH$_2$, preferably OH, which intermediate dissociates under aqueous conditions to afford a molecule with a free 3'-OH; with the proviso that where Z is —C(R')$_2$—S—R", both R' groups are not H. In certain embodiments, R' of the modified nucleotide or nucleoside is an alkyl or substituted alkyl, with the proviso that such alkyl or substituted alkyl has from 1 to 10 carbon atoms and from 0 to 4 oxygen or nitrogen heteroatoms. In certain embodiments, —Z of the modified nucleotide or nucleoside is of formula —C(R')$_2$—N3. In certain embodiments, Z is an azidomethyl group.

In some embodiments, Z is a cleavable organic moiety with or without heteroatoms having a molecular weight of 200 or less. In other embodiments, Z is a cleavable organic moiety with or without heteroatoms having a molecular weight of 100 or less. In other embodiments, Z is a cleavable organic moiety with or without heteroatoms having a molecular weight of 50 or less. In some embodiments, Z is an enzymatically cleavable organic moiety with or without heteroatoms having a molecular weight of 200 or less. In other embodiments, Z is an enzymatically cleavable organic moiety with or without heteroatoms having a molecular weight of 100 or less. In other embodiments, Z is an enzymatically cleavable organic moiety with or without heteroatoms having a molecular weight of 50 or less. In other embodiments, Z is an enzymatically cleavable ester group having a molecular weight of 200 or less. In other embodiments, Z is a phosphate group removable by a 3'-phosphatase. In some embodiments, one or more of the following 3'-phosphatases may be used with the manufacturer's recommended protocols: T4 polynucleotide kinase, calf intestinal alkaline phosphatase, recombinant shrimp alkaline phosphatase (e.g. available from New England Biolabs, Beverly, MA)

In a further embodiments, the 3'-blocked nucleotide triphosphate is blocked by either a 3'-O-azidomethyl, 3'-O—NH₂ or 3'-O-allyl group.

In still other embodiments, 3'-O-blocking groups of the invention include 3'-O-methyl, 3'-O-(2-nitrobenzyl), 3'-O-allyl, 3'-O-amine, 3'-O-azidomethyl, 3'-O-tert-butoxy ethoxy, 3'-O-(2-cyanoethyl), and 3'-O-propargyl.

In some embodiments, 3'-O-protection groups are electrochemically labile groups. That is, deprotection or cleavage of the protection group is accomplished by changing the electrochemical conditions in the vicinity of the protection group which result in cleavage. Such changes in electrochemical conditions may be brought about by changing or applying a physical quantity, such as a voltage difference or light to activate auxiliary species which, in turn, cause changes in the electrochemical conditions at the site of the protection group, such as an increase or decrease in pH. In some embodiments, electrochemically labile groups include, for example, pH-sensitive protection groups that are cleaved whenever the pH is changed to a predetermined value. In other embodiments, electrochemically labile groups include protecting groups which are cleaved directly whenever reducing or oxidizing conditions are changed, for example, by increasing or decreasing a voltage difference at the site of the protection group.

3'-O-blocked dNTPs without base protection may be purchased from commercial vendors or synthesized using published techniques, e.g. U.S. Pat. No. 7,057,026; Guo et al, Proc. Natl. Acad. Sci., 105(27): 9145-9150 (2008); Benner, U.S. Pat. Nos. 7,544,794 and 8,212,020; International patent publications WO2004/005667, WO91/06678; Canard et al, Gene (cited herein); Metzker et al, Nucleic Acids Research, 22: 4259-4267 (1994); Meng et al, J. Org. Chem., 14: 3248-3252 (2006); U.S. patent publication 2005/037991. 3'-O-blocked dNTPs with base protection may be synthesized as described below.

Template-Free Polymerases

A variety of different template-free polymerases are available for use in methods of synthesis implement by systems and apparatus of the invention. Template-free polymerases include, but are not limited to, polX family polymerases (including DNA polymerases β, λ and µ), poly(A) polymerases (PAPs), poly(U) polymerases (PUPs), DNA polymerase θ, and the like, for example, described in the following references: Ybert et al, International patent publication WO2017/216472; Champion et al, U.S. patent Ser. No. 10/435,676; Champion et al, International patent publication WO2020/099451; Yang et al, J. Biol. Chem., 269 (16): 11859-11868 (1994); Motea et al, Biochim. Biophys. Acta, 1804(5): 1151-1166 (2010). In particular, terminal deoxynucleotidyltransferases (TdTs) and its variants are useful in template-free DNA synthesis. In some embodiments, template-free polymerases are selected based on properties such as coupling reaction efficiency, manufacturability, shelf life, minimal radius of gyration and lack of self-aggregation and adhesion to surfaces. In some embodiments, template-free polymerases are terminal deoxynucleotidyltransferase (TdT) variants specifically selected for coupling efficiency, minimal radius of gyration, and lack of self-aggregation and adhesion to surfaces, such as M96 (SEQ ID NOs: 68 or 69) and M103 (SEQ ID NO: 70 or 71).

In some embodiments, enzymatic synthesis methods employ TdT variants that display increased incorporation activity with respect to 3'-O-modified nucleoside triphosphates. For example, such TdT variants may be produced using techniques described in Champion et al, U.S. patent Ser. No. 10/435,676, which is incorporated herein by reference. In some embodiments, a TdT variant is employed having an amino acid sequence at least 60 percent identical, or at least 80 percent identical, to SEQ ID NO: 2 and a substitution at a first arginine at position 207 and a substitution at a second arginine at position 325, or functionally equivalent residues thereof. In some embodiments, a TdT variant is employed that has an amino acid sequence at least sixty percent identical to an amino acid sequence selected from SEQ ID NO: 2, 3, 4, 5, 6, 7, 8, 9, 10, 11, 12, 13, 14 or 15 with a substitution of arginine ("first arginine") at position 207 with respect to SEQ ID NOs 2, 3, 4, 6, 7, 9, 12 and 13, at position 206 with respect to SEQ ID NO 5, at position 208 with respect to SEQ ID NOs 8 and 10, at position 205 with respect to SEQ ID NO 11, at position 216 with respect to SEQ ID NO 14 and at position 210 with respect to SEQ ID NO 15; and a substitution of arginine ("second arginine") at position 325 with respect to SEQ ID NOs 2, 9 and 13, at position 324 with respect to SEQ ID NOs 3 and 4, at position 320 with respect to SEQ ID NO 320, at position 331 with respect to SEQ ID NOs 6 and 8, at position 323 with respect to SEQ ID NO 11, at position 328 with respect to SEQ ID NOs 12 and 15, and at position 338 with respect to SEQ ID NO 14; or functionally equivalent residues thereof; wherein the TdT variant (i) is capable of synthesizing a nucleic acid fragment without a template and (ii) is capable of incorporating a 3'-O-modified nucleotide onto a free 3'-hydroxyl of a nucleic acid fragment. In some embodiments, the above percent identity value is at least 80 percent identity with the indicated SEQ ID NOs; in some embodiments, the above percent identity value is at least 90 percent identity with the indicated SEQ ID NOs; in some embodiments, the above percent identity value is at least 95 percent identity with the indicated SEQ ID NOs; in some embodiments, the above percent identity value is at least 97 percent identity; in some embodiments, the above percent identity value is at least 98 percent identity; in some embodiments, the above percent identity value is at least 99 percent identity. As used herein, the percent identity values used to compare a reference sequence to a variant sequence do not include the expressly specified amino acid positions containing substitutions of the variant sequence; that is, the percent identity relationship is between sequences of a reference protein and sequences of a variant protein outside of the expressly specified positions containing substitutions in the variant. Thus, for example, if the reference sequence and the variant sequence each comprised 100 amino acids and the variant sequence had mutations at positions 25 and 81, then the percent homology would be in regard to sequences 1-24, 26-80 and 82-100.

In regard to (ii), such 3'-O-modified nucleotide may comprise a 3'-O—NH₂-nucleoside triphosphate, a 3'-O-azidomethyl-nucleoside triphosphate, a 3'-O-allyl-nucleoside triphosphate, a 3'O-(2-nitrobenzyl)-nucleoside triphosphate, or a 3'-O-propargyl-nucleoside triphosphate.

In some embodiments, the above TdT variants have substitutions at the first and second arginines as shown in Table 1.

TABLE 1

| SEQ ID NO | Substitutions | | | | |
|---|---|---|---|---|---|
| 1 | M192R/Q | C302G/R | R336L/N | R454P/N/A/V | E457N/L/T/S/K |
| 2 | M63R/Q | C173G/R | R207L/N | R325P/N/A/V | E328N/L/T/S/K |
| 3 | M63R/Q | C173G/R | R207L/N | R324P/N/A/V | E327N/L/T/S/K |
| 4 | M63R/Q | C173G/R | R207L/N | R324P/N/A/V | E327N/L/T/S/K |
| 5 | — | C172G/R | R206L/N | R320P/N/A/V | — |
| 6 | M63R/Q | C173G/R | R207L/N | R331P/N/A/V | E334N/L/T/S/K |
| 7 | M63R/Q | C173G/R | R207L/N | — | E328N/L/T/S/K |
| 8 | M63R/Q | C173G/R | R207L/N | R325P/N/A/V | E328N/L/T/S/K |
| 9 | M64R/Q | C174G/R | R208L/N | — | E329N/L/T/S/K |
| 10 | M61R/Q | C171G/R | R205L/N | R323P/N/A/V | E326N/L/T/S/K |
| 11 | M63R/Q | C173G/R | R207L/N | R328P/N/A/V | E331N/L/T/S/K |
| 12 | — | C173G/R | R207L/N | R325P/N/A/V | E328N/L/T/S/K |
| 13 | M63R/Q | C182G/R | R216L/N | R338P/N/A/V | E341N/L/T/S/K |
| 14 | M66R/Q | C176G/R | R210L/N | R328P/N/A/V | E331N/L/T/S/K |
| 15 | M47R/Q | C156G/R | R190L/N | R308P/N/A/V | E311N/L/T/S/K |

In some embodiments, further TdT variants for use with methods of the invention include one or more of the substitutions of methionine, cysteine or glutamic acid, as shown in Table 1.

Some embodiments of the system of present invention comprise the use of N-terminally truncated terminal deoxynucleotidyl transferase (TdT) variants having a stabilizing mutation at the N-terminus of the truncated sequence. That is, in some embodiments, systems of the invention employ compact TdT variants having a minimized size and radius of gyration which permits the TdT variants to access the interior spaces of porous solid supports and resins more readily than wild type TdTs or prior TdT variants. In some embodiments, the stabilizing mutation of the N-terminally truncated TdT variant is at position Q152 (where the amino acid position number is with respect to full-length mouse TdT (SEQ ID NO: 1)), or at a functionally equivalent position in other TdT amino acid sequences. In some embodiments, TdT variants used with the invention comprise a terminal or an interior affinity tag to facilitate purification and to minimize its radius of gyration. In some embodiments, such stabilized truncated TdTs used with apparatus of the invention have an amino acid sequence that is at least ninety percent identical with an amino acid sequence of SEQ ID NO: 16-30, 32, 35, 37, 39, 41, 43, 45, 46, 49 or 50, and subject to the further mutations of Table 2.

TABLE 2

| SEQ ID NO | Animal | Substitutions | | | | |
|---|---|---|---|---|---|---|
| 1 | Mouse | M192R/Q | C302G/R | R336L/N | R454P/N/A/V | E457N/L/T/S/K |
| 16 | Mouse | M44R/Q | C154G/R | R188L/N | R306P/N/A/V | E309N/L/T/S/K |
| 17 | Bovine | M44R/Q | C154G/R | R188L/N | R305P/N/A/V | E308N/L/T/S/K |
| 18 | Human | M44R/Q | C154G/R | R188L/N | R305P/N/A/V | E308N/L/T/S/K |
| 19 | Chicken | — | C154G/R | R188L/N | R302P/N/A/V | — |
| 20 | Possum | M44R/Q | C154G/R | R188L/N | R312P/N/A/V | E315N/L/T/S/K |
| 21 | Shrew | M44R/Q | C154G/R | R188L/N | — | E309N/L/T/S/K |
| 22 | Canine | M44R/Q | C154G/R | R188L/N | R306P/N/A/V | E309N/L/T/S/K |
| 23 | Mole | M44R/Q | C154G/R | R188L/N | — | E309N/L/T/S/K |
| 24 | Pika | M44R/Q | C154G/R | R188L/N | R306P/N/A/V | E309N/L/T/S/K |
| 25 | Hedgehog | M44R/Q | C154G/R | R188L/N | R309P/N/A/V | E312N/L/T/S/K |
| 26 | Tree shrew | — | C154G/R | R188L/N | R306P/N/A/V | E309N/L/T/S/K |
| 27 | Platypus | M44R/Q | C163G/R | R197L/N | R319P/N/A/V | E322N/L/T/S/K |
| 28 | Canary | — | C153G/R | R187L/N | R309P/N/A/V | — |
| 29 | Neopelma | — | C154G/R | R188L/N | R310P/N/A/V | E311N/L/T/S/K |
| 30 | Alligator | — | — | R188L/N | R310P/N/A/V | E313N/L/T/S/K |
| 32 | Xenopus | — | — | R188L/N | R307P/N/A/V | E310N/L/T/S/K |
| 35 | Brown Trout | — | — | R188L/N | — | E310N/L/T/S/K |
| 37 | Electric eel | — | — | R188L/N | — | — |
| 39 | Walking fish | — | — | R188L/N | R305P/N/A/V | E308N/L/T/S/K |
| 41 | Guppy | — | — | R188L/N | R305P/N/A/V | E308N/L/T/S/K |
| 43 | Rat | — | — | R188L/N | R306P/N/A/V | E309N/L/T/S/K |
| 45 | Piliocolobus | — | — | R188L/N | R306P/N/A/V | E309N/L/T/S/K |
| 46 | Pig | M44R/Q | C154G/R | R188L/N | R306P/N/A/V | E309N/L/T/S/K |
| 49 | Water buffalo | M44R/Q | C154G/R | R188L/N | R305P/N/A/V | E308N/L/T/S/K |
| 50 | Marmot | M44R/Q | C154G/R | R188L/N | R306P/N/A/V | E309N/L/T/S/K |

In additional embodiments, a TdT variant for use with apparatus of the invention is selected from the group of TdT variants having an amino acid sequence of SEQ ID NO: 31, 33, 34, 36, 38, 40, 42, 44, 47, 48, or 51-71. In some embodiments, such TdT variant has amino acid sequence of SEQ ID NO 56, 57, 68, 69, 70 or 71.

TdT variants of the invention as described above each comprise an amino acid sequence having a percent sequence identity with a specified SEQ ID NO, subject to the presence of indicated substitutions. In some embodiments, the number and type of sequence differences between a TdT variant of the invention described in this manner and the specified SEQ ID NO may be due to substitutions, deletion and/or insertions, and the amino acids substituted, deleted and/or inserted may comprise any amino acid. In some embodiments, such deletions, substitutions and/or insertions comprise only naturally occurring amino acids. In some embodiments, substitutions comprise only conservative, or synonymous, amino acid changes, as described in Grantham, Science, 185: 862-864 (1974). That is, a substitution of an amino acid can occur only among members of its set of synonymous amino acids. In some embodiments, sets of synonymous amino acids that may be employed are set forth in Table 3A.

TABLE 3A

Synonymous Sets of Amino Acids I

| Amino Acid | Synonymous Set |
| --- | --- |
| Ser | Ser, Thr, Gly, Asn |
| Arg | Arg, Gln, Lys, Glu, His |
| Leu | Ile, Phe, Tyr, Met, Val, Leu |
| Pro | Gly, Ala, Thr, Pro |
| Thr | Pro, Ser, Ala, Gly, His, Gln, Thr |
| Ala | Gly, Thr, Pro, Ala |
| Val | Met, Tyr, Phe, Ile, Leu, Val |
| Gly | Gly, Ala, Thr, Pro, Ser |
| Ile | Met, Tyr, Phe, Val, Leu, Ile |
| Phe | Trp, Met, Tyr, Ile, Val, Leu, Phe |
| Tyr | Trp, Met, Phe, Ile, Val, Leu, Tyr |
| Cys | Cys, Ser, Thr |
| His | His, Glu, Lys, Gln, Thr, Arg |
| Gln | Gln, Glu, Lys, Asn, His, Thr, Arg |
| Asn | Asn, Gln, Asp, Ser |
| Lys | Lys, Glu, Gln, His, Arg |
| Asp | Asp, Glu, Asn |
| Glu | Glu, Asp, Lys, Asn, Gln, His, Arg |
| Met | Met, Phe, Ile, Val, Leu |
| Trp | Trp |

In some embodiments, sets of synonymous amino acids that may be employed are set forth in Table 3B.

TABLE 3B

Synonymous Sets of Amino Acids II

| Amino Acid | Synonymous Set |
| --- | --- |
| Ser | Ser |
| Arg | Arg, Lys, His |
| Leu | Ile, Phe, Met, Leu |
| Pro | Ala, Pro |
| Thr | Thr |
| Ala | Pro, Ala |
| Val | Met, Ile Val |
| Gly | Gly |
| Ile | Met, Phe, Val, Leu, Ile |
| Phe | Met, Tyr, Ile, Leu, Phe |
| Tyr | Trp, Met |
| Cys | Cys, Ser |
| His | His, Gln, Arg |
| Gln | Gln, Glu, His |
| Asn | Asn, Asp |
| Lys | Lys, Arg |
| Asp | Asp, Asn |
| Glu | Glu, Gln |
| Met | Met, Phe, Ile, Val, Leu |
| Trp | Trp |

Kits for Practicing Enzymatic Synthesis of a Plurality of Polynucleotides on an Automated Synthesizer In one aspect, kits of the invention comprise consumables adapted for use in specific embodiments of the systems and apparatus of the invention. In some embodiments, a kit of the invention comprises a planar array of a plurality of reaction chambers each having a synthesis support with initiators attached in the form of a conventional 96-well or 384-well filter plate wherein deposited in each well is a predetermined amount of synthesis support in a viscous humectant solution. In some embodiments, such synthesis support is further vacuum packed in a plastic, foil or other air-tight, non-permeable packaging material. In some embodiments, the viscosity of the humectant solution is equivalent to a 40-60 percent (v/v) glycerol:water solution. In some embodiments, the humectant solution comprise a humectant selected from the group consisting of glycerol, alcohol sugars, ethylhexylglycerin, panthenol, sorbitol, xylitol, maltitol, propylene glycol, hexylene glycol, butylene glycol, sodium lactate, hyaluronic acid, and polydextrose. In some embodiments, a kit comprising such planar array of a plurality of reaction chambers further includes activity assay reagents for measuring TdT activity of synthesis reagents, including mixtures of TdT and each of the 3'-O-protected dNTPs used in the method implemented by the apparatus. In some embodiments activity assay reagents comprise a BODIPY-labeled dATP monomer that is quenched by Fe(III).

In another aspect, kits of the invention comprise a reagent cartridge containing in a plurality of different compartments or reservoirs synthesis reagents for implementing a predetermined number cycles of coupling reactions to produce a predetermined plurality of polynucleotides each up to a maximum yield and a maximum length. In some embodiments, such reagent cartridges may further include a protease solution for implementing a protease treatment step whenever a liquid level sensor detects anomalous liquid levels or rate of change of liquid levels in one or more reaction chambers. In some embodiments such reagent cartridge comprises at least four reservoirs, one each containing a coupling reagents comprising a TdT and a 3'-O-protected-dATP, a TdT and a 3'-O-protected-dCTP, a TdT and a 3'-O-protected-dGTP, and a TdT and a 3'-O-protected-dTTP. In some embodiments, each reservoir contains enough coupling reagent to synthesize at least 96 polynucleotides at a yield of 100 pmoles each or less, wherein each polynucleotide has a length up to 200 nucleotides and wherein the nucleotide composition among all of the polynucleotides each nucleotide is in the range of from 20-30 percent. In some embodiments such reagent cartridge comprises at least five reservoirs, one each containing a coupling reagent comprising a TdT and a 3'-O-protected-dATP, a TdT and a 3'-O-protected-dCTP, a TdT and a 3'-O-protected-dGTP, and a TdT, a 3'-O-protected-dTTP, and one containing a deprotection reagent. In some embodiments, such coupling reagents comprise a TdT and a 3'-O-amino-dATP, a TdT and a 3'-O-amino-dCTP, a TdT and a 3'-O-amino-dGTP, and a TdT and a 3'-O-amino-dTTP. In other embodiments, such coupling reagents comprise a TdT and a 3'-O-azidomethyl-dATP, a TdT and a 3'-O-azidomethyl-dCTP, a TdT and a 3'-O-azidomethyl-dGTP, and a TdT and a 3'-O-azidomethyl-dTTP.

In some embodiments such reagent cartridge comprises at least six reservoirs, one each containing a coupling reagent comprising a TdT and a 3'-O-protected-dATP, a TdT and a 3'-O-protected-dCTP, a TdT and a 3'-O-protected-dGTP, and a TdT, a 3'-O-protected-dTTP, one containing a deprotection reagent, and one containing a protease solution. In some embodiments, such coupling reagents comprise a TdT and a 3'-O-amino-dATP, a TdT and a 3'-O-amino-dCTP, a TdT and a 3'-O-amino-dGTP, a TdT and a 3'-O-amino-dTTP, an amino-deprotection reagent, and a protease solution. In other embodiments, such coupling reagents comprise a TdT and a 3'-O-azidomethyl-dATP, a TdT and a 3'-O-azidomethyl-dCTP, a TdT and a 3'-O-azidomethyl-dGTP, a TdT and a 3'-O-azidomethyl-dTTP, an azidomethyl-deprotection reagent, and a protease solution. In some of the foregoing embodiments, the protease solution comprises proteinase K.

Definitions

Unless otherwise specifically defined herein, terms and symbols of nucleic acid chemistry, biochemistry, genetics, and molecular biology used herein follow those of standard treatises and texts in the field, e.g. Kornberg and Baker, DNA Replication, Second Edition (W.H. Freeman, New York, 1992); Lehninger, Biochemistry, Second Edition (Worth Publishers, New York, 1975); Strachan and Read, Human Molecular Genetics, Second Edition (Wiley-Liss, New York, 1999).

"Functionally equivalent" in reference to amino acid positions in two or more different TdTs means (i) the amino acids at the respective positions play the same functional role in an activity of the TdTs, and (ii) the amino acids occur at homologous amino acid positions in the amino acid sequences of the respective TdTs. It is possible to identify positionally equivalent or homologous amino acid residues in the amino acid sequences of two or more different TdTs on the basis of sequence alignment and/or molecular modelling. In some embodiments, functionally equivalent amino acid positions belong to inefficiency motifs that are conserved among the amino acid sequences of TdTs of evolutionarily related species, e.g. genus, families, or the like. Examples of such conserved inefficiency motifs are described in Motea et al, Biochim. Biophys. Acta. 1804(5): 1151-1166 (2010); Delarue et al, EMBO J., 21: 427-439 (2002); and like references.

"Kit" refers to any delivery system, such as a package, for delivering materials or reagents for carrying out a method implemented by a system or apparatus of the invention. In some embodiments, consumables materials or reagents are delivered to a user of a system or apparatus of the invention in a package referred to herein as a "kit." In the context of systems and apparatus of the invention, such delivery systems include, usually packaging methods and materials that allow for the storage, transport, or delivery of materials, such as, synthesis plates that may have easily damaged or contaminated components, such as synthesis supports. For example, kits may include one or more enclosures (e.g., boxes) containing the synthesis plates and/or supporting materials. Such contents may be delivered to the intended recipient together or separately. For example, a first container may contain a synthesis plate with synthesis supports in each well vacuum wrapped in a protective plastic material, while a second or more containers contain 3'-O-reversibly blocked dNTPs and template-free polymerase and buffer.

"Mutant" or "variant," which are used interchangeably, refer to polypeptides derived from a natural or reference TdT polypeptide described herein, and comprising a modification or an alteration, i.e., a substitution, insertion, and/or deletion, at one or more positions. Variants may be obtained by various techniques well known in the art. In particular, examples of techniques for altering the DNA sequence encoding the wild-type protein, include, but are not limited to, site-directed mutagenesis, random mutagenesis, sequence shuffling and synthetic oligonucleotide construction. Mutagenesis activities consist in deleting, inserting or substituting one or several amino-acids in the sequence of a protein or in the case of the invention of a polymerase. The following terminology is used to designate a substitution: L238A denotes that amino acid residue (Leucine, L) at position 238 of a reference, or wild type, sequence is changed to an Alanine (A). A132V/I/M denotes that amino acid residue (Alanine, A) at position 132 of the parent sequence is substituted by one of the following amino acids: Valine (V), Isoleucine (I), or Methionine (M). The substitution can be a conservative or non-conservative substitution. Examples of conservative substitutions are within the groups of basic amino acids (arginine, lysine and histidine), acidic amino acids (glutamic acid and aspartic acid), polar amino acids (glutamine, asparagine and threonine), hydrophobic amino acids (methionine, leucine, isoleucine, cysteine and valine), aromatic amino acids (phenylalanine, tryptophan and tyrosine), and small amino acids (glycine, alanine and serine).

"Polynucleotide" or "oligonucleotide" are used interchangeably and each mean a linear polymer of nucleotide monomers or analogs thereof. Monomers making up polynucleotides and oligonucleotides are capable of specifically binding to a natural polynucleotide by way of a regular pattern of monomer-to-monomer interactions, such as Watson-Crick type of base pairing, base stacking, Hoogsteen or reverse Hoogsteen types of base pairing, or the like. Such monomers and their internucleosidic linkages may be naturally occurring or may be analogs thereof, e.g. naturally occurring or non-naturally occurring analogs. Non-naturally occurring analogs may include PNAs, phosphorothioate internucleosidic linkages, bases containing linking groups permitting the attachment of labels, such as fluorophores, or haptens, and the like. Whenever the use of an oligonucleotide or polynucleotide requires enzymatic processing, such as extension by a polymerase, ligation by a ligase, or the like, one of ordinary skill would understand that oligonucleotides or polynucleotides in those instances would not contain certain analogs of internucleosidic linkages, sugar moieties, or bases at any or some positions. Polynucleotides typically range in size from a few monomeric units, e.g. 5-40, when they are usually referred to as "oligonucleotides," to several thousand monomeric units. Whenever a polynucleotide or oligonucleotide is represented by a sequence of letters (upper or lower case), such as "ATGCCTG," it will be understood that the nucleotides are in 5' to 3' order from left to right and that "A" denotes deoxyadenosine, "C" denotes deoxycytidine, "G" denotes deoxyguanosine, and "T" denotes thymidine, "I" denotes deoxyinosine, "U" denotes uridine, unless otherwise indicated or obvious from context. Unless otherwise noted the terminology and atom numbering conventions will follow those disclosed in Kornberg and Baker, DNA Replication, Second Edition (W.H. Freeman, 1992), or like reference. Usually polynucleotides comprise the four natural nucleosides (e.g. deoxyadenosine, deoxycytidine, deoxyguanosine, deoxythymidine for DNA or their ribose counterparts for RNA) linked by phosphodiester linkages; however, they may also comprise non-natural nucleotide analogs, e.g. including modified bases, sugars, or internucleosidic linkages. It is clear to those skilled in the art that where an enzyme has specific oligonucleotide or polynucleotide substrate requirements for activity, e.g. single stranded DNA, RNA/DNA duplex, or the like, then selection of appropriate composition for the oligonucleotide or polynucleotide substrates is well within the knowledge of one of ordinary skill, especially with guidance from treatises, such as Sambrook et al, Molecular Cloning, Second Edition (Cold Spring Harbor Laboratory, New York, 1989), and like references. Likewise, the oligonucleotide and polynucleotide may refer to either a single stranded form or a double stranded form (i.e. duplexes of an oligonucleotide or polynucleotide and its respective complement). It will be clear to one of ordinary skill which form or whether both forms are intended from the context of the terms' usage.

"Sequence identity" refers to the number (or fraction, usually expressed as a percentage) of matches (e.g., identical amino acid residues) between two sequences, such as two polypeptide sequences or two polynucleotide sequences. The sequence identity is determined by comparing the sequences when aligned so as to maximize overlap and identity while minimizing sequence gaps. In particular, sequence identity may be determined using any of a number of mathematical global or local alignment algorithms, depending on the length of the two sequences. Sequences of similar lengths are preferably aligned using a global alignment algorithm (e.g. Needleman and Wunsch algorithm; Needleman and Wunsch, 1970) which aligns the sequences optimally over the entire length, while sequences of substantially different lengths are preferably aligned using a local alignment algorithm (e.g. Smith and Waterman algorithm (Smith and Waterman, 1981) or Altschul algorithm (Altschul et al., 1997; Altschul et al., 2005)). Alignment for purposes of determining percent amino acid sequence identity can be achieved in various ways that are within the skill in the art, for instance, using publicly available computer software available on internet web sites such as http://blast.ncbi.nlm.nih.gov/or http://www.ebi.ac.uk/Tools/emboss/. Those skilled in the art can determine appropriate parameters for measuring alignment, including any algorithm needed to achieve maximal alignment over the full length of the sequences being compared. For purposes herein, % amino acid sequence identity values refer to values generated using the pair wise sequence alignment program EMBOSS Needle, that creates an optimal global alignment of two sequences using the Needleman-Wunsch algorithm, wherein all search parameters are set to default values, i.e. Scoring matrix=BLOSUM62, Gap open=10, Gap extend=0.5, End gap penalty=false, End gap open=10 and End gap extend=0.5.

"Substitution" means that an amino acid residue is replaced by another amino acid residue. Preferably, the term "substitution" refers to the replacement of an amino acid residue by another selected from the naturally-occurring standard 20 amino acid residues, rare naturally occurring amino acid residues (e.g. hydroxyproline, hydroxylysine, allohydroxylysine, 6-N-methylysine, N-ethylglycine, N-methylglycine, N-ethylasparagine, allo-isoleucine, N-methylisoleucine, N-methylvaline, pyroglutamine, aminobutyric acid, ornithine, norleucine, norvaline), and non-naturally occurring amino acid residue, often made synthetically, (e.g. cyclohexyl-alanine). Preferably, the term "substitution" refers to the replacement of an amino acid residue by another selected from the naturally-occurring standard 20 amino acid residues. The sign "+" indicates a combination of substitutions. The amino acids are herein represented by their one-letter or three-letters code according to the following nomenclature: A: alanine (Ala); C: cysteine (Cys); D: aspartic acid (Asp); E: glutamic acid (Glu); F: phenylalanine (Phe); G: glycine (Gly); H: histidine (His); I: isoleucine (Ile); K: lysine (Lys); L: leucine (Leu); M: methionine (Met); N: asparagine (Asn); P: proline (Pro); Q: glutamine (Gln); R: arginine (Arg); S: serine (Ser); T: threonine (Thr); V: valine (Val); W: tryptophan (Trp) and Y: tyrosine (Tyr). In the present document, the following terminology is used to designate a substitution: L238A denotes that amino acid residue (Leucine, L) at position 238 of the parent sequence is changed to an Alanine (A). A132V/I/M denotes that amino acid residue (Alanine, A) at position 132 of the parent sequence is substituted by one of the following amino acids: Valine (V), Isoleucine (I), or Methionine (M). The substitution can be a conservative or non-conservative substitution. Examples of conservative substitutions are within the groups of basic amino acids (arginine, lysine and histidine), acidic amino acids (glutamic acid and aspartic acid), polar amino acids (glutamine, asparagine and threonine), hydrophobic amino acids (methionine, leucine, isoleucine, cysteine and valine), aromatic amino acids (phenylalanine, tryptophan and tyrosine), and small amino acids (glycine, alanine and serine).

The invention claimed is:

1. A method for synthesizing with a template-free polymerase a plurality of polynucleotides each with a predetermined sequence, the method comprising:
   (1) providing an apparatus comprising
      (a) a plurality of reaction chambers, each reaction chamber having a synthesis support with initiators attached, wherein each initiator has a free 3'-hydroxyl, and wherein each reaction chamber has an inlet and an outlet and a filter that retains the synthesis support and that is operationally connected to the outlet so that reaction solutions exiting the reaction chamber pass through the filter;
      (b) a waste manifold configured to operatively connect to the outlets of the plurality of reaction chambers such that reaction solutions are removed from the reaction chambers and enter the waste manifold whenever a positive pressure differential is established between the plurality of reaction chambers and the waste manifold;
      (c) a fluid delivery system for delivering reaction solutions to the plurality of reaction chambers, the reaction solutions comprising 3'-O-protected nucleoside triphosphates, a deprotection solution, and a template-free polymerase;
      (d) a user interface for accepting nucleotide sequences of polynucleotides to be synthesized; and
      (e) a control system operationally connected to the user interface, the plurality of reaction chambers, the fluid delivery system and the waste manifold, wherein the control system assigns the predetermined sequence of each polynucleotide to a reaction chamber of the plurality of reaction chambers for synthesis;
   (2) repeating for each reaction chamber of the plurality of reactions chambers, under direction of the control system:
      (i) delivering under coupling conditions to the initiators or deprotected elongated fragments a 3'-O-protected nucleoside triphosphate and a template-free polymerase, wherein the coupling conditions include a predetermined coupling incubation time and incubation temperature to allow initiator oligonucleotides or deprotected elongated fragments to be elongated by the 3'-O-protected nucleoside triphosphate to form 3'-O-protected elongated fragments;
      (ii) delivering the deprotection solution to the plurality of reaction chambers so that the 3'-O-protected elongated fragments are deprotected; and
      (iii) producing a pressure differential between the plurality of reaction chambers and the waste manifold to remove deprotection solution from the plurality of reaction chambers at a predetermined rate.

2. The method of claim 1, wherein the apparatus further comprises one or more liquid level sensors for measuring a liquid level in each of the plurality of reaction chambers, and wherein step (2) further comprises step (iv) measuring with the one or more liquid level sensors a liquid level in each of said reaction chambers of the plurality of reaction chambers and whenever a reaction chamber is identified whose liquid level is outside of predetermined bounds, bypassing the identified reaction chamber in subsequent reagent delivery steps.

3. The method of claim 2, wherein said plurality of reaction chambers are uniformly spaced in a planar synthesis plate positioned at a first location in the apparatus and wherein said apparatus further comprises
   (i) a polynucleotide isolation plate positioned at a second location in said apparatus, wherein the polynucleotide isolation plate comprises a plurality of chambers in a planar array spaced to align with said outlets of said plurality of reaction chambers of the synthesis plate, each chamber of the polynucleotide isolation plate having an inlet, an outlet and a separation material for isolating polynucleotides, and
   (ii) a plate mover operationally connected to said control system, and configured to operationally engage the synthesis plate and the polynucleotide isolation plate, such that, upon instructions from said control system, the plate mover moves the synthesis plate and the polynucleotide isolation plate so that at the first or second location the polynucleotide isolation plate is operationally mounted on the waste manifold and the synthesis plate is operationally mounted on the polynucleotide isolation plate so that whenever a positive pressure differential is established between said plurality of reaction chambers of the synthesis plate and the waste manifold isolation reagents in each reaction chamber of the plurality of reactions chambers flow through a chamber of the isolation plate to said waste manifold.

4. The method of claim 2, wherein said plurality of reaction chambers are uniformly spaced in a planar synthesis plate positioned at a first location in the apparatus and wherein said apparatus further comprises
   (i) a polynucleotide isolation plate positioned at a second location in said apparatus, wherein the polynucleotide isolation plate comprises a plurality of chambers in a planar array spaced to align with said plurality of reaction chambers of the synthesis plate, each chamber of the polynucleotide isolation plate having an inlet, an outlet and a separation material for isolating polynucleotides, and
   (ii) a pipettor operationally connected to said control system, the synthesis plate, and the polynucleotide isolation plate, such that, upon instructions from said control system, the pipettor moves contents of each reaction chamber to a separate chamber of the polynucleotide isolation plate.

5. The method of claim 1, wherein step 2 further comprises:
   (iv) delivering a wash solution to said plurality of reaction chambers, and
   (v) producing a pressure differential between said plurality of reaction chambers and said waste manifold to remove wash solution from said plurality of reaction chambers at a predetermined rate.

6. The method of claim 1, wherein the apparatus also comprises:
   (f) one or more liquid level sensors for measuring rates of change of liquid levels in individual reaction chambers; and
      wherein step (2) further comprises:
      (iv) delivering a wash solution to the reaction chambers of the plurality of reaction chambers,
      (v) producing a predetermined pressure differential between the plurality of reaction chambers and the waste manifold to remove wash solution from the plurality of reaction chambers, and
      (vi) measuring with the one or more liquid level sensors a rate of change of liquid level in each of a portion of the plurality of reaction chambers and whenever a reaction chamber is detected whose rate of liquid removal is below the predetermined rate a corrective action is actuated; wherein the kind of 3'-protected nucleoside triphosphate contacted in step (i) in a reaction chamber of the plurality of reaction chambers is determined by the predetermined sequence assigned to the reaction chamber of the plurality of reaction chambers.

7. The method of claim 6, wherein said corrective action comprises a further step of delivering said protease solution to said reaction chamber whose rate of liquid removal is below said predetermined rate or comprises a further step of bypassing in subsequence reagent delivery steps to said reaction chamber whose rate of liquid removal is below said predetermined rate.

8. The method of claim 6, wherein step (2) further comprises after steps (iii) and (v) a measurement of said rates of change of liquid levels during removal of said deprotection solution or during removal of said wash solution.

9. The method of claim 6, wherein said plurality of said reaction chambers is in the range of from 24 to 100 and said one or more liquid level sensors is in the range of from 2 to 32 liquid level sensors.

10. The method of claim 6, wherein said plurality of said reaction chambers is in the range of from 200 to 1600 and said one or more liquid level sensors is in the range of from 32 to 50 liquid level sensors.

11. The method of claim 6, wherein step (2) does not comprise the step (vi).

12. The method of claim 6, wherein said plurality of reaction chambers are uniformly spaced in a planar reaction plate positioned at a first location in said apparatus and wherein said apparatus further comprises
  (i) a polynucleotide isolation plate positioned at a second location in said apparatus, wherein the isolation plate comprises a plurality of chambers in a planar array spaced to align with said outlets of said plurality of reaction chambers of the reaction plate, each chamber of the isolation plate having an inlet, an outlet and a separation material for isolating polynucleotides, and
  (ii) a plate mover operationally connected to said control system, and configured to operationally engage the reaction plate and the isolation plate, such that, upon instructions from said control system, the plate mover moves the reaction plate and the isolation plate so that at the first or second location the isolation plate is operationally mounted on a waste manifold and the reaction plate is operationally mounted on the isolation plate so that whenever a positive pressure differential is established between said plurality of reaction chambers of the reaction plate and the waste manifold isolation reagents in each reaction chamber of the plurality of reactions chambers flow through a chamber of the isolation plate to said waste manifold.

* * * * *

SEQUENCE LISTING

```
<160> NUMBER OF SEQ ID NOS: 71

<210> SEQ ID NO 1
<211> LENGTH: 510
<212> TYPE: PRT
<213> ORGANISM: mouse

<400> SEQUENCE: 1

Met Asp Pro Leu Gln Ala Val His Leu Gly Pro Arg Lys Lys Arg Pro
1               5                   10                  15

Arg Gln Leu Gly Thr Pro Val Ala Ser Thr Pro Tyr Asp Ile Arg Phe
            20                  25                  30
```

-continued

Arg Asp Leu Val Leu Phe Ile Leu Glu Lys Lys Met Gly Thr Thr Arg
         35                  40                  45

Arg Ala Phe Leu Met Glu Leu Ala Arg Arg Lys Gly Phe Arg Val Glu
         50                  55                  60

Asn Glu Leu Ser Asp Ser Val Thr His Ile Val Ala Glu Asn Asn Ser
 65                  70                  75                  80

Gly Ser Asp Val Leu Glu Trp Leu Gln Leu Gln Asn Ile Lys Ala Ser
                 85                  90                  95

Ser Glu Leu Glu Leu Leu Asp Ile Ser Trp Leu Ile Glu Cys Met Gly
                100                 105                 110

Ala Gly Lys Pro Val Glu Met Met Gly Arg His Gln Leu Val Val Asn
            115                 120                 125

Arg Asn Ser Ser Pro Ser Pro Val Pro Gly Ser Gln Asn Val Pro Ala
130                 135                 140

Pro Ala Val Lys Lys Ile Ser Gln Tyr Ala Cys Gln Arg Arg Thr Thr
145                 150                 155                 160

Leu Asn Asn Tyr Asn Gln Leu Phe Thr Asp Ala Leu Asp Ile Leu Ala
                165                 170                 175

Glu Asn Asp Glu Leu Arg Glu Asn Glu Gly Ser Cys Leu Ala Phe Met
            180                 185                 190

Arg Ala Ser Ser Val Leu Lys Ser Leu Pro Phe Pro Ile Thr Ser Met
            195                 200                 205

Lys Asp Thr Glu Gly Ile Pro Cys Leu Gly Asp Lys Val Lys Ser Ile
210                 215                 220

Ile Glu Gly Ile Ile Glu Asp Gly Glu Ser Ser Glu Ala Lys Ala Val
225                 230                 235                 240

Leu Asn Asp Glu Arg Tyr Lys Ser Phe Lys Leu Phe Thr Ser Val Phe
                245                 250                 255

Gly Val Gly Leu Lys Thr Ala Glu Lys Trp Phe Arg Met Gly Phe Arg
            260                 265                 270

Thr Leu Ser Lys Ile Gln Ser Asp Lys Ser Leu Arg Phe Thr Gln Met
        275                 280                 285

Gln Lys Ala Gly Phe Leu Tyr Tyr Glu Asp Leu Val Ser Cys Val Asn
290                 295                 300

Arg Pro Glu Ala Glu Ala Val Ser Met Leu Val Lys Glu Ala Val Val
305                 310                 315                 320

Thr Phe Leu Pro Asp Ala Leu Val Thr Met Thr Gly Gly Phe Arg Arg
                325                 330                 335

Gly Lys Met Thr Gly His Asp Val Asp Phe Leu Ile Thr Ser Pro Glu
            340                 345                 350

Ala Thr Glu Asp Glu Glu Gln Gln Leu Leu His Lys Val Thr Asp Phe
        355                 360                 365

Trp Lys Gln Gln Gly Leu Leu Leu Tyr Cys Asp Ile Leu Glu Ser Thr
370                 375                 380

Phe Glu Lys Phe Lys Gln Pro Ser Arg Lys Val Asp Ala Leu Asp His
385                 390                 395                 400

Phe Gln Lys Cys Phe Leu Ile Leu Lys Leu Asp His Gly Arg Val His
                405                 410                 415

Ser Glu Lys Ser Gly Gln Gln Glu Gly Lys Gly Trp Lys Ala Ile Arg
            420                 425                 430

Val Asp Leu Val Met Cys Pro Tyr Asp Arg Arg Ala Phe Ala Leu Leu
        435                 440                 445

```
Gly Trp Thr Gly Ser Arg Gln Phe Glu Arg Asp Leu Arg Arg Tyr Ala
            450                 455                 460
Thr His Glu Arg Lys Met Met Leu Asp Asn His Ala Leu Tyr Asp Arg
465                 470                 475                 480
Thr Lys Arg Val Phe Leu Glu Ala Glu Ser Glu Glu Ile Phe Ala
                485                 490                 495
His Leu Gly Leu Asp Tyr Ile Glu Pro Trp Glu Arg Asn Ala
            500                 505                 510

<210> SEQ ID NO 2
<211> LENGTH: 381
<212> TYPE: PRT
<213> ORGANISM: mouse

<400> SEQUENCE: 2

Asn Ser Ser Pro Ser Pro Val Pro Gly Ser Gln Asn Val Pro Ala Pro
1               5                   10                  15
Ala Val Lys Lys Ile Ser Gln Tyr Ala Cys Gln Arg Arg Thr Thr Leu
            20                  25                  30
Asn Asn Tyr Asn Gln Leu Phe Thr Asp Ala Leu Asp Ile Leu Ala Glu
        35                  40                  45
Asn Asp Glu Leu Arg Glu Asn Glu Gly Ser Cys Leu Ala Phe Met Arg
    50                  55                  60
Ala Ser Ser Val Leu Lys Ser Leu Pro Phe Pro Ile Thr Ser Met Lys
65                  70                  75                  80
Asp Thr Glu Gly Ile Pro Cys Leu Gly Asp Lys Val Lys Ser Ile Ile
                85                  90                  95
Glu Gly Ile Ile Glu Asp Gly Glu Ser Ser Glu Ala Lys Ala Val Leu
            100                 105                 110
Asn Asp Glu Arg Tyr Lys Ser Phe Lys Leu Phe Thr Ser Val Phe Gly
        115                 120                 125
Val Gly Leu Lys Thr Ala Glu Lys Trp Phe Arg Met Gly Phe Arg Thr
    130                 135                 140
Leu Ser Lys Ile Gln Ser Asp Lys Ser Leu Arg Phe Thr Gln Met Gln
145                 150                 155                 160
Lys Ala Gly Phe Leu Tyr Tyr Glu Asp Leu Val Ser Cys Val Asn Arg
                165                 170                 175
Pro Glu Ala Glu Ala Val Ser Met Leu Val Lys Glu Ala Val Val Thr
            180                 185                 190
Phe Leu Pro Asp Ala Leu Val Thr Met Thr Gly Gly Phe Arg Arg Gly
        195                 200                 205
Lys Met Thr Gly His Asp Val Asp Phe Leu Ile Thr Ser Pro Glu Ala
    210                 215                 220
Thr Glu Asp Glu Glu Gln Gln Leu Leu His Lys Val Thr Asp Phe Trp
225                 230                 235                 240
Lys Gln Gln Gly Leu Leu Leu Tyr Cys Asp Ile Leu Glu Ser Thr Phe
                245                 250                 255
Glu Lys Phe Lys Gln Pro Ser Arg Lys Val Asp Ala Leu Asp His Phe
            260                 265                 270
Gln Lys Cys Phe Leu Ile Leu Lys Leu Asp His Gly Arg Val His Ser
        275                 280                 285
Glu Lys Ser Gly Gln Gln Glu Gly Lys Gly Trp Lys Ala Ile Arg Val
    290                 295                 300
Asp Leu Val Met Cys Pro Tyr Asp Arg Arg Ala Phe Ala Leu Leu Gly
305                 310                 315                 320
```

Trp Thr Gly Ser Arg Gln Phe Glu Arg Asp Leu Arg Arg Tyr Ala Thr
        325                 330                 335

His Glu Arg Lys Met Met Leu Asp Asn His Ala Leu Tyr Asp Arg Thr
            340                 345                 350

Lys Arg Val Phe Leu Glu Ala Glu Ser Glu Glu Ile Phe Ala His
                355                 360                 365

Leu Gly Leu Asp Tyr Ile Glu Pro Trp Glu Arg Asn Ala
    370                 375                 380

<210> SEQ ID NO 3
<211> LENGTH: 380
<212> TYPE: PRT
<213> ORGANISM: bovine

<400> SEQUENCE: 3

Asp Tyr Ser Ala Thr Pro Asn Pro Gly Phe Gln Lys Thr Pro Pro Leu
1               5                   10                  15

Ala Val Lys Lys Ile Ser Gln Tyr Ala Cys Gln Arg Lys Thr Thr Leu
            20                  25                  30

Asn Asn Tyr Asn His Ile Phe Thr Asp Ala Phe Glu Ile Leu Ala Glu
        35                  40                  45

Asn Ser Glu Phe Lys Glu Asn Glu Val Ser Tyr Val Thr Phe Met Arg
    50                  55                  60

Ala Ala Ser Val Leu Lys Ser Leu Pro Phe Thr Ile Ile Ser Met Lys
65                  70                  75                  80

Asp Thr Glu Gly Ile Pro Cys Leu Gly Asp Lys Val Lys Cys Ile Ile
                85                  90                  95

Glu Glu Ile Ile Glu Asp Gly Glu Ser Ser Glu Val Lys Ala Val Leu
            100                 105                 110

Asn Asp Glu Arg Tyr Gln Ser Phe Lys Leu Phe Thr Ser Val Phe Gly
        115                 120                 125

Val Gly Leu Lys Thr Ser Glu Lys Trp Phe Arg Met Gly Phe Arg Ser
    130                 135                 140

Leu Ser Lys Ile Met Ser Asp Lys Thr Leu Lys Phe Thr Lys Met Gln
145                 150                 155                 160

Lys Ala Gly Phe Leu Tyr Tyr Glu Asp Leu Val Ser Cys Val Thr Arg
                165                 170                 175

Ala Glu Ala Glu Ala Val Gly Val Leu Val Lys Glu Ala Val Trp Ala
            180                 185                 190

Phe Leu Pro Asp Ala Phe Val Thr Met Thr Gly Gly Phe Arg Arg Gly
        195                 200                 205

Lys Lys Ile Gly His Asp Val Asp Phe Leu Ile Thr Ser Pro Gly Ser
    210                 215                 220

Ala Glu Asp Glu Glu Gln Leu Leu Pro Lys Val Ile Asn Leu Trp Glu
225                 230                 235                 240

Lys Lys Gly Leu Leu Leu Tyr Tyr Asp Leu Val Glu Ser Thr Phe Glu
                245                 250                 255

Lys Phe Lys Leu Pro Ser Arg Gln Val Asp Thr Leu Asp His Phe Gln
            260                 265                 270

Lys Cys Phe Leu Ile Leu Lys Leu His His Gln Arg Val Asp Ser Ser
        275                 280                 285

Lys Ser Asn Gln Gln Glu Gly Lys Thr Trp Lys Ala Ile Arg Val Asp
    290                 295                 300

Leu Val Met Cys Pro Tyr Glu Asn Arg Ala Phe Ala Leu Leu Gly Trp

```
                305                 310                 315                 320
Thr Gly Ser Arg Gln Phe Glu Arg Asp Ile Arg Arg Tyr Ala Thr His
            325                 330                 335

Glu Arg Lys Met Met Leu Asp Asn His Ala Leu Tyr Asp Lys Thr Lys
        340                 345                 350

Arg Val Phe Leu Lys Ala Glu Glu Glu Ile Phe Ala His Leu
        355                 360                 365

Gly Leu Asp Tyr Ile Glu Pro Trp Arg Asn Ala
        370                 375                 380

<210> SEQ ID NO 4
<211> LENGTH: 380
<212> TYPE: PRT
<213> ORGANISM: human

<400> SEQUENCE: 4

Asp Tyr Ser Asp Ser Thr Asn Pro Gly Pro Pro Lys Thr Pro Pro Ile
1               5                   10                  15

Ala Val Gln Lys Ile Ser Gln Tyr Ala Cys Gln Arg Arg Thr Thr Leu
            20                  25                  30

Asn Asn Cys Asn Gln Ile Phe Thr Asp Ala Phe Asp Ile Leu Ala Glu
        35                  40                  45

Asn Cys Glu Phe Arg Glu Asn Glu Asp Ser Cys Val Thr Phe Met Arg
    50                  55                  60

Ala Ala Ser Val Leu Lys Ser Leu Pro Phe Thr Ile Ile Ser Met Lys
65                  70                  75                  80

Asp Thr Glu Gly Ile Pro Cys Leu Gly Ser Lys Val Lys Gly Ile Ile
                85                  90                  95

Glu Glu Ile Ile Glu Asp Gly Glu Ser Ser Glu Val Lys Ala Val Leu
            100                 105                 110

Asn Asp Glu Arg Tyr Gln Ser Phe Lys Leu Phe Thr Ser Val Phe Gly
        115                 120                 125

Val Gly Leu Lys Thr Ser Glu Lys Trp Phe Arg Met Gly Phe Arg Thr
    130                 135                 140

Leu Ser Lys Val Arg Ser Asp Lys Ser Leu Lys Phe Thr Arg Met Gln
145                 150                 155                 160

Lys Ala Gly Phe Leu Tyr Tyr Glu Asp Leu Val Ser Cys Val Thr Arg
                165                 170                 175

Ala Glu Ala Glu Ala Val Ser Val Leu Val Lys Glu Ala Val Trp Ala
            180                 185                 190

Phe Leu Pro Asp Ala Phe Val Thr Met Thr Gly Gly Phe Arg Arg Gly
        195                 200                 205

Lys Lys Met Gly His Asp Val Asp Phe Leu Ile Thr Ser Pro Gly Ser
    210                 215                 220

Thr Glu Asp Glu Glu Gln Leu Leu Gln Lys Val Met Asn Leu Trp Glu
225                 230                 235                 240

Lys Lys Gly Leu Leu Leu Tyr Tyr Asp Leu Val Glu Ser Thr Phe Glu
                245                 250                 255

Lys Leu Arg Leu Pro Ser Arg Lys Val Asp Ala Leu Asp His Phe Gln
            260                 265                 270

Lys Cys Phe Leu Ile Phe Lys Leu Pro Arg Gln Arg Val Asp Ser Asp
        275                 280                 285

Gln Ser Ser Trp Gln Glu Gly Lys Thr Trp Lys Ala Ile Arg Val Asp
    290                 295                 300
```

```
Leu Val Leu Cys Pro Tyr Glu Arg Arg Ala Phe Ala Leu Leu Gly Trp
305                 310                 315                 320

Thr Gly Ser Arg Gln Phe Glu Arg Asp Leu Arg Arg Tyr Ala Thr His
            325                 330                 335

Glu Arg Lys Met Ile Leu Asp Asn His Ala Leu Tyr Asp Lys Thr Lys
            340                 345                 350

Arg Ile Phe Leu Lys Ala Glu Ser Glu Glu Ile Phe Ala His Leu
            355                 360                 365

Gly Leu Asp Tyr Ile Glu Pro Trp Glu Arg Asn Ala
            370                 375                 380

<210> SEQ ID NO 5
<211> LENGTH: 376
<212> TYPE: PRT
<213> ORGANISM: chicken

<400> SEQUENCE: 5

Gln Tyr Pro Thr Leu Lys Thr Pro Glu Ser Glu Val Ser Ser Phe Thr
1               5                   10                  15

Ala Ser Lys Val Ser Gln Tyr Ser Cys Gln Arg Lys Thr Thr Leu Asn
            20                  25                  30

Asn Cys Asn Lys Lys Phe Thr Asp Ala Phe Glu Ile Met Ala Glu Asn
            35                  40                  45

Tyr Glu Phe Lys Glu Asn Glu Ile Phe Cys Leu Glu Phe Leu Arg Ala
        50                  55                  60

Ala Ser Val Leu Lys Ser Leu Pro Phe Pro Val Thr Arg Met Lys Asp
65                  70                  75                  80

Ile Gln Gly Leu Pro Cys Met Gly Asp Arg Val Arg Asp Val Ile Glu
                85                  90                  95

Glu Ile Ile Glu Glu Gly Glu Ser Ser Arg Ala Lys Asp Val Leu Asn
            100                 105                 110

Asp Glu Arg Tyr Lys Ser Phe Lys Glu Phe Thr Ser Val Phe Gly Val
        115                 120                 125

Gly Val Lys Thr Ser Glu Lys Trp Phe Arg Met Gly Leu Arg Thr Val
130                 135                 140

Glu Glu Val Lys Ala Asp Lys Thr Leu Lys Leu Ser Lys Met Gln Arg
145                 150                 155                 160

Ala Gly Phe Leu Tyr Tyr Glu Asp Leu Val Ser Cys Val Ser Lys Ala
                165                 170                 175

Glu Ala Asp Ala Val Ser Ser Ile Val Lys Asn Thr Val Cys Thr Phe
            180                 185                 190

Leu Pro Asp Ala Leu Val Thr Ile Thr Gly Gly Phe Arg Arg Gly Lys
        195                 200                 205

Lys Ile Gly His Asp Ile Asp Phe Leu Ile Thr Ser Pro Gly Gln Arg
    210                 215                 220

Glu Asp Asp Glu Leu Leu His Lys Gly Leu Leu Leu Tyr Cys Asp Ile
225                 230                 235                 240

Ile Glu Ser Thr Phe Val Lys Glu Gln Ile Pro Ser Arg His Val Asp
                245                 250                 255

Ala Met Asp His Phe Gln Lys Cys Phe Ala Ile Leu Lys Leu Tyr Gln
            260                 265                 270

Pro Arg Val Asp Asn Ser Ser Tyr Asn Met Ser Lys Lys Cys Asp Met
        275                 280                 285

Ala Glu Val Lys Asp Trp Lys Ala Ile Arg Val Asp Leu Val Ile Thr
            290                 295                 300
```

```
Pro Phe Glu Gln Tyr Ala Tyr Ala Leu Leu Gly Trp Thr Gly Ser Arg
305                 310                 315                 320

Gln Phe Gly Arg Asp Leu Arg Arg Tyr Ala Thr His Glu Arg Lys Met
            325                 330                 335

Met Leu Asp Asn His Ala Leu Tyr Asp Lys Arg Lys Val Phe Leu
        340                 345                 350

Lys Ala Gly Ser Glu Glu Ile Phe Ala His Leu Gly Leu Asp Tyr
        355                 360                 365

Val Glu Pro Trp Glu Arg Asn Ala
        370                 375

<210> SEQ ID NO 6
<211> LENGTH: 387
<212> TYPE: PRT
<213> ORGANISM: possum

<400> SEQUENCE: 6

Ser Ala Asn Pro Asp Pro Thr Ala Gly Thr Leu Asn Ile Leu Pro Pro
1               5                   10                  15

Thr Thr Lys Thr Ile Ser Gln Tyr Ala Cys Gln Arg Arg Thr Thr Ile
            20                  25                  30

Asn Asn His Asn Gln Arg Phe Thr Asp Ala Phe Glu Ile Leu Ala Lys
        35                  40                  45

Asn Tyr Glu Phe Lys Glu Asn Asp Asp Thr Cys Leu Thr Phe Met Arg
    50                  55                  60

Ala Ile Ser Val Leu Lys Cys Leu Pro Phe Glu Val Val Ser Leu Lys
65                  70                  75                  80

Asp Thr Glu Gly Leu Pro Trp Ile Gly Asp Glu Val Lys Gly Ile Met
                85                  90                  95

Glu Glu Ile Ile Glu Asp Gly Glu Ser Leu Glu Val Gln Ala Val Leu
            100                 105                 110

Asn Asp Glu Arg Tyr Gln Ser Phe Lys Leu Phe Thr Ser Val Phe Gly
        115                 120                 125

Val Gly Leu Lys Thr Ala Asp Lys Trp Tyr Arg Met Gly Phe Arg Thr
    130                 135                 140

Leu Asn Lys Ile Arg Ser Asp Lys Thr Leu Lys Leu Thr Lys Met Gln
145                 150                 155                 160

Lys Ala Gly Leu Cys Tyr Tyr Glu Asp Leu Ile Asp Cys Val Ser Lys
                165                 170                 175

Ala Glu Ala Asp Ala Val Ser Leu Leu Val Gln Asp Ala Val Trp Thr
            180                 185                 190

Phe Leu Pro Asp Ala Leu Val Thr Ile Thr Gly Gly Phe Arg Arg Gly
        195                 200                 205

Lys Glu Phe Gly His Asp Val Asp Phe Leu Ile Thr Ser Pro Gly Ala
    210                 215                 220

Glu Lys Glu Gln Glu Asp Gln Leu Leu Gln Lys Val Thr Asn Leu Trp
225                 230                 235                 240

Lys Lys Gln Gly Leu Leu Leu Tyr Cys Asp Leu Ile Glu Ser Thr Phe
                245                 250                 255

Glu Asp Leu Lys Leu Pro Ser Arg Lys Ile Asp Ala Leu Asp His Phe
            260                 265                 270

Gln Lys Cys Phe Leu Ile Leu Lys Leu Tyr His His Lys Glu Asp Lys
        275                 280                 285

Arg Lys Trp Glu Met Pro Thr Gly Ser Asn Glu Ser Glu Ala Lys Ser
```

```
            290                 295                 300
Trp Lys Ala Ile Arg Val Asp Leu Val Val Cys Pro Tyr Asp Arg Tyr
305                 310                 315                 320

Ala Phe Ala Leu Leu Gly Trp Ser Gly Ser Arg Gln Phe Glu Arg Asp
                325                 330                 335

Leu Arg Arg Tyr Ala Thr His Glu Lys Lys Met Met Leu Asp Asn His
                340                 345                 350

Ala Leu Tyr Asp Lys Thr Lys Lys Ile Phe Leu Lys Ala Lys Ser Glu
            355                 360                 365

Glu Glu Ile Phe Ala His Leu Gly Leu Glu Tyr Ile Gln Pro Ser Glu
370                 375                 380

Arg Asn Ala
385

<210> SEQ ID NO 7
<211> LENGTH: 381
<212> TYPE: PRT
<213> ORGANISM: shrew

<400> SEQUENCE: 7

Asp Cys Pro Ala Ser His Asp Ser Ser Pro Gln Lys Thr Glu Ser Ala
1               5                   10                  15

Ala Val Gln Lys Ile Ser Gln Tyr Ala Cys Gln Arg Arg Thr Thr Leu
            20                  25                  30

Asn Asn His Asn His Ile Phe Thr Asp Ala Phe Glu Ile Leu Ala Glu
        35                  40                  45

Asn Cys Glu Phe Arg Glu Asn Glu Gly Ser Tyr Val Thr Tyr Met Arg
50                  55                  60

Ala Ala Ser Val Leu Lys Ser Leu Pro Phe Ser Ile Ile Ser Met Lys
65                  70                  75                  80

Asp Thr Glu Gly Ile Pro Cys Leu Ala Asp Lys Val Lys Cys Val Ile
                85                  90                  95

Glu Glu Ile Ile Glu Asp Gly Glu Ser Ser Glu Val Lys Ala Val Leu
            100                 105                 110

Asn Asp Glu Arg Tyr Lys Ser Phe Lys Leu Phe Thr Ser Val Phe Gly
        115                 120                 125

Val Gly Leu Lys Thr Ala Glu Lys Trp Phe Arg Leu Gly Phe Arg Thr
130                 135                 140

Leu Ser Gly Ile Met Asn Asp Lys Thr Leu Lys Leu Thr His Met Gln
145                 150                 155                 160

Lys Ala Gly Phe Leu Tyr Tyr Glu Asp Leu Val Ser Cys Val Thr Arg
                165                 170                 175

Ala Glu Ala Glu Ala Val Gly Val Leu Val Lys Glu Ala Val Trp Ala
            180                 185                 190

Phe Leu Pro Asp Ala Ile Val Thr Met Thr Gly Gly Phe Arg Arg Gly
        195                 200                 205

Lys Lys Val Gly His Asp Val Asp Phe Leu Ile Thr Ser Pro Glu Ala
210                 215                 220

Thr Glu Glu Gln Glu Gln Gln Leu Leu His Lys Val Ile Thr Phe Trp
225                 230                 235                 240

Glu Lys Glu Gly Leu Leu Leu Tyr Cys Asp Leu Tyr Glu Ser Thr Phe
                245                 250                 255

Glu Lys Leu Lys Met Pro Ser Arg Lys Val Asp Ala Leu Asp His Phe
            260                 265                 270
```

```
Gln Lys Cys Phe Leu Ile Leu Lys Leu His Arg Glu Cys Val Asp Asp
                275                 280                 285

Gly Thr Ser Ser Gln Leu Gln Gly Lys Thr Trp Lys Ala Ile Arg Val
290                 295                 300

Asp Leu Val Val Cys Pro Tyr Glu Cys Arg Ala Phe Ala Leu Leu Gly
305                 310                 315                 320

Trp Thr Gly Ser Pro Gln Phe Glu Arg Asp Leu Arg Arg Tyr Ala Thr
                325                 330                 335

His Glu Arg Lys Met Met Leu Asp Asn His Ala Leu Tyr Asp Lys Thr
                340                 345                 350

Lys Arg Lys Phe Leu Ser Ala Asp Ser Glu Glu Asp Ile Phe Ala His
                355                 360                 365

Leu Gly Leu Asp Tyr Ile Glu Pro Trp Glu Arg Asn Ala
370                 375                 380

<210> SEQ ID NO 8
<211> LENGTH: 381
<212> TYPE: PRT
<213> ORGANISM: dog

<400> SEQUENCE: 8

Asp Tyr Thr Ala Ser Pro Asn Pro Glu Leu Gln Lys Thr Leu Pro Val
1               5                   10                  15

Ala Val Lys Lys Ile Ser Gln Tyr Ala Cys Gln Arg Arg Thr Thr Leu
                20                  25                  30

Asn Asn Tyr Asn Asn Val Phe Thr Asp Ala Phe Glu Val Leu Ala Glu
                35                  40                  45

Asn Tyr Glu Phe Arg Glu Asn Glu Val Phe Ser Leu Thr Phe Met Arg
50                  55                  60

Ala Ala Ser Val Leu Lys Ser Leu Pro Phe Thr Ile Ile Ser Met Lys
65                  70                  75                  80

Asp Thr Glu Gly Ile Pro Cys Leu Gly Asp Gln Val Lys Cys Ile Ile
                85                  90                  95

Glu Glu Ile Ile Glu Asp Gly Glu Ser Ser Glu Val Lys Ala Val Leu
                100                 105                 110

Asn Asp Glu Arg Tyr Gln Ser Phe Lys Leu Phe Thr Ser Val Phe Gly
                115                 120                 125

Val Gly Leu Lys Thr Ser Glu Lys Trp Phe Arg Met Gly Phe Arg Thr
130                 135                 140

Leu Ser Lys Ile Lys Ser Asp Lys Ser Leu Lys Phe Thr Pro Met Gln
145                 150                 155                 160

Lys Ala Gly Phe Leu Tyr Tyr Glu Asp Leu Val Ser Cys Val Thr Arg
                165                 170                 175

Ala Glu Ala Glu Ala Val Gly Val Leu Val Lys Glu Ala Val Gly Ala
                180                 185                 190

Phe Leu Pro Asp Ala Phe Val Thr Met Thr Gly Gly Phe Arg Arg Gly
                195                 200                 205

Lys Lys Met Gly His Asp Val Asp Phe Leu Ile Thr Ser Pro Gly Ser
                210                 215                 220

Thr Asp Glu Asp Glu Gln Leu Leu Pro Lys Val Ile Asn Leu Trp
225                 230                 235                 240

Glu Arg Lys Gly Leu Leu Leu Tyr Cys Asp Leu Val Glu Ser Thr Phe
                245                 250                 255

Glu Lys Leu Lys Leu Pro Ser Arg Lys Val Asp Ala Leu Asp His Phe
                260                 265                 270
```

```
Gln Lys Cys Phe Leu Ile Leu Lys Leu His His Gln Arg Val Asp Gly
            275                 280                 285

Gly Lys Cys Ser Gln Gln Glu Gly Lys Thr Trp Lys Ala Ile Arg Val
        290                 295                 300

Asp Leu Val Met Cys Pro Tyr Glu Arg Arg Ala Phe Ala Leu Leu Gly
305                 310                 315                 320

Trp Thr Gly Ser Arg Gln Phe Glu Arg Asp Leu Arg Arg Tyr Ala Ser
                325                 330                 335

His Glu Arg Lys Met Ile Leu Asp Asn His Ala Leu Tyr Asp Lys Thr
            340                 345                 350

Lys Lys Ile Phe Leu Lys Ala Glu Ser Glu Glu Ile Phe Ala His
        355                 360                 365

Leu Gly Leu Asp Tyr Ile Glu Pro Trp Glu Arg Asn Ala
        370                 375                 380
```

<210> SEQ ID NO 9
<211> LENGTH: 382
<212> TYPE: PRT
<213> ORGANISM: mole

<400> SEQUENCE: 9

```
Gly Asp Cys Pro Ala Ser His Asp Ser Ser Pro Gln Lys Thr Glu Ser
1               5                   10                  15

Ala Ala Val Gln Lys Ile Ser Gln Tyr Ala Cys Gln Arg Arg Thr Thr
            20                  25                  30

Leu Asn Asn His Asn His Ile Phe Thr Asp Ala Phe Glu Ile Leu Ala
        35                  40                  45

Glu Asn Cys Glu Phe Arg Glu Asn Gly Ser Tyr Val Thr Tyr Met
    50                  55                  60

Arg Ala Ala Ser Val Leu Lys Ser Leu Pro Phe Ser Ile Ile Ser Met
65                  70                  75                  80

Lys Asp Thr Glu Gly Ile Pro Cys Leu Ala Asp Lys Val Lys Cys Val
                85                  90                  95

Ile Glu Glu Ile Ile Glu Asp Gly Glu Ser Ser Glu Val Lys Ala Val
            100                 105                 110

Leu Asn Asp Glu Arg Tyr Lys Ser Phe Lys Leu Phe Thr Ser Val Phe
        115                 120                 125

Gly Val Gly Leu Lys Thr Ala Glu Lys Trp Phe Arg Leu Gly Phe Arg
    130                 135                 140

Thr Leu Ser Gly Ile Met Asn Asp Lys Thr Leu Lys Leu Thr His Met
145                 150                 155                 160

Gln Lys Ala Gly Phe Leu Tyr Tyr Glu Asp Leu Val Ser Cys Val Thr
                165                 170                 175

Arg Ala Glu Ala Glu Ala Val Gly Val Leu Val Lys Glu Ala Val Trp
            180                 185                 190

Ala Phe Leu Pro Asp Ala Ile Val Thr Met Thr Gly Gly Phe Arg Arg
        195                 200                 205

Gly Lys Lys Val Gly His Asp Val Asp Phe Leu Ile Thr Ser Pro Glu
    210                 215                 220

Ala Thr Glu Glu Gln Glu Gln Gln Leu Leu His Lys Val Ile Thr Phe
225                 230                 235                 240

Trp Glu Lys Glu Gly Leu Leu Leu Tyr Cys Asp Leu Tyr Glu Ser Thr
                245                 250                 255

Phe Glu Lys Leu Lys Met Pro Ser Arg Lys Val Asp Ala Leu Asp His
```

```
              260                 265                 270
Phe Gln Lys Cys Phe Leu Ile Leu Lys Leu His Arg Glu Cys Val Asp
            275                 280                 285
Asp Gly Thr Ser Ser Gln Leu Gln Gly Lys Thr Trp Lys Ala Ile Arg
            290                 295                 300
Val Asp Leu Val Val Cys Pro Tyr Glu Cys Arg Ala Phe Ala Leu Leu
305                 310                 315                 320
Gly Trp Thr Gly Ser Pro Gln Phe Glu Arg Asp Leu Arg Arg Tyr Ala
                325                 330                 335
Thr His Glu Arg Lys Met Met Leu Asp Asn His Ala Leu Tyr Asp Lys
                340                 345                 350
Thr Lys Arg Lys Phe Leu Ser Ala Asp Ser Glu Glu Asp Ile Phe Ala
                355                 360                 365
His Leu Gly Leu Asp Tyr Ile Glu Pro Trp Glu Arg Asn Ala
                370                 375                 380

<210> SEQ ID NO 10
<211> LENGTH: 379
<212> TYPE: PRT
<213> ORGANISM: pika

<400> SEQUENCE: 10

Glu Tyr Ser Ala Asn Pro Ser Pro Gly Pro Gln Ala Thr Pro Ala Val
1               5                   10                  15
Tyr Lys Ile Ser Gln Tyr Ala Cys Gln Arg Arg Thr Thr Leu Asn Asn
                20                  25                  30
His Asn His Ile Phe Thr Asp Ala Phe Glu Ile Leu Ala Glu Asn Tyr
            35                  40                  45
Glu Phe Lys Glu Asn Glu Gly Cys Tyr Val Thr Tyr Met Arg Ala Ala
        50                  55                  60
Ser Val Leu Lys Ser Leu Pro Phe Thr Ile Val Ser Met Lys Asp Thr
65                  70                  75                  80
Glu Gly Ile Pro Cys Leu Glu Asp Lys Val Lys Ser Ile Met Glu Glu
                85                  90                  95
Ile Ile Glu Glu Gly Gly Ser Ser Glu Val Lys Ala Val Leu Ser Asp
            100                 105                 110
Glu Arg Tyr Gln Cys Phe Lys Leu Phe Thr Ser Val Phe Gly Val Gly
        115                 120                 125
Leu Lys Thr Ser Glu Lys Trp Phe Arg Met Gly Phe Arg Ser Leu Ser
130                 135                 140
Asn Ile Arg Leu Asp Lys Ser Leu Lys Phe Thr Gln Met Gln Lys Ala
145                 150                 155                 160
Gly Phe Arg Tyr Tyr Glu Asp Ile Val Ser Cys Val Thr Arg Ala Glu
                165                 170                 175
Ala Glu Ala Val Asp Val Leu Val Asn Glu Ala Val Arg Ala Phe Leu
            180                 185                 190
Pro Asp Ala Phe Ile Thr Met Thr Gly Gly Phe Arg Arg Gly Lys Lys
        195                 200                 205
Ile Gly His Asp Val Asp Phe Leu Ile Thr Ser Pro Glu Leu Thr Glu
    210                 215                 220
Glu Asp Glu Gln Gln Leu Leu His Lys Val Met Asn Leu Trp Glu Lys
225                 230                 235                 240
Lys Gly Leu Leu Leu Tyr His Asp Leu Val Glu Ser Thr Phe Glu Lys
                245                 250                 255
```

```
Leu Lys Gln Pro Ser Arg Lys Val Asp Ala Leu Asp His Phe Gln Lys
            260                 265                 270

Cys Phe Leu Ile Phe Lys Leu Tyr His Glu Arg Val Gly Gly Asp Arg
        275                 280                 285

Cys Arg Gln Pro Glu Gly Lys Asp Trp Lys Ala Ile Arg Val Asp Leu
    290                 295                 300

Val Met Cys Pro Tyr Glu Cys His Ala Phe Ala Leu Leu Gly Trp Thr
305                 310                 315                 320

Gly Ser Arg Gln Phe Glu Arg Asp Leu Arg Arg Tyr Ala Ser His Glu
                325                 330                 335

Arg Lys Met Ile Leu Asp Asn His Ala Leu Tyr Asp Lys Thr Lys Arg
            340                 345                 350

Val Phe Leu Gln Ala Glu Asn Glu Glu Ile Phe Ala His Leu Gly
        355                 360                 365

Leu Asp Tyr Ile Glu Pro Trp Glu Arg Asn Ala
    370                 375
```

<210> SEQ ID NO 11
<211> LENGTH: 384
<212> TYPE: PRT
<213> ORGANISM: hedgehog

<400> SEQUENCE: 11

```
Asp Ala Ser Phe Gly Ser Asn Pro Gly Ser Gln Asn Thr Pro Pro Leu
1               5                   10                  15

Ala Ile Lys Lys Ile Ser Gln Tyr Ala Cys Gln Arg Arg Thr Ser Leu
            20                  25                  30

Asn Asn Cys Asn His Ile Phe Thr Asp Ala Leu Asp Ile Leu Ala Glu
        35                  40                  45

Asn His Glu Phe Arg Glu Asn Glu Val Ser Cys Val Ala Phe Met Arg
    50                  55                  60

Ala Ala Ser Val Leu Lys Ser Leu Pro Phe Thr Ile Ile Ser Met Lys
65                  70                  75                  80

Asp Thr Lys Gly Ile Pro Cys Leu Gly Asp Lys Ala Lys Cys Val Ile
                85                  90                  95

Glu Glu Ile Ile Glu Asp Gly Glu Ser Ser Glu Val Lys Ala Ile Leu
            100                 105                 110

Asn Asp Glu Arg Tyr Gln Ser Phe Lys Leu Phe Thr Ser Val Phe Gly
        115                 120                 125

Val Gly Leu Lys Thr Ser Glu Lys Trp Phe Arg Met Gly Phe Arg Thr
    130                 135                 140

Leu Asn Lys Ile Met Ser Asp Lys Thr Leu Lys Leu Thr Arg Met Gln
145                 150                 155                 160

Lys Ala Gly Phe Leu Tyr Tyr Glu Asp Leu Val Ser Cys Val Ala Lys
                165                 170                 175

Ala Glu Ala Asp Ala Val Ser Val Leu Val Gln Glu Ala Val Trp Ala
            180                 185                 190

Phe Leu Pro Asp Ala Met Val Thr Met Thr Gly Gly Phe Arg Arg Gly
        195                 200                 205

Lys Lys Leu Gly His Asp Val Asp Phe Leu Ile Thr Ser Pro Gly Ala
    210                 215                 220

Thr Glu Glu Glu Glu Gln Gln Leu Leu Pro Lys Val Ile Asn Phe Trp
225                 230                 235                 240

Glu Arg Lys Gly Leu Leu Leu Tyr His Asp Leu Val Glu Ser Thr Phe
                245                 250                 255
```

Glu Lys Leu Lys Leu Pro Ser Arg Lys Val Asp Ala Leu Asp His Phe
            260                 265                 270

Gln Lys Cys Phe Leu Ile Leu Lys Leu His Leu Gln His Val Asn Gly
            275                 280                 285

Val Gly Asn Ser Lys Thr Gly Gln Gln Glu Gly Lys Asn Trp Lys Ala
290                 295                 300

Ile Arg Val Asp Leu Val Met Cys Pro Tyr Glu Arg Arg Ala Phe Ala
305                 310                 315                 320

Leu Leu Gly Trp Thr Gly Ser Arg Gln Phe Glu Arg Asp Leu Arg Arg
                325                 330                 335

Phe Ala Thr His Glu Arg Lys Met Met Leu Asp Asn His Ala Leu Tyr
            340                 345                 350

Asp Lys Thr Lys Arg Ile Phe Leu Lys Ala Glu Ser Glu Glu Glu Ile
            355                 360                 365

Phe Ala His Leu Gly Leu Asp Tyr Ile Asp Pro Trp Glu Arg Asn Ala
            370                 375                 380

<210> SEQ ID NO 12
<211> LENGTH: 381
<212> TYPE: PRT
<213> ORGANISM: tree shrew

<400> SEQUENCE: 12

Asp His Ser Thr Ser Pro Ser Pro Gly Pro Gln Lys Thr Pro Ala Leu
1               5                   10                  15

Ala Val Gln Lys Ile Ser Gln Tyr Ala Cys Gln Arg Arg Thr Thr Leu
            20                  25                  30

Asn Asn Cys Asn Arg Val Phe Thr Asp Ala Phe Glu Thr Leu Ala Glu
        35                  40                  45

Asn Tyr Glu Phe Arg Glu Asn Glu Asp Ser Ser Val Ile Phe Leu Arg
    50                  55                  60

Ala Ala Ser Val Leu Arg Ser Leu Pro Phe Thr Ile Thr Ser Met Arg
65                  70                  75                  80

Asp Thr Glu Gly Leu Pro Cys Leu Gly Asp Lys Val Lys Cys Val Ile
                85                  90                  95

Glu Glu Ile Ile Glu Asp Gly Glu Ser Ser Glu Val Asn Ala Val Leu
            100                 105                 110

Asn Asp Glu Arg Tyr Lys Ser Phe Lys Leu Phe Thr Ser Val Phe Gly
        115                 120                 125

Val Gly Leu Lys Thr Ser Glu Lys Trp Phe Arg Met Gly Phe Arg Thr
    130                 135                 140

Leu Ser Arg Val Arg Ser Asp Lys Ser Leu His Leu Thr Arg Met Gln
145                 150                 155                 160

Gln Ala Gly Phe Leu Tyr Tyr Glu Asp Leu Ala Ser Cys Val Thr Arg
                165                 170                 175

Ala Glu Ala Glu Ala Val Gly Val Leu Val Lys Glu Ala Val Gly Ala
            180                 185                 190

Phe Leu Pro Asp Ala Leu Val Thr Ile Thr Gly Gly Phe Arg Arg Gly
        195                 200                 205

Lys Lys Thr Gly His Asp Val Asp Phe Leu Ile Thr Ser Pro Gly Ser
    210                 215                 220

Thr Glu Glu Lys Glu Glu Leu Leu Gln Lys Val Leu Asn Leu Trp
225                 230                 235                 240

Glu Lys Lys Gly Leu Leu Leu Tyr Tyr Asp Leu Val Glu Ser Thr Phe

```
                    245                 250                 255
Glu Lys Leu Lys Thr Pro Ser Arg Lys Val Asp Ala Leu Asp His Phe
                260                 265                 270

Pro Lys Cys Phe Leu Ile Leu Lys Leu His His Gln Arg Val Asp Gly
            275                 280                 285

Asp Lys Pro Ser Gln Gln Glu Gly Lys Ser Trp Lys Ala Ile Arg Val
        290                 295                 300

Asp Leu Val Met Cys Pro Tyr Glu Arg His Ala Phe Ala Leu Leu Gly
305                 310                 315                 320

Trp Thr Gly Ser Arg Gln Phe Glu Arg Asp Leu Arg Arg Tyr Ala Thr
                325                 330                 335

His Glu Arg Lys Met Met Leu Asp Asn His Ala Leu Tyr Asp Lys Thr
            340                 345                 350

Lys Arg Val Phe Leu Lys Ala Glu Ser Glu Asp Ile Phe Ala His
        355                 360                 365

Leu Gly Leu Asp Tyr Ile Glu Pro Trp Glu Arg Asn Ala
    370                 375                 380

<210> SEQ ID NO 13
<211> LENGTH: 394
<212> TYPE: PRT
<213> ORGANISM: platypus

<400> SEQUENCE: 13

Leu Thr Asn Ser Ala Pro Ile Asn Cys Met Thr Glu Thr Pro Ser Leu
1               5                   10                  15

Ala Thr Lys Gln Val Ser Gln Tyr Ala Cys Glu Arg Arg Thr Thr Leu
            20                  25                  30

Asn Asn Cys Asn Gln Lys Phe Thr Asp Ala Phe Glu Ile Leu Ala Lys
        35                  40                  45

Asp Phe Glu Phe Arg Glu Asn Glu Gly Ile Cys Leu Ala Phe Met Arg
    50                  55                  60

Ala Ile Ser Val Leu Lys Cys Leu Pro Phe Thr Ile Val Arg Met Lys
65                  70                  75                  80

Asp Ile Glu Gly Val Pro Trp Leu Gly Asp Gln Val Lys Ser Ile Ile
                85                  90                  95

Glu Glu Ile Ile Glu Asp Gly Glu Ser Ser Val Lys Ala Val Leu
            100                 105                 110

Asn Asp Glu Arg Tyr Arg Ser Phe Gln Leu Phe Asn Ser Val Phe Glu
        115                 120                 125

Val Gly Leu Thr Asp Asn Gly Glu Asn Gly Ile Ala Arg Gly Phe Gln
    130                 135                 140

Thr Leu Asn Glu Val Ile Thr Asp Glu Asn Ile Ser Leu Thr Lys Thr
145                 150                 155                 160

Thr Leu Ser Thr Ser Leu Trp Asn Tyr Leu Pro Gly Phe Leu Tyr Tyr
                165                 170                 175

Glu Asp Leu Val Ser Cys Val Ala Lys Glu Gly Ala Asp Ala Val Tyr
            180                 185                 190

Leu Ile Val Lys Glu Ala Val Arg Ala Phe Leu Pro Glu Ala Leu Val
        195                 200                 205

Thr Leu Thr Gly Gly Phe Arg Arg Gly Lys Lys Ile Gly His Asp Val
    210                 215                 220

Asp Phe Leu Ile Ser Asp Pro Glu Ser Gly Gln Asp Glu Gln Leu Leu
225                 230                 235                 240
```

```
Pro Asn Ile Ile Lys Leu Trp Glu Lys Gln Glu Leu Leu Tyr Tyr
            245                 250                 255

Asp Leu Val Glu Ser Thr Phe Glu Lys Thr Lys Ile Pro Ser Arg Lys
        260                 265                 270

Val Asp Ala Met Asp His Phe Gln Lys Cys Phe Leu Ile Leu Lys Leu
        275                 280                 285

His His Gln Lys Val Asp Ser Gly Arg Tyr Lys Pro Pro Pro Glu Ser
        290                 295                 300

Lys Asn His Glu Ala Lys Asn Trp Lys Ala Ile Arg Val Asp Leu Val
305                 310                 315                 320

Met Cys Pro Phe Glu Gln Tyr Ala Tyr Ala Leu Leu Gly Trp Thr Gly
            325                 330                 335

Ser Arg Gln Phe Glu Arg Asp Leu Arg Arg Tyr Ala Thr His Glu Lys
            340                 345                 350

Lys Met Met Leu Asp Asn His Ala Leu Tyr Asp Lys Thr Lys Lys Ile
            355                 360                 365

Phe Leu Lys Ala Glu Ser Glu Glu Asp Ile Phe Thr His Leu Gly Leu
            370                 375                 380

Asp Tyr Ile Glu Pro Trp Glu Arg Asn Ala
385                 390

<210> SEQ ID NO 14
<211> LENGTH: 384
<212> TYPE: PRT
<213> ORGANISM: jerboa

<400> SEQUENCE: 14

Ser Ser Glu Leu Glu Leu Leu Asp Val Ser Trp Leu Ile Glu Cys Met
1               5                   10                  15

Gly Ala Gly Lys Pro Val Glu Met Thr Gly Arg His Gln Leu Val Lys
            20                  25                  30

Gln Thr Phe Cys Leu Pro Gly Phe Ile Leu Gln Asp Ala Phe Asp Ile
        35                  40                  45

Leu Ala Glu Asn Cys Glu Phe Arg Glu Asn Glu Ala Ser Cys Val Glu
    50                  55                  60

Phe Met Arg Ala Ala Ser Val Leu Lys Ser Leu Pro Phe Pro Ile Ile
65                  70                  75                  80

Ser Val Lys Asp Thr Glu Gly Ile Pro Trp Leu Gly Gly Lys Val Lys
                85                  90                  95

Cys Val Ile Glu Glu Ile Ile Glu Asp Gly Glu Ser Ser Glu Val Lys
            100                 105                 110

Ala Leu Leu Asn Asp Glu Arg Tyr Lys Ser Phe Lys Leu Phe Thr Ser
        115                 120                 125

Val Phe Gly Val Gly Leu Lys Thr Ala Glu Arg Trp Phe Arg Met Gly
    130                 135                 140

Phe Arg Thr Leu Ser Thr Val Lys Leu Asp Lys Ser Leu Thr Phe Thr
145                 150                 155                 160

Arg Met Gln Lys Ala Gly Phe Leu His Tyr Glu Asp Leu Val Ser Cys
                165                 170                 175

Val Thr Arg Ala Glu Ala Glu Ala Val Ser Val Leu Val Gln Gln Ala
            180                 185                 190

Val Val Ala Phe Leu Pro Asp Ala Leu Val Ser Met Thr Gly Gly Phe
        195                 200                 205

Arg Arg Gly Lys Lys Ile Gly His Asp Val Asp Phe Leu Ile Thr Ser
    210                 215                 220
```

```
Pro Glu Ala Thr Glu Glu Glu Gln Gln Leu Leu His Lys Val Thr
225                 230                 235                 240

Asn Phe Trp Glu Gln Lys Gly Leu Leu Leu Tyr Cys Asp His Val Glu
            245                 250                 255

Ser Thr Phe Glu Lys Cys Lys Leu Pro Ser Arg Lys Val Asp Ala Leu
            260                 265                 270

Asp His Phe Gln Lys Cys Phe Leu Ile Leu Lys Leu Tyr Arg Glu Arg
            275                 280                 285

Val Asp Ser Val Lys Ser Ser Gln Gln Glu Gly Lys Gly Trp Lys Ala
            290                 295                 300

Ile Arg Val Asp Leu Val Met Cys Pro Tyr Glu Cys Arg Ala Phe Ala
305                 310                 315                 320

Leu Leu Gly Trp Thr Gly Ser Arg Gln Phe Glu Arg Asp Leu Arg Arg
            325                 330                 335

Tyr Ala Thr His Glu Arg Lys Met Arg Leu Asp Asn His Ala Leu Tyr
            340                 345                 350

Asp Lys Thr Lys Arg Val Phe Leu Lys Ala Glu Ser Glu Glu Ile
            355                 360                 365

Phe Ala His Leu Gly Leu Glu Tyr Ile Glu Pro Leu Glu Arg Asn Ala
            370                 375                 380

<210> SEQ ID NO 15
<211> LENGTH: 364
<212> TYPE: PRT
<213> ORGANISM: puma

<400> SEQUENCE: 15

Val Val Lys Lys Ile Pro Leu Tyr Ala Cys Gln Arg Arg Thr Thr Leu
1               5                   10                  15

Asn Asn Phe Asn His Ile Phe Thr Asp Ala Phe Glu Val Leu Ala Glu
            20                  25                  30

Asn Tyr Glu Phe Lys Glu Asn Glu Ile Ser Ser Ala Thr Phe Met Arg
            35                  40                  45

Ala Ala Ser Val Leu Lys Leu Pro Phe Thr Ile Ile Ser Met Lys Asp
50                  55                  60

Thr Glu Gly Ile Pro Cys Leu Gly Asp Lys Val Lys Cys Val Ile Glu
65                  70                  75                  80

Glu Ile Ile Glu Asp Gly Ser Ser Glu Val Lys Ala Val Leu Asn
            85                  90                  95

Asp Glu Arg Tyr Gln Ser Phe Lys Leu Phe Thr Ser Val Phe Gly Val
            100                 105                 110

Gly Leu Lys Thr Ser Glu Lys Trp Phe Arg Met Gly Phe Arg Thr Leu
            115                 120                 125

Ser Lys Ile Lys Ser Asp Lys Thr Leu Lys Phe Thr Gln Met Gln Lys
            130                 135                 140

Ala Gly Phe Leu Tyr Tyr Glu Asp Leu Val Ser Cys Val Thr Arg Ala
145                 150                 155                 160

Glu Ala Glu Ala Val Gly Val Leu Val Lys Glu Ala Val Trp Ala Phe
            165                 170                 175

Leu Pro Asp Ala Phe Val Thr Met Thr Gly Gly Phe Arg Arg Gly Lys
            180                 185                 190

Lys Ile Gly His Asp Val Asp Phe Leu Ile Thr Ile Pro Gly Ser Thr
            195                 200                 205

Asp Glu Glu Glu Glu Gln Leu Leu Pro Lys Val Ile Asn Leu Trp Gln
```

```
                210               215               220
Arg Lys Glu Leu Leu Tyr Tyr Asp Leu Val Glu Ser Thr Phe Glu
225                 230                 235                 240

Lys Leu Lys Leu Pro Ser Arg Lys Val Asp Ala Leu Asp His Phe Gln
                245                 250                 255

Lys Cys Phe Leu Ile Leu Lys Leu His His Gln Arg Val Asp Ser Gly
                260                 265                 270

Lys Cys Ser Gln Gln Glu Gly Lys Thr Trp Lys Ala Ile Arg Val Asp
                275                 280                 285

Leu Val Met Cys Pro Tyr Glu Arg Arg Ala Phe Ala Leu Leu Gly Trp
                290                 295                 300

Thr Gly Ser Arg Gln Phe Glu Arg Asp Leu Arg Arg Tyr Ala Thr His
305                 310                 315                 320

Glu Arg Lys Met Ile Leu Asp Asn His Ala Leu Tyr Asp Lys Thr Lys
                325                 330                 335

Lys Ile Phe Leu Lys Ala Glu Ser Glu Glu Ile Phe Ala His Leu
                340                 345                 350

Gly Leu Asp Tyr Ile Glu Pro Trp Glu Arg Asn Ala
                355                 360

<210> SEQ ID NO 16
<211> LENGTH: 362
<212> TYPE: PRT
<213> ORGANISM: mouse

<400> SEQUENCE: 16

Lys Ile Ser Gln Tyr Ala Cys Gln Arg Arg Thr Thr Leu Asn Asn Tyr
1                 5                  10                 15

Asn Gln Leu Phe Thr Asp Ala Leu Asp Ile Leu Ala Glu Asn Asp Glu
                20                  25                 30

Leu Arg Glu Asn Glu Gly Ser Cys Leu Ala Phe Met Arg Ala Ser Ser
                35                  40                 45

Val Leu Lys Ser Leu Pro Phe Pro Ile Thr Ser Met Lys Asp Thr Glu
50                  55                  60

Gly Ile Pro Cys Leu Gly Asp Lys Val Lys Ser Ile Ile Glu Gly Ile
65                  70                  75                 80

Ile Glu Asp Gly Glu Ser Ser Glu Ala Lys Ala Val Leu Asn Asp Glu
                85                  90                 95

Arg Tyr Lys Ser Phe Lys Leu Phe Thr Ser Val Phe Gly Val Gly Leu
                100                 105                110

Lys Thr Ala Glu Lys Trp Phe Arg Met Gly Phe Arg Thr Leu Ser Lys
                115                 120                 125

Ile Gln Ser Asp Lys Ser Leu Arg Phe Thr Gln Met Gln Lys Ala Gly
                130                 135                 140

Phe Leu Tyr Tyr Glu Asp Leu Val Ser Cys Val Asn Arg Pro Glu Ala
145                 150                 155                 160

Glu Ala Val Ser Met Leu Val Lys Glu Ala Val Val Thr Phe Leu Pro
                165                 170                 175

Asp Ala Leu Val Thr Met Thr Gly Gly Phe Arg Arg Gly Lys Met Thr
                180                 185                 190

Gly His Asp Val Asp Phe Leu Ile Thr Ser Pro Glu Ala Thr Glu Asp
                195                 200                 205

Glu Glu Gln Gln Leu Leu His Lys Val Thr Asp Phe Trp Lys Gln Gln
                210                 215                 220
```

```
Gly Leu Leu Leu Tyr Cys Asp Ile Leu Glu Ser Thr Phe Glu Lys Phe
225                 230                 235                 240

Lys Gln Pro Ser Arg Lys Val Asp Ala Leu Asp His Phe Gln Lys Cys
            245                 250                 255

Phe Leu Ile Leu Lys Leu Asp His Gly Arg Val His Ser Glu Lys Ser
            260                 265                 270

Gly Gln Gln Glu Gly Lys Gly Trp Lys Ala Ile Arg Val Asp Leu Val
            275                 280                 285

Met Cys Pro Tyr Asp Arg Arg Ala Phe Ala Leu Leu Gly Trp Thr Gly
290                 295                 300

Ser Arg Gln Phe Glu Arg Asp Leu Arg Arg Tyr Ala Thr His Glu Arg
305                 310                 315                 320

Lys Met Met Leu Asp Asn His Ala Leu Tyr Asp Arg Thr Lys Arg Val
                325                 330                 335

Phe Leu Glu Ala Glu Ser Glu Glu Ile Phe Ala His Leu Gly Leu
                340                 345                 350

Asp Tyr Ile Glu Pro Trp Glu Arg Asn Ala
            355                 360

<210> SEQ ID NO 17
<211> LENGTH: 361
<212> TYPE: PRT
<213> ORGANISM: Bovine

<400> SEQUENCE: 17

Lys Ile Ser Gln Tyr Ala Cys Gln Arg Lys Thr Thr Leu Asn Asn Tyr
1               5                   10                  15

Asn His Ile Phe Thr Asp Ala Phe Glu Ile Leu Ala Glu Asn Ser Glu
            20                  25                  30

Phe Lys Glu Asn Glu Val Ser Tyr Val Thr Phe Met Arg Ala Ala Ser
        35                  40                  45

Val Leu Lys Ser Leu Pro Phe Thr Ile Ile Ser Met Lys Asp Thr Glu
    50                  55                  60

Gly Ile Pro Cys Leu Gly Asp Lys Val Lys Cys Ile Glu Glu Ile
65                  70                  75                  80

Ile Glu Asp Gly Glu Ser Ser Glu Val Lys Ala Val Leu Asn Asp Glu
                85                  90                  95

Arg Tyr Gln Ser Phe Lys Leu Pro Thr Ser Val Phe Gly Val Gly Leu
            100                 105                 110

Lys Thr Ser Glu Lys Trp Phe Arg Met Gly Phe Arg Ser Leu Ser Lys
        115                 120                 125

Ile Met Ser Asp Lys Thr Leu Lys Phe Thr Lys Met Gln Lys Ala Gly
    130                 135                 140

Phe Leu Tyr Tyr Glu Asp Leu Val Ser Cys Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Phe Val Thr Met Thr Gly Gly Phe Arg Arg Gly Lys Lys Ile
            180                 185                 190

Gly His Asp Val Asp Phe Leu Ile Thr Ser Pro Gly Ser Ala Glu Asp
        195                 200                 205

Glu Glu Gln Leu Leu Pro Lys Val Ile Asn Leu Trp Glu Lys Lys Gly
    210                 215                 220

Leu Leu Leu Tyr Tyr Asp Leu Val Glu Ser Thr Phe Glu Lys Phe Lys
225                 230                 235                 240
```

```
Leu Pro Ser Arg Gln Val Asp Thr Leu Asp His Phe Gln Lys Cys Phe
                245                 250                 255

Leu Ile Leu Lys Leu His His Gln Arg Val Asp Ser Ser Lys Ser Asn
            260                 265                 270

Gln Gln Glu Gly Lys Thr Trp Lys Ala Ile Arg Val Asp Leu Val Met
        275                 280                 285

Cys Pro Tyr Glu Asn Arg Ala Phe Ala Leu Leu Gly Trp Thr Gly Ser
290                 295                 300

Arg Gln Phe Glu Arg Asp Ile Arg Arg Tyr Ala Thr His Glu Arg Lys
305                 310                 315                 320

Met Met Leu Asp Asn His Ala Leu Tyr Asp Lys Thr Lys Arg Val Phe
                325                 330                 335

Leu Lys Ala Glu Ser Glu Glu Ile Phe Ala His Leu Gly Leu Asp
            340                 345                 350

Tyr Ile Glu Pro Trp Glu Arg Asn Ala
            355                 360

<210> SEQ ID NO 18
<211> LENGTH: 361
<212> TYPE: PRT
<213> ORGANISM: Human

<400> SEQUENCE: 18

Lys Ile Ser Gln Tyr Ala Cys Gln Arg Arg Thr Thr Leu Asn Asn Cys
1               5                   10                  15

Asn Gln Ile Phe Thr Asp Ala Phe Asp Ile Leu Ala Glu Asn Cys Glu
            20                  25                  30

Phe Arg Glu Asn Glu Asp Ser Cys Val Thr Phe Met Arg Ala Ala Ser
        35                  40                  45

Val Leu Lys Ser Leu Pro Phe Thr Ile Ser Met Lys Asp Thr Glu
    50                  55                  60

Gly Ile Pro Cys Leu Gly Ser Lys Val Lys Gly Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Gln Ser Phe Lys Leu Phe Thr Ser Val Phe Gly Val Gly Leu
            100                 105                 110

Lys Thr Ser Glu Lys Trp Phe Arg Met Gly Phe Arg Thr Leu Ser Lys
        115                 120                 125

Val Arg Ser Asp Lys Ser Leu Lys Phe Thr Arg Met Gln Lys Ala Gly
    130                 135                 140

Phe Leu Tyr Tyr Glu Asp Leu Val Ser Cys Val Thr Arg Ala Glu Ala
145                 150                 155                 160

Glu Ala Val Ser Val Leu Val Lys Glu Ala Val Trp Ala Phe Leu Pro
                165                 170                 175

Asp Ala Phe Val Thr Met Thr Gly Gly Phe Arg Arg Gly Lys Lys Met
            180                 185                 190

Gly His Asp Val Asp Phe Leu Ile Thr Ser Pro Gly Ser Thr Glu Asp
        195                 200                 205

Glu Glu Gln Leu Leu Gln Lys Val Met Asn Leu Trp Glu Lys Lys Gly
    210                 215                 220

Leu Leu Leu Tyr Tyr Asp Leu Val Glu Ser Thr Phe Glu Lys Leu Arg
225                 230                 235                 240

Leu Pro Ser Arg Lys Val Asp Ala Leu Asp His Phe Gln Lys Cys Phe
```

```
                        245                 250                 255
Leu Ile Phe Lys Leu Pro Arg Gln Arg Val Asp Ser Asp Gln Ser Ser
                260                 265                 270

Trp Gln Glu Gly Lys Thr Trp Lys Ala Ile Arg Val Asp Leu Val Leu
            275                 280                 285

Cys Pro Tyr Glu Arg Arg Ala Phe Ala Leu Leu Gly Trp Thr Gly Ser
290                 295                 300

Arg Gln Phe Glu Arg Asp Leu Arg Arg Tyr Ala Thr His Glu Arg Lys
305                 310                 315                 320

Met Ile Leu Asp Asn His Ala Leu Tyr Asp Lys Thr Lys Arg Ile Phe
                325                 330                 335

Leu Lys Ala Glu Ser Glu Glu Ile Phe Ala His Leu Gly Leu Asp
            340                 345                 350

Tyr Ile Glu Pro Trp Glu Arg Asn Ala
            355                 360
```

<210> SEQ ID NO 19
<211> LENGTH: 358
<212> TYPE: PRT
<213> ORGANISM: Chicken

<400> SEQUENCE: 19

```
Lys Val Ser Gln Tyr Ser Cys Gln Arg Lys Thr Thr Leu Asn Asn Cys
1               5                   10                  15

Asn Lys Lys Phe Thr Asp Ala Phe Glu Ile Met Ala Glu Asn Tyr Glu
                20                  25                  30

Phe Lys Glu Asn Glu Ile Phe Cys Leu Glu Phe Leu Arg Ala Ala Ser
            35                  40                  45

Val Leu Lys Ser Leu Pro Phe Pro Val Thr Arg Met Lys Asp Ile Gln
        50                  55                  60

Gly Leu Pro Cys Met Gly Asp Arg Val Arg Asp Val Ile Glu Glu Ile
65                  70                  75                  80

Ile Glu Glu Gly Glu Ser Ser Arg Ala Lys Asp Val Leu Asn Asp Glu
                85                  90                  95

Arg Tyr Lys Ser Phe Lys Glu Phe Thr Ser Val Phe Gly Val Gly Val
            100                 105                 110

Lys Thr Ser Glu Lys Trp Phe Arg Met Gly Leu Arg Thr Val Glu Glu
        115                 120                 125

Val Lys Ala Asp Lys Thr Leu Lys Leu Ser Lys Met Gln Arg Ala Gly
    130                 135                 140

Phe Leu Tyr Tyr Glu Asp Leu Val Ser Cys Val Ser Lys Ala Glu Ala
145                 150                 155                 160

Asp Ala Val Ser Ser Ile Val Lys Asn Thr Val Cys Thr Phe Leu Pro
                165                 170                 175

Asp Ala Leu Val Thr Ile Thr Gly Gly Phe Arg Arg Gly Lys Lys Ile
            180                 185                 190

Gly His Asp Ile Asp Phe Leu Ile Thr Ser Pro Gly Gln Arg Glu Asp
        195                 200                 205

Asp Glu Leu Leu His Lys Gly Leu Leu Leu Tyr Cys Asp Ile Ile Glu
    210                 215                 220

Ser Thr Phe Val Lys Glu Gln Ile Pro Ser Arg His Val Asp Ala Met
225                 230                 235                 240

Asp His Phe Gln Lys Cys Phe Ala Ile Leu Lys Leu Tyr Gln Pro Arg
                245                 250                 255
```

```
Val Asp Asn Ser Ser Tyr Asn Met Ser Lys Lys Cys Asp Met Ala Glu
            260                 265                 270

Val Lys Asp Trp Lys Ala Ile Arg Val Asp Leu Val Ile Thr Pro Phe
            275                 280                 285

Glu Gln Tyr Ala Tyr Ala Leu Leu Gly Trp Thr Gly Ser Arg Gln Phe
            290                 295                 300

Gly Arg Asp Leu Arg Arg Tyr Ala Thr His Glu Arg Lys Met Met Leu
305                 310                 315                 320

Asp Asn His Ala Leu Tyr Asp Lys Arg Lys Arg Val Phe Leu Lys Ala
                    325                 330                 335

Gly Ser Glu Glu Glu Ile Phe Ala His Leu Gly Leu Asp Tyr Val Glu
            340                 345                 350

Pro Trp Glu Arg Asn Ala
            355

<210> SEQ ID NO 20
<211> LENGTH: 368
<212> TYPE: PRT
<213> ORGANISM: Possum

<400> SEQUENCE: 20

Thr Ile Ser Gln Tyr Ala Cys Gln Arg Arg Thr Thr Ile Asn Asn His
1               5                   10                  15

Asn Gln Arg Phe Thr Asp Ala Phe Glu Ile Leu Ala Lys Asn Tyr Glu
            20                  25                  30

Phe Lys Glu Asn Asp Asp Thr Cys Leu Thr Phe Met Arg Ala Ile Ser
            35                  40                  45

Val Leu Lys Cys Leu Pro Phe Glu Val Val Ser Leu Lys Asp Thr Glu
50                  55                  60

Gly Leu Pro Trp Ile Gly Asp Glu Val Lys Gly Ile Met Glu Glu Ile
65                  70                  75                  80

Ile Glu Asp Gly Glu Ser Leu Glu Val Gln Ala Val Leu Asn Asp Glu
                    85                  90                  95

Arg Tyr Gln Ser Phe Lys Leu Phe Thr Ser Val Phe Gly Val Gly Leu
            100                 105                 110

Lys Thr Ala Asp Lys Trp Tyr Arg Met Gly Phe Arg Thr Leu Asn Lys
            115                 120                 125

Ile Arg Ser Asp Lys Thr Leu Lys Leu Thr Lys Met Gln Lys Ala Gly
            130                 135                 140

Leu Cys Tyr Tyr Glu Asp Leu Ile Asp Cys Val Ser Lys Ala Glu Ala
145                 150                 155                 160

Asp Ala Val Ser Leu Leu Val Gln Asp Ala Val Trp Thr Phe Leu Pro
                    165                 170                 175

Asp Ala Leu Val Thr Ile Thr Gly Gly Phe Arg Arg Gly Lys Glu Phe
            180                 185                 190

Gly His Asp Val Asp Phe Leu Ile Thr Ser Pro Gly Ala Glu Lys Glu
            195                 200                 205

Gln Glu Asp Gln Leu Leu Gln Lys Val Thr Asn Leu Trp Lys Lys Gln
            210                 215                 220

Gly Leu Leu Leu Tyr Cys Asp Leu Ile Glu Ser Thr Phe Glu Asp Leu
225                 230                 235                 240

Lys Leu Pro Ser Arg Lys Ile Asp Ala Leu Asp His Phe Gln Lys Cys
                    245                 250                 255

Phe Leu Ile Leu Lys Leu Tyr His His Lys Glu Asp Lys Arg Lys Trp
            260                 265                 270
```

```
Glu Met Pro Thr Gly Ser Asn Glu Ser Glu Ala Lys Ser Trp Lys Ala
            275                 280                 285

Ile Arg Val Asp Leu Val Val Cys Pro Tyr Asp Arg Tyr Ala Phe Ala
        290                 295                 300

Leu Leu Gly Trp Ser Gly Ser Arg Gln Phe Glu Arg Asp Leu Arg Arg
305                 310                 315                 320

Tyr Ala Thr His Glu Lys Lys Met Met Leu Asp Asn His Ala Leu Tyr
                325                 330                 335

Asp Lys Thr Lys Lys Ile Phe Leu Lys Ala Lys Ser Glu Glu Glu Ile
                340                 345                 350

Phe Ala His Leu Gly Leu Glu Tyr Ile Gln Pro Ser Glu Arg Asn Ala
                355                 360                 365

<210> SEQ ID NO 21
<211> LENGTH: 362
<212> TYPE: PRT
<213> ORGANISM: shrew

<400> SEQUENCE: 21

Lys Ile Ser Gln Tyr Ala Cys Gln Arg Arg Thr Thr Leu Asn Asn His
1               5                   10                  15

Asn His Ile Phe Thr Asp Ala Phe Glu Ile Leu Ala Glu Asn Cys Glu
                20                  25                  30

Phe Arg Glu Asn Glu Gly Ser Tyr Val Thr Tyr Met Arg Ala Ala Ser
            35                  40                  45

Val Leu Lys Ser Leu Pro Phe Ser Ile Ile Ser Met Lys Asp Thr Glu
    50                  55                  60

Gly Ile Pro Cys Leu Ala Asp Lys Val Lys Cys Val Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ser Phe Lys Leu Phe Thr Ser Val Phe Gly Val Gly Leu
            100                 105                 110

Lys Thr Ala Glu Lys Trp Phe Arg Leu Gly Phe Arg Thr Leu Ser Gly
            115                 120                 125

Ile Met Asn Asp Lys Thr Leu Lys Leu Thr His Met Gln Lys Ala Gly
        130                 135                 140

Phe Leu Tyr Tyr Glu Asp Leu Val Ser Cys Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Ile Val Thr Met Thr Gly Gly Phe Arg Arg Gly Lys Lys Val
            180                 185                 190

Gly His Asp Val Asp Phe Leu Ile Thr Ser Pro Glu Ala Thr Glu Glu
        195                 200                 205

Gln Glu Gln Gln Leu Leu His Lys Val Ile Thr Phe Trp Glu Lys Glu
    210                 215                 220

Gly Leu Leu Leu Tyr Cys Asp Leu Tyr Glu Ser Thr Phe Glu Lys Leu
225                 230                 235                 240

Lys Met Pro Ser Arg Lys Val Asp Ala Leu Asp His Phe Gln Lys Cys
                245                 250                 255

Phe Leu Ile Leu Lys Leu His Arg Glu Cys Val Asp Asp Gly Thr Ser
            260                 265                 270

Ser Gln Leu Gln Gly Lys Thr Trp Lys Ala Ile Arg Val Asp Leu Val
```

```
            275                 280                 285
Val Cys Pro Tyr Glu Cys Arg Ala Phe Ala Leu Leu Gly Trp Thr Gly
    290                 295                 300

Ser Pro Gln Phe Glu Arg Asp Leu Arg Arg Tyr Ala Thr His Glu Arg
305                 310                 315                 320

Lys Met Met Leu Asp Asn His Ala Leu Tyr Asp Lys Thr Lys Arg Lys
                325                 330                 335

Phe Leu Ser Ala Asp Ser Glu Glu Asp Ile Phe Ala His Leu Gly Leu
            340                 345                 350

Asp Tyr Ile Glu Pro Trp Glu Arg Asn Ala
            355                 360

<210> SEQ ID NO 22
<211> LENGTH: 362
<212> TYPE: PRT
<213> ORGANISM: dog

<400> SEQUENCE: 22

Lys Ile Ser Gln Tyr Ala Cys Gln Arg Arg Thr Thr Leu Asn Asn Tyr
1               5                   10                  15

Asn Asn Val Phe Thr Asp Ala Phe Glu Val Leu Ala Glu Asn Tyr Glu
            20                  25                  30

Phe Arg Glu Asn Glu Val Phe Ser Leu Thr Phe Met Arg Ala Ala Ser
        35                  40                  45

Val Leu Lys Ser Leu Pro Phe Thr Ile Ile Ser Met Lys Asp Thr Glu
    50                  55                  60

Gly Ile Pro Cys Leu Gly Asp Gln Val Lys Cys Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Gln Ser Phe Lys Leu Phe Thr Ser Val Phe Gly Val Gly Leu
            100                 105                 110

Lys Thr Ser Glu Lys Trp Phe Arg Met Gly Phe Arg Thr Leu Ser Lys
        115                 120                 125

Ile Lys Ser Asp Lys Ser Leu Lys Phe Thr Pro Met Gln Lys Ala Gly
    130                 135                 140

Phe Leu Tyr Tyr Glu Asp Leu Val Ser Cys Val Thr Arg Ala Glu Ala
145                 150                 155                 160

Glu Ala Val Gly Val Leu Val Lys Glu Ala Val Gly Ala Phe Leu Pro
                165                 170                 175

Asp Ala Phe Val Thr Met Thr Gly Gly Phe Arg Arg Gly Lys Lys Met
            180                 185                 190

Gly His Asp Val Asp Phe Leu Ile Thr Ser Pro Gly Ser Thr Asp Glu
        195                 200                 205

Asp Glu Glu Gln Leu Leu Pro Lys Val Ile Asn Leu Trp Glu Arg Lys
    210                 215                 220

Gly Leu Leu Leu Tyr Cys Asp Leu Val Glu Ser Thr Phe Glu Lys Leu
225                 230                 235                 240

Lys Leu Pro Ser Arg Lys Val Asp Ala Leu Asp His Phe Gln Lys Cys
                245                 250                 255

Phe Leu Ile Leu Lys Leu His His Gln Arg Val Asp Gly Gly Lys Cys
            260                 265                 270

Ser Gln Gln Glu Gly Lys Thr Trp Lys Ala Ile Arg Val Asp Leu Val
        275                 280                 285
```

```
Met Cys Pro Tyr Glu Arg Arg Ala Phe Ala Leu Leu Gly Trp Thr Gly
    290                 295                 300

Ser Arg Gln Phe Glu Arg Asp Leu Arg Arg Tyr Ala Ser His Glu Arg
305                 310                 315                 320

Lys Met Ile Leu Asp Asn His Ala Leu Tyr Asp Lys Thr Lys Lys Ile
                325                 330                 335

Phe Leu Lys Ala Glu Ser Glu Glu Ile Phe Ala His Leu Gly Leu
            340                 345                 350

Asp Tyr Ile Glu Pro Trp Glu Arg Asn Ala
            355                 360
```

<210> SEQ ID NO 23
<211> LENGTH: 362
<212> TYPE: PRT
<213> ORGANISM: MOLE

<400> SEQUENCE: 23

```
Lys Ile Ser Gln Tyr Ala Cys Gln Arg Arg Thr Thr Leu Asn Asn His
1               5                   10                  15

Asn His Ile Phe Thr Asp Ala Phe Glu Ile Leu Ala Glu Asn Cys Glu
                20                  25                  30

Phe Arg Glu Asn Glu Gly Ser Tyr Val Thr Tyr Met Arg Ala Ala Ser
            35                  40                  45

Val Leu Lys Ser Leu Pro Phe Ser Ile Ile Ser Met Lys Asp Thr Glu
50                  55                  60

Gly Ile Pro Cys Leu Ala Asp Lys Val Lys Cys Val Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ser Phe Lys Leu Phe Thr Ser Val Phe Gly Val Gly Leu
            100                 105                 110

Lys Thr Ala Glu Lys Trp Phe Arg Leu Gly Phe Arg Thr Leu Ser Gly
            115                 120                 125

Ile Met Asn Asp Lys Thr Leu Lys Leu Thr His Met Gln Lys Ala Gly
130                 135                 140

Phe Leu Tyr Tyr Glu Asp Leu Val Ser Cys Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Ile Val Thr Met Thr Gly Gly Phe Arg Arg Gly Lys Lys Val
            180                 185                 190

Gly His Asp Val Asp Phe Leu Ile Thr Ser Pro Glu Ala Thr Glu Glu
            195                 200                 205

Gln Glu Gln Gln Leu Leu His Lys Val Ile Thr Phe Trp Glu Lys Glu
        210                 215                 220

Gly Leu Leu Leu Tyr Cys Asp Leu Tyr Glu Ser Thr Phe Glu Lys Leu
225                 230                 235                 240

Lys Met Pro Ser Arg Lys Val Asp Ala Leu Asp His Phe Gln Lys Cys
                245                 250                 255

Phe Leu Ile Leu Lys Leu His Arg Glu Cys Val Asp Asp Gly Thr Ser
            260                 265                 270

Ser Gln Leu Gln Gly Lys Thr Trp Lys Ala Ile Arg Val Asp Leu Val
        275                 280                 285

Val Cys Pro Tyr Glu Cys Arg Ala Phe Ala Leu Leu Gly Trp Thr Gly
290                 295                 300
```

Ser Pro Gln Phe Glu Arg Asp Leu Arg Arg Tyr Ala Thr His Glu Arg
305                 310                 315                 320

Lys Met Met Leu Asp Asn His Ala Leu Tyr Asp Lys Thr Lys Arg Lys
                325                 330                 335

Phe Leu Ser Ala Asp Ser Glu Glu Asp Ile Phe Ala His Leu Gly Leu
                340                 345                 350

Asp Tyr Ile Glu Pro Trp Glu Arg Asn Ala
        355                 360

<210> SEQ ID NO 24
<211> LENGTH: 362
<212> TYPE: PRT
<213> ORGANISM: Pika

<400> SEQUENCE: 24

Lys Ile Ser Gln Tyr Ala Cys Gln Arg Arg Thr Thr Leu Asn Asn His
1               5                   10                  15

Asn His Ile Phe Thr Asp Ala Phe Glu Ile Leu Ala Glu Asn Tyr Glu
            20                  25                  30

Phe Lys Glu Asn Glu Gly Cys Tyr Val Thr Tyr Met Arg Ala Ala Ser
        35                  40                  45

Val Leu Lys Ser Leu Pro Phe Thr Ile Val Ser Met Lys Asp Thr Glu
50                  55                  60

Gly Ile Pro Cys Leu Glu Asp Lys Val Lys Ser Ile Met Glu Glu Ile
65                  70                  75                  80

Ile Glu Glu Gly Glu Ser Ser Glu Val Lys Ala Val Leu Ser Asp Glu
                85                  90                  95

Arg Tyr Gln Cys Phe Lys Leu Phe Thr Ser Val Phe Gly Val Gly Leu
            100                 105                 110

Lys Thr Ser Glu Lys Trp Phe Arg Met Gly Phe Arg Ser Leu Ser Asn
        115                 120                 125

Ile Arg Leu Asp Lys Ser Leu Lys Phe Thr Gln Met Gln Lys Ala Gly
130                 135                 140

Phe Arg Tyr Tyr Glu Asp Ile Val Ser Cys Val Thr Arg Ala Glu Ala
145                 150                 155                 160

Glu Ala Val Asp Val Leu Val Asn Glu Ala Val Arg Ala Phe Leu Pro
                165                 170                 175

Asp Ala Phe Ile Thr Met Thr Gly Gly Phe Arg Arg Gly Lys Lys Ile
            180                 185                 190

Gly His Asp Val Asp Phe Leu Ile Thr Ser Pro Glu Leu Thr Glu Glu
        195                 200                 205

Asp Glu Gln Gln Leu Leu His Lys Val Met Asn Leu Trp Glu Lys Lys
210                 215                 220

Gly Leu Leu Leu Tyr His Asp Leu Val Glu Ser Thr Phe Glu Lys Leu
225                 230                 235                 240

Lys Gln Pro Ser Arg Lys Val Asp Ala Leu Asp His Phe Gln Lys Cys
                245                 250                 255

Phe Leu Ile Phe Lys Leu Tyr His Glu Arg Val Gly Gly Asp Arg Cys
            260                 265                 270

Arg Gln Pro Glu Gly Lys Asp Trp Lys Ala Ile Arg Val Asp Leu Val
        275                 280                 285

Met Cys Pro Tyr Glu Cys His Ala Phe Ala Leu Leu Gly Trp Thr Gly
290                 295                 300

Ser Arg Gln Phe Glu Arg Asp Leu Arg Arg Tyr Ala Ser His Glu Arg

```
                305                 310                 315                 320
Lys Met Ile Leu Asp Asn His Ala Leu Tyr Asp Lys Thr Lys Arg Val
                325                 330                 335

Phe Leu Gln Ala Glu Asn Glu Glu Ile Phe Ala His Leu Gly Leu
                340                 345                 350

Asp Tyr Ile Glu Pro Trp Glu Arg Asn Ala
                355                 360

<210> SEQ ID NO 25
<211> LENGTH: 365
<212> TYPE: PRT
<213> ORGANISM: TRUNC HEDGEHOG

<400> SEQUENCE: 25

Lys Ile Ser Gln Tyr Ala Cys Gln Arg Thr Ser Leu Asn Asn Cys
1               5                   10                  15

Asn His Ile Phe Thr Asp Ala Leu Asp Ile Leu Ala Glu Asn His Glu
                20                  25                  30

Phe Arg Glu Asn Glu Val Ser Cys Val Ala Phe Met Arg Ala Ala Ser
                35                  40                  45

Val Leu Lys Ser Leu Pro Phe Thr Ile Ile Ser Met Lys Asp Thr Lys
50                  55                  60

Gly Ile Pro Cys Leu Gly Asp Lys Ala Lys Cys Val Ile Glu Ile
65                  70                  75                  80

Ile Glu Asp Gly Glu Ser Ser Glu Val Lys Ala Ile Leu Asn Asp Glu
                85                  90                  95

Arg Tyr Gln Ser Phe Lys Leu Phe Thr Ser Val Phe Gly Val Gly Leu
                100                 105                 110

Lys Thr Ser Glu Lys Trp Phe Arg Met Gly Phe Arg Thr Leu Asn Lys
                115                 120                 125

Ile Met Ser Asp Lys Thr Leu Lys Leu Thr Arg Met Gln Lys Ala Gly
                130                 135                 140

Phe Leu Tyr Tyr Glu Asp Leu Val Ser Cys Val Ala Lys Ala Glu Ala
145                 150                 155                 160

Asp Ala Val Ser Val Leu Val Gln Glu Ala Val Trp Ala Phe Leu Pro
                165                 170                 175

Asp Ala Met Val Thr Met Thr Gly Gly Phe Arg Arg Gly Lys Lys Leu
                180                 185                 190

Gly His Asp Val Asp Phe Leu Ile Thr Ser Pro Gly Ala Thr Glu Glu
                195                 200                 205

Glu Glu Gln Gln Leu Leu Pro Lys Val Ile Asn Phe Trp Glu Arg Lys
                210                 215                 220

Gly Leu Leu Leu Tyr His Asp Leu Val Glu Ser Thr Phe Glu Lys Leu
225                 230                 235                 240

Lys Leu Pro Ser Arg Lys Val Asp Ala Leu Asp His Phe Gln Lys Cys
                245                 250                 255

Phe Leu Ile Leu Lys Leu His His Gln His Val Asn Gly Val Gly Asn
                260                 265                 270

Ser Lys Thr Gly Gln Gln Glu Gly Lys Asn Trp Lys Ala Ile Arg Val
                275                 280                 285

Asp Leu Val Met Cys Pro Tyr Glu Arg Arg Ala Phe Ala Leu Leu Gly
                290                 295                 300

Trp Thr Gly Ser Arg Gln Phe Glu Arg Asp Leu Arg Arg Phe Ala Thr
305                 310                 315                 320
```

```
His Glu Arg Lys Met Met Leu Asp Asn His Ala Leu Tyr Asp Lys Thr
                    325                 330                 335

Lys Arg Ile Phe Leu Lys Ala Glu Ser Glu Glu Ile Phe Ala His
            340                 345                 350

Leu Gly Leu Asp Tyr Ile Asp Pro Trp Glu Arg Asn Ala
        355                 360                 365

<210> SEQ ID NO 26
<211> LENGTH: 362
<212> TYPE: PRT
<213> ORGANISM: tree shrew

<400> SEQUENCE: 26

Lys Ile Ser Gln Tyr Ala Cys Gln Arg Arg Thr Thr Leu Asn Asn Cys
1               5                   10                  15

Asn Arg Val Phe Thr Asp Ala Phe Glu Thr Leu Ala Glu Asn Tyr Glu
            20                  25                  30

Phe Arg Glu Asn Glu Asp Ser Ser Val Ile Phe Leu Arg Ala Ala Ser
        35                  40                  45

Val Leu Arg Ser Leu Pro Phe Thr Ile Thr Ser Met Arg Asp Thr Glu
50                  55                  60

Gly Leu Pro Cys Leu Gly Asp Lys Val Lys Cys Val Ile Glu Glu Ile
65                  70                  75                  80

Ile Glu Asp Gly Glu Ser Ser Glu Val Asn Ala Val Leu Asn Asp Glu
                85                  90                  95

Arg Tyr Lys Ser Phe Lys Leu Phe Thr Ser Val Phe Gly Val Gly Leu
            100                 105                 110

Lys Thr Ser Glu Lys Trp Phe Arg Met Gly Phe Arg Thr Leu Ser Arg
        115                 120                 125

Val Arg Ser Asp Lys Ser Leu His Leu Thr Arg Met Gln Gln Ala Gly
130                 135                 140

Phe Leu Tyr Tyr Glu Asp Leu Ala Ser Cys Val Thr Arg Ala Glu Ala
145                 150                 155                 160

Glu Ala Val Gly Val Leu Val Lys Glu Ala Val Gly Ala Phe Leu Pro
                165                 170                 175

Asp Ala Leu Val Thr Ile Thr Gly Gly Phe Arg Arg Gly Lys Lys Thr
            180                 185                 190

Gly His Asp Val Asp Phe Leu Ile Thr Ser Pro Gly Ser Thr Glu Glu
        195                 200                 205

Lys Glu Glu Glu Leu Leu Gln Lys Val Leu Asn Leu Trp Glu Lys Lys
210                 215                 220

Gly Leu Leu Leu Tyr Tyr Asp Leu Val Glu Ser Thr Phe Glu Lys Leu
225                 230                 235                 240

Lys Thr Pro Ser Arg Lys Val Asp Ala Leu Asp His Phe Pro Lys Cys
                245                 250                 255

Phe Leu Ile Leu Lys Leu His His Gln Arg Val Asp Gly Asp Lys Pro
            260                 265                 270

Ser Gln Gln Glu Gly Lys Ser Trp Lys Ala Ile Arg Val Asp Leu Val
        275                 280                 285

Met Cys Pro Tyr Glu Arg His Ala Phe Ala Leu Leu Gly Trp Thr Gly
290                 295                 300

Ser Arg Gln Phe Glu Arg Asp Leu Arg Arg Tyr Ala Thr His Glu Arg
305                 310                 315                 320

Lys Met Met Leu Asp Asn His Ala Leu Tyr Asp Lys Thr Lys Arg Val
                325                 330                 335
```

Phe Leu Lys Ala Glu Ser Glu Asp Ile Phe Ala His Leu Gly Leu
                340                 345                 350

Asp Tyr Ile Glu Pro Trp Glu Arg Asn Ala
            355                 360

<210> SEQ ID NO 27
<211> LENGTH: 375
<212> TYPE: PRT
<213> ORGANISM: TRUNCATED PLATYPUS

<400> SEQUENCE: 27

Gln Val Ser Gln Tyr Ala Cys Glu Arg Arg Thr Thr Leu Asn Asn Cys
1               5                   10                  15

Asn Gln Lys Phe Thr Asp Ala Phe Glu Ile Leu Ala Lys Asp Phe Glu
            20                  25                  30

Phe Arg Glu Asn Glu Gly Ile Cys Leu Ala Phe Met Arg Ala Ile Ser
        35                  40                  45

Val Leu Lys Cys Leu Pro Phe Thr Ile Val Arg Met Lys Asp Ile Glu
    50                  55                  60

Gly Val Pro Trp Leu Gly Asp Gln Val Lys Ser Ile Ile Glu Glu Ile
65                  70                  75                  80

Ile Glu Asp Gly Glu Ser Ser Val Lys Ala Val Leu Asn Asp Glu
                85                  90                  95

Arg Tyr Arg Ser Phe Gln Leu Phe Asn Ser Val Phe Glu Val Gly Leu
            100                 105                 110

Thr Asp Asn Gly Glu Asn Gly Ile Ala Arg Gly Phe Gln Thr Leu Asn
        115                 120                 125

Glu Val Ile Thr Asp Glu Asn Ile Ser Leu Thr Lys Thr Thr Leu Ser
    130                 135                 140

Thr Ser Leu Trp Asn Tyr Leu Pro Gly Phe Leu Tyr Tyr Glu Asp Leu
145                 150                 155                 160

Val Ser Cys Val Ala Lys Glu Glu Ala Asp Ala Val Tyr Leu Ile Val
                165                 170                 175

Lys Glu Ala Val Arg Ala Phe Leu Pro Glu Ala Leu Val Thr Leu Thr
            180                 185                 190

Gly Gly Phe Arg Arg Gly Lys Lys Ile Gly His Asp Val Asp Phe Leu
        195                 200                 205

Ile Ser Asp Pro Glu Ser Gly Gln Asp Glu Gln Leu Leu Pro Asn Ile
    210                 215                 220

Ile Lys Leu Trp Glu Lys Gln Glu Leu Leu Tyr Tyr Asp Leu Val
225                 230                 235                 240

Glu Ser Thr Phe Glu Lys Thr Lys Ile Pro Ser Arg Lys Val Asp Ala
                245                 250                 255

Met Asp His Phe Gln Lys Cys Phe Leu Ile Leu Lys Leu His His Gln
            260                 265                 270

Lys Val Asp Ser Gly Arg Tyr Lys Pro Pro Glu Ser Lys Asn His
        275                 280                 285

Glu Ala Lys Asn Trp Lys Ala Ile Arg Val Asp Leu Val Met Cys Pro
    290                 295                 300

Phe Glu Gln Tyr Ala Tyr Ala Leu Leu Gly Trp Thr Gly Ser Arg Gln
305                 310                 315                 320

Phe Glu Arg Asp Leu Arg Arg Tyr Ala Thr His Glu Lys Lys Met Met
                325                 330                 335

Leu Asp Asn His Ala Leu Tyr Asp Lys Thr Lys Lys Ile Phe Leu Lys

Ala Glu Ser Glu Glu Asp Ile Phe Thr His Leu Gly Leu Asp Tyr Ile
                355                 360                 365

Glu Pro Trp Glu Arg Asn Ala
370                 375

<210> SEQ ID NO 28
<211> LENGTH: 365
<212> TYPE: PRT
<213> ORGANISM: Serinus canaria

<400> SEQUENCE: 28

Lys Val Ser Gln Tyr Ser Cys Gln Arg Lys Thr Thr Leu Asn Asn Tyr
1               5                   10                  15

Asn Lys Lys Phe Thr Asp Ala Phe Glu Val Met Ala Glu Asn Tyr Glu
                20                  25                  30

Phe Lys Glu Asn Glu Ile Phe Cys Leu Glu Phe Leu Arg Ala Ala Ser
                35                  40                  45

Leu Leu Lys Ser Leu Pro Phe Ser Val Thr Arg Met Lys Asp Ile Gln
50                  55                  60

Gly Leu Pro Cys Met Gly Asp Gln Val Arg Asp Val Ile Glu Ile Ile
65                  70                  75                  80

Glu Glu Gly Glu Ser Ser Arg Val Lys Glu Val Leu Asn Asp Glu Arg
                85                  90                  95

Tyr Lys Ala Phe Lys Gln Phe Thr Ser Val Phe Gly Val Gly Val Lys
                100                 105                 110

Thr Ser Glu Lys Trp Tyr Arg Met Gly Leu Arg Thr Val Gly Glu Val
                115                 120                 125

Lys Ala Asp Lys Thr Leu Lys Leu Ser Lys Met Gln Lys Ala Gly Phe
130                 135                 140

Leu Tyr Tyr Glu Asp Leu Val Ser Cys Val Ser Lys Ala Glu Ala Asp
145                 150                 155                 160

Ala Val Ser Leu Ile Val Lys Asn Thr Val Cys Thr Phe Leu Pro Asp
                165                 170                 175

Ala Leu Val Thr Ile Thr Gly Gly Phe Arg Arg Gly Lys Asn Ile Gly
                180                 185                 190

His Asp Ile Asp Phe Leu Ile Thr Asn Pro Gly Pro Arg Glu Asp Asp
                195                 200                 205

Glu Leu Leu His Lys Val Ile Asp Leu Trp Lys Lys Gln Gly Leu Leu
                210                 215                 220

Leu Tyr Cys Asp Ile Ile Glu Ser Thr Phe Val Lys Glu Gln Leu Pro
225                 230                 235                 240

Ser Arg Lys Ile Asp Ala Met Asp His Phe Gln Lys Cys Phe Ala Ile
                245                 250                 255

Leu Lys Leu Tyr Gln Pro Arg Val Asp Asn Ser Thr Cys Asn Thr Ser
                260                 265                 270

Lys Lys Leu Glu Met Ala Glu Val Lys Asp Trp Lys Ala Ile Arg Val
                275                 280                 285

Asp Leu Val Ile Thr Pro Phe Glu Gln Tyr Ser Tyr Ala Leu Leu Gly
                290                 295                 300

Trp Thr Gly Ser Arg Gln Phe Gly Arg Asp Leu Arg Arg Tyr Ala Ala
305                 310                 315                 320

His Glu Arg Arg Met Ile Leu Asp Asn His Gly Leu Tyr Asp Arg Thr
                325                 330                 335

```
Lys Arg Ile Phe Leu Lys Ala Gly Ser Glu Glu Ile Phe Ala His
            340                 345                 350

Leu Gly Leu Asp Tyr Val Glu Pro Trp Glu Arg Asn Ala
        355                 360                 365

<210> SEQ ID NO 29
<211> LENGTH: 366
<212> TYPE: PRT
<213> ORGANISM: Neopelma chrysocephalum

<400> SEQUENCE: 29

Lys Val Ser Gln Tyr Ser Cys Gln Arg Lys Thr Thr Leu Asn Asn Tyr
1               5                   10                  15

Asn Lys Lys Phe Thr Asp Ala Phe Glu Ile Met Ala Glu Asn Tyr Glu
            20                  25                  30

Phe Lys Glu Asn Glu Ile Phe Cys Leu Glu Phe Leu Arg Ala Ala Ser
        35                  40                  45

Leu Leu Lys Tyr Leu Pro Phe Pro Val Thr Arg Met Lys Asp Ile Gln
    50                  55                  60

Gly Leu Pro Cys Ile Gly Asp Gln Val Arg Asp Val Ile Glu Gly Ile
65                  70                  75                  80

Ile Glu Glu Gly Glu Ser Ser Arg Val Lys Val Leu Asn Asp Glu
                85                  90                  95

Arg Tyr Lys Ala Phe Lys Gln Phe Thr Ser Val Phe Gly Val Gly Val
                100                 105                 110

Lys Thr Ser Glu Lys Trp Tyr Arg Met Gly Leu Arg Thr Val Glu Glu
            115                 120                 125

Leu Lys Ala Asp Lys Thr Leu Lys Leu Ser Lys Met Gln Lys Ala Gly
        130                 135                 140

Phe Leu Tyr Tyr Glu Asp Leu Val Ser Cys Val Ser Lys Ala Glu Ala
145                 150                 155                 160

Asp Ala Val Thr Leu Ile Val Lys Asn Thr Val Ser Thr Phe Leu Pro
                165                 170                 175

Asp Ala Leu Val Thr Ile Thr Gly Gly Phe Arg Arg Gly Lys Lys Met
            180                 185                 190

Gly His Asp Ile Asp Phe Leu Ile Thr Asn Pro Gly Pro Arg Glu Asp
        195                 200                 205

Asp Glu Leu Leu His Lys Val Val Asp Leu Trp Lys Lys Gln Gly Leu
    210                 215                 220

Leu Leu Tyr Cys Asp Ile Ile Glu Ser Thr Phe Val Glu Glu Gln Leu
225                 230                 235                 240

Pro Ser Arg Lys Val Asp Ala Met Asp Asn Phe Gln Lys Cys Phe Thr
                245                 250                 255

Ile Leu Lys Leu Tyr Gln Pro Gly Val Asp Asn Ser Ser Tyr Asn Met
            260                 265                 270

Ser Lys Lys Ser Asp Met Ala Glu Val Lys Asp Trp Lys Ala Ile Arg
        275                 280                 285

Val Asp Leu Val Ile Thr Pro Phe Glu Gln Tyr Ala Tyr Ala Leu Leu
    290                 295                 300

Gly Trp Thr Gly Ser Arg Glu Phe Gly Arg Asp Leu Arg Arg Tyr Ala
305                 310                 315                 320

Ser His Glu Arg Lys Met Ile Leu Asp Asn His Gly Leu Tyr Asp Arg
                325                 330                 335

Arg Lys Arg Ile Phe Leu Lys Ala Gly Ser Glu Glu Ile Phe Ala
            340                 345                 350
```

His Leu Gly Leu Asp Tyr Val Glu Pro Trp Glu Arg Asn Ala
        355                 360                 365

<210> SEQ ID NO 30
<211> LENGTH: 366
<212> TYPE: PRT
<213> ORGANISM: Alligator sinensis

<400> SEQUENCE: 30

Lys Val Ser Gln Tyr Ala Cys Gln Arg Arg Thr Thr Leu Asn Asn Tyr
1               5                   10                  15

Asn Lys Lys Phe Thr Asp Ala Phe Glu Ile Leu Ala Glu Asn Cys Glu
            20                  25                  30

Phe Arg Glu Asn Arg Leu Gly Cys Leu Glu Phe Leu Arg Ala Ala Ser
        35                  40                  45

Val Leu Lys Phe Leu Pro Phe Pro Ile Val Lys Met Lys Asn Ile Glu
    50                  55                  60

Gly Leu Pro Cys Met Gly Asp Lys Val Lys Cys Val Ile Glu Glu Ile
65                  70                  75                  80

Leu Glu Glu Gly Glu Ser Cys Gln Ala Lys Glu Ile Leu Asn Asp Glu
                85                  90                  95

Arg Tyr Lys Ser Phe Lys Leu Phe Thr Ser Val Phe Gly Val Gly Leu
            100                 105                 110

Lys Thr Thr Glu Lys Trp Tyr Arg Met Gly Phe Arg Thr Leu Glu Glu
        115                 120                 125

Val Lys Ala Glu Lys Thr Leu Lys Leu Ser Arg Met Gln Ile Ala Gly
    130                 135                 140

Phe Leu His Tyr Glu Asp Ile Ile Ser Tyr Val Ser Lys Ala Glu Ala
145                 150                 155                 160

Asp Ala Val Ser Leu Leu Ile Lys Asp Thr Val Cys Met Phe Leu Pro
                165                 170                 175

Asp Ala Leu Val Thr Ile Thr Gly Gly Phe Arg Arg Gly Lys Lys Thr
            180                 185                 190

Gly His Asp Val Asp Phe Leu Ile Thr Asn Pro Gly Pro Glu Glu Glu
        195                 200                 205

Lys Glu Leu Leu His Lys Val Val Asp Leu Trp Glu Lys Gln Gly Leu
    210                 215                 220

Leu Leu Tyr Tyr Asp Val Ile Glu Ser Thr Phe Glu Lys Glu Lys Arg
225                 230                 235                 240

Pro Ser Arg Lys Val Asp Ala Leu Asp His Phe Gln Lys Cys Phe Ala
                245                 250                 255

Ile Leu Lys Leu His Gln Gln Arg Arg Gly Asn Ser Asn Ser Asn Ile
            260                 265                 270

Ser Lys Glu Ser Asp Lys Ala Glu Val Lys Asp Trp Lys Ala Ile Arg
        275                 280                 285

Val Asp Leu Val Ile Ser Pro Phe Glu Gln Tyr Ala Tyr Ala Leu Leu
    290                 295                 300

Gly Trp Thr Gly Ser Arg Gln Phe Glu Arg Asp Leu Arg Arg Tyr Ala
305                 310                 315                 320

Ser Arg Glu Arg Lys Met Met Leu Asp Asn His Ala Leu Tyr Asp Lys
                325                 330                 335

Thr Lys Arg Thr Phe Leu Lys Ala Glu Ser Glu Glu Glu Ile Phe Ala
            340                 345                 350

His Leu Gly Leu Asp Tyr Ile Glu Pro Trp Glu Arg Asn Ala

-continued

```
            355                 360                 365

<210> SEQ ID NO 31
<211> LENGTH: 366
<212> TYPE: PRT
<213> ORGANISM: Alligator sinensis

<400> SEQUENCE: 31

Lys Ile Ser Glu Tyr Ala Cys Gln Arg Arg Thr Thr Leu Asn Asn Tyr
1               5                   10                  15

Asn Lys Lys Phe Thr Asp Ala Phe Glu Ile Leu Ala Glu Asn Tyr Glu
            20                  25                  30

Phe Asn Glu Asn Lys Gly Phe Cys Leu Ala Phe Arg Arg Ala Ala Ser
        35                  40                  45

Val Leu Lys Phe Leu Pro Phe Thr Ile Val Arg Met Asn Asp Ile Gln
    50                  55                  60

Gly Leu Pro Trp Met Gly Asp Gln Val Lys Arg Val Ile Glu Glu Ile
65                  70                  75                  80

Leu Glu Glu Gly Glu Ser Ser Lys Val Lys Glu Val Leu Asn Asp Glu
                85                  90                  95

Lys Tyr Lys Ala Phe Lys Leu Phe Thr Ser Val Phe Gly Val Gly Arg
            100                 105                 110

Lys Thr Ser Glu Lys Trp Tyr Arg Met Gly Leu Arg Thr Leu Glu Glu
        115                 120                 125

Val Lys Ala Asp Lys Thr Leu Lys Leu Thr Lys Met Gln Lys Ala Gly
    130                 135                 140

Phe Leu Tyr Tyr Glu Asp Leu Ile Ser Arg Val Ser Lys Ala Glu Ala
145                 150                 155                 160

Asp Ala Val Ser Leu Ile Val Lys Asp Thr Val Trp Lys Phe Leu Pro
                165                 170                 175

Asp Ala Leu Val Thr Leu Thr Gly Gly Phe Arg Leu Gly Lys Lys Met
            180                 185                 190

Gly His Asp Val Asp Phe Leu Ile Thr Thr Pro Gly Pro Glu Glu Glu
        195                 200                 205

Glu Glu Leu Leu His Lys Val Ile Asp Leu Trp Lys Lys Gln Gly Leu
    210                 215                 220

Leu Leu Tyr Tyr Asp Ile Ile Glu Ser Thr Phe Glu Lys Thr Lys Leu
225                 230                 235                 240

Pro Ser Arg Thr Val Asp Ala Leu Asp His Phe Gln Lys Cys Phe Ala
                245                 250                 255

Ile Leu Lys Leu His Lys Gln Arg Val Asp Asn Gly Asn Ser Asn Gln
            260                 265                 270

Ser Lys Glu Phe Asp Lys Glu Glu Thr Lys Asp Trp Lys Ala Ile Arg
        275                 280                 285

Val Asp Leu Val Ile Thr Pro Phe Glu Gln Tyr Ala Tyr Ala Leu Leu
    290                 295                 300

Gly Trp Thr Gly Ser Ala Phe Phe Asn Arg Asp Leu Arg Arg Tyr Ala
305                 310                 315                 320

Thr His Glu Lys Lys Met Met Leu Asp Asn His Ala Leu Tyr Asp Lys
                325                 330                 335

Thr Lys Arg Ile Phe Leu Lys Ala Ala Ser Glu Glu Glu Ile Phe Ala
            340                 345                 350

His Leu Gly Leu Asp Tyr Leu Glu Pro Trp Glu Arg Asn Ala
        355                 360                 365
```

<210> SEQ ID NO 32
<211> LENGTH: 363
<212> TYPE: PRT
<213> ORGANISM: Xenopus laevis

<400> SEQUENCE: 32

| | | | | | | | | | | | | | | | |
|---|---|---|---|---|---|---|---|---|---|---|---|---|---|---|---|
| Lys | Val | Ser | Gln | Tyr | Ala | Cys | Gln | Arg | Cys | Thr | Thr | Leu | Gln | Asp | Thr |
| 1 | | | | 5 | | | | | 10 | | | | | 15 | |
| Asn | Arg | Ile | Phe | Thr | Asp | Ala | Phe | Asp | Ile | Leu | Ala | Glu | His | Phe | Glu |
| | | | 20 | | | | | 25 | | | | | 30 | | |
| Phe | Cys | Glu | Asn | Lys | Gly | Arg | Thr | Val | Ala | Phe | Leu | Arg | Ala | Ser | Ser |
| | | | | 35 | | | | | 40 | | | | | 45 | |
| Leu | Ile | Lys | Ser | Leu | Pro | Phe | Pro | Ile | Thr | Ala | Met | Lys | Glu | Leu | Glu |
| | 50 | | | | | 55 | | | | | 60 | | | | |
| Gly | Leu | Pro | Trp | Leu | Gly | Asp | Gln | Met | Lys | Gly | Ile | Ile | Glu | Glu | Ile |
| 65 | | | | | 70 | | | | | 75 | | | | | 80 |
| Leu | Glu | Glu | Gly | Lys | Ser | Tyr | Lys | Val | Leu | Glu | Val | Met | Asn | Glu | Glu |
| | | | | 85 | | | | | 90 | | | | | 95 | |
| Arg | Tyr | Lys | Ser | Phe | Lys | Gln | Phe | Thr | Ser | Val | Phe | Gly | Val | Gly | Leu |
| | | | 100 | | | | | 105 | | | | | 110 | | |
| Lys | Thr | Ser | Asp | Lys | Trp | Phe | Arg | Met | Gly | Phe | Arg | Thr | Leu | Glu | Glu |
| | | | | 115 | | | | | 120 | | | | | 125 | |
| Ile | Lys | Asn | Glu | Lys | Glu | Leu | Lys | Leu | Thr | Lys | Met | Gln | Lys | Cys | Gly |
| | 130 | | | | | 135 | | | | | 140 | | | | |
| Leu | Leu | Tyr | Tyr | Glu | Asp | Ile | Thr | Ser | Tyr | Val | Ser | Arg | Ala | Glu | Ala |
| 145 | | | | | 150 | | | | | 155 | | | | | 160 |
| Glu | Thr | Thr | Glu | Gln | Leu | Ile | Lys | Ser | Ile | Val | Trp | Lys | Phe | Val | Pro |
| | | | | 165 | | | | | 170 | | | | | 175 | |
| Asp | Ala | Ile | Val | Thr | Leu | Thr | Gly | Gly | Phe | Arg | Arg | Gly | Lys | Lys | Lys |
| | | | 180 | | | | | 185 | | | | | 190 | | |
| Gly | His | Asp | Val | Asp | Ile | Leu | Ile | Thr | Cys | Ala | Arg | Lys | Gly | Lys | Glu |
| | | 195 | | | | | 200 | | | | | 205 | | | |
| Lys | Asn | Ile | Leu | His | Asn | Thr | Met | Ser | Val | Leu | Lys | Asn | Arg | Gly | Leu |
| | 210 | | | | | 215 | | | | | 220 | | | | |
| Leu | Leu | Phe | Tyr | Asn | Ile | Ile | Glu | Ser | Thr | Phe | Asp | Glu | Thr | Lys | Leu |
| 225 | | | | | 230 | | | | | 235 | | | | | 240 |
| Pro | Ser | Arg | His | Val | Asp | Ala | Leu | Asp | His | Phe | Gln | Lys | Cys | Phe | Thr |
| | | | | 245 | | | | | 250 | | | | | 255 | |
| Ile | Leu | Lys | Leu | Pro | Lys | Arg | Gln | Met | Asp | Ile | Gly | Asn | Ile | Ile | Asp |
| | | | 260 | | | | | 265 | | | | | 270 | | |
| Pro | His | Glu | Cys | Glu | Arg | Lys | Asn | Trp | Lys | Ala | Val | Arg | Leu | Asp | Leu |
| | | 275 | | | | | 280 | | | | | 285 | | | |
| Val | Ile | Thr | Pro | Tyr | Glu | Gln | Tyr | Pro | Tyr | Ala | Leu | Leu | Gly | Trp | Thr |
| | 290 | | | | | 295 | | | | | 300 | | | | |
| Gly | Ser | Arg | Gln | Phe | Glu | Arg | Asp | Leu | Arg | Arg | Tyr | Ala | Thr | His | Glu |
| 305 | | | | | 310 | | | | | 315 | | | | | 320 |
| Lys | Arg | Met | Met | Leu | Asp | Asn | His | Gly | Leu | Tyr | Asp | Lys | Thr | Lys | Asn |
| | | | | 325 | | | | | 330 | | | | | 335 | |
| Asn | Phe | Leu | Lys | Ala | Asn | Asn | Glu | Glu | Asp | Ile | Phe | Lys | Gln | Leu | Gly |
| | | | 340 | | | | | 345 | | | | | 350 | | |
| Leu | Asp | Tyr | Leu | Glu | Pro | Trp | Glu | Arg | Asn | Ala | | | | | |
| | | | 355 | | | | | 360 | | | | | | | |

<210> SEQ ID NO 33

```
<211> LENGTH: 363
<212> TYPE: PRT
<213> ORGANISM: Xenopus

<400> SEQUENCE: 33

Lys Val Ser Glu Tyr Ala Cys Gln Arg Arg Thr Thr Leu Gln Asp Thr
1               5                   10                  15

Asn Arg Ile Phe Thr Asp Ala Phe Asp Ile Leu Ala Glu Asn Tyr Glu
            20                  25                  30

Phe Asn Glu Asn Lys Gly Pro Cys Val Ala Phe Arg Arg Ala Ser Ser
        35                  40                  45

Val Leu Lys Ser Leu Pro Phe Pro Ile Val Ala Met Lys Asp Leu Glu
50                  55                  60

Gly Leu Pro Trp Leu Gly Asp Gln Met Lys Arg Ile Ile Glu Glu Ile
65                  70                  75                  80

Leu Glu Glu Gly Lys Ser Ser Lys Val Val Glu Val Met Asn Asp Glu
                85                  90                  95

Arg Tyr Lys Ala Phe Lys Leu Phe Thr Ser Val Phe Gly Val Gly Arg
            100                 105                 110

Lys Thr Ser Glu Lys Trp Phe Arg Met Gly Phe Arg Thr Leu Glu Glu
        115                 120                 125

Ile Lys Ser Asp Lys Glu Leu Lys Leu Thr Lys Met Gln Lys Ala Gly
        130                 135                 140

Leu Leu Tyr Tyr Glu Asp Ile Thr Ser Ala Val Ser Lys Ala Glu Ala
145                 150                 155                 160

Glu Ala Val Glu Gln Leu Ile Lys Ser Ile Val Trp Lys Phe Val Pro
                165                 170                 175

Asp Ala Ile Val Thr Leu Thr Gly Gly Phe Arg Leu Gly Lys Lys Met
            180                 185                 190

Gly His Asp Val Asp Ile Leu Ile Thr Thr Pro Arg Lys Gly Glu Lys
        195                 200                 205

Glu Glu Ile Leu His Lys Thr Ile Asn Val Leu Lys Lys Arg Gly Leu
    210                 215                 220

Leu Leu Phe Tyr Asn Ile Ile Glu Ser Thr Phe Asp Glu Thr Lys Leu
225                 230                 235                 240

Pro Ser Arg His Val Asp Ala Leu Asp His Phe Gln Lys Cys Phe Thr
                245                 250                 255

Ile Leu Lys Leu Gln Lys Gln Leu Asp Asn Gly Asn Ser Asn Glu
            260                 265                 270

Pro Phe Glu Thr Glu Lys Lys Asn Trp Lys Ala Ile Arg Val Asp Leu
        275                 280                 285

Val Ile Thr Pro Tyr Glu Gln Tyr Ala Tyr Ala Leu Leu Gly Trp Thr
290                 295                 300

Gly Ser Pro Gln Phe Asn Arg Asp Leu Arg Arg Tyr Ala Thr His Glu
305                 310                 315                 320

Lys Arg Met Met Leu Asp Asn His Ala Leu Tyr Asp Lys Thr Lys Asn
                325                 330                 335

Ile Phe Leu Lys Ala Asn Ser Glu Glu Asp Ile Phe Thr His Leu Gly
            340                 345                 350

Leu Asp Tyr Leu Glu Pro Trp Glu Arg Asn Ala
                355                 360

<210> SEQ ID NO 34
<211> LENGTH: 367
<212> TYPE: PRT
```

<213> ORGANISM: Notechis

<400> SEQUENCE: 34

Ser Ile Ser Glu Tyr Ala Cys Gln Arg Arg Thr Thr Leu Asn Asn Tyr
1               5                   10                  15

Asn Lys Lys Phe Thr Asp Ala Phe Glu Ile Leu Ala Glu Asn Tyr Glu
            20                  25                  30

Phe Asn Glu Asn Lys Gly Phe Cys Leu Ala Phe Arg Arg Ala Ala Ser
        35                  40                  45

Val Leu Lys Phe Leu Pro Phe Thr Ile Val Arg Val Asn Asp Ile Glu
    50                  55                  60

Gly Leu Pro Trp Met Gly Glu Gln Val Lys Arg Ile Ile Glu Asp Ile
65                  70                  75                  80

Leu Glu Glu Gly Glu Ser Ser Lys Val Lys Ala Val Leu Asn Asn Glu
                85                  90                  95

Asn Tyr Arg Ala Phe Lys Leu Phe Thr Ser Val Phe Gly Val Gly Arg
            100                 105                 110

Lys Thr Ser Glu Lys Trp Tyr Arg Met Gly Leu Arg Thr Leu Glu Glu
        115                 120                 125

Val Lys Ala Asp Lys Asn Leu Lys Leu Thr Arg Met Gln Lys Ala Gly
    130                 135                 140

Phe Leu His Tyr Glu Asp Leu Ile Ser Arg Val Ser Lys Ala Glu Ala
145                 150                 155                 160

Asp Ala Ala Ser Leu Ile Val Lys Asp Thr Val Trp Lys Phe Leu Pro
                165                 170                 175

Asn Ala Leu Val Thr Leu Thr Gly Gly Phe Arg Leu Gly Lys Lys Met
            180                 185                 190

Gly His Asp Val Asp Phe Leu Ile Thr Val Pro Gly Ser Arg Gln Glu
        195                 200                 205

Glu Glu Glu Leu Leu His Thr Val Ile Asp Leu Trp Lys Lys Gln Gly
    210                 215                 220

Leu Leu Leu Tyr Tyr Asp Leu Ile Glu Ser Thr Phe Glu Lys Thr Lys
225                 230                 235                 240

Leu Pro Ser Arg Thr Val Asp Ala Leu Asp His Phe Gln Lys Cys Phe
                245                 250                 255

Ala Ile Leu Lys Leu His Lys Glu Arg Val Asp Lys Gly Asn Ser Ile
            260                 265                 270

Gln Ser Lys Ala Phe Ala Glu Glu Thr Lys Asp Trp Lys Ala Ile
        275                 280                 285

Arg Val Asp Leu Val Val Thr Pro Phe Glu Gln Tyr Ala Phe Ala Leu
    290                 295                 300

Leu Gly Trp Thr Gly Ser Pro Phe Phe Asn Arg Asp Leu Arg Arg Tyr
305                 310                 315                 320

Ala Thr His Glu Lys Lys Met Met Leu Asp Asn His Ala Leu Tyr Asp
                325                 330                 335

Lys Thr Lys Lys Ile Phe Leu Lys Ala Ala Ser Glu Glu Glu Ile Phe
            340                 345                 350

Ala His Leu Gly Leu Asp Tyr Leu Glu Pro Trp Glu Arg Asn Ala
        355                 360                 365

<210> SEQ ID NO 35
<211> LENGTH: 363
<212> TYPE: PRT
<213> ORGANISM: Salmo trutta

<400> SEQUENCE: 35

Asn Val Ser Gln Tyr Ala Cys Leu Arg Arg Thr Thr Thr Glu Asn His
1               5                   10                  15

Asn Lys Ile Phe Thr Asp Val Leu Glu Glu Leu Ala Glu Asn Ser Glu
            20                  25                  30

Phe Asn Glu Ser Lys Gly Pro Cys Leu Ala Phe Arg Arg Ala Ala Ser
        35                  40                  45

Val Leu Lys Ser Leu Pro Ser Ala Val His Cys Leu Gly Ala Ile Gln
50                  55                  60

Gly Leu Pro Cys Leu Gly Glu His Thr Lys Ala Val Met Glu Glu Ile
65                  70                  75                  80

Leu Ile Phe Gly Arg Ser Phe Lys Val Glu Glu Val Gln Ser Asp Glu
                85                  90                  95

Arg Tyr Gln Ala Leu Lys Leu Phe Thr Ser Val Phe Gly Val Gly Pro
            100                 105                 110

Lys Thr Ala Glu Lys Trp Tyr Arg Arg Gly Leu Arg Ser Leu Lys Glu
            115                 120                 125

Ile Leu Ala Glu Pro Asn Ile Gln Leu Asn Arg Met Gln Arg Ala Gly
130                 135                 140

Phe Leu Tyr Tyr Arg Asp Ile Ser Lys Ala Val Ser Lys Ala Glu Ala
145                 150                 155                 160

Lys Ala Leu Ser Ser Ile Ile Glu Glu Thr Ala His Trp Ile Ala Pro
                165                 170                 175

Asp Ser Ile Leu Ala Leu Thr Gly Gly Phe Arg Arg Gly Lys Glu Tyr
            180                 185                 190

Gly His Asp Val Asp Phe Leu Leu Thr Met Pro Glu Met Gly Lys Glu
            195                 200                 205

Glu Gly Leu Leu Leu Arg Val Ile Asp Arg Leu Arg Asp Gln Gly Ile
210                 215                 220

Leu Leu Tyr Cys Glu His Gln Asp Ser Thr Phe Asp Met Ser Lys Leu
225                 230                 235                 240

Pro Ser His Arg Phe Glu Ala Met Asp His Phe Glu Lys Cys Phe Leu
                245                 250                 255

Ile Leu Arg Leu Glu Glu Gly Gln Val Glu Gly Asp Gly Gly Leu Gln
            260                 265                 270

Lys Asp Pro Gly Glu Ser Arg Gly Trp Arg Ala Val Arg Val Asp Leu
            275                 280                 285

Val Ala Pro Pro Val Asp Arg Tyr Ala Phe Val Leu Leu Gly Trp Thr
290                 295                 300

Gly Ser Arg Gln Phe Glu Arg Asp Leu Arg Arg Phe Ala Ser Lys Glu
305                 310                 315                 320

Arg Gly Met Cys Leu Asp Asn His Ala Leu Tyr Asp Lys Thr Lys Lys
                325                 330                 335

Leu Phe Leu Pro Ala Thr Ser Glu Glu Asp Ile Phe Ala His Leu Gly
            340                 345                 350

Leu Glu Tyr Val Glu Pro Trp Gln Arg Asn Ala
            355                 360

<210> SEQ ID NO 36
<211> LENGTH: 363
<212> TYPE: PRT
<213> ORGANISM: Salmo trutta

<400> SEQUENCE: 36

Thr Val Ser Glu Tyr Ala Cys Gln Arg Arg Thr Thr Met Glu Asn His
1               5                   10                  15

Asn Lys Ile Phe Thr Asp Ala Phe Glu Val Leu Ala Glu Asn Ser Glu
            20                  25                  30

Phe Asn Glu Ser Lys Glu Ser Arg Asp Ala Phe Arg Arg Ala Ala Ser
        35                  40                  45

Val Leu Lys Ser Leu Pro Ser Ala Val Arg Ser Leu Gly Asp Thr Glu
50                  55                  60

Gly Leu Pro Cys Leu Gly Glu His Thr Lys Arg Val Ile Glu Glu Ile
65                  70                  75                  80

Leu Glu Tyr Gly Arg Ser Ser Lys Val Glu Asp Ile Leu Ser Asp Glu
                85                  90                  95

Arg Tyr Gln Thr Met Lys Leu Phe Thr Ser Val Phe Gly Val Gly Pro
                100                 105                 110

Lys Thr Ala Glu Lys Trp Tyr Arg Arg Gly Leu Arg Ser Leu Glu Glu
                115                 120                 125

Val Arg Ala Glu Pro Ser Ile His Leu Asn Arg Met Gln Arg Ala Gly
130                 135                 140

Phe Leu Tyr Tyr Arg Asp Ile Ser Lys Arg Val Ser Lys Ala Glu Ala
145                 150                 155                 160

Lys Ala Leu Gly Asn Ile Ile Glu Glu Thr Val His Ala Ile Ala Pro
                165                 170                 175

Asp Ala Ile Val Thr Leu Thr Gly Gly Phe Arg Leu Gly Lys Glu Phe
                180                 185                 190

Gly His Asp Val Asp Phe Ile Leu Thr Thr Pro Glu Met Gly Lys Glu
                195                 200                 205

Glu Gly Leu Leu Pro Arg Val Ile Asp Arg Leu Arg Asn Gln Gly Ile
210                 215                 220

Leu Leu Tyr Cys Asp Tyr Gln Glu Ser Thr Phe Asp Met Ser Lys Leu
225                 230                 235                 240

Pro Ser Arg Thr Phe Glu Ala Met Asp His Phe Gln Lys Cys Phe Leu
                245                 250                 255

Ile Ile Lys Leu Lys Glu Gly Leu Val Glu Gly Glu Gly Leu Gln
                260                 265                 270

Ser Asp Pro Gly Asp Arg Arg Gly Trp Arg Ala Val Arg Val Asp Leu
                275                 280                 285

Val Ala Pro Pro Val Asp Arg Tyr Ala Phe Ala Leu Leu Gly Trp Thr
290                 295                 300

Gly Ser Pro Gln Phe Asn Arg Asp Leu Arg Arg Phe Ala Arg Leu Glu
305                 310                 315                 320

Arg Arg Met Leu Leu Asp Asn His Ala Leu Tyr Asp Lys Thr Lys Lys
                325                 330                 335

Ile Phe Leu Pro Ala Lys Thr Glu Glu Asp Ile Phe Ala His Leu Gly
                340                 345                 350

Leu Glu Tyr Ile Glu Pro Trp Gln Arg Asn Ala
                355                 360

<210> SEQ ID NO 37
<211> LENGTH: 360
<212> TYPE: PRT
<213> ORGANISM: Electrophorus electricus

<400> SEQUENCE: 37

Thr Val Ser Gln Tyr Ala Cys Gln Arg Arg Thr Thr Leu Asp Asn His
1               5                   10                  15

```
Asn Lys Val Phe Thr Asp Ala Leu Glu Val Leu Ile Glu Asn Tyr Glu
         20                  25                  30

Phe Ser Asp Asn Lys Gly Ala Cys Val Gly Phe Arg Arg Ala Ala Ser
         35                  40                  45

Val Leu Lys Ser Leu Pro Lys Pro Leu Arg Cys Leu Lys Asp Met Glu
 50                  55                  60

Gly Leu Pro Cys Leu Gly Asp Asp Thr Lys Ala Ile Ile Glu Glu Ile
 65                  70                  75                  80

Tyr Glu Cys Gly Ser Ser Arg Val Glu Asn Ile Leu Ser Asp Glu
                 85                  90                  95

Lys Tyr Gln Thr Leu Lys Leu Phe Thr Ser Val Phe Gly Val Gly Pro
             100                 105                 110

Lys Thr Gly Glu Lys Trp Tyr Arg Arg Gly Leu Arg Ala Leu Glu Gln
             115                 120                 125

Val His Ser Glu Pro Ser Ile Gln Leu Asn Lys Met Gln Ala Ala Gly
 130                 135                 140

Phe Leu Tyr Tyr Glu Asp Ile Ser Lys Pro Val Ser Arg Ala Glu Ala
145                 150                 155                 160

Lys Ala Val Gly Cys Ile Ile Glu Glu Val Ala Ser Cys Phe Ser Ser
                 165                 170                 175

Ser Val Thr Ile Thr Leu Thr Gly Gly Phe Arg Arg Gly Lys Glu Phe
             180                 185                 190

Gly His Asp Val Asp Phe Leu Leu Ser Ile Pro Glu Pro Gly Lys Glu
             195                 200                 205

Asp Gly Leu Leu Pro Ala Val Ile Asp Arg Leu Arg Lys Gln Gly Ile
 210                 215                 220

Leu Leu Tyr Ser Asp Leu Gln Glu Ser Thr Leu Gln Gln Trp Lys Arg
225                 230                 235                 240

Pro Ser Arg Cys Phe Asp Ser Met Asp His Phe Gln Lys Cys Phe Leu
                 245                 250                 255

Ile Val Lys Leu Trp Thr Arg Leu Val Glu Gly His Arg Glu Asp Pro
             260                 265                 270

Ser Ser Gln Arg Asp Trp Lys Ala Val Arg Val Asp Leu Val Val Pro
             275                 280                 285

Pro Val Asp Cys Tyr Ala Phe Ala Leu Leu Gly Trp Ser Gly Ser Thr
 290                 295                 300

Gln Phe Glu Arg Asp Leu Arg Arg Phe Ala Arg Leu Glu Arg Arg Met
305                 310                 315                 320

Leu Leu Asp Asn His Ala Leu Tyr Asp Lys Thr Thr Asn Thr Phe Leu
                 325                 330                 335

Gln Ala Lys Thr Glu Glu Asp Ile Phe Ala His Leu Gly Leu Asp Tyr
             340                 345                 350

Ile Glu Pro Trp Gln Arg Asn Ala
             355                 360

<210> SEQ ID NO 38
<211> LENGTH: 360
<212> TYPE: PRT
<213> ORGANISM: Electrophorus electricus

<400> SEQUENCE: 38

Thr Val Ser Glu Tyr Ala Cys Gln Arg Arg Thr Thr Leu Asp Asn His
1               5                   10                  15

Asn Lys Ile Phe Thr Asp Ala Leu Glu Val Leu Ala Glu Asn Tyr Glu
```

```
                20                  25                  30
Phe Ser Asp Ser Lys Glu Ser Arg Asp Ala Phe Arg Arg Ala Ala Ser
         35                  40                  45

Val Leu Lys Ser Leu Pro Thr Pro Leu Arg Ser Leu Gln Asp Thr Glu
 50                  55                  60

Gly Leu Pro Cys Leu Gly Glu Glu Thr Lys Arg Val Ile Glu Glu Ile
 65                  70                  75                  80

Phe Glu Glu Gly Ser Ser Arg Val Glu Asp Ile Leu Ser Asp Glu
                 85                  90                  95

Arg Tyr Gln Thr Leu Lys Leu Phe Thr Ser Val Phe Gly Val Gly Pro
             100                 105                 110

Lys Thr Ala Glu Lys Trp Tyr Arg Arg Gly Leu Arg Ser Leu Glu Gln
             115                 120                 125

Val Arg Ser Asp Pro Ser Ile His Leu Asn Arg Met Gln Thr Ala Gly
             130                 135                 140

Phe Leu Tyr Tyr Glu Asp Ile Ser Lys Pro Val Ser Lys Ala Glu Ala
145                 150                 155                 160

Lys Ala Leu Gly Asn Ile Ile Glu Glu Thr Ala Ser Ala Phe Ser Pro
                 165                 170                 175

Ser Val Thr Ile Thr Leu Thr Gly Gly Phe Arg Leu Gly Lys Glu Phe
             180                 185                 190

Gly His Asp Val Asp Phe Leu Leu Thr Val Pro Glu Pro Gly Lys Glu
             195                 200                 205

Asp Gly Leu Leu Pro Ala Val Ile Asp Arg Leu Arg Ser Gln Gly Ile
             210                 215                 220

Leu Leu Tyr Ser Asp Phe Gln Glu Ser Thr Phe Asp Leu Ser Lys Leu
225                 230                 235                 240

Pro Ser Arg Arg Phe Glu Ala Met Asp His Phe Gln Lys Cys Phe Leu
                 245                 250                 255

Ile Val Lys Leu Lys Ala Gly Leu Val Glu Gly Glu Ala Asp Pro
             260                 265                 270

Gly Asp Arg Arg Asp Trp Arg Ala Val Arg Val Asp Leu Val Ala Pro
             275                 280                 285

Pro Val Asp Arg Tyr Ala Phe Ala Leu Leu Gly Trp Ser Gly Ser Ala
             290                 295                 300

Phe Phe Asn Arg Asp Leu Arg Arg Phe Ala Arg Leu Glu Arg Gly Met
305                 310                 315                 320

Leu Leu Asp Asn His Ala Leu Tyr Asp Lys Thr Thr Asn Thr Phe Leu
                 325                 330                 335

Gln Ala Lys Thr Glu Glu Asp Ile Phe Ala His Leu Gly Leu Asp Tyr
             340                 345                 350

Ile Glu Pro Trp Gln Arg Asn Ala
             355                 360

<210> SEQ ID NO 39
<211> LENGTH: 361
<212> TYPE: PRT
<213> ORGANISM: Anabas testudineus

<400> SEQUENCE: 39

Thr Val Ser Gln Tyr Ala Cys Gln Arg Arg Thr Thr Glu Asn Asn
 1               5                  10                  15

Asn Lys Ile Leu Thr Asp Ala Phe Glu Val Leu Ala Glu Ser Tyr Glu
                 20                  25                  30
```

Leu Asn Gln Leu Glu Gly Pro Cys Leu Ala Phe Arg Arg Ala Ala Ser
            35                  40                  45

Val Leu Lys Ser Leu Pro Trp Ala Val Gln Cys Leu Gly Ala Thr Gln
 50                  55                  60

Gly Leu Pro Cys Leu Gly Glu His Thr Lys Ala Leu Ile Glu Glu Ile
 65                  70                  75                  80

Leu Gln Tyr Gly His Ser Phe Glu Val Glu Lys Ile Leu Ser Asp Glu
                85                  90                  95

Arg Tyr Gln Thr Leu Lys Leu Phe Thr Ser Val Phe Gly Val Gly Pro
            100                 105                 110

Lys Thr Ala Glu Lys Trp Tyr Arg Arg Gly Leu Arg Ser Phe Ser Asp
            115                 120                 125

Ile Leu Ala Glu Pro Ser Ile Gln Leu Asn Arg Met Gln Gln Ser Gly
130                 135                 140

Phe Leu His Tyr Gly Asp Ile Ser Arg Ala Val Ser Lys Ala Glu Ala
145                 150                 155                 160

Arg Ala Leu Gly Asn Ile Ile Asp Glu Ala Val His Ala Ile Thr Pro
                165                 170                 175

Asp Gly Ile Leu Ala Leu Thr Gly Gly Phe Arg Arg Gly Lys Glu Phe
            180                 185                 190

Gly His Asp Val Asp Phe Ile Val Thr Thr Pro Glu Gln Gly Lys Glu
            195                 200                 205

Glu Thr Leu Leu Pro Asn Ile Ile Asp Arg Leu Lys Glu Gln Gly Ile
            210                 215                 220

Leu Leu Tyr Ser Asp Tyr Gln Thr Ser Thr Phe Asp Ile Ser Lys Leu
225                 230                 235                 240

Pro Ser His Lys Phe Glu Ala Met Asp His Phe Ala Lys Cys Phe Leu
                245                 250                 255

Ile Leu Arg Leu Glu Gly Ser Leu Val Asp Arg Gly Leu Asn Ser Thr
            260                 265                 270

Glu Gly Asp Ser Arg Gly Trp Arg Ala Val Arg Val Asp Leu Val Ser
            275                 280                 285

Pro Pro Met Glu Arg Tyr Ala Tyr Ala Leu Leu Gly Trp Thr Gly Ser
290                 295                 300

Arg Gln Phe Glu Arg Asp Leu Arg Arg Phe Ala Arg Leu Glu Gln His
305                 310                 315                 320

Met Leu Leu Asp Asn His Ala Leu Tyr Asp Lys Thr Lys Lys Glu Phe
                325                 330                 335

Leu Ala Thr Thr Glu Arg Asp Ile Phe Ala His Leu Gly Leu Glu
            340                 345                 350

Tyr Ile Glu Pro Trp Gln Arg Asn Ala
            355                 360

<210> SEQ ID NO 40
<211> LENGTH: 361
<212> TYPE: PRT
<213> ORGANISM: Anabas testudineus

<400> SEQUENCE: 40

Thr Val Ser Glu Tyr Ala Cys Gln Arg Arg Thr Thr Thr Glu Asn Asn
1               5                   10                  15

Asn Lys Ile Phe Thr Asp Ala Phe Glu Val Leu Ala Glu Ser Tyr Glu
            20                  25                  30

Phe Asn Glu Met Glu Glu Ser Arg Asp Ala Phe Arg Arg Ala Ala Ser
            35                  40                  45

Val Leu Lys Ser Leu Pro Trp Ala Val Gln Ser Leu Gly Ala Thr Gln
 50                  55                  60

Asp Leu Pro Cys Leu Gly Glu His Thr Lys Arg Val Met Glu Glu Ile
 65                  70                  75                  80

Leu Gln Tyr Gly Arg Ser Phe Glu Val Glu Lys Ile Leu Ser Asp Glu
                 85                  90                  95

Arg Tyr Gln Thr Leu Lys Leu Phe Thr Ser Val Phe Gly Val Gly Pro
            100                 105                 110

Lys Thr Ala Glu Lys Trp Tyr Arg Arg Gly Leu Arg Ser Phe Glu Asp
            115                 120                 125

Ile Arg Ala Glu Pro Ser Ile His Leu Asn Arg Met Gln Gln Ser Gly
        130                 135                 140

Phe Leu His Tyr Gly Asp Ile Ser Arg Ala Val Ser Lys Ala Glu Ala
145                 150                 155                 160

Arg Ala Leu Gly Asn Ile Ile Asp Glu Ala Val His Ala Ile Thr Pro
                165                 170                 175

Asp Ala Ile Leu Ala Leu Thr Gly Gly Phe Arg Leu Gly Lys Glu Phe
            180                 185                 190

Gly His Asp Val Asp Phe Ile Val Thr Thr Pro Glu Leu Gly Lys Glu
            195                 200                 205

Glu Ser Leu Leu Pro Asn Ile Ile Asp Arg Leu Lys Lys Gln Gly Ile
        210                 215                 220

Leu Leu Tyr Ser Asp Tyr Gln Ala Ser Thr Phe Asp Met Ser Lys Leu
225                 230                 235                 240

Pro Ser His Arg Phe Glu Ala Met Asp His Phe Ala Lys Cys Phe Leu
                245                 250                 255

Ile Leu Arg Leu Glu Gly Ser Gln Val Glu Gly Gly Leu Asn Ser Ala
            260                 265                 270

Glu Gly Asp Ser Arg Gly Trp Arg Ala Val Arg Val Asp Leu Val Ser
            275                 280                 285

Pro Pro Met Asp Arg Tyr Ala Phe Ala Leu Leu Gly Trp Thr Gly Ser
        290                 295                 300

Ala Phe Phe Asn Arg Asp Leu Arg Arg Phe Ala Arg Met Glu Arg Arg
305                 310                 315                 320

Met Leu Leu Asp Asn His Ala Leu Tyr Asp Lys Thr Lys Lys Glu Phe
                325                 330                 335

Leu Ala Ala Thr Thr Glu Lys Asp Ile Phe Ala His Leu Gly Leu Glu
            340                 345                 350

Tyr Ile Glu Pro Trp Gln Arg Asn Ala
            355                 360

<210> SEQ ID NO 41
<211> LENGTH: 361
<212> TYPE: PRT
<213> ORGANISM: Poecilia reticulate

<400> SEQUENCE: 41

Lys Val Ser Gln Tyr Ala Cys Gln Arg Thr Thr Val Glu Asn Asn
1               5                   10                  15

Asn Arg Ile Phe Thr Asp Ala Phe Glu Val Leu Ala Glu Asn Tyr Glu
            20                  25                  30

Phe Asn Glu Ile Glu Gly Arg Cys Leu Ala Phe Arg Arg Ala Ala Ser
        35                  40                  45

Val Leu Lys Ser Leu Pro Trp Ala Val Arg Ser Val Gly Ala Thr Leu

```
            50                  55                  60
Asp Leu Pro Cys Leu Gly Glu His Thr Thr Ala Val Met Lys Glu Ile
 65                  70                  75                  80

Leu Gln Tyr Gly Arg Ser Phe Glu Val Glu Lys Ile Leu Ser Asp Glu
                 85                  90                  95

Arg Cys Gln Thr Leu Lys Leu Phe Thr Ser Val Phe Gly Val Gly Pro
            100                 105                 110

Lys Thr Ala Glu Lys Trp Tyr Arg Arg Gly Leu Arg Ser Phe Ser Asp
            115                 120                 125

Val Leu Ala Gln Pro Gly Ile His Leu Asn Arg Met Gln Gln Ser Gly
            130                 135                 140

Phe Leu His Tyr Gly Asp Ile Ser Arg Ala Val Ser Lys Ala Glu Ala
145                 150                 155                 160

Arg Ala Val Gly Asn Ile Ile Asp Glu Ala Val His Val Ile Thr Pro
            165                 170                 175

Asn Ala Ile Leu Ala Leu Thr Gly Gly Phe Arg Arg Gly Lys Asp Phe
            180                 185                 190

Gly His Asp Val Asp Phe Ile Val Thr Thr Thr Glu Leu Gly Lys Glu
            195                 200                 205

Lys Asn Leu Leu Ile Ser Val Ile Glu Ser Leu Lys Lys Gln Gly Leu
            210                 215                 220

Leu Leu Phe Ser Asp Tyr Gln Ala Ser Thr Phe Asp Ile Ser Lys Leu
225                 230                 235                 240

Pro Ser His Arg Phe Glu Ala Met Asp His Phe Ala Lys Cys Phe Leu
            245                 250                 255

Ile Leu Arg Leu Glu Gly Ser Arg Val Glu Gly Leu Gln Arg Ala
            260                 265                 270

Gln Ala Asp Gly Arg Gly Trp Arg Ala Val Arg Val Asp Leu Val Ser
            275                 280                 285

Pro Pro Ala Asp Arg Phe Ala Phe Thr Met Leu Gly Trp Thr Gly Ser
            290                 295                 300

Arg Met Phe Glu Arg Asp Leu Arg Arg Phe Ala Arg Leu Glu Arg Gln
305                 310                 315                 320

Met Leu Leu Asp Asn His Ala Leu Tyr Asp Lys Thr Lys Lys Glu Phe
            325                 330                 335

Leu Thr Ala Ala Thr Glu Lys Asp Ile Phe Asp His Leu Gly Leu Glu
            340                 345                 350

Tyr Ile Glu Pro Trp Gln Arg Asn Ala
            355                 360

<210> SEQ ID NO 42
<211> LENGTH: 366
<212> TYPE: PRT
<213> ORGANISM: artificial sequence
<220> FEATURE:
<223> OTHER INFORMATION: F57 trunc new (Poecilia reticulate) guppy
      [56.66 percent identity to wt calc by NCBI BLASTP]

<400> SEQUENCE: 42

Lys Ile Ser Glu Tyr Ala Cys Gln Arg Thr Thr Leu Asn Asn Tyr
 1                5                  10                  15

Asn Lys Lys Phe Thr Asp Ala Phe Glu Ile Leu Ala Glu Asn Tyr Glu
                 20                  25                  30

Phe Asn Glu Asn Lys Gly Phe Cys Leu Ala Phe Arg Arg Ala Ala Ser
             35                  40                  45
```

Val Leu Lys Phe Leu Pro Phe Thr Ile Val Arg Met Asn Asp Ile Gln
 50                  55                  60

Gly Leu Pro Trp Met Gly Asp Gln Val Lys Arg Val Ile Glu Glu Ile
 65                  70                  75                  80

Leu Glu Glu Gly Glu Ser Ser Lys Val Lys Glu Val Leu Asn Asp Glu
                 85                  90                  95

Lys Tyr Lys Ala Phe Lys Leu Phe Thr Ser Val Phe Gly Val Gly Arg
                100                 105                 110

Lys Thr Ser Glu Lys Trp Tyr Arg Met Gly Leu Arg Thr Leu Glu Glu
            115                 120                 125

Val Lys Ala Asp Lys Thr Leu Lys Leu Thr Lys Met Gln Lys Ala Gly
130                 135                 140

Phe Leu Tyr Tyr Glu Asp Leu Ile Ser Arg Val Ser Lys Ala Glu Ala
145                 150                 155                 160

Asp Ala Val Ser Leu Ile Val Lys Asp Thr Val Trp Lys Phe Leu Pro
                165                 170                 175

Asp Ala Leu Val Thr Leu Thr Gly Gly Phe Arg Leu Gly Lys Lys Met
                180                 185                 190

Gly His Asp Val Asp Phe Leu Ile Thr Thr Pro Gly Pro Glu Glu Glu
            195                 200                 205

Glu Glu Leu Leu His Lys Val Ile Asp Leu Trp Lys Lys Gln Gly Leu
            210                 215                 220

Leu Leu Tyr Tyr Asp Ile Ile Glu Ser Thr Phe Glu Lys Thr Lys Leu
225                 230                 235                 240

Pro Ser Arg Thr Val Asp Ala Leu Asp His Phe Gln Lys Cys Phe Ala
                245                 250                 255

Ile Leu Lys Leu His Lys Gln Arg Val Asp Asn Gly Asn Ser Asn Gln
                260                 265                 270

Ser Lys Glu Phe Asp Lys Glu Thr Lys Asp Trp Lys Ala Ile Arg
            275                 280                 285

Val Asp Leu Val Ile Thr Pro Phe Glu Gln Tyr Ala Tyr Ala Leu Leu
            290                 295                 300

Gly Trp Thr Gly Ser Ala Phe Phe Asn Arg Asp Leu Arg Arg Tyr Ala
305                 310                 315                 320

Thr His Glu Lys Lys Met Met Leu Asp Asn His Ala Leu Tyr Asp Lys
                325                 330                 335

Thr Lys Arg Ile Phe Leu Lys Ala Ala Ser Glu Glu Glu Ile Phe Ala
            340                 345                 350

His Leu Gly Leu Asp Tyr Leu Glu Pro Trp Glu Arg Asn Ala
            355                 360                 365

<210> SEQ ID NO 43
<211> LENGTH: 362
<212> TYPE: PRT
<213> ORGANISM: Rattus norvegicus

<400> SEQUENCE: 43

Lys Ile Ser Gln Tyr Ala Cys Gln Arg Arg Thr Thr Leu Asn Asn His
 1               5                  10                  15

Asn Gln Leu Phe Thr Asp Ala Phe Asp Ile Leu Ala Glu Asn Tyr Glu
                 20                  25                  30

Phe Arg Glu Asn Glu Val Ser Cys Leu Pro Phe Met Arg Ala Ala Ser
            35                  40                  45

Val Leu Lys Ser Leu Ser Phe Pro Ile Val Ser Met Lys Asp Ile Glu
 50                  55                  60

```
Gly Ile Pro Cys Leu Gly Asp Lys Val Lys Cys Val Ile Glu Gly Ile
 65                  70                  75                  80

Ile Glu Asp Gly Glu Ser Ser Glu Val Lys Ala Val Leu Asn Asp Glu
                 85                  90                  95

Arg Tyr Lys Ser Phe Lys Leu Phe Thr Ser Val Phe Gly Val Gly Leu
            100                 105                 110

Lys Thr Ala Glu Lys Trp Phe Arg Met Gly Phe Arg Thr Leu Ser Lys
        115                 120                 125

Ile Lys Ser Asp Lys Ser Leu Arg Phe Thr His Met Gln Lys Ala Gly
    130                 135                 140

Phe Leu Tyr Tyr Glu Asp Leu Val Ser Cys Val Asn Arg Ala Glu Ala
145                 150                 155                 160

Glu Ala Val Ser Met Leu Val Lys Glu Ala Val Val Ala Phe Leu Pro
                165                 170                 175

Asp Ala Leu Val Thr Met Thr Gly Gly Phe Arg Arg Gly Lys Met Thr
            180                 185                 190

Gly His Asp Val Asp Phe Leu Ile Thr Ser Pro Glu Ala Thr Glu Glu
        195                 200                 205

Glu Glu Gln Gln Leu Leu His Lys Val Thr Asn Phe Trp Arg Gln Gln
    210                 215                 220

Gly Leu Leu Leu Tyr Cys Asp Ile Ile Glu Ser Thr Phe Glu Lys Phe
225                 230                 235                 240

Lys Leu Pro Ser Arg Lys Val Asp Ala Leu Asp His Phe Gln Lys Cys
                245                 250                 255

Phe Leu Ile Leu Lys Leu His Arg Gly Leu Val Arg Ser Glu Ser
            260                 265                 270

Gly Gln Gln Glu Gly Lys Asp Trp Lys Ala Ile Arg Val Asp Leu Val
        275                 280                 285

Met Cys Pro Tyr Glu Arg Arg Ala Phe Ala Leu Leu Gly Trp Thr Gly
    290                 295                 300

Ser Arg Gln Phe Glu Arg Asp Leu Arg Arg Tyr Ala Thr His Glu Arg
305                 310                 315                 320

Lys Met Met Leu Asp Asn His Ala Leu Tyr Asp Lys Thr Lys Arg Val
                325                 330                 335

Phe Leu Glu Ala Glu Ser Glu Glu Glu Ile Phe Ala His Leu Gly Leu
            340                 345                 350

Asp Tyr Ile Glu Pro Trp Glu Arg Asn Ala
        355                 360

<210> SEQ ID NO 44
<211> LENGTH: 366
<212> TYPE: PRT
<213> ORGANISM: Rattus norvegicus

<400> SEQUENCE: 44

Ser Val Val Glu Lys Ile Ser Glu Tyr Ala Cys Gln Arg Arg Thr Thr
  1               5                  10                  15

Leu Asn Asn His Asn Glu Val Phe Thr Arg Ala Phe Asp Ile Leu Ala
                 20                  25                  30

Glu Asn Tyr Glu Phe Arg Glu Asn Glu Glu Ser Arg Asp Ala Phe Arg
             35                  40                  45

Arg Ala Ser Ser Val Leu Lys Ser Leu Pro Phe Pro Ile Ile Ser Met
         50                  55                  60

Lys Asp Thr Glu Gly Ile Pro Cys Leu Gly Asp Lys Val Lys Arg Val
```

```
              65                  70                  75                  80
Ile Glu Glu Ile Ile Glu Asp Gly Ser Ser Glu Val Lys Ala Val
                85                  90                  95

Leu Asn Asp Glu Arg Tyr Lys Ala Phe Lys Leu Phe Thr Ser Val Phe
            100                 105                 110

Gly Val Gly Arg Lys Thr Ala Glu Lys Trp Phe Arg Met Gly Phe Arg
            115                 120                 125

Thr Leu Glu Lys Ile Lys Ser Asp Lys Ser Leu Arg Phe Thr Gln Met
        130                 135                 140

Gln Lys Ala Gly Phe Leu Tyr Tyr Glu Asp Leu Ala Glu Arg Val Asn
145                 150                 155                 160

Arg Ala Glu Ala Glu Ala Ile Glu Met Leu Val Lys Glu Ala Val Val
                165                 170                 175

Ala Phe Leu Pro Asp Ala Leu Val Thr Met Thr Gly Gly Phe Arg Leu
            180                 185                 190

Gly Lys Met Thr Gly His Asp Val Asp Phe Leu Ile Thr Ser Pro Glu
            195                 200                 205

Ala Thr Glu Glu Glu Gln Gln Leu Leu His Lys Val Thr Asp Phe
        210                 215                 220

Trp Arg Gln Gln Gly Leu Leu Leu Tyr Cys Asp Ile Ile Glu Ser Thr
225                 230                 235                 240

Phe Glu Lys Phe Lys Leu Pro Ser Arg Thr Val Asp Ala Leu Asp His
                245                 250                 255

Phe Gln Lys Cys Phe Leu Ile Leu Lys Leu His His Gly Arg Val Val
            260                 265                 270

Ser Glu Lys Ser Gly Gln Gln Glu Gly Lys Gly Trp Lys Ala Ile Arg
        275                 280                 285

Val Asp Leu Val Met Cys Pro Tyr Glu Arg Arg Ala Phe Ala Leu Leu
            290                 295                 300

Gly Trp Thr Gly Ser Pro Phe Phe Asn Arg Asp Leu Arg Arg Tyr Ala
305                 310                 315                 320

Thr His Glu Arg Lys Met Met Leu Asp Asn His Ala Leu Tyr Asp Lys
                325                 330                 335

Thr Lys Arg Val Phe Leu Glu Ala Glu Ser Glu Glu Ile Phe Ala
            340                 345                 350

His Leu Gly Leu Asp Tyr Ile Glu Pro Trp Glu Arg Asn Ala
        355                 360                 365

<210> SEQ ID NO 45
<211> LENGTH: 362
<212> TYPE: PRT
<213> ORGANISM: Piliocolobus tephrosceles

<400> SEQUENCE: 45

Lys Ile Ser Gln Tyr Ala Cys Gln Arg Arg Thr Thr Leu Asn Asn Cys
1               5                   10                  15

Asn Gln Ile Phe Thr Asp Ala Phe Asp Ile Leu Ala Glu Asn Cys Glu
            20                  25                  30

Phe Arg Glu Asn Glu Asp Ser Cys Val Thr Phe Met Arg Ala Ala Ser
        35                  40                  45

Val Leu Lys Ser Leu Pro Phe Thr Ile Ile Ser Met Lys Asp Thr Glu
    50                  55                  60

Gly Ile Pro Cys Leu Gly Ser Lys Val Lys Cys Ile Ile Glu Glu Ile
65                  70                  75                  80
```

Ile Glu Asp Gly Glu Ser Ser Glu Val Lys Ala Val Leu Asn Asp Glu
                    85                  90                  95

Arg Tyr Gln Ser Phe Lys Leu Phe Thr Ser Val Phe Gly Val Gly Leu
                100                 105                 110

Lys Thr Ser Glu Lys Trp Phe Arg Met Gly Phe Arg Thr Leu Ser Lys
            115                 120                 125

Val Arg Ser Asp Glu Ser Leu Lys Phe Thr Arg Met Gln Arg Ala Gly
130                 135                 140

Phe Leu Tyr Tyr Glu Asp Leu Val Ser Cys Val Thr Arg Ala Glu Ala
145                 150                 155                 160

Glu Ala Val Ser Ala Leu Val Lys Glu Ala Val Trp Ala Phe Leu Pro
                165                 170                 175

Asp Ala Phe Val Thr Met Thr Gly Gly Phe Arg Arg Gly Lys Lys Met
                180                 185                 190

Gly His Asp Val Asp Phe Leu Ile Thr Ser Pro Gly Ser Thr Glu Asp
            195                 200                 205

Glu Glu Gln Gln Leu Leu Gln Lys Val Met Asn Leu Trp Glu Lys Lys
        210                 215                 220

Gly Leu Leu Leu Tyr Tyr Asp Leu Val Glu Ser Thr Phe Glu Lys Leu
225                 230                 235                 240

Arg Leu Pro Ser Arg Lys Val Asp Ala Leu Asp His Phe Gln Lys Cys
                245                 250                 255

Phe Leu Ile Phe Lys Leu Pro Leu Gln Arg Val Asp Ser Asp Gln Ser
                260                 265                 270

Ser Trp Gln Gly Gly Lys Thr Trp Lys Ala Ile Arg Val Asp Leu Val
            275                 280                 285

Met Cys Pro Tyr Glu Arg Arg Ala Phe Ala Leu Leu Gly Trp Thr Gly
        290                 295                 300

Ser Arg Gln Phe Glu Arg Asp Leu Arg Arg Tyr Ala Thr His Glu Arg
305                 310                 315                 320

Lys Met Ile Leu Asp Asn His Ala Leu Tyr Asp Lys Thr Lys Arg Ile
                325                 330                 335

Phe Leu Lys Ala Glu Ser Glu Glu Glu Ile Phe Ala His Leu Gly Leu
                340                 345                 350

Asp Tyr Ile Glu Pro Trp Glu Arg Asn Ala
            355                 360

<210> SEQ ID NO 46
<211> LENGTH: 362
<212> TYPE: PRT
<213> ORGANISM: Sus scrofa

<400> SEQUENCE: 46

Lys Ile Ser Gln Tyr Ala Cys Gln Arg Arg Thr Thr Leu Asn Asn Cys
1               5                   10                  15

Asn His Ile Phe Thr Asp Ala Phe Glu Val Leu Ala Glu Asn Tyr Glu
                20                  25                  30

Phe Arg Glu Asn Glu Thr Phe Cys Leu Ala Phe Met Arg Ala Ala Ser
            35                  40                  45

Val Leu Lys Ser Leu Pro Phe Thr Ile Ile Ser Met Lys Asp Thr Glu
        50                  55                  60

Gly Ile Pro Cys Leu Gly Asp Lys Val Lys Cys Val Ile Glu Glu Ile
65                  70                  75                  80

Ile Glu Asp Gly Glu Ser Ser Glu Val Lys Ala Val Leu Asn Asp Glu
                85                  90                  95

Arg Tyr Gln Ser Phe Lys Leu Phe Thr Ser Val Phe Gly Val Gly Leu
                100                 105                 110

Lys Thr Ser Glu Arg Trp Phe Arg Met Gly Phe Arg Ser Leu Ser Lys
            115                 120                 125

Ile Arg Ser Asp Lys Thr Leu Lys Phe Thr Arg Met Gln Lys Ala Gly
        130                 135                 140

Phe Leu Tyr Tyr Glu Asp Leu Val Ser Cys Val Thr Arg Ala Glu Ala
145                 150                 155                 160

Glu Ala Val Gly Val Leu Val Lys Glu Ala Val Gln Ala Phe Leu Pro
                165                 170                 175

Asp Ala Phe Val Thr Met Thr Gly Gly Phe Arg Arg Gly Lys Lys Met
            180                 185                 190

Gly His Asp Val Asp Phe Leu Ile Thr Ser Pro Gly Ser Thr Asp Asp
        195                 200                 205

Glu Glu Gln Gln Leu Leu Pro Lys Val Val Asn Leu Trp Glu Arg Glu
210                 215                 220

Gly Leu Leu Leu Tyr Cys Asp Leu Val Glu Ser Thr Leu Glu Lys Ser
225                 230                 235                 240

Lys Leu Pro Ser Arg Asn Val Asp Ala Leu Asp His Phe Gln Lys Cys
                245                 250                 255

Phe Leu Ile Leu Lys Leu His His Gln Arg Val Asp Ser Gly Met Ser
            260                 265                 270

Ser Gln Gln Glu Gly Lys Thr Trp Lys Ala Ile Arg Val Asp Leu Val
        275                 280                 285

Met Cys Pro Tyr Glu Leu Arg Ala Phe Ala Leu Leu Gly Trp Thr Gly
290                 295                 300

Ser Arg Gln Phe Glu Arg Asp Leu Arg Arg Tyr Ala Thr His Glu Arg
305                 310                 315                 320

Lys Met Ile Leu Asp Asn His Ala Leu Tyr Asp Lys Thr Lys Arg Ile
                325                 330                 335

Phe Leu Lys Ala Glu Ser Glu Glu Ile Phe Ala His Leu Gly Leu
            340                 345                 350

Asp Tyr Leu Glu Pro Trp Glu Arg Asn Ala
        355                 360

<210> SEQ ID NO 47
<211> LENGTH: 362
<212> TYPE: PRT
<213> ORGANISM: artificial sequence
<220> FEATURE:
<223> OTHER INFORMATION: N27 trunc new [88.13 percent identity to wt
      calc by NCBI BLASTP] pig

<400> SEQUENCE: 47

Lys Ile Ser Glu Tyr Ala Cys Gln Arg Arg Thr Thr Leu Asn Asn Tyr
1               5                   10                  15

Asn Glu Ile Phe Thr Arg Ala Phe Glu Ile Leu Ala Glu Asn Tyr Glu
            20                  25                  30

Phe Arg Glu Asn Glu Glu Ser Tyr Val Thr Phe Arg Arg Ala Ala Ser
        35                  40                  45

Val Leu Lys Ser Leu Pro Phe Thr Ile Ile Ser Met Lys Asp Thr Glu
    50                  55                  60

Gly Ile Pro Cys Leu Gly Asp Lys Val Lys Arg Val Ile Glu Glu Ile
65                  70                  75                  80

Ile Glu Asp Gly Glu Ser Ser Glu Val Lys Ala Val Leu Asn Asp Glu

```
                    85                  90                  95
Arg Tyr Lys Ala Phe Lys Leu Phe Thr Ser Val Phe Gly Val Gly Arg
            100                 105                 110

Lys Thr Ser Glu Lys Trp Phe Arg Met Gly Phe Arg Thr Leu Glu Lys
        115                 120                 125

Ile Arg Ser Asp Lys Thr Leu Lys Phe Thr Arg Met Gln Lys Ala Gly
    130                 135                 140

Phe Leu Tyr Tyr Glu Asp Leu Val Ser Arg Val Thr Arg Ala Glu Ala
145                 150                 155                 160

Glu Ala Val Ser Val Leu Val Lys Glu Ala Val Trp Ala Phe Leu Pro
                165                 170                 175

Asp Ala Phe Val Thr Met Thr Gly Gly Phe Arg Leu Gly Lys Lys Ile
            180                 185                 190

Gly His Asp Val Asp Phe Leu Ile Thr Ser Pro Gly Ser Thr Glu Glu
        195                 200                 205

Glu Glu Gln Gln Leu Leu His Lys Val Ile Asn Leu Trp Glu Lys Lys
    210                 215                 220

Gly Leu Leu Leu Tyr Tyr Asp Leu Val Glu Ser Thr Phe Glu Lys Leu
225                 230                 235                 240

Lys Leu Pro Ser Arg Thr Val Asp Ala Leu Asp His Phe Gln Lys Cys
                245                 250                 255

Phe Leu Ile Leu Lys Leu His His Gln Arg Val Gly Ser Gly Lys Ser
            260                 265                 270

Ser Gln Gln Glu Gly Lys Thr Trp Lys Ala Ile Arg Val Asp Leu Val
        275                 280                 285

Met Cys Pro Tyr Glu Arg Arg Ala Phe Ala Leu Leu Gly Trp Thr Gly
    290                 295                 300

Ser Pro Gln Phe Asn Arg Asp Leu Arg Arg Tyr Ala Thr His Glu Arg
305                 310                 315                 320

Lys Met Met Leu Asp Asn His Ala Leu Tyr Asp Lys Thr Lys Arg Ile
                325                 330                 335

Phe Leu Lys Ala Glu Ser Glu Glu Ile Phe Ala His Leu Gly Leu
            340                 345                 350

Asp Tyr Ile Glu Pro Trp Glu Arg Asn Ala
        355                 360

<210> SEQ ID NO 48
<211> LENGTH: 362
<212> TYPE: PRT
<213> ORGANISM: artificial sequence
<220> FEATURE:
<223> OTHER INFORMATION: N35 trunc new

<400> SEQUENCE: 48

Lys Ile Ser Glu Tyr Ala Cys Gln Arg Arg Thr Thr Leu Asn Asn Tyr
1               5                   10                  15

Asn Glu Ile Phe Thr Arg Ala Phe Glu Val Leu Ala Glu Asn Tyr Glu
            20                  25                  30

Phe Arg Glu Asn Glu Glu Ser Tyr Val Thr Phe Arg Arg Ala Ala Ser
        35                  40                  45

Val Leu Lys Ser Leu Pro Phe Thr Ile Ile Ser Met Lys Asp Thr Glu
    50                  55                  60

Gly Ile Pro Cys Leu Gly Asp Lys Val Lys Arg Val Ile Glu Glu Ile
65                  70                  75                  80

Ile Glu Asp Gly Glu Ser Ser Glu Val Lys Ala Val Leu Asn Asp Glu
```

```
                    85                  90                  95
Arg Tyr Gln Ala Phe Lys Leu Phe Thr Ser Val Phe Gly Val Gly Arg
            100                 105                 110

Lys Thr Ser Glu Lys Trp Phe Arg Met Gly Phe Arg Thr Leu Glu Lys
            115                 120                 125

Ile Arg Ser Asp Lys Thr Leu Lys Phe Thr Arg Met Gln Lys Ala Gly
            130                 135                 140

Phe Leu Tyr Tyr Glu Asp Leu Ala Glu Arg Val Thr Arg Ala Glu Ala
145                 150                 155                 160

Glu Ala Val Ser Val Leu Val Lys Glu Ala Val Trp Ala Phe Leu Pro
            165                 170                 175

Asp Ala Phe Val Thr Met Thr Gly Gly Phe Arg Leu Gly Lys Lys Ile
            180                 185                 190

Gly His Asp Val Asp Phe Leu Ile Thr Ser Pro Gly Ser Thr Glu Glu
            195                 200                 205

Glu Glu Gln Gln Leu Leu Pro Lys Val Ile Asn Leu Trp Glu Arg Lys
            210                 215                 220

Gly Leu Leu Leu Tyr Tyr Asp Leu Val Glu Ser Thr Phe Glu Lys Leu
225                 230                 235                 240

Lys Leu Pro Ser Arg Lys Val Asp Ala Leu Asp His Phe Gln Lys Cys
            245                 250                 255

Phe Leu Ile Leu Lys Leu His His Gln Arg Val Gly Ser Gly Lys Ser
            260                 265                 270

Ser Gln Gln Glu Gly Lys Thr Trp Lys Ala Ile Arg Val Asp Leu Val
            275                 280                 285

Met Cys Pro Tyr Glu Arg Arg Ala Phe Ala Leu Leu Gly Trp Thr Gly
            290                 295                 300

Ser Ala Phe Phe Asn Arg Asp Leu Arg Arg Tyr Ala Thr His Glu Arg
305                 310                 315                 320

Lys Met Ile Leu Asp Asn His Ala Leu Tyr Asp Lys Thr Lys Arg Ile
            325                 330                 335

Phe Leu Lys Ala Glu Ser Glu Glu Ile Phe Ala His Leu Gly Leu
            340                 345                 350

Asp Tyr Ile Glu Pro Trp Glu Arg Asn Ala
            355                 360

<210> SEQ ID NO 49
<211> LENGTH: 361
<212> TYPE: PRT
<213> ORGANISM: Bubalus bubalis

<400> SEQUENCE: 49

Lys Ile Ser Gln Tyr Ala Cys Gln Arg Lys Thr Thr Leu Asn Asn Tyr
1               5                   10                  15

Asn His Ile Phe Thr Asp Ala Phe Glu Ile Leu Ala Glu Asn Ser Glu
            20                  25                  30

Phe Lys Glu Asn Glu Val Ser Tyr Val Thr Phe Met Arg Ala Ala Ser
            35                  40                  45

Val Leu Lys Ser Leu Pro Phe Thr Ile Ile Ser Met Lys Asp Thr Gln
        50                  55                  60

Gly Ile Pro Cys Leu Gly Asp Lys Val Lys Cys Val Ile Glu Glu Ile
65                  70                  75                  80

Ile Glu Asp Gly Glu Ser Ser Glu Val Lys Ala Val Leu Asn Asp Glu
                85                  90                  95
```

Arg Tyr Gln Ser Phe Lys Leu Phe Thr Ser Val Phe Gly Val Gly Leu
            100                 105                 110

Lys Thr Ser Glu Lys Trp Phe Arg Met Gly Phe Arg Ser Leu Ser Lys
        115                 120                 125

Ile Thr Ser Asp Lys Thr Leu Lys Phe Thr Lys Met Gln Lys Ala Gly
    130                 135                 140

Phe Leu Tyr Tyr Glu Asp Leu Val Ser Cys Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Phe Ile Thr Met Thr Gly Gly Phe Arg Arg Gly Lys Lys Ile
            180                 185                 190

Gly His Asp Val Asp Phe Leu Ile Thr Ser Pro Gly Ser Ala Glu Asp
        195                 200                 205

Glu Glu Gln Leu Leu Pro Lys Val Ile Asn Leu Trp Glu Lys Lys Gly
    210                 215                 220

Leu Leu Leu Tyr Tyr Asp Leu Val Glu Ser Thr Phe Glu Lys Phe Lys
225                 230                 235                 240

Leu Pro Ser Arg Gln Val Asp Thr Leu Asp His Phe Gln Lys Cys Phe
                245                 250                 255

Leu Ile Leu Lys Leu His His Gln Arg Val Asp Ser Gly Arg Ser Asn
            260                 265                 270

Gln Gln Glu Gly Lys Thr Trp Lys Ala Ile Arg Val Asp Leu Val Met
        275                 280                 285

Cys Pro Tyr Glu Asn Arg Ala Phe Ala Leu Leu Gly Trp Thr Gly Ser
    290                 295                 300

Arg Gln Phe Glu Arg Asp Ile Arg Arg Tyr Ala Thr His Glu Arg Lys
305                 310                 315                 320

Met Met Leu Asp Asn His Ala Leu Tyr Asp Lys Thr Lys Arg Val Phe
                325                 330                 335

Leu Lys Ala Glu Ser Glu Glu Ile Phe Ala His Leu Gly Leu Asp
            340                 345                 350

Tyr Ile Glu Pro Trp Glu Arg Asn Ala
        355                 360

<210> SEQ ID NO 50
<211> LENGTH: 362
<212> TYPE: PRT
<213> ORGANISM: Marmota flaviventris

<400> SEQUENCE: 50

Thr Ile Ser Gln Tyr Ala Cys Gln Arg Arg Thr Thr Leu Asn Asn Cys
1               5                   10                  15

Asn Arg Val Phe Thr Asp Ala Phe Asp Val Leu Ala Glu Asn Tyr Glu
            20                  25                  30

Phe Arg Glu Asn Glu Ser Cys Ser Val Val Phe Met Arg Ala Ala Ser
        35                  40                  45

Val Leu Lys Ser Leu Pro Phe Thr Ile Ile Ser Met Arg Asp Leu Glu
    50                  55                  60

Gly Ile Pro Cys Leu Glu Gly Lys Ala Lys Ser Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ser Phe Lys Leu Phe Thr Ser Val Phe Gly Val Gly Leu
            100                 105                 110

```
Lys Thr Ser Glu Lys Trp Phe Arg Met Gly Phe Arg Thr Leu Ser Lys
            115                 120                 125

Ile Arg Ser Asp Lys Ser Leu Lys Phe Thr His Met Gln Lys Ala Gly
            130                 135                 140

Phe Leu Tyr Tyr Glu Asp Leu Val Ser Cys Val Thr Arg Ala Glu Ala
145                 150                 155                 160

Glu Ala Val Ser Val Leu Val Lys Glu Ala Val Trp Ala Phe Leu Pro
                165                 170                 175

Asp Ala Phe Ile Thr Met Thr Gly Gly Phe Arg Arg Gly Lys Asn Ile
                180                 185                 190

Gly His Asp Val Asp Phe Leu Ile Thr Ser Ala Glu Ala Thr Glu Glu
                195                 200                 205

Glu Glu Gln Gln Leu Leu His Lys Val Thr Asn Leu Trp Glu Lys Lys
            210                 215                 220

Gly Leu Leu Leu Tyr Cys Asp Leu Val Glu Ser Thr Phe Glu Lys Leu
225                 230                 235                 240

Lys Thr Pro Ser Arg Lys Val Asp Ala Leu Asp His Phe Gln Lys Cys
                245                 250                 255

Phe Leu Ile Leu Lys Leu His His Gln Arg Val Asp Ser Asp Lys Ala
                260                 265                 270

Ser Gln Gln Gly Gly Lys Asn Trp Lys Ala Ile Arg Val Asp Leu Val
            275                 280                 285

Met Cys Pro Tyr Glu Arg Arg Ala Phe Ala Leu Leu Gly Trp Thr Gly
            290                 295                 300

Ser Arg Gln Phe Glu Arg Asp Leu Arg Arg Tyr Ala Thr His Glu Arg
305                 310                 315                 320

Lys Met Ile Leu Asp Asn His Ala Leu Tyr Asp Lys Thr Lys Arg Ile
                325                 330                 335

Phe Leu Lys Ala Glu Ser Glu Glu Ile Phe Ala His Leu Gly Leu
                340                 345                 350

Asp Tyr Ile Glu Pro Trp Glu Arg Asn Ala
                355                 360

<210> SEQ ID NO 51
<211> LENGTH: 362
<212> TYPE: PRT
<213> ORGANISM: mouse

<400> SEQUENCE: 51

Lys Ile Ser Glu Tyr Ala Cys Gln Arg Arg Thr Thr Leu Asn Asn Tyr
1               5                   10                  15

Asn Glu Leu Phe Thr Arg Ala Leu Asp Ile Leu Ala Glu Asn Asp Glu
                20                  25                  30

Phe Arg Glu Asn Glu Glu Ser Arg Asp Ala Phe Arg Arg Ala Ser Ser
            35                  40                  45

Val Leu Lys Ser Leu Pro Phe Pro Ile Thr Ser Met Lys Asp Thr Glu
        50                  55                  60

Gly Ile Pro Cys Leu Gly Asp Lys Val Lys Arg Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ala Phe Lys Leu Phe Thr Ser Val Phe Gly Val Gly Arg
                100                 105                 110

Lys Thr Ala Glu Lys Trp Phe Arg Met Gly Phe Arg Thr Leu Glu Lys
```

```
            115                 120                 125
Ile Arg Ser Asp Lys Ser Leu Arg Phe Thr Gln Met Gln Lys Ala Gly
        130                 135                 140

Phe Leu Tyr Tyr Glu Asp Leu Ala Glu Arg Val Asn Arg Pro Glu Ala
145                 150                 155                 160

Glu Ala Ile Arg Met Leu Val Lys Glu Ala Val Thr Phe Leu Pro
                165                 170                 175

Asp Ala Leu Val Thr Met Thr Gly Gly Phe Arg Leu Gly Lys Met Thr
            180                 185                 190

Gly His Asp Val Asp Phe Leu Ile Thr Ser Pro Glu Ala Thr Glu Asp
        195                 200                 205

Glu Glu Gln Gln Leu Leu His Lys Val Thr Asp Phe Trp Lys Gln Gln
    210                 215                 220

Gly Leu Leu Leu Tyr Cys Asp Ile Leu Glu Ser Thr Phe Glu Lys Phe
225                 230                 235                 240

Lys Gln Pro Ser Arg Thr Val Asp Ala Leu Asp His Phe Gln Lys Cys
                245                 250                 255

Phe Leu Ile Leu Lys Leu Asp His Pro Arg Val His Ser Val Lys Ser
            260                 265                 270

Gly Gln Gln Glu Gly Lys Gly Trp Lys Ala Ile Arg Val Asp Leu Val
        275                 280                 285

Met Cys Pro Tyr Asp Arg Arg Ala Phe Ala Leu Leu Gly Trp Thr Gly
    290                 295                 300

Ser Pro Gln Phe Asn Arg Asp Leu Arg Arg Tyr Ala Thr His Glu Arg
305                 310                 315                 320

Lys Met Met Leu Asp Asn His Ala Leu Tyr Asp Lys Thr Lys Arg Val
                325                 330                 335

Phe Leu Glu Ala Glu Ser Glu Glu Glu Ile Phe Ala His Leu Gly Leu
            340                 345                 350

Asp Tyr Ile Glu Pro Trp Glu Arg Asn Ala
        355                 360

<210> SEQ ID NO 52
<211> LENGTH: 361
<212> TYPE: PRT
<213> ORGANISM: artificial sequence
<220> FEATURE:
<223> OTHER INFORMATION: (M57 without His tag & linker) bovine-mouse
      chimera

<400> SEQUENCE: 52

Lys Ile Ser Glu Tyr Ala Cys Gln Arg Arg Thr Thr Leu Asn Asn Tyr
1               5                   10                  15

Asn Glu Leu Phe Thr Arg Ala Leu Asp Ile Leu Ala Glu Asn Asp Glu
            20                  25                  30

Phe Arg Glu Asn Glu Glu Ser Arg Asp Ala Phe Arg Arg Ala Ser Ser
        35                  40                  45

Val Leu Lys Ser Leu Pro Phe Pro Ile Thr Ser Met Lys Asp Thr Glu
    50                  55                  60

Gly Ile Pro Cys Leu Gly Asp Lys Val Lys Arg Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ala Phe Lys Leu Phe Thr Ser Val Phe Gly Val Gly Arg
            100                 105                 110
```

```
Lys Thr Ala Glu Lys Trp Phe Arg Met Gly Phe Arg Thr Leu Glu Lys
            115                 120                 125

Ile Arg Ser Asp Lys Ser Leu Arg Phe Thr Gln Met Gln Lys Ala Gly
        130                 135                 140

Phe Leu Tyr Tyr Glu Asp Leu Val Ser Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Phe Val Thr Met Thr Gly Gly Phe Arg Leu Gly Lys Lys Ile
            180                 185                 190

Gly His Asp Val Asp Phe Leu Ile Thr Ser Pro Gly Ser Ala Glu Asp
        195                 200                 205

Glu Glu Gln Leu Leu Pro Lys Val Ile Asn Leu Trp Glu Lys Lys Gly
    210                 215                 220

Leu Leu Leu Tyr Tyr Asp Leu Val Glu Ser Thr Phe Glu Lys Phe Lys
225                 230                 235                 240

Leu Pro Ser Arg Gln Val Asp Thr Leu Asp His Phe Lys Cys Phe
                245                 250                 255

Leu Ile Leu Lys Leu His His Gln Arg Val Asp Ser Ser Lys Ser Asn
            260                 265                 270

Gln Gln Glu Gly Lys Thr Trp Lys Ala Ile Arg Val Asp Leu Val Met
        275                 280                 285

Cys Pro Tyr Glu Asn Arg Ala Phe Ala Leu Leu Gly Trp Thr Gly Ser
    290                 295                 300

Pro Gln Phe Asn Arg Asp Leu Arg Arg Tyr Ala Thr His Glu Arg Lys
305                 310                 315                 320

Met Met Leu Asp Asn His Ala Leu Tyr Asp Lys Thr Lys Arg Val Phe
                325                 330                 335

Leu Glu Ala Glu Ser Glu Glu Ile Phe Ala His Leu Gly Leu Asp
            340                 345                 350

Tyr Ile Glu Pro Trp Glu Arg Asn Ala
        355                 360

<210> SEQ ID NO 53
<211> LENGTH: 361
<212> TYPE: PRT
<213> ORGANISM: artificial sequence
<220> FEATURE:
<223> OTHER INFORMATION: (M59 without His Tag and linker) bovine-mouse
      chimera

<400> SEQUENCE: 53

Lys Ile Ser Glu Tyr Ala Cys Gln Arg Arg Thr Thr Leu Asn Asn Tyr
1               5                   10                  15

Asn Glu Leu Phe Thr Arg Ala Leu Asp Ile Leu Ala Glu Asn Asp Glu
            20                  25                  30

Phe Arg Glu Asn Glu Glu Ser Arg Asp Ala Phe Arg Arg Ala Ser Ser
        35                  40                  45

Val Leu Lys Ser Leu Pro Phe Pro Ile Thr Ser Met Lys Asp Thr Glu
    50                  55                  60

Gly Ile Pro Cys Leu Gly Asp Lys Val Lys Arg Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ala Phe Lys Leu Phe Thr Ser Val Phe Gly Val Gly Arg
            100                 105                 110
```

Lys Thr Ala Glu Lys Trp Phe Arg Met Gly Phe Arg Thr Leu Glu Lys
                115                 120                 125

Ile Arg Ser Asp Lys Ser Leu Arg Phe Thr Gln Met Gln Lys Ala Gly
            130                 135                 140

Phe Leu Tyr Tyr Glu Asp Leu Ala Glu Arg Val Asn Arg Pro Glu Ala
145                 150                 155                 160

Glu Ala Ile Arg Met Leu Val Lys Glu Ala Val Val Thr Phe Leu Pro
                165                 170                 175

Asp Ala Leu Val Thr Met Thr Gly Gly Phe Arg Leu Gly Lys Met Thr
            180                 185                 190

Gly His Asp Val Asp Phe Leu Ile Thr Ser Pro Gly Ser Ala Glu Asp
                195                 200                 205

Glu Glu Gln Leu Leu Pro Lys Val Ile Asn Leu Trp Glu Lys Lys Gly
        210                 215                 220

Leu Leu Leu Tyr Tyr Asp Leu Val Glu Ser Thr Phe Glu Lys Phe Lys
225                 230                 235                 240

Leu Pro Ser Arg Gln Val Asp Thr Leu Asp His Phe Gln Lys Cys Phe
                245                 250                 255

Leu Ile Leu Lys Leu His His Gln Arg Val Asp Ser Ser Lys Ser Asn
            260                 265                 270

Gln Gln Glu Gly Lys Thr Trp Lys Ala Ile Arg Val Asp Leu Val Met
        275                 280                 285

Cys Pro Tyr Glu Asn Arg Ala Phe Ala Leu Leu Gly Trp Thr Gly Ser
290                 295                 300

Pro Gln Phe Asn Arg Asp Leu Arg Arg Tyr Ala Thr His Glu Arg Lys
305                 310                 315                 320

Met Met Leu Asp Asn His Ala Leu Tyr Asp Lys Thr Lys Arg Val Phe
                325                 330                 335

Leu Glu Ala Glu Ser Glu Glu Ile Phe Ala His Leu Gly Leu Asp
            340                 345                 350

Tyr Ile Glu Pro Trp Glu Arg Asn Ala
        355                 360

<210> SEQ ID NO 54
<211> LENGTH: 362
<212> TYPE: PRT
<213> ORGANISM: mouse

<400> SEQUENCE: 54

Lys Ile Ser Glu Tyr Ala Cys Gln Arg Arg Thr Thr Leu Asn Asn Tyr
1               5                   10                  15

Asn Gln Leu Phe Thr Asp Ala Leu Asp Ile Leu Ala Glu Asn Asp Glu
            20                  25                  30

Phe Arg Glu Asn Glu Glu Ser Cys Leu Ala Phe Arg Arg Ala Ser Ser
        35                  40                  45

Val Leu Lys Ser Leu Pro Phe Pro Ile Thr Ser Met Lys Asp Thr Glu
    50                  55                  60

Gly Ile Pro Cys Leu Gly Asp Lys Val Lys Ser Ile Ile Glu Gly Ile
65                  70                  75                  80

Ile Glu Asp Gly Glu Ser Ser Glu Val Lys Ala Val Leu Asn Asp Glu
                85                  90                  95

Arg Tyr Lys Ser Phe Lys Leu Phe Thr Ser Val Phe Gly Val Gly Leu
            100                 105                 110

Lys Thr Ala Glu Lys Trp Phe Arg Met Gly Phe Arg Thr Leu Ser Lys

```
            115                 120                 125
Ile Gln Ser Asp Lys Ser Leu Arg Phe Thr Gln Met Gln Lys Ala Gly
    130                 135                 140
Phe Leu Tyr Tyr Glu Asp Leu Val Ser Gly Val Asn Arg Pro Glu Ala
145                 150                 155                 160
Glu Ala Val Ser Met Leu Val Lys Glu Ala Val Thr Phe Leu Pro
                165                 170                 175
Asp Ala Leu Val Thr Met Thr Gly Gly Phe Arg Leu Gly Lys Met Thr
            180                 185                 190
Gly His Asp Val Asp Phe Leu Ile Thr Ser Pro Glu Ala Thr Glu Asp
            195                 200                 205
Glu Glu Gln Gln Leu Leu His Lys Val Thr Asp Phe Trp Lys Gln Gln
    210                 215                 220
Gly Leu Leu Leu Tyr Cys Asp Ile Leu Glu Ser Thr Phe Glu Lys Phe
225                 230                 235                 240
Lys Gln Pro Ser Arg Thr Val Asp Ala Leu Asp His Phe Gln Lys Cys
                245                 250                 255
Phe Leu Ile Leu Lys Leu Asp His Pro Arg Val His Ser Val Lys Ser
            260                 265                 270
Gly Gln Gln Glu Gly Lys Gly Trp Lys Ala Ile Arg Val Asp Leu Val
            275                 280                 285
Met Cys Pro Tyr Asp Arg Arg Ala Phe Ala Leu Leu Gly Trp Thr Gly
    290                 295                 300
Ser Pro Gln Phe Asn Arg Asp Leu Arg Arg Tyr Ala Thr His Glu Arg
305                 310                 315                 320
Lys Met Met Leu Asp Asn His Ala Leu Tyr Asp Lys Thr Lys Arg Val
                325                 330                 335
Phe Leu Glu Ala Glu Ser Glu Glu Ile Phe Ala His Leu Gly Leu
            340                 345                 350
Asp Tyr Ile Glu Pro Trp Glu Arg Asn Ala
            355                 360

<210> SEQ ID NO 55
<211> LENGTH: 361
<212> TYPE: PRT
<213> ORGANISM: artificial sequence
<220> FEATURE:
<223> OTHER INFORMATION: M54 (from 822)

<400> SEQUENCE: 55

Lys Ile Ser Glu Tyr Ala Cys Gln Arg Lys Thr Thr Leu Asn Asn Tyr
1               5                   10                  15
Asn Glu Ile Phe Thr Arg Ala Phe Glu Ile Leu Ala Glu Asn Ser Glu
            20                  25                  30
Phe Lys Glu Asn Glu Glu Ser Tyr Val Thr Phe Arg Arg Ala Ala Ser
        35                  40                  45
Val Leu Lys Ser Leu Pro Phe Thr Ile Ile Ser Met Lys Asp Thr Glu
    50                  55                  60
Gly Ile Pro Cys Leu Gly Asp Lys Val Lys Ile Ile Glu Glu Ile
65                  70                  75                  80
Ile Glu Asp Gly Glu Ser Ser Glu Val Lys Ala Val Leu Asn Asp Glu
                85                  90                  95
Arg Tyr Gln Ala Phe Lys Leu Phe Thr Ser Val Phe Gly Val Gly Arg
            100                 105                 110
Lys Thr Ser Glu Lys Trp Phe Arg Met Gly Phe Arg Ser Leu Glu Lys
```

```
                115                 120                 125
Ile Arg Ser Asp Lys Thr Leu Lys Phe Thr Lys Met Gln Lys Ala Gly
    130                 135                 140
Phe Leu Tyr Tyr Glu Asp Leu Val Ser Gly Val Thr Arg Ala Glu Ala
145                 150                 155                 160
Glu Ala Val Gly Val Leu Val Lys Glu Ala Val Trp Ala Phe Leu Pro
                165                 170                 175
Asp Ala Phe Val Thr Met Thr Gly Gly Phe Arg Leu Gly Lys Lys Ile
            180                 185                 190
Gly His Asp Val Asp Phe Leu Ile Thr Ser Pro Gly Ser Ala Glu Asp
        195                 200                 205
Glu Glu Gln Leu Leu Pro Lys Val Ile Asn Leu Trp Glu Lys Lys Gly
    210                 215                 220
Leu Leu Leu Tyr Tyr Asp Leu Val Glu Ser Thr Phe Glu Lys Phe Lys
225                 230                 235                 240
Leu Pro Ser Arg Gln Val Asp Thr Leu Asp His Phe Gln Lys Cys Phe
                245                 250                 255
Leu Ile Leu Lys Leu His His Gln Arg Val Asp Ser Ser Lys Ser Asn
            260                 265                 270
Gln Gln Glu Gly Lys Thr Trp Lys Ala Ile Arg Val Asp Leu Val Met
        275                 280                 285
Cys Pro Tyr Glu Asn Arg Ala Phe Ala Leu Leu Gly Trp Thr Gly Ser
    290                 295                 300
Ala Phe Phe Asn Arg Asp Ile Arg Arg Tyr Ala Thr His Glu Arg Lys
305                 310                 315                 320
Met Met Leu Asp Asn His Ala Leu Tyr Asp Lys Thr Lys Arg Val Phe
                325                 330                 335
Leu Lys Ala Glu Ser Glu Glu Ile Phe Ala His Leu Gly Leu Asp
            340                 345                 350
Tyr Ile Glu Pro Arg Glu Arg Asn Ala
        355                 360

<210> SEQ ID NO 56
<211> LENGTH: 362
<212> TYPE: PRT
<213> ORGANISM: Artificial Sequence
<220> FEATURE:
<223> OTHER INFORMATION: M77 without His tag

<400> SEQUENCE: 56

Lys Lys Ile Ser Glu Tyr Ala Cys Gln Arg Arg Thr Thr Leu Asn Asn
1               5                   10                  15
Tyr Asn Glu Leu Phe Thr Arg Ala Leu Asp Ile Leu Ala Glu Asn Asp
            20                  25                  30
Glu Phe Arg Glu Asn Glu Glu Ser Arg Asp Ala Phe Arg Arg Ala Ser
        35                  40                  45
Ser Val Leu Lys Ser Leu Pro Phe Pro Ile Thr Ser Met Lys Asp Thr
    50                  55                  60
Glu Gly Ile Pro Cys Leu Gly Asp Lys Val Lys Arg Ile Ile Glu Glu
65                  70                  75                  80
Ile Ile Glu Asp Gly Glu Ser Ser Glu Val Lys Ala Val Leu Asn Asp
                85                  90                  95
Glu Arg Tyr Lys Ala Phe Lys Leu Phe Thr Ser Val Phe Gly Val Gly
            100                 105                 110
Arg Lys Thr Ala Glu Lys Trp Phe Arg Met Gly Phe Arg Thr Leu Glu
```

```
            115                 120                 125
Lys Ile Arg Ser Asp Lys Ser Leu Arg Phe Thr Gln Met Gln Lys Ala
        130                 135                 140
Gly Phe Leu Tyr Tyr Glu Asp Leu Val Ser Gly Val Thr Arg Ala Glu
145                 150                 155                 160
Ala Glu Ala Val Gly Val Leu Val Lys Glu Ala Val Trp Ala Phe Leu
                165                 170                 175
Pro Asp Ala Phe Val Thr Met Thr Gly Gly Phe Arg Leu Gly Lys Lys
            180                 185                 190
Ile Gly His Asp Val Asp Phe Leu Ile Thr Ser Pro Gly Ser Ala Glu
            195                 200                 205
Asp Glu Glu Gln Leu Leu Pro Lys Val Ile Asn Leu Trp Glu Lys Lys
        210                 215                 220
Gly Leu Leu Leu Tyr Tyr Asp Leu Val Glu Ser Thr Phe Glu Lys Phe
225                 230                 235                 240
Lys Leu Pro Ser Arg Gln Val Asp Thr Leu Asp His Phe Gln Lys Cys
                245                 250                 255
Phe Leu Ile Leu Lys Leu His His Gln Arg Val Asp Ser Ser Lys Ser
            260                 265                 270
Asn Gln Gln Glu Gly Lys Thr Trp Lys Ala Ile Arg Val Asp Leu Val
        275                 280                 285
Met Cys Pro Tyr Glu Asn Arg Ala Phe Ala Leu Leu Gly Trp Thr Gly
        290                 295                 300
Ser Pro Gln Phe Asn Arg Asp Leu Arg Arg Tyr Ala Thr His Glu Arg
305                 310                 315                 320
Lys Met Met Leu Asp Asn His Ala Leu Tyr Asp Lys Thr Lys Arg Val
                325                 330                 335
Phe Leu Glu Ala Glu Ser Glu Glu Ile Phe Ala His Leu Gly Leu
            340                 345                 350
Asp Tyr Ile Glu Pro Trp Glu Arg Asn Ala
        355                 360

<210> SEQ ID NO 57
<211> LENGTH: 377
<212> TYPE: PRT
<213> ORGANISM: Artificial Sequence
<220> FEATURE:
<223> OTHER INFORMATION: M77 with His tag

<400> SEQUENCE: 57

Met Ala Ser Ser His His His His His Ser Ser Gly Ser Glu Lys
1               5                   10                  15
Lys Ile Ser Glu Tyr Ala Cys Gln Arg Arg Thr Thr Leu Asn Asn Tyr
            20                  25                  30
Asn Glu Leu Phe Thr Arg Ala Leu Asp Ile Leu Ala Glu Asn Asp Glu
        35                  40                  45
Phe Arg Glu Asn Glu Glu Ser Arg Asp Ala Phe Arg Arg Ala Ser Ser
    50                  55                  60
Val Leu Lys Ser Leu Pro Phe Pro Ile Thr Ser Met Lys Asp Thr Glu
65                  70                  75                  80
Gly Ile Pro Cys Leu Gly Asp Lys Val Lys Arg Ile Ile Glu Glu Ile
                85                  90                  95
Ile Glu Asp Gly Glu Ser Ser Glu Val Lys Ala Val Leu Asn Asp Glu
            100                 105                 110
Arg Tyr Lys Ala Phe Lys Leu Phe Thr Ser Val Phe Gly Val Gly Arg
```

```
                115                 120                 125
Lys Thr Ala Glu Lys Trp Phe Arg Met Gly Phe Arg Thr Leu Glu Lys
            130                 135                 140

Ile Arg Ser Asp Lys Ser Leu Arg Phe Thr Gln Met Gln Lys Ala Gly
145                 150                 155                 160

Phe Leu Tyr Tyr Glu Asp Leu Val Ser Gly Val Thr Arg Ala Glu Ala
                165                 170                 175

Glu Ala Val Gly Val Leu Val Lys Glu Ala Val Trp Ala Phe Leu Pro
            180                 185                 190

Asp Ala Phe Val Thr Met Thr Gly Gly Phe Arg Leu Gly Lys Lys Ile
            195                 200                 205

Gly His Asp Val Asp Phe Leu Ile Thr Ser Pro Gly Ser Ala Glu Asp
            210                 215                 220

Glu Glu Gln Leu Leu Pro Lys Val Ile Asn Leu Trp Glu Lys Lys Gly
225                 230                 235                 240

Leu Leu Leu Tyr Tyr Asp Leu Val Glu Ser Thr Phe Glu Lys Phe Lys
                245                 250                 255

Leu Pro Ser Arg Gln Val Asp Thr Leu Asp His Phe Gln Lys Cys Phe
            260                 265                 270

Leu Ile Leu Lys Leu His His Gln Arg Val Asp Ser Ser Lys Ser Asn
            275                 280                 285

Gln Gln Glu Gly Lys Thr Trp Lys Ala Ile Arg Val Asp Leu Val Met
290                 295                 300

Cys Pro Tyr Glu Asn Arg Ala Phe Ala Leu Leu Gly Trp Thr Gly Ser
305                 310                 315                 320

Pro Gln Phe Asn Arg Asp Leu Arg Arg Tyr Ala Thr His Glu Arg Lys
                325                 330                 335

Met Met Leu Asp Asn His Ala Leu Tyr Asp Lys Thr Lys Arg Val Phe
            340                 345                 350

Leu Glu Ala Glu Ser Glu Glu Ile Phe Ala His Leu Gly Leu Asp
            355                 360                 365

Tyr Ile Glu Pro Trp Glu Arg Asn Ala
370                 375

<210> SEQ ID NO 58
<211> LENGTH: 361
<212> TYPE: PRT
<213> ORGANISM: artificial sequence
<220> FEATURE:
<223> OTHER INFORMATION: C1-40 without His tag

<400> SEQUENCE: 58

Lys Ile Ser Glu Tyr Ala Cys Gln Arg Arg Thr Thr Leu Asn Asn Tyr
1               5                   10                  15

Asn Glu Leu Phe Thr Arg Ala Leu Asp Ile Leu Ala Glu Asn Asp Glu
            20                  25                  30

Phe Arg Glu Asn Glu Gly Ser Arg Asp Ala Phe Arg Arg Ala Ser Ser
        35                  40                  45

Val Leu Lys Ser Leu Pro Phe Pro Ile Thr Ser Met Lys Asp Thr Glu
50                  55                  60

Gly Ile Pro Cys Leu Gly Asp Lys Val Lys Arg Ile Ile Glu Glu Ile
65                  70                  75                  80

Ile Glu Asp Gly Glu Ser Ser Glu Val Lys Ala Val Leu Asn Asp Glu
                85                  90                  95

Arg Tyr Lys Ala Phe Lys Leu Phe Thr Ser Val Phe Gly Val Gly Arg
```

```
                100             105             110
Lys Thr Ala Glu Lys Trp Phe Arg Met Gly Phe Arg Thr Leu Glu Lys
            115                 120                 125

Ile Arg Ser Asp Lys Ser Leu Arg Phe Thr Gln Met Gln Lys Ala Gly
            130                 135                 140

Phe Leu Tyr Tyr Glu Asp Leu Val Ser Gly Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Phe Val Thr Met Thr Gly Gly Phe Arg Leu Gly Lys Lys Ile
            180                 185                 190

Gly His Asp Val Asp Phe Leu Ile Thr Ser Pro Gly Ser Ala Glu Asp
            195                 200                 205

Glu Glu Gln Leu Leu Pro Lys Val Ile Asn Leu Trp Glu Lys Lys Gly
            210                 215                 220

Leu Leu Leu Tyr Tyr Asp Leu Val Glu Ser Thr Phe Glu Lys Phe Lys
225                 230                 235                 240

Leu Pro Ser Arg Gln Val Asp Thr Leu Asp His Phe Gln Lys Cys Phe
                245                 250                 255

Leu Ile Leu Lys Leu His His Gln Arg Val Asp Ser Ser Lys Ser Asn
            260                 265                 270

Gln Gln Glu Gly Lys Thr Trp Lys Ala Ile Arg Val Asp Leu Val Met
            275                 280                 285

Cys Pro Tyr Glu Asn Arg Ala Phe Ala Leu Leu Gly Trp Thr Gly Ser
            290                 295                 300

Pro Gln Phe Asn Arg Asp Leu Arg Arg Tyr Ala Thr His Glu Arg Lys
305                 310                 315                 320

Met Met Leu Asp Asn His Ala Leu Tyr Asp Lys Thr Lys Arg Val Phe
                325                 330                 335

Leu Glu Ala Glu Ser Glu Glu Ile Phe Ala His Leu Gly Leu Asp
            340                 345                 350

Tyr Ile Glu Pro Trp Glu Arg Asn Ala
            355                 360

<210> SEQ ID NO 59
<211> LENGTH: 376
<212> TYPE: PRT
<213> ORGANISM: artificial sequence
<220> FEATURE:
<223> OTHER INFORMATION: C1-40 with His tag

<400> SEQUENCE: 59

Met Ala Ser Ser His His His His His Ser Ser Gly Ser Glu Lys
1               5                   10                  15

Ile Ser Glu Tyr Ala Cys Gln Arg Arg Thr Thr Leu Asn Asn Tyr Asn
            20                  25                  30

Glu Leu Phe Thr Arg Ala Leu Asp Ile Leu Ala Glu Asn Asp Glu Phe
            35                  40                  45

Arg Glu Asn Glu Glu Ser Arg Asp Ala Phe Arg Ala Ser Ser Val
            50                  55                  60

Leu Lys Ser Leu Pro Phe Pro Ile Thr Ser Met Lys Asp Thr Glu Gly
65                  70                  75                  80

Ile Pro Cys Leu Gly Asp Lys Val Lys Arg Ile Ile Glu Glu Ile Ile
                85                  90                  95

Glu Asp Gly Glu Ser Ser Glu Val Lys Ala Val Leu Asn Asp Glu Arg
```

```
            100              105              110
Tyr Lys Ala Phe Lys Leu Phe Thr Ser Val Phe Gly Val Gly Arg Lys
        115              120              125

Thr Ala Glu Lys Trp Phe Arg Met Gly Phe Arg Thr Leu Glu Lys Ile
        130              135              140

Arg Ser Asp Lys Ser Leu Arg Phe Thr Gln Met Gln Lys Ala Gly Phe
145              150              155              160

Leu Tyr Tyr Glu Asp Leu Val Ser Gly Val Thr Arg Ala Glu Ala Glu
                165              170              175

Ala Val Gly Val Leu Val Lys Glu Ala Val Trp Ala Phe Leu Pro Asp
            180              185              190

Ala Phe Val Thr Met Thr Gly Gly Phe Arg Leu Gly Lys Lys Ile Gly
        195              200              205

His Asp Val Asp Phe Leu Ile Thr Ser Pro Gly Ser Ala Glu Asp Glu
        210              215              220

Glu Gln Leu Leu Pro Lys Val Ile Asn Leu Trp Glu Lys Lys Gly Leu
225              230              235              240

Leu Leu Tyr Tyr Asp Leu Val Glu Ser Thr Phe Glu Lys Phe Lys Leu
                245              250              255

Pro Ser Arg Gln Val Asp Thr Leu Asp His Phe Gln Lys Cys Phe Leu
            260              265              270

Ile Leu Lys Leu His His Gln Arg Val Asp Ser Ser Lys Ser Asn Gln
        275              280              285

Gln Glu Gly Lys Thr Trp Lys Ala Ile Arg Val Asp Leu Val Met Cys
        290              295              300

Pro Tyr Glu Asn Arg Ala Phe Ala Leu Leu Gly Trp Thr Gly Ser Pro
305              310              315              320

Gln Phe Asn Arg Asp Leu Arg Arg Tyr Ala Thr His Glu Arg Lys Met
                325              330              335

Met Leu Asp Asn His Ala Leu Tyr Asp Lys Thr Lys Arg Val Phe Leu
            340              345              350

Glu Ala Glu Ser Glu Glu Ile Phe Ala His Leu Gly Leu Asp Tyr
        355              360              365

Ile Glu Pro Trp Glu Arg Asn Ala
        370              375

<210> SEQ ID NO 60
<211> LENGTH: 363
<212> TYPE: PRT
<213> ORGANISM: artificial sequence
<220> FEATURE:
<223> OTHER INFORMATION: A2-20 without His tag

<400> SEQUENCE: 60

Val Thr Thr Val Ser Glu Tyr Ala Cys Gln Arg Arg Thr Thr Leu Asn
1               5               10              15

Asn Tyr Asn Glu Leu Phe Thr Arg Ala Leu Asp Ile Leu Ala Glu Asn
                20              25              30

Asp Glu Phe Arg Glu Asn Glu Glu Ser Arg Asp Ala Phe Arg Arg Ala
            35              40              45

Ser Ser Val Leu Lys Ser Leu Pro Phe Pro Ile Thr Ser Met Lys Asp
        50              55              60

Thr Glu Gly Ile Pro Cys Leu Gly Asp Lys Val Lys Arg Ile Ile Glu
65              70              75              80

Glu Ile Ile Glu Asp Gly Glu Ser Ser Glu Val Lys Ala Val Leu Asn
```

```
                      85                  90                  95
Asp Glu Arg Tyr Lys Ala Phe Lys Leu Phe Thr Ser Val Phe Gly Val
                100                 105                 110
Gly Arg Lys Thr Ala Glu Lys Trp Phe Arg Met Gly Phe Arg Thr Leu
            115                 120                 125
Glu Lys Ile Arg Ser Asp Lys Ser Leu Arg Phe Thr Gln Met Gln Lys
        130                 135                 140
Ala Gly Phe Leu Tyr Tyr Glu Asp Leu Val Ser Gly Val Thr Arg Ala
145                 150                 155                 160
Glu Ala Glu Ala Val Gly Val Leu Val Lys Glu Ala Val Trp Ala Phe
                165                 170                 175
Leu Pro Asp Ala Phe Val Thr Met Thr Gly Gly Phe Arg Leu Gly Lys
                180                 185                 190
Lys Ile Gly His Asp Val Asp Phe Leu Ile Thr Ser Pro Gly Ser Ala
            195                 200                 205
Glu Asp Glu Glu Gln Leu Leu Pro Lys Val Ile Asn Leu Trp Glu Lys
        210                 215                 220
Lys Gly Leu Leu Leu Tyr Tyr Asp Leu Val Glu Ser Thr Phe Glu Lys
225                 230                 235                 240
Phe Lys Leu Pro Ser Arg Gln Val Asp Thr Leu Asp His Phe Gln Lys
                245                 250                 255
Cys Phe Leu Ile Leu Lys Leu His His Gln Arg Val Asp Ser Ser Lys
                260                 265                 270
Ser Asn Gln Gln Glu Gly Lys Thr Trp Lys Ala Ile Arg Val Asp Leu
            275                 280                 285
Val Met Cys Pro Tyr Glu Asn Arg Ala Phe Ala Leu Leu Gly Trp Thr
        290                 295                 300
Gly Ser Pro Gln Phe Asn Arg Asp Leu Arg Arg Tyr Ala Thr His Glu
305                 310                 315                 320
Arg Lys Met Met Leu Asp Asn His Ala Leu Tyr Asp Lys Thr Lys Arg
                325                 330                 335
Val Phe Leu Glu Ala Glu Ser Glu Glu Ile Phe Ala His Leu Gly
                340                 345                 350
Leu Asp Tyr Ile Glu Pro Trp Glu Arg Asn Ala
            355                 360

<210> SEQ ID NO 61
<211> LENGTH: 379
<212> TYPE: PRT
<213> ORGANISM: artificial sequence
<220> FEATURE:
<223> OTHER INFORMATION: A2-20 with His tag

<400> SEQUENCE: 61

Met Ala Ser Ser His His His His His Ser Ser Gly Ser Glu Asn
1               5                   10                  15
Val Thr Thr Val Ser Glu Tyr Ala Cys Gln Arg Arg Thr Thr Leu Asn
                20                  25                  30
Asn Tyr Asn Glu Leu Phe Thr Arg Ala Leu Asp Ile Leu Ala Glu Asn
            35                  40                  45
Asp Glu Phe Arg Glu Asn Glu Glu Ser Arg Asp Ala Phe Arg Arg Ala
        50                  55                  60
Ser Ser Val Leu Lys Ser Leu Pro Phe Pro Ile Thr Ser Met Lys Asp
65                  70                  75                  80
Thr Glu Gly Ile Pro Cys Leu Gly Asp Lys Val Lys Arg Ile Ile Glu
```

```
                    85                  90                  95
Glu Ile Ile Glu Asp Gly Glu Ser Ser Glu Val Lys Ala Val Leu Asn
                100                 105                 110

Asp Glu Arg Tyr Lys Ala Phe Lys Leu Phe Thr Ser Val Phe Gly Val
            115                 120                 125

Gly Arg Lys Thr Ala Glu Lys Trp Phe Arg Met Gly Phe Arg Thr Leu
    130                 135                 140

Glu Lys Ile Arg Ser Asp Lys Ser Leu Arg Phe Thr Gln Met Gln Lys
145                 150                 155                 160

Ala Gly Phe Leu Tyr Tyr Glu Asp Leu Val Ser Gly Val Thr Arg Ala
                165                 170                 175

Glu Ala Glu Ala Val Gly Val Leu Val Lys Glu Ala Val Trp Ala Phe
            180                 185                 190

Leu Pro Asp Ala Phe Val Thr Met Thr Gly Gly Phe Arg Leu Gly Lys
    195                 200                 205

Lys Ile Gly His Asp Val Asp Phe Leu Ile Thr Ser Pro Gly Ser Ala
210                 215                 220

Glu Asp Glu Glu Gln Leu Leu Pro Lys Val Ile Asn Leu Trp Glu Lys
225                 230                 235                 240

Lys Gly Leu Leu Leu Tyr Tyr Asp Leu Val Glu Ser Thr Phe Glu Lys
                245                 250                 255

Phe Lys Leu Pro Ser Arg Gln Val Asp Thr Leu Asp His Phe Gln Lys
            260                 265                 270

Cys Phe Leu Ile Leu Lys Leu His His Gln Arg Val Asp Ser Ser Lys
    275                 280                 285

Ser Asn Gln Gln Glu Gly Lys Thr Trp Lys Ala Ile Arg Val Asp Leu
290                 295                 300

Val Met Cys Pro Tyr Glu Asn Arg Ala Phe Ala Leu Leu Gly Trp Thr
305                 310                 315                 320

Gly Ser Pro Gln Phe Asn Arg Asp Leu Arg Arg Tyr Ala Thr His Glu
                325                 330                 335

Arg Lys Met Met Leu Asp Asn His Ala Leu Tyr Asp Lys Thr Lys Arg
            340                 345                 350

Val Phe Leu Glu Ala Glu Ser Glu Glu Ile Phe Ala His Leu Gly
    355                 360                 365

Leu Asp Tyr Ile Glu Pro Trp Glu Arg Asn Ala
    370                 375

<210> SEQ ID NO 62
<211> LENGTH: 363
<212> TYPE: PRT
<213> ORGANISM: artificial sequence
<220> FEATURE:
<223> OTHER INFORMATION: ii-ell-40 without His tag

<400> SEQUENCE: 62

Val Ala Thr Val Ser Gly Tyr Ala Cys Gln Arg Arg Thr Thr Leu Asn
1               5                   10                  15

Asn Tyr Asn Glu Leu Phe Thr Arg Ala Leu Asp Ile Leu Ala Glu Asn
            20                  25                  30

Asp Glu Phe Arg Glu Asn Glu Ser Arg Asp Ala Phe Arg Arg Ala
        35                  40                  45

Ser Ser Val Leu Lys Ser Leu Pro Phe Pro Ile Thr Ser Met Lys Asp
50                  55                  60

Thr Glu Gly Ile Pro Cys Leu Gly Asp Lys Val Lys Arg Ile Ile Glu
```

```
              65                  70                  75                  80
    Glu Ile Ile Glu Asp Gly Glu Ser Ser Glu Val Lys Ala Val Leu Asn
                      85                  90                  95

Asp Glu Arg Tyr Lys Ala Phe Lys Leu Phe Thr Ser Val Phe Gly Val
                    100                 105                 110

Gly Arg Lys Thr Ala Glu Lys Trp Phe Arg Met Gly Phe Arg Thr Leu
                    115                 120                 125

Glu Lys Ile Arg Ser Asp Lys Ser Leu Arg Phe Thr Gln Met Gln Lys
                    130                 135                 140

Ala Gly Phe Leu Tyr Tyr Glu Asp Leu Val Ser Gly Val Thr Arg Ala
    145                 150                 155                 160

Glu Ala Glu Ala Val Gly Val Leu Val Lys Glu Ala Val Trp Ala Phe
                    165                 170                 175

Leu Pro Asp Ala Phe Val Thr Met Thr Gly Gly Phe Arg Leu Gly Lys
                    180                 185                 190

Lys Ile Gly His Asp Val Asp Phe Leu Ile Thr Ser Pro Gly Ser Ala
                    195                 200                 205

Glu Asp Glu Glu Gln Leu Leu Pro Lys Val Ile Asn Leu Trp Glu Lys
                    210                 215                 220

Lys Gly Leu Leu Leu Tyr Tyr Asp Leu Val Glu Ser Thr Phe Glu Lys
    225                 230                 235                 240

Phe Lys Leu Pro Ser Arg Gln Val Asp Thr Leu Asp His Phe Gln Lys
                    245                 250                 255

Cys Phe Leu Ile Leu Lys Leu His His Gln Arg Val Asp Ser Ser Lys
                    260                 265                 270

Ser Asn Gln Gln Glu Gly Lys Thr Trp Lys Ala Ile Arg Val Asp Leu
                    275                 280                 285

Val Met Cys Pro Tyr Glu Asn Arg Ala Phe Ala Leu Leu Gly Trp Thr
                    290                 295                 300

Gly Ser Pro Gln Phe Asn Arg Asp Leu Arg Arg Tyr Ala Thr His Glu
    305                 310                 315                 320

Arg Lys Met Met Leu Asp Asn His Ala Leu Tyr Asp Lys Thr Lys Arg
                    325                 330                 335

Val Phe Leu Glu Ala Glu Ser Glu Glu Ile Phe Ala His Leu Gly
                    340                 345                 350

Leu Asp Tyr Ile Glu Pro Trp Glu Arg Asn Ala
                    355                 360

<210> SEQ ID NO 63
<211> LENGTH: 379
<212> TYPE: PRT
<213> ORGANISM: artificial sequence
<220> FEATURE:
<223> OTHER INFORMATION: ii-ell-40 with His tag

<400> SEQUENCE: 63

Met Ala Ser Ser His His His His His Ser Ser Gly Ser Glu Asn
    1               5                   10                  15

Val Ala Thr Val Ser Glu Tyr Ala Cys Gln Arg Arg Thr Thr Leu Asn
                    20                  25                  30

Asn Tyr Asn Glu Leu Phe Thr Arg Ala Leu Asp Ile Leu Ala Glu Asn
                    35                  40                  45

Asp Glu Phe Arg Glu Asn Glu Glu Ser Arg Asp Ala Phe Arg Arg Ala
                    50                  55                  60

Ser Ser Val Leu Lys Ser Leu Pro Phe Pro Ile Thr Ser Met Lys Asp
```

```
                65                  70                  75                  80
        Thr Glu Gly Ile Pro Cys Leu Gly Asp Lys Val Lys Arg Ile Ile Glu
                            85                  90                  95

Glu Ile Ile Glu Asp Gly Glu Ser Ser Glu Val Lys Ala Val Leu Asn
                    100                 105                 110

Asp Glu Arg Tyr Lys Ala Phe Lys Leu Phe Thr Ser Val Phe Gly Val
                115                 120                 125

Gly Arg Lys Thr Ala Glu Lys Trp Phe Arg Met Gly Phe Arg Thr Leu
            130                 135                 140

Glu Lys Ile Arg Ser Asp Lys Ser Leu Arg Phe Thr Gln Met Gln Lys
        145                 150                 155                 160

Ala Gly Phe Leu Tyr Tyr Glu Asp Leu Val Ser Gly Val Thr Arg Ala
                        165                 170                 175

Glu Ala Glu Ala Val Gly Val Leu Val Lys Glu Ala Val Trp Ala Phe
                    180                 185                 190

Leu Pro Asp Ala Phe Val Thr Met Thr Gly Gly Phe Arg Leu Gly Lys
                195                 200                 205

Lys Ile Gly His Asp Val Asp Phe Leu Ile Thr Ser Pro Gly Ser Ala
            210                 215                 220

Glu Asp Glu Glu Gln Leu Leu Pro Lys Val Ile Asn Leu Trp Glu Lys
        225                 230                 235                 240

Lys Gly Leu Leu Leu Tyr Tyr Asp Leu Val Glu Ser Thr Phe Glu Lys
                        245                 250                 255

Phe Lys Leu Pro Ser Arg Gln Val Asp Thr Leu Asp His Phe Gln Lys
                    260                 265                 270

Cys Phe Leu Ile Leu Lys Leu His His Gln Arg Val Asp Ser Ser Lys
                275                 280                 285

Ser Asn Gln Gln Glu Gly Lys Thr Trp Lys Ala Ile Arg Val Asp Leu
            290                 295                 300

Val Met Cys Pro Tyr Glu Asn Arg Ala Phe Ala Leu Leu Gly Trp Thr
        305                 310                 315                 320

Gly Ser Pro Gln Phe Asn Arg Asp Leu Arg Arg Tyr Ala Thr His Glu
                        325                 330                 335

Arg Lys Met Met Leu Asp Asn His Ala Leu Tyr Asp Lys Thr Lys Arg
                    340                 345                 350

Val Phe Leu Glu Ala Glu Ser Glu Glu Ile Phe Ala His Leu Gly
                355                 360                 365

Leu Asp Tyr Ile Glu Pro Trp Glu Arg Asn Ala
            370                 375

<210> SEQ ID NO 64
<211> LENGTH: 363
<212> TYPE: PRT
<213> ORGANISM: artificial sequence
<220> FEATURE:
<223> OTHER INFORMATION: 9-40 without His tag

<400> SEQUENCE: 64

Val Ala Thr Val Ser Glu Tyr Ala Cys Gln Arg Arg Thr Thr Leu Asn
        1               5                   10                  15

Asn Tyr Asn Glu Leu Phe Thr Arg Ala Leu Asp Ile Leu Ala Glu Asn
                        20                  25                  30

Asp Glu Phe Arg Glu Asn Glu Glu Ser Arg Asp Ala Phe Arg Arg Ala
                    35                  40                  45

Ser Ser Val Leu Lys Ser Leu Pro Phe Pro Ile Thr Ser Met Lys Asp
```

```
            50                  55                  60
Thr Glu Gly Ile Pro Cys Leu Gly Asp Lys Val Lys Arg Ile Ile Glu
 65                  70                  75                  80

Glu Ile Ile Glu Asp Gly Ser Ser Glu Val Lys Ala Val Leu Asn
                85                  90                  95

Asp Glu Arg Tyr Lys Ala Phe Lys Leu Phe Thr Ser Val Phe Gly Val
            100                 105                 110

Gly Arg Lys Thr Ala Glu Lys Trp Phe Arg Met Gly Phe Arg Thr Leu
        115                 120                 125

Glu Lys Ile Arg Ser Asp Lys Ser Leu Arg Phe Thr Gln Met Gln Lys
        130                 135                 140

Ala Gly Phe Leu Tyr Tyr Glu Asp Leu Val Ser Gly Val Thr Arg Ala
145                 150                 155                 160

Glu Ala Glu Ala Val Gly Val Leu Val Lys Glu Ala Val Trp Ala Phe
                165                 170                 175

Leu Pro Asp Ala Phe Val Thr Met Thr Gly Gly Phe Arg Leu Gly Lys
            180                 185                 190

Lys Ile Gly His Asp Val Asp Phe Leu Ile Thr Ser Pro Gly Ser Ala
        195                 200                 205

Glu Asp Glu Glu Gln Leu Leu Pro Lys Val Ile Asn Leu Trp Glu Lys
    210                 215                 220

Lys Gly Leu Leu Leu Tyr Tyr Asp Leu Val Glu Ser Thr Phe Glu Lys
225                 230                 235                 240

Phe Lys Leu Pro Ser Arg Gln Val Asp Thr Leu Asp His Phe Gln Lys
                245                 250                 255

Cys Phe Leu Ile Leu Lys Leu His His Gln Arg Val Asp Ser Ser Lys
            260                 265                 270

Ser Asn Gln Gln Glu Gly Lys Thr Trp Lys Ala Ile Arg Val Asp Leu
        275                 280                 285

Val Met Cys Pro Tyr Glu Asn Arg Ala Phe Ala Leu Leu Gly Trp Thr
    290                 295                 300

Gly Ser Pro Gln Phe Asn Arg Asp Leu Arg Arg Tyr Ala Thr His Glu
305                 310                 315                 320

Arg Lys Met Met Leu Asp Asn His Ala Leu Tyr Asp Lys Thr Lys Arg
                325                 330                 335

Val Phe Leu Glu Ala Glu Ser Glu Glu Ile Phe Ala His Leu Gly
            340                 345                 350

Leu Asp Tyr Ile Glu Pro Trp Glu Arg Asn Ala
        355                 360

<210> SEQ ID NO 65
<211> LENGTH: 379
<212> TYPE: PRT
<213> ORGANISM: artificial sequence
<220> FEATURE:
<223> OTHER INFORMATION: 9-40 with His tag

<400> SEQUENCE: 65

Met Ala Ser Ser His His His His His His Ser Ser Gly Ser Glu Asn
 1               5                  10                  15

Val Ala Thr Val Ser Glu Tyr Ala Cys Gln Arg Arg Thr Thr Leu Asn
                20                  25                  30

Asn Tyr Asn Glu Leu Phe Thr Arg Ala Leu Asp Ile Leu Ala Glu Asn
        35                  40                  45

Asp Glu Phe Arg Glu Asn Glu Glu Ser Arg Asp Ala Phe Arg Arg Ala
```

```
        50                  55                  60
Ser Ser Val Leu Lys Ser Leu Pro Phe Pro Ile Thr Ser Met Lys Asp
 65                  70                  75                  80

Thr Glu Gly Ile Pro Cys Leu Gly Asp Lys Val Lys Arg Ile Ile Glu
                     85                  90                  95

Glu Ile Ile Glu Asp Gly Glu Ser Ser Glu Val Lys Ala Val Leu Asn
                100                 105                 110

Asp Glu Arg Tyr Lys Ala Phe Lys Leu Phe Thr Ser Val Phe Gly Val
                115                 120                 125

Gly Arg Lys Thr Ala Glu Lys Trp Phe Arg Met Gly Phe Arg Thr Leu
            130                 135                 140

Glu Lys Ile Arg Ser Asp Lys Ser Leu Arg Phe Thr Gln Met Gln Lys
145                 150                 155                 160

Ala Gly Phe Leu Tyr Tyr Glu Asp Leu Val Ser Gly Val Thr Arg Ala
                165                 170                 175

Glu Ala Glu Ala Val Gly Val Leu Val Lys Glu Ala Val Trp Ala Phe
                180                 185                 190

Leu Pro Asp Ala Phe Val Thr Met Thr Gly Gly Phe Arg Leu Gly Lys
                195                 200                 205

Lys Ile Gly His Asp Val Asp Phe Leu Ile Thr Ser Pro Gly Ser Ala
210                 215                 220

Glu Asp Glu Glu Gln Leu Leu Pro Lys Val Ile Asn Leu Trp Glu Lys
225                 230                 235                 240

Lys Gly Leu Leu Leu Tyr Tyr Asp Leu Val Glu Ser Thr Phe Glu Lys
                245                 250                 255

Phe Lys Leu Pro Ser Arg Gln Val Asp Thr Leu Asp His Phe Gln Lys
                260                 265                 270

Cys Phe Leu Ile Leu Lys Leu His His Gln Arg Val Asp Ser Ser Lys
                275                 280                 285

Ser Asn Gln Gln Glu Gly Lys Thr Trp Lys Ala Ile Arg Val Asp Leu
                290                 295                 300

Val Met Cys Pro Tyr Glu Asn Arg Ala Phe Ala Leu Leu Gly Trp Thr
305                 310                 315                 320

Gly Ser Pro Gln Phe Asn Arg Asp Leu Arg Arg Tyr Ala Thr His Glu
                325                 330                 335

Arg Lys Met Met Leu Asp Asn His Ala Leu Tyr Asp Lys Thr Lys Arg
                340                 345                 350

Val Phe Leu Glu Ala Glu Ser Glu Glu Ile Phe Ala His Leu Gly
                355                 360                 365

Leu Asp Tyr Ile Glu Pro Trp Glu Arg Asn Ala
                370                 375

<210> SEQ ID NO 66
<211> LENGTH: 365
<212> TYPE: PRT
<213> ORGANISM: artificial sequence
<220> FEATURE:
<223> OTHER INFORMATION: (45-751)(loop2 his tag)

<400> SEQUENCE: 66

Met Ala Glu Lys Lys Ile Ser Glu Tyr Ala Cys Gln Arg Arg Thr Thr
  1               5                  10                  15

Leu Asn Asn Tyr Asn Glu Leu Phe Thr Arg Ala Leu Asp Ile Leu Ala
                 20                  25                  30

Glu Asn Asp Glu Phe Arg Glu Asn Glu Glu Ser Arg Asp Ala Phe Arg
```

```
            35                  40                  45
Arg Ala Ser Ser Val Leu Lys Ser Leu Pro Phe Pro Ile Thr Ser Met
 50                  55                  60

Lys Asp Thr Glu Gly Ile Pro Cys Leu Gly Asp Lys Val Lys Arg Ile
 65                  70                  75                  80

Ile Glu Glu Ile Ile Glu Asp Gly Glu Ser Glu Val Lys Ala Val
                     85                  90                  95

Leu Asn Asp Glu Arg Tyr Lys Ala Phe Lys Leu Phe Thr Ser Val Phe
                100                 105                 110

Gly Val Gly Arg Lys Thr Ala Glu Lys Trp Phe Arg Met Gly Phe Arg
                115                 120                 125

Thr Leu Glu Glu Ile Arg Ser Asp Lys Ser Leu Arg Phe Thr Gln Met
130                 135                 140

Gln Lys Ala Gly Phe Leu Tyr Tyr Glu Asp Leu Val Ser Gly Val Thr
145                 150                 155                 160

Arg Ala Glu Ala Glu Ala Val Gly Val Leu Val Lys Glu Ala Val Trp
                165                 170                 175

Ala Phe Leu Pro Asp Ala Phe Val Thr Met Thr Gly Gly Phe Arg Leu
                180                 185                 190

Gly Lys Lys Ile Gly His Asp Val Asp Phe Leu Ile Thr Ser Pro Gly
                195                 200                 205

Ser Ala Glu Asp Glu Glu Gln Leu Leu Pro Lys Val Ile Asn Leu Trp
210                 215                 220

Glu Lys Lys Gly Leu Leu Leu Tyr Tyr Asp Leu Val Glu Ser Thr Leu
225                 230                 235                 240

Glu Lys Phe Lys Leu Pro Ser Arg Gln Val Asp Thr Leu Asp His Phe
                245                 250                 255

Gln Lys Cys Phe Leu Ile Leu Lys Leu His Arg Gln Arg Val Asp Ser
                260                 265                 270

Ser Lys His His His His His His Lys Thr Trp Lys Ala Ile Arg Val
                275                 280                 285

Asp Leu Val Met Cys Pro Tyr Glu Asn Arg Ala Phe Ala Leu Leu Gly
290                 295                 300

Trp Thr Gly Ser Pro Gln Phe Asn Arg Asp Leu Arg Arg Tyr Ala Thr
305                 310                 315                 320

His Glu Arg Lys Met Met Leu Asp Asn His Ala Leu Tyr Asp Lys Thr
                325                 330                 335

Lys Arg Val Phe Leu Glu Ala Glu Ser Glu Glu Ile Phe Ala His
                340                 345                 350

Leu Gly Leu Asp Tyr Ile Glu Pro Trp Glu Arg Asn Ala
                355                 360                 365

<210> SEQ ID NO 67
<211> LENGTH: 369
<212> TYPE: PRT
<213> ORGANISM: Artificial Sequence
<220> FEATURE:
<223> OTHER INFORMATION: (46-737)(loop2 his tag)

<400> SEQUENCE: 67

Met Ala His His Gly Ser Glu Lys Lys Ile Ser Glu Tyr Ala Cys Gln
 1               5                  10                  15

Arg Arg Thr Thr Leu Asn Asn Tyr Asn Glu Leu Phe Thr Arg Ala Leu
                20                  25                  30

Asp Ile Leu Ala Glu Asn Asp Glu Phe Arg Glu Asn Glu Glu Ser Arg
```

```
                35                  40                  45
Asp Ala Phe Arg Arg Ala Ser Ser Val Leu Lys Ser Leu Pro Phe Pro
 50                  55                  60
Ile Thr Ser Met Lys Asp Thr Glu Gly Ile Pro Cys Leu Gly Asp Lys
 65                  70                  75                  80
Val Lys Arg Ile Ile Glu Glu Ile Glu Asp Gly Glu Ser Ser Glu
                 85                  90                  95
Val Lys Ala Val Leu Asn Asp Glu Arg Tyr Lys Ala Phe Lys Leu Phe
                100                 105                 110
Thr Ser Val Phe Gly Val Gly Arg Lys Thr Ala Glu Lys Trp Phe Arg
                115                 120                 125
Met Gly Phe Arg Thr Leu Glu Glu Ile Arg Ser Asp Lys Ser Leu Arg
                130                 135                 140
Phe Thr Gln Met Gln Lys Ala Gly Phe Leu Tyr Tyr Glu Asp Leu Val
145                 150                 155                 160
Ser Gly Val Thr Arg Ala Glu Ala Glu Ala Val Gly Val Leu Val Lys
                165                 170                 175
Glu Ala Val Trp Ala Phe Leu Pro Asp Ala Phe Val Thr Met Thr Gly
                180                 185                 190
Gly Phe Arg Leu Gly Lys Lys Ile Gly His Asp Val Asp Phe Leu Ile
                195                 200                 205
Thr Ser Pro Gly Ser Ala Glu Asp Glu Glu Gln Leu Leu Pro Lys Val
                210                 215                 220
Ile Asn Leu Trp Glu Lys Lys Gly Leu Leu Leu Tyr Tyr Asp Leu Val
225                 230                 235                 240
Glu Ser Thr Leu Glu Lys Phe Lys Arg Pro Ser Arg Gln Val Asp Thr
                245                 250                 255
Leu Asp His Phe Gln Lys Cys Phe Leu Ile Leu Lys Leu His Arg Gln
                260                 265                 270
Arg Val Asp Ser Ser Lys His His His His His Glu Thr Trp Lys
                275                 280                 285
Ala Ile Arg Val Asp Leu Val Met Cys Pro Tyr Glu Asn Arg Ala Phe
                290                 295                 300
Ala Leu Leu Gly Trp Thr Gly Ser Pro Gln Phe Asn Arg Asp Leu Arg
305                 310                 315                 320
Arg Tyr Ala Thr His Glu Arg Lys Met Met Leu Asp Asn His Ala Leu
                325                 330                 335
Tyr Asp Lys Thr Lys Arg Val Phe Leu Glu Ala Glu Ser Glu Glu
                340                 345                 350
Ile Phe Ala His Leu Gly Leu Asp Tyr Ile Glu Pro Trp Glu Arg Asn
                355                 360                 365
Ala

<210> SEQ ID NO 68
<211> LENGTH: 361
<212> TYPE: PRT
<213> ORGANISM: Artificial Sequence
<220> FEATURE:
<223> OTHER INFORMATION: TdT-M96 without N-terminal His tag

<400> SEQUENCE: 68

Lys Ile Ser Glu Tyr Ala Cys Gln Arg Arg Thr Thr Leu Asn Asn Tyr
 1               5                  10                  15
Asn Glu Leu Phe Thr Arg Ala Leu Asp Ile Leu Ala Glu Asn Asp Glu
                 20                  25                  30
```

```
Phe Arg Glu Asn Glu Glu Ser Arg Asp Ala Phe Arg Arg Ala Ser Ser
            35                  40                  45

Val Leu Lys Ser Leu Pro Phe Pro Ile Thr Ser Met Lys Asp Thr Glu
 50                  55                  60

Gly Ile Pro Cys Leu Gly Asp Lys Val Lys Arg Ile Ile Glu Glu Ile
 65                  70                  75                  80

Ile Glu Asp Gly Glu Ser Ser Glu Val Lys Ala Val Leu Asn Asp Glu
                     85                  90                  95

Arg Tyr Lys Ala Phe Lys Leu Phe Thr Ser Val Phe Gly Val Gly Arg
                100                 105                 110

Lys Thr Ala Glu Lys Trp Phe Arg Met Gly Phe Arg Thr Leu Glu Glu
                115                 120                 125

Ile Arg Ser Asp Lys Ser Leu Arg Phe Thr Gln Met Gln Lys Ala Gly
130                 135                 140

Phe Leu Tyr Tyr Glu Asp Leu Val Ser Gly Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Phe Val Thr Met Thr Gly Gly Phe Arg Leu Gly Lys Lys Ile
            180                 185                 190

Gly His Asp Val Asp Phe Leu Ile Thr Ser Pro Gly Ser Ala Glu Asp
        195                 200                 205

Glu Glu Gln Leu Leu Pro Lys Val Ile Asn Leu Trp Glu Lys Lys Gly
    210                 215                 220

Leu Leu Leu Tyr Tyr Asn Leu Val Glu Ser Thr Phe Glu Lys Phe Lys
225                 230                 235                 240

Leu Pro Ser Arg Gln Val Asp Thr Leu Asp His Phe Gln Lys Cys Phe
                245                 250                 255

Leu Ile Leu Lys Leu His His Gln Arg Val Asp Ser Ser Lys Ser Asn
            260                 265                 270

Gln Gln Glu Gly Lys Thr Trp Lys Ala Ile Arg Val Asp Leu Val Met
        275                 280                 285

Cys Pro Tyr Glu Asn Arg Ala Phe Ala Leu Leu Gly Trp Thr Gly Ser
    290                 295                 300

Pro Gln Phe Asn Arg Asp Leu Arg Arg Tyr Ala Thr His Glu Arg Lys
305                 310                 315                 320

Met Met Leu Asp Asn His Ala Leu Tyr Asp Lys Thr Lys Arg Val Phe
                325                 330                 335

Leu Glu Ala Glu Ser Glu Glu Ile Phe Ala His Leu Gly Leu Asp
            340                 345                 350

Tyr Ile Glu Pro Trp Glu Arg Asn Ala
        355                 360

<210> SEQ ID NO 69
<211> LENGTH: 377
<212> TYPE: PRT
<213> ORGANISM: Artificial Sequence
<220> FEATURE:
<223> OTHER INFORMATION: TdT-M96 with N-terminal His tag

<400> SEQUENCE: 69

Met Ala Ser Ser His His His His His His Ser Ser Gly Ser Glu Lys
1               5                   10                  15

Lys Ile Ser Glu Tyr Ala Cys Gln Arg Arg Thr Thr Leu Asn Asn Tyr
            20                  25                  30
```

Asn Glu Leu Phe Thr Arg Ala Leu Asp Ile Leu Ala Glu Asn Asp Glu
            35                  40                  45

Phe Arg Glu Asn Glu Glu Ser Arg Asp Ala Phe Arg Arg Ala Ser Ser
 50                  55                  60

Val Leu Lys Ser Leu Pro Phe Pro Ile Thr Ser Met Lys Asp Thr Glu
 65                  70                  75                  80

Gly Ile Pro Cys Leu Gly Asp Lys Val Lys Arg Ile Ile Glu Glu Ile
                 85                  90                  95

Ile Glu Asp Gly Glu Ser Ser Glu Val Lys Ala Val Leu Asn Asp Glu
                100                 105                 110

Arg Tyr Lys Ala Phe Lys Leu Phe Thr Ser Val Phe Gly Val Gly Arg
            115                 120                 125

Lys Thr Ala Glu Lys Trp Phe Arg Met Gly Phe Arg Thr Leu Glu Glu
        130                 135                 140

Ile Arg Ser Asp Lys Ser Leu Arg Phe Thr Gln Met Gln Lys Ala Gly
145                 150                 155                 160

Phe Leu Tyr Tyr Glu Asp Leu Val Ser Gly Val Thr Arg Ala Glu Ala
                165                 170                 175

Glu Ala Val Gly Val Leu Val Lys Glu Ala Val Trp Ala Phe Leu Pro
            180                 185                 190

Asp Ala Phe Val Thr Met Thr Gly Gly Phe Arg Leu Gly Lys Lys Ile
        195                 200                 205

Gly His Asp Val Asp Phe Leu Ile Thr Ser Pro Gly Ser Ala Glu Asp
210                 215                 220

Glu Glu Gln Leu Leu Pro Lys Val Ile Asn Leu Trp Glu Lys Lys Gly
225                 230                 235                 240

Leu Leu Leu Tyr Tyr Asn Leu Val Glu Ser Thr Phe Glu Lys Phe Lys
                245                 250                 255

Leu Pro Ser Arg Gln Val Asp Thr Leu Asp His Phe Gln Lys Cys Phe
            260                 265                 270

Leu Ile Leu Lys Leu His His Gln Arg Val Asp Ser Ser Lys Ser Asn
        275                 280                 285

Gln Gln Glu Gly Lys Thr Trp Lys Ala Ile Arg Val Asp Leu Val Met
290                 295                 300

Cys Pro Tyr Glu Asn Arg Ala Phe Ala Leu Leu Gly Trp Thr Gly Ser
305                 310                 315                 320

Pro Gln Phe Asn Arg Asp Leu Arg Arg Tyr Ala Thr His Glu Arg Lys
                325                 330                 335

Met Met Leu Asp Asn His Ala Leu Tyr Asp Lys Thr Lys Arg Val Phe
            340                 345                 350

Leu Glu Ala Glu Ser Glu Glu Ile Phe Ala His Leu Gly Leu Asp
        355                 360                 365

Tyr Ile Glu Pro Trp Glu Arg Asn Ala
    370                 375

<210> SEQ ID NO 70
<211> LENGTH: 361
<212> TYPE: PRT
<213> ORGANISM: Artificial Sequence
<220> FEATURE:
<223> OTHER INFORMATION: TdT-M103 without N-terminal His tag

<400> SEQUENCE: 70

Lys Ile Ser Glu Tyr Ala Cys Gln Arg Arg Thr Thr Leu Asn Asn Tyr
1               5                   10                  15

Asn Glu Leu Phe Thr Arg Ala Leu Asp Ile Leu Val Glu Asn Asp Glu
            20                  25                  30

Phe Arg Glu Asn Glu Ser Arg Asp Ala Phe Arg Ala Ser Ser
        35                  40                  45

Val Leu Lys Ser Leu Pro Phe Pro Ile Thr Ser Met Lys Asp Thr Glu
 50                  55                  60

Gly Ile Pro Cys Leu Gly Asp Lys Val Lys Arg Ile Glu Glu Ile
 65                  70                  75                  80

Ile Glu Asp Gly Glu Ser Ser Glu Val Lys Ala Val Leu Asn Asp Glu
                85                  90                  95

Arg Tyr Lys Ala Phe Lys Leu Phe Thr Ser Val Phe Gly Val Gly Arg
            100                 105                 110

Lys Thr Ala Glu Lys Trp Phe Arg Met Gly Phe Arg Thr Leu Glu Lys
            115                 120                 125

Ile Arg Ser Asp Lys Ser Leu Arg Phe Thr Gln Met Gln Lys Ala Gly
 130                 135                 140

Phe Leu Tyr Tyr Glu Asp Leu Val Ser Gly Val Thr Arg Ala Glu Ala
145                 150                 155                 160

Glu Ala Val Gly Val Leu Val Lys Glu Ala Val Trp Ala Phe Leu Pro
                165                 170                 175

Asp Ala Phe Val Thr Met Thr Gly Gly Phe Arg Leu Gly Lys Lys Ile
            180                 185                 190

Gly His Asp Val Asp Phe Leu Ile Thr Ser Pro Gly Ser Ala Glu Asp
            195                 200                 205

Glu Glu Gln Leu Leu Pro Lys Val Ile Asn Leu Trp Glu Lys Lys Gly
        210                 215                 220

Leu Leu Leu Tyr Tyr Asp Leu Arg Glu Ser Thr Phe Glu Lys Phe Lys
225                 230                 235                 240

Leu Pro Ser Arg Gln Val Asp Thr Leu Asp His Phe Gln Lys Cys Phe
            245                 250                 255

Leu Ile Leu Lys Leu His His Gln Arg Val Asp Ser Ser Lys Ser Asn
            260                 265                 270

Gln Gln Glu Gly Lys Thr Trp Lys Ala Ile Arg Val Asp Leu Val Met
        275                 280                 285

Cys Pro Tyr Glu Asn Arg Ala Phe Ala Leu Leu Gly Trp Thr Gly Ser
290                 295                 300

Pro Gln Phe Asn Arg Asp Leu Arg Arg Tyr Ala Thr His Glu Arg Lys
305                 310                 315                 320

Met Met Leu Asp Asn His Ala Leu Tyr Asp Lys Thr Lys Arg Val Phe
            325                 330                 335

Leu Glu Ala Glu Ser Glu Glu Ile Phe Ala His Leu Gly Leu Asp
            340                 345                 350

Tyr Ile Glu Pro Trp Glu Arg Asn Ala
        355                 360

<210> SEQ ID NO 71
<211> LENGTH: 377
<212> TYPE: PRT
<213> ORGANISM: Artificial Sequence
<220> FEATURE:
<223> OTHER INFORMATION: TdT-M103 with N-terminal His tag

<400> SEQUENCE: 71

Met Ala Ser Ser His His His His His His Ser Ser Gly Ser Glu Lys
1               5                   10                  15

```
Lys Ile Ser Glu Tyr Ala Cys Gln Arg Arg Thr Thr Leu Asn Asn Tyr
            20                  25                  30

Asn Glu Leu Phe Thr Arg Ala Leu Asp Ile Leu Val Glu Asn Asp Glu
        35                  40                  45

Phe Arg Glu Asn Glu Ser Arg Asp Ala Phe Arg Arg Ala Ser Ser
50                  55                  60

Val Leu Lys Ser Leu Pro Phe Pro Ile Thr Ser Met Lys Asp Thr Glu
65                  70                  75                  80

Gly Ile Pro Cys Leu Gly Asp Lys Val Lys Arg Ile Ile Glu Glu Ile
                85                  90                  95

Ile Glu Asp Gly Glu Ser Ser Glu Val Lys Ala Val Leu Asn Asp Glu
                100                 105                 110

Arg Tyr Lys Ala Phe Lys Leu Phe Thr Ser Val Phe Gly Val Gly Arg
            115                 120                 125

Lys Thr Ala Glu Lys Trp Phe Arg Met Gly Phe Arg Thr Leu Glu Lys
130                 135                 140

Ile Arg Ser Asp Lys Ser Leu Arg Phe Thr Gln Met Gln Lys Ala Gly
145                 150                 155                 160

Phe Leu Tyr Tyr Glu Asp Leu Val Ser Gly Val Thr Arg Ala Glu Ala
                165                 170                 175

Glu Ala Val Gly Val Leu Val Lys Glu Ala Val Trp Ala Phe Leu Pro
            180                 185                 190

Asp Ala Phe Val Thr Met Thr Gly Gly Phe Arg Leu Gly Lys Lys Ile
        195                 200                 205

Gly His Asp Val Asp Phe Leu Ile Thr Ser Pro Gly Ser Ala Glu Asp
    210                 215                 220

Glu Glu Gln Leu Leu Pro Lys Val Ile Asn Leu Trp Glu Lys Lys Gly
225                 230                 235                 240

Leu Leu Leu Tyr Tyr Asp Leu Arg Glu Ser Thr Phe Glu Lys Phe Lys
                245                 250                 255

Leu Pro Ser Arg Gln Val Asp Thr Leu Asp His Phe Gln Lys Cys Phe
            260                 265                 270

Leu Ile Leu Lys Leu His His Gln Arg Val Asp Ser Ser Lys Ser Asn
        275                 280                 285

Gln Gln Glu Gly Lys Thr Trp Lys Ala Ile Arg Val Asp Leu Val Met
290                 295                 300

Cys Pro Tyr Glu Asn Arg Ala Phe Ala Leu Leu Gly Trp Thr Gly Ser
305                 310                 315                 320

Pro Gln Phe Asn Arg Asp Leu Arg Arg Tyr Ala Thr His Glu Arg Lys
                325                 330                 335

Met Met Leu Asp Asn His Ala Leu Tyr Asp Lys Thr Lys Arg Val Phe
            340                 345                 350

Leu Glu Ala Glu Ser Glu Glu Ile Phe Ala His Leu Gly Leu Asp
        355                 360                 365

Tyr Ile Glu Pro Trp Glu Arg Asn Ala
370                 375
```